United States Patent
Forster et al.

(10) Patent No.: US 10,333,454 B2
(45) Date of Patent: Jun. 25, 2019

(54) POWER TOOL HAVING A UNIVERSAL MOTOR CAPABLE OF BEING POWERED BY AC OR DC POWER SUPPLY

(71) Applicant: Black & Decker, Inc., New Britain, CT (US)

(72) Inventors: Michael K. Forster, White Hall, MD (US); John C. Vanko, Timonium, MD (US); Daniel J. White, Baltimore, MD (US); Bhanuprasad V. Gorti, Perry Hall, MD (US)

(73) Assignee: Black & Decker Inc., New Britain, CT (US)

(*) Notice: Subject to any disclaimer, the term of this patent is extended or adjusted under 35 U.S.C. 154(b) by 0 days.

(21) Appl. No.: 15/817,383

(22) Filed: Nov. 20, 2017

(65) Prior Publication Data

US 2018/0090978 A1 Mar. 29, 2018

Related U.S. Application Data

(63) Continuation of application No. 15/289,654, filed on Oct. 10, 2016, now abandoned, which is a
(Continued)

(51) Int. Cl.
*B25F 5/00* (2006.01)
*B25F 5/02* (2006.01)
(Continued)

(52) U.S. Cl.
CPC ............. *H02P 29/032* (2016.02); *B25F 5/00* (2013.01); *B25F 5/02* (2013.01); *H01M 2/1022* (2013.01);
(Continued)

(58) Field of Classification Search
CPC ............ H02J 7/00; H02J 7/0024; H02J 7/022; H01M 10/00; H01M 10/4207;
(Continued)

(56) References Cited

U.S. PATENT DOCUMENTS 2,559,521 A  7/1951 Smith, Jr. et al.
2,590,805 A  3/1952 Vitale
(Continued)

FOREIGN PATENT DOCUMENTS

CA  1304464  6/1992
CA  1315335  3/1993
(Continued)

OTHER PUBLICATIONS

ThunderVolt Catalog 1990.
(Continued)

*Primary Examiner* — Bickey Dhakal
*Assistant Examiner* — Said Bouziane
(74) *Attorney, Agent, or Firm* — Amir Rohani

(57) ABSTRACT

A power tool is provided including an electric universal motor. A power supply interface is arranged to receive at least one of Alternating Current (AC) power from an AC power supply having a first nominal voltage higher than the operating voltage of the motor, or Direct Current (DC) power from a DC power supply having a second nominal voltage that falls approximately within the operating voltage range of the motor. The power supply interface outputs the AC power via an AC power line and the DC power via a DC power line. A motor control circuit supplies electric power from one of the AC power line or the DC power line via a common node, and reduces a supply of power from the AC power line to a level corresponding to the operating voltage of the operating voltage range of the motor.

21 Claims, 49 Drawing Sheets

Related U.S. Application Data continuation of application No. PCT/US2015/031432, filed on May 15, 2015, and a continuation of application No. 14/992,484, filed on Jan. 11, 2016, now Pat. No. 9,583,793, which is a continuation of application No. 14/715,258, filed on May 18, 2015, now Pat. No. 9,406,915.

(60) Provisional application No. 62/118,917, filed on Feb. 20, 2015, provisional application No. 62/114,645, filed on Feb. 11, 2015, provisional application No. 62/093,513, filed on Dec. 18, 2014, provisional application No. 62/091,134, filed on Dec. 12, 2014, provisional application No. 62/046,546, filed on Sep. 5, 2014, provisional application No. 62/000,307, filed on May 19, 2014, provisional application No. 62/000,112, filed on May 19, 2014, provisional application No. 61/994,953, filed on May 18, 2014.

(51) Int. Cl.

| | | |
|---|---|---|
| *H01M 2/10* | (2006.01) | |
| *H01M 2/20* | (2006.01) | |
| *H01M 2/30* | (2006.01) | |
| *H01M 2/34* | (2006.01) | |
| *H02J 5/00* | (2016.01) | |
| *H02J 7/00* | (2006.01) | |
| *H02J 7/02* | (2016.01) | |
| *H02J 7/04* | (2006.01) | |
| *H02J 7/36* | (2006.01) | |
| *H01M 10/42* | (2006.01) | |
| *H01M 10/44* | (2006.01) | |
| *H01M 10/46* | (2006.01) | |
| *H02P 25/14* | (2006.01) | |
| *H02P 27/08* | (2006.01) | |
| *H02P 29/00* | (2016.01) | |
| *H02P 29/024* | (2016.01) | |
| *H02P 29/032* | (2016.01) | |

(52) U.S. Cl.
CPC ......... *H01M 2/1061* (2013.01); *H01M 2/204* (2013.01); *H01M 2/30* (2013.01); *H01M 2/34* (2013.01); *H01M 10/425* (2013.01); *H01M 10/4207* (2013.01); *H02J 5/00* (2013.01); *H02J 7/0013* (2013.01); *H02J 7/0022* (2013.01); *H02J 7/0024* (2013.01); *H02J 7/0045* (2013.01); *H02J 7/02* (2013.01); *H02J 7/022* (2013.01); *H02J 7/045* (2013.01); *H02J 7/36* (2013.01); *H02P 25/14* (2013.01); *H02P 27/08* (2013.01); *H02P 29/00* (2013.01); *H02P 29/024* (2013.01); *H01M 10/441* (2013.01); *H01M 10/46* (2013.01); *H01M 2220/30* (2013.01); *H02J 2007/0001* (2013.01)

(58) Field of Classification Search
CPC ......... H01M 10/4214; H01M 10/4221; H01M 10/441; H01M 10/0445; H01M 2/1022; H01M 2/1033; H01M 2220/30; H02P 25/14; H02P 29/00
See application file for complete search history.

(56) References Cited

U.S. PATENT DOCUMENTS

| | | |
|---|---|---|
| 3,214,670 A | 10/1965 | Schaf et al. |
| 3,344,899 A | 10/1967 | Wang et al. |
| 3,453,518 A | 7/1969 | Stambaugh |
| 3,456,119 A | 7/1969 | Franklin et al. |
| 3,525,912 A | 8/1970 | Gus et al. |
| 3,757,194 A | 9/1973 | Weber et al. |
| 3,936,710 A | 2/1976 | Tanikoshi et al. |
| 3,970,912 A | 7/1976 | Hoffman |
| 4,175,249 A | 11/1979 | Gruber et al. |
| 4,240,015 A | 12/1980 | White et al. |
| 4,267,914 A | 5/1981 | Saar et al. |
| 4,285,112 A | 8/1981 | Eshghy et al. |
| 4,292,571 A | 9/1981 | Cuneo et al. |
| 4,315,162 A | 2/1982 | Ferguson et al. |
| 4,581,570 A | 4/1986 | Mejia |
| 4,737,661 A | 4/1988 | Lessign, III et al. |
| 4,834,192 A | 5/1989 | Hansson et al. |
| 4,835,409 A | 5/1989 | Walter et al. |
| 4,835,410 A | 5/1989 | Bhagwat et al. |
| 4,835,448 A | 5/1989 | Dishner et al. |
| 4,847,513 A | 7/1989 | Katz et al. |
| 4,879,503 A | 11/1989 | Aoki et al. |
| 5,028,858 A | 7/1991 | Schnizler et al. |
| 5,095,259 A | 3/1992 | Bailey et al. |
| 5,121,046 A | 6/1992 | McCullough et al. |
| 5,180,641 A | 1/1993 | Burns et al. |
| 5,217,395 A | 6/1993 | Bailey et al. |
| 5,229,693 A | 7/1993 | Futami et al. |
| 5,235,232 A | 8/1993 | Conley et al. |
| 5,285,112 A | 2/1994 | Mann |
| 5,298,821 A | 3/1994 | Michel et al. |
| 5,298,839 A | 3/1994 | Takeda |
| 5,354,215 A | 10/1994 | Viracola et al. |
| 5,461,264 A | 10/1995 | Yang et al. |
| 5,506,456 A | 3/1996 | Yang et al. |
| 5,573,074 A | 11/1996 | Thames et al. |
| 5,687,129 A | 11/1997 | Kim et al. |
| 5,715,156 A | 2/1998 | Yilmaz et al. |
| 5,734,025 A | 2/1998 | Komai et al. |
| 5,739,651 A | 3/1998 | Miyazawa et al. |
| 5,804,939 A | 9/1998 | Yamai et al. |
| 5,821,722 A | 10/1998 | Forbes et al. |
| 5,897,454 A | 4/1999 | Cannaliato et al. |
| 6,034,494 A | 3/2000 | Kitamine et al. |
| 6,057,608 A | 5/2000 | Bailey, Jr. et al. |
| 6,081,087 A | 6/2000 | Iijima et al. |
| 6,104,162 A | 8/2000 | Sainsbury et al. |
| 6,172,437 B1 | 1/2001 | Du et al. |
| 6,172,860 B1 | 1/2001 | Yoshimizu et al. |
| 6,243,276 B1 | 6/2001 | Neumann et al. |
| 6,268,711 B1 | 7/2001 | Bearfield et al. |
| 6,296,065 B1 | 10/2001 | Carrier et al. |
| 6,308,059 B1 | 10/2001 | Domes |
| 6,346,793 B1 | 2/2002 | Shibata et al. |
| 6,400,107 B1 | 6/2002 | Nakatani et al. |
| 6,430,692 B1 | 8/2002 | Kimble et al. |
| 6,431,289 B1 | 8/2002 | Potter et al. |
| 6,448,732 B1 | 9/2002 | Block et al. |
| 6,460,626 B2 | 10/2002 | Carrier et al. |
| 6,495,932 B1 | 12/2002 | Nakagawa et al. |
| 6,522,902 B2 | 2/2003 | Nishihara et al. |
| 6,536,536 B1 | 3/2003 | Gass et al. |
| 6,566,843 B2 | 5/2003 | Takano et al. |
| 6,573,621 B2 | 6/2003 | Neumann et al. |
| 6,577,097 B2 | 6/2003 | Krefta et al. |
| 6,580,235 B2 | 6/2003 | Laurent et al. |
| 6,581,696 B2 | 6/2003 | Giardino et al. |
| 6,624,535 B2 | 9/2003 | Morrow et al. |
| 6,675,912 B2 | 1/2004 | Carrier et al. |
| 6,683,396 B2 | 1/2004 | Ishida et al. |
| 6,713,988 B2 | 3/2004 | Dubac et al. |
| 6,727,679 B2 | 4/2004 | Kovarik et al. |
| 6,731,022 B2 | 5/2004 | Silverman et al. |
| 6,753,673 B2 | 6/2004 | Shiue et al. |
| 6,761,229 B2 | 7/2004 | Cripe et al. |
| 6,765,317 B2 | 7/2004 | Chu |
| 6,860,341 B2 | 3/2005 | Spielmann et al. |
| 6,971,951 B2 | 12/2005 | Boyer et al. |
| 6,978,846 B2 | 12/2005 | Kawai et al. |
| 6,982,541 B2 | 1/2006 | Zick et al. |
| 6,983,810 B2 | 1/2006 | Hara et al. |
| 7,007,762 B2 | 3/2006 | Yamamoto et al. |
| 7,064,519 B2 | 6/2006 | Ito et al. |
| 7,085,123 B2 | 8/2006 | Shiue et al. |

(56) References Cited

U.S. PATENT DOCUMENTS

| | | |
|---|---|---|
| 7,090,030 B2 | 8/2006 | Miller et al. |
| 7,102,306 B2 | 9/2006 | Hamaoka et al. |
| 7,121,361 B2 | 10/2006 | Hara et al. |
| 7,157,870 B2 | 1/2007 | Nakawa et al. |
| 7,157,882 B2 | 1/2007 | Johnson et al. |
| 7,176,656 B2 | 2/2007 | Feldmann et al. |
| 7,193,385 B2 | 3/2007 | Emadi et al. |
| 7,196,911 B2 | 3/2007 | Takano et al. |
| 7,202,622 B2 | 4/2007 | Eskritt et al. |
| 7,210,541 B2 | 5/2007 | Miller et al. |
| 7,292,009 B2 | 11/2007 | Kawakami et al. |
| 7,327,120 B2 | 2/2008 | Lin et al. |
| 7,332,889 B2 | 2/2008 | Glasgow et al. |
| 7,385,366 B2 | 7/2008 | Yukitake et al. |
| 7,494,035 B2 | 2/2009 | Weaver et al. |
| 7,516,726 B2 | 4/2009 | Esaka et al. |
| 7,551,411 B2 | 6/2009 | Woods et al. |
| 7,621,652 B2 | 11/2009 | Zick et al. |
| 7,653,963 B2 | 2/2010 | Cochran et al. |
| 7,659,696 B2 | 2/2010 | Zeiler et al. |
| 7,696,721 B2 | 4/2010 | Young et al. |
| 7,723,954 B2 | 5/2010 | Frucht |
| 7,750,594 B2 | 7/2010 | Clothier et al. |
| 7,752,760 B2 | 7/2010 | Baskar et al. |
| 7,755,308 B2 | 7/2010 | Kayikci et al. |
| 7,821,217 B2 | 10/2010 | Abolhassani et al. |
| 7,835,534 B2 * | 11/2010 | Cole, Jr. .............. A45C 15/00 219/717 |
| 8,025,418 B2 | 9/2011 | Zick et al. |
| 8,040,090 B2 | 10/2011 | Kitagawa et al. |
| 8,076,873 B1 | 12/2011 | Lucas et al. |
| 8,136,254 B2 | 3/2012 | Riddell et al. |
| 8,159,194 B2 | 4/2012 | Mori et al. |
| 8,198,835 B2 | 6/2012 | Yokoyama et al. |
| 8,212,504 B2 | 7/2012 | Ogahara et al. |
| 8,222,863 B2 | 7/2012 | Sakibara |
| 8,241,235 B2 | 8/2012 | Kahler et al. |
| 8,310,177 B2 | 11/2012 | Naumann et al. |
| 8,376,667 B2 | 2/2013 | Wilbert et al. |
| 8,378,632 B2 | 2/2013 | Bourilkov et al. |
| 8,381,829 B2 | 2/2013 | Hanawa et al. |
| 8,395,337 B2 | 3/2013 | Onishi et al. |
| 8,410,756 B2 | 4/2013 | Matsunga |
| 8,424,213 B2 | 4/2013 | Fukinuki et al. |
| 8,490,732 B2 | 7/2013 | Sugimoto et al. |
| 8,564,236 B2 | 10/2013 | Hirabayashi et al. |
| 8,587,230 B2 | 11/2013 | Pant et al. |
| 8,601,640 B2 | 12/2013 | Bertram et al. |
| 8,643,319 B2 | 2/2014 | Celik et al. |
| 8,723,480 B2 | 5/2014 | Lim et al. |
| 8,732,896 B2 | 5/2014 | Lucas et al. |
| 8,733,470 B2 | 5/2014 | Matthias et al. |
| 8,797,004 B2 | 8/2014 | Skinner et al. |
| 8,813,866 B2 | 8/2014 | Suzuki et al. |
| 8,847,532 B2 | 9/2014 | Kawai et al. |
| 8,876,540 B2 | 11/2014 | Lavender |
| 8,994,336 B2 | 3/2015 | Brotto et al. |
| 9,041,322 B2 | 5/2015 | Shimizu et al. |
| 9,112,360 B2 | 8/2015 | Goto et al. |
| 2001/0017531 A1 | 8/2001 | Sakakibara et al. |
| 2003/0090227 A1 | 5/2003 | Ito et al. |
| 2003/0235060 A1 | 12/2003 | Matsubara et al. |
| 2004/0084968 A1 * | 5/2004 | Lee .............. H02J 9/062 307/66 |
| 2004/0140781 A1 | 7/2004 | Craven et al. |
| 2005/0110458 A1 | 5/2005 | Seman et al. |
| 2005/0200339 A1 | 9/2005 | Phillips et al. |
| 2005/0247459 A1 | 11/2005 | Voigt et al. |
| 2005/0263305 A1 | 12/2005 | Shimizu et al. |
| 2005/0280393 A1 | 12/2005 | Feldmann et al. |
| 2006/0157262 A1 | 7/2006 | Chen et al. |
| 2006/0218768 A1 | 10/2006 | Makimae et al. |
| 2006/0222930 A1 | 10/2006 | Aradachi et al. |
| 2006/0225904 A1 | 10/2006 | Chen et al. |
| 2007/0034394 A1 | 2/2007 | Gass et al. |
| 2007/0090796 A1 | 4/2007 | Norris et al. |
| 2007/0152624 A1 | 7/2007 | Hamaoka et al. |
| 2008/0079319 A1 | 4/2008 | Okada et al. |
| 2008/0180049 A1 * | 7/2008 | Yang .............. A47L 9/2805 318/434 |
| 2008/0218917 A1 | 9/2008 | Archer et al. |
| 2008/0266913 A1 | 10/2008 | Brotto et al. |
| 2008/0284363 A1 * | 11/2008 | Lucas .............. A01D 34/78 318/441 |
| 2009/0121550 A1 | 5/2009 | Riviera et al. |
| 2010/0181966 A1 * | 7/2010 | Sakakibara .............. B25F 5/00 320/136 |
| 2010/0244769 A1 | 9/2010 | Sakibara |
| 2010/0320969 A1 | 12/2010 | Goto |
| 2011/0001456 A1 | 1/2011 | Wang et al. |
| 2011/0012560 A1 | 1/2011 | Sakakibara |
| 2011/0037423 A1 | 2/2011 | Koda et al. |
| 2011/0043143 A1 | 2/2011 | Alter et al. |
| 2011/0090726 A1 | 4/2011 | Brotto et al. |
| 2011/0121782 A1 | 5/2011 | Marsh et al. |
| 2011/0147031 A1 | 7/2011 | Matthias et al. |
| 2011/0162219 A1 | 7/2011 | Okouchi et al. |
| 2011/0250484 A1 | 10/2011 | Meng et al. |
| 2011/0279070 A1 | 11/2011 | Tanaka et al. |
| 2011/0285352 A1 | 11/2011 | Lim et al. |
| 2011/0291617 A1 | 12/2011 | Rosenbecker et al. |
| 2012/0037385 A1 | 2/2012 | Suzuki et al. |
| 2012/0048588 A1 | 3/2012 | Iyoda et al. |
| 2012/0205984 A1 | 8/2012 | Fukomoto |
| 2012/0239957 A1 | 9/2012 | Hsiao et al. |
| 2012/0262955 A1 * | 10/2012 | Yan .............. H02M 3/3376 363/21.02 |
| 2012/0287691 A1 | 11/2012 | Breuner et al. |
| 2012/0293128 A1 | 11/2012 | Kim et al. |
| 2012/0321912 A1 | 12/2012 | Hachisuka et al. |
| 2013/0025893 A1 | 1/2013 | Ota et al. |
| 2013/0044002 A1 | 2/2013 | Schneider et al. |
| 2013/0082627 A1 | 4/2013 | Ichikawa et al. |
| 2013/0106355 A1 | 5/2013 | Kim et al. |
| 2013/0134787 A1 | 5/2013 | Sakibara |
| 2013/0162045 A1 | 6/2013 | Weissenborn et al. |
| 2013/0164589 A1 | 6/2013 | Ota et al. |
| 2013/0187461 A1 | 7/2013 | Goto et al. |
| 2013/0293197 A1 | 11/2013 | Sakakibara et al. |
| 2013/0314007 A1 | 11/2013 | Yanagihara et al. |
| 2013/0320926 A1 | 12/2013 | Kerfoot, Jr. et al. |
| 2013/0334898 A1 | 12/2013 | Kao et al. |
| 2014/0132093 A1 | 5/2014 | Purohit et al. |
| 2014/0190017 A1 | 7/2014 | Máynez et al. |
| 2014/0210379 A1 | 7/2014 | Kato et al. |
| 2014/0361740 A1 | 12/2014 | Suzuki et al. |
| 2015/0015205 A1 | 1/2015 | Suzuki et al. |
| 2015/0137717 A1 | 5/2015 | Ishikawa et al. |

FOREIGN PATENT DOCUMENTS

| | | |
|---|---|---|
| DE | 2412143 | 9/1975 |
| DE | 2838996 | 3/1980 |
| DE | 3844093 | 7/1990 |
| DE | 19907369 | 8/2000 |
| DE | 102009046565 | 5/2011 |
| DE | 202012001853 | 5/2012 |
| DE | 202013102567 | 9/2013 |
| DE | 102012210662 | 12/2013 |
| DE | 202011110568 | 10/2014 |
| EP | 0024268 | 2/1981 |
| EP | 0170833 | 2/1986 |
| EP | 0310717 | 4/1989 |
| EP | 0310718 | 4/1989 |
| EP | 0372823 | 7/1990 |
| EP | 0609101 | 8/1994 |
| EP | 1266725 | 12/2002 |
| EP | 1381131 | 1/2004 |
| EP | 1898508 | 3/2008 |
| EP | 1903657 | 3/2008 |
| EP | 2246157 | 11/2010 |
| EP | 2495843 | 5/2012 |
| EP | 2554334 | 2/2013 |

(56) References Cited

FOREIGN PATENT DOCUMENTS

| | | |
|---|---|---|
| EP | 2554335 | 2/2013 |
| EP | 2704287 | 3/2014 |
| EP | 2747235 | 6/2014 |
| GB | 2399148 | 9/2004 |
| JP | 4-183253 | 6/1992 |
| JP | 05236608 | 9/1993 |
| JP | 7337067 | 12/1995 |
| JP | 2000308268 | 11/2000 |
| JP | 2002315381 | 10/2002 |
| JP | 2012231655 | 11/2012 |
| WO | 9748922 | 12/1997 |
| WO | 9828831 | 7/1998 |
| WO | 9967869 | 12/1999 |
| WO | 2005099043 | 10/2005 |
| WO | 2007116239 | 10/2007 |
| WO | 2009055360 | 4/2009 |
| WO | 2011099348 | 8/2011 |
| WO | 2011105794 | 9/2011 |
| WO | 2012039418 | 3/2012 |
| WO | 2013027772 | 2/2013 |
| WO | 2014075285 | 5/2014 |
| WO | 2014119126 | 8/2014 |
| WO | 2014119128 | 8/2014 |
| WO | 2014119135 | 8/2014 |
| WO | 2014119188 | 8/2014 |
| WO | 2014119203 | 8/2014 |
| WO | 2014192372 | 12/2014 |

OTHER PUBLICATIONS

ThunderVolt Instruction Manual 1988.
PCT International Search Report, dated Aug. 7, 2015.
Thundervolt 12 & 24 Volt System Instruction Manual.
ThunderVolt 24 Volt Cordless System Instruction Manual.

* cited by examiner

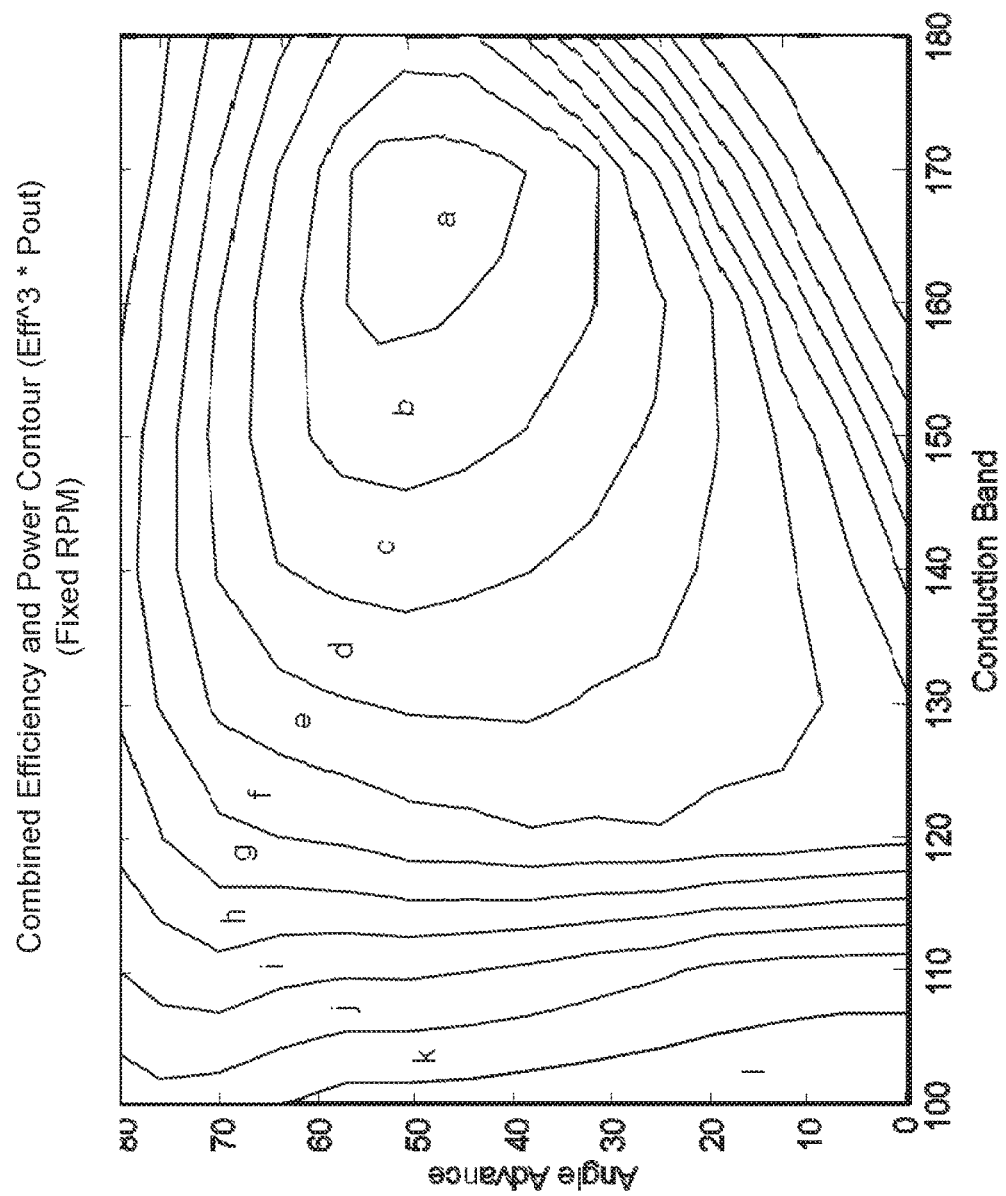

POWER TOOL HAVING A UNIVERSAL MOTOR CAPABLE OF BEING POWERED BY AC OR DC POWER SUPPLY

CROSS REFERENCE TO RELATED APPLICATIONS

This application is a continuation of U.S. application Ser. No. 15/289,654 filed Oct. 10, 2016, titled "Power Tool Having Multiple Power Supplies," which is a continuation of PCT Application No. PCT/US2015/031432 filed May 15, 2015, titled "Power Tool System," and of U.S. patent application Ser. No. 14/992,484 filed Jan. 11, 2016, titled "Power Tool System," which claims the benefit of U.S. patent application Ser. No. 14/715,258 filed May 18, 2015, titled "Power Tool System," all of which claim priority, under 35 U.S.C. § 119(e), to U.S. Provisional Application No. 61/994,953, filed May 18, 2014, titled "Power Tool System," U.S. Provisional Application No. 62/000,112, filed May 19, 2014, titled "Power Tool System," U.S. Provisional Application No. 62/046,546, filed Sep. 5, 2014, titled "Convertible Battery Pack," U.S. Provisional Application No. 62/118,917, filed Feb. 20, 2015, titled "Convertible Battery Pack," U.S. Provisional Application No. 62/091,134, filed Dec. 12, 2014, titled "Convertible Battery Pack," U.S. Provisional Application No. 62/114,645, filed Feb. 11, 2015, titled "Transport for System for Convertible Battery Pack," U.S. Provisional Application No. 62/000,307, filed May 19, 2014, titled "Cycle-By-Cycle Current Limit for Power Tools Having a Brushless Motor," and U.S. Provisional Application No. 62/093,513, filed Dec. 18, 2014, titled "Conduction Band Control for Brushless Motors in Power Tools," each of which is incorporated by reference.

TECHNICAL FIELD

This application relates to a power tool system that includes various power tools and other electrical devices that are operable using various AC power supplies and DC power supplies.

BACKGROUND

Various types of electric power tools are commonly used in construction, home improvement, outdoor, and do-it-yourself projects. Power tools generally fall into two categories—AC power tools (often also called corded power tools) that can operate using one or more AC power supply (such as AC mains or a generator), and DC power tools (often also called cordless power tools) that can operate using one or more DC power supplies (such as removable and rechargeable battery packs).

Corded or AC power tools generally are used for heavy duty applications, such as heavy duty sawing, heavy duty drilling and hammering, and heavy duty metal working, that require higher power and/or longer runtimes, as compared to cordless power tool applications. However, as their name implies, corded tools require the use of a cord that can be connected to an AC power supply. In many applications, such as on construction sites, it is not practical to connect to an AC power supply and/or AC power must be generated by a separate AC power generator, e.g., a gasoline powered generator.

Cordless or DC power tools generally are used for lighter duty applications, such as light duty sawing, light duty drilling, fastening, that require lower power and/or shorter runtimes, as compared to corded power tool applications. Because cordless tools may be more limited in their power and/or runtime, they have not generally been accepted by the industry for many of the heavier duty applications. Cordless tools are also limited by weight since the higher voltage and/or capacity batteries tend to have greater weight, creating an ergonomic disadvantage.

AC power tools and DC power tools may also operate using many different types of motors and motor control circuits. For example, corded or AC power tools may operate using an AC brushed motor, a universal brushed motor (that can operate using AC or DC), or a brushless motor. The motor in a corded tool may have its construction optimized or rated to run on an AC voltage source having a rated voltage that is approximately the same as AC mains (e.g., 120V in the United States, 230V in much of Europe). The motors in AC or corded tools generally are controlled using an AC control circuit that may contain an on-off switch (e.g., for tools operating at substantially constant no-load speed) or using a variable speed control circuit such as a triac control circuit (e.g., for motors tools operating at a variable no-load speed). An example of a triac control circuit can be found in U.S. Pat. No. 7,928,673, which is incorporated by reference.

Cordless or DC power tools also may operate using many different types of motors and control circuits. For example, cordless or DC power tools may operate using a DC brushed motor, a universal brushed motor or a brushless motor. Since the batteries of cordless power tools tend to be at a lower rated voltage than the AC mains (e.g., 12V, 20V, 40V, etc.), the motors for cordless or DC power tools generally have their construction optimized or rated for use with a DC power supply having one or more of these lower voltages. Control circuits for cordless or DC power tools may include an on-off switch (e.g., for tools operating at substantially constant no-load speed) or a variable speed control circuit (e.g., for tools operating at a variable no-load speed). A variable speed control circuit may comprise, e.g., an analog voltage regulator or a digital pulse-width-modulation (PWM) control to control power delivery to the motor. An example of a PWM control circuit can be found in U.S. Pat. No. 7,821,217, which is incorporated by reference.

SUMMARY

In an aspect, a power tool system includes a first power tool having a low power tool rated voltage, a second power tool having a medium power tool rated voltage that is higher than the low power tool rated voltage, a third power tool having a high power tool rated voltage that is higher than the medium power tool rated voltage, a first battery pack having a low battery pack rated voltage that corresponds to the low power tool rated voltage, and a convertible battery pack. The convertible battery pack is operable in a first configuration in which the convertible battery pack has a convertible battery pack rated voltage that corresponds to the first power tool rated voltage, and in a second configuration in which the convertible battery pack has a second convertible battery pack rated voltage that corresponds to the second power tool rated voltage. The first battery pack is coupleable to the first power tool to enable operation of the first power tool. The convertible battery pack is coupleable to the first power tool in the first configuration to enable operation of the first power tool. The convertible battery pack is coupleable to the second power tool in the second configuration to enable operation of the second power tool. A plurality of the convertible battery packs are coupleable to the third power tool in their second configuration to enable operation of the third power tool.

Implementations of this aspect may include one or more of the following features. The third power tool may be alternatively coupleable to an AC power supply having a rated voltage that corresponds to a voltage rating of an AC mains power supply to enable operation of the third power tool using either the plurality of convertible battery packs or the AC power supply. The AC mains voltage rating may be approximately 100 volts to 120 volts or approximately 220 volts to 240 volts. The high power tool rated voltage may correspond to the voltage rating of the AC mains power supply. The system may further include a battery pack charger having a low charger rated voltage that corresponds to the low battery pack rated voltage and to the convertible battery pack rated voltage, wherein the battery pack charger is configured to be coupled to the first battery pack to charge the first battery pack, and to be coupled to the convertible battery pack when in the first configuration to charge the convertible battery pack.

The medium power tool rated voltage may be a whole number multiple of the low power tool rated voltage, and the high rated power tool rated voltage may be a whole number multiple of the medium power tool rated voltage. The low power tool rated voltage may be between approximately 17 volts to 20 volts, the medium power tool rated voltage may be between approximately 51 volts to 60 volts, and the high power tool rated voltage may be between approximately 102 volts to 120 volts. The first power tool may have been on sale prior to May 18, 2014, and the second power tool and the third power tool may have not been on sale prior to May 18, 2014. The first power tool may be a DC-only power tool, the second power tool may be a DC-only power tool, and the third power tool may be an AC/DC power tool.

The convertible battery pack may be automatically configured in the first configuration when coupled to the first power tool and may be automatically configured in the second configuration when coupled to the second power tool or the third power tool. The system may include a third battery pack having a medium battery pack rated voltage. The third battery pack may be coupleable to the second power tool to enable operation of the second power tool. A plurality of third battery packs may be coupleable to the third power tool to enable operation of the third power tool. The first battery pack may be incapable of enabling operation of the second power tool or the third power tool.

In another aspect, a power tool system includes a first battery pack having a first battery pack rated voltage and a convertible battery pack operable in a first configuration in which the convertible battery pack has a first battery pack rated voltage and in a second configuration in which the convertible battery pack has a second convertible battery pack rated voltage that is higher than the first convertible battery pack rated voltage. A first power tool has a first motor, a first motor control circuit, and a first power supply interface. The first power tool has a first power tool rated voltage that corresponds to the first battery pack rated voltage and the first convertible battery pack rated voltage. The first power tool is operable using either the first battery pack when the first power supply interface is coupled to the first battery pack or using the convertible battery pack when the first power supply interface is coupled to the convertible battery pack so that the convertible battery pack is in the first configuration. A second power tool has a second motor, a second motor control circuit, and a second power supply interface. The second power tool has a second power tool rated voltage that corresponds to the second convertible battery pack rated voltage. The second power tool is operable using the convertible battery pack when the second power supply interface is coupled to convertible battery pack so that the convertible battery pack is in the second configuration. A third power tool has a third motor, a third motor control circuit, and a third power supply interface. The third power tool has a third rated voltage that is a whole number multiple of the second convertible battery pack rated voltage. The third power tool is operable using a plurality of the convertible battery packs when the third power tool interface is coupled to the plurality of convertible battery packs so that the convertible battery packs each are in the second configuration.

Implementations of this aspect may include one or more of the following features. The third power supply interface of the third power tool may be alternatively coupleable to an AC power supply having a rated voltage that corresponds to a voltage rating of an AC mains power supply to enable operation of the third power tool using either the plurality of convertible battery packs or the AC power supply. The AC mains voltage rating may be approximately 100 volts to 120 volts or approximately 220 volts to 240 volts. The high power tool rated voltage may correspond to the voltage rating of the AC mains power supply.

The system may include a battery pack charger having a first charger rated voltage that corresponds to the first battery pack rated voltage and to the first convertible battery pack rated voltage. The battery pack charger may be configured to be coupled to the first battery pack to charge the first battery pack, and to be coupled to the convertible battery pack when in the first configuration to charge the convertible battery pack. The second power tool rated voltage may be a whole number multiple of the first power tool rated voltage. The first power tool rated voltage may be between approximately 17 volts to 20 volts, the second power tool rated voltage may be between approximately 51 volts to 60 volts, and the third power tool rated voltage is between approximately 100 volts to 120 volts. The first power tool may have been on sale prior to May 18, 2014, and the second power tool and the third power tool may have not been on sale prior to May 18, 2014.

The first power tool may be a DC-only power tool. The second power tool may be a DC-only power tool. The third power tool may be an AC/DC power tool. The convertible battery pack may be automatically configured in the first configuration when coupled to the first power tool and may be automatically configured in the second configuration when coupled to the second power tool or the third power tool. The system may include a third battery pack having a third battery pack rated voltage that corresponds to the second power tool rated voltage. The third battery pack may be coupleable to the second power tool to enable operation of the second power tool and a plurality of third battery packs may be coupleable to the third power tool to enable operation of the third power tool. The first battery pack may be incapable of enabling operation of the second power tool or the third power tool.

In another aspect, a power tool includes a power supply interface, a motor, and a motor control circuit. The power supply interface is configured to receive AC power from an AC power supply having a rated AC voltage that corresponds to an AC mains rated voltage, and to receive DC power from one or more removable battery packs having a total rated DC voltage that also corresponds to the AC mains rated voltage. The motor has a rated voltage that corresponds to the rated AC voltage and to the rated DC voltage. The motor is operable using both the AC power from the AC power supply and the DC power from the DC power supply. The motor control circuit is configured to control operation of the motor using one of the AC power and the DC power, without reducing a magnitude of the rated AC voltage, without reducing the magnitude of the rated DC voltage, and without converting the DC power to AC power.

Implementations of this aspect may include one or more of the following features. The rated AC voltage may be between approximately 100 volts and 120 volts. The DC rated voltage may be between approximately 102 volts and approximately 120 volts. The motor rated voltage is approximately 100 volts and 120 volts. The rated AC voltage may encompass an RMS voltage of 120 VAC and the rated DC voltage may encompass a nominal voltage of 120 volts. The rated AC voltage may encompass an average voltage of approximately 108 volts and the rated DC voltage may encompass a nominal voltage of approximately 108 volts. The AC power supply may include AC mains.

The one or more removable battery packs may include at least two removable battery packs. The at least two battery packs may be connected to each other in series. Each battery pack may have a rated DC voltage that is approximately half of the rated AC voltage. The motor may be a universal motor. The control circuit may be configured to operate the universal motor at a constant no load speed. The control circuit is configured to operate the universal motor at a variable no load speed based upon a user input. The motor may include a brushless motor.

In another aspect, a power tool system includes a DC power supply and a power tool. The DC power supply includes one or more battery packs that together have a rated DC voltage that corresponds to an AC mains rated voltage. The power tool has a power supply interface, a motor, and a motor control circuit. The power supply interface is configured to receive AC power from an AC power supply having the AC mains rated voltage and to receive DC power from the DC power supply. The motor has a rated voltage that corresponds to the AC mains rated voltage and to the rated DC voltage. The motor is operable using both the AC power from the AC mains power supply and the DC power from the DC power supply. The motor control circuit is configured to control operation of the motor using one of the AC power and the DC power, without reducing a magnitude of the rated AC voltage, without reducing the magnitude of the rated DC voltage, and without converting the DC power to AC power.

Implementations of this aspect may include one or more of the following features. The rated AC voltage may be between approximately 100 volts and 120 volts. The DC rated voltage may be between approximately 102 volts and approximately 120 volts. The motor rated voltage is approximately 100 volts and 120 volts. The rated AC voltage may encompass an RMS voltage of 120 VAC and the rated DC voltage may encompass a nominal voltage of 120 volts. The rated AC voltage may encompass an average voltage of approximately 108 volts and the rated DC voltage may encompass a nominal voltage of approximately 108 volts. The AC power supply may include AC mains.

The one or more removable battery packs may include at least two removable battery packs. The at least two battery packs may be connected to each other in series. Each battery pack may have a rated DC voltage that is approximately half of the rated AC voltage. The motor may be a universal motor. The control circuit may be configured to operate the universal motor at a constant no load speed. The control circuit is configured to operate the universal motor at a variable no load speed based upon a user input. The motor may include a brushless motor.

In another aspect, a power tool includes a power supply interface, a motor, and a motor control circuit. The power supply interface is configured to receive AC power from an AC mains power supply having a rated AC voltage and to receive DC power from a DC power supply comprising one or more battery packs together having a rated DC voltage that is different from the rated AC voltage. The motor has a rated voltage that corresponds to one of the rated AC voltage and the rated DC voltage. The motor is operable using both the AC power from the AC power supply and the DC power from the DC power supply. The motor control circuit is configured to enable operation of the motor using one of the AC power and the DC power, such that the motor substantially the same output speed performance when operating using the AC power supply and the DC power supply.

Implementations of this aspect may include one or more of the following features. The rated DC voltage may be less than the rated AC voltage. The rated AC voltage may be approximately 100 volts to 120 volts and the rated DC voltage may be less than 100 volts. The rated DC voltage may be approximately 51 volts to 60 volts. The rated AC voltage may be less than the rated DC voltage. The one or more battery packs may include two battery packs connected to one another in series, wherein each battery pack has a rated voltage that is approximately half of the rated AC voltage. The motor may be a universal motor. The control circuit may operate the universal motor at a constant no load speed. The control circuit may operate the universal motor at a variable no load speed based upon a user input. The control circuit may optimize a range of pulse-width-modulation according to the rated voltages of the AC power supply and the DC power supply so that the motor substantially the same output speed performance when operating using the AC power supply and the DC power supply. The motor may be a brushless motor. The control circuit may use at least one of cycle-by-cycle current limiting, conduction band control, and advance angle control such that the motor substantially the same output speed performance when operating using the AC power supply and the DC power supply.

In another aspect, a power tool includes a means for receiving AC power from an AC mains power supply having a rated AC voltage and a means for receiving DC power from a DC power supply comprising one or more battery packs together having a rated DC voltage that is different from the rated AC voltage. The power tool also has a motor having a rated voltage that corresponds to the higher of the rated AC voltage and the rated DC voltage. The motor is operable using both the AC power from the AC power supply and the DC power from the DC power supply. The power tool also has means for operating the motor using one of the AC power and the DC power, such that the motor substantially the same output speed performance when operating using the AC power supply and the DC power supply.

Implementations of this aspect may include one or more of the following features. The rated DC voltage may be less than the rated AC voltage. The rated AC voltage may be approximately 100 volts to 120 volts and the rated DC voltage may be less than 100 volts. The rated DC voltage may be approximately 51 volts to 60 volts. The rated AC voltage may be less than the rated DC voltage. The one or more battery packs may include two battery packs connected to one another in series, wherein each battery pack has a rated voltage that is approximately half of the rated AC voltage. The motor may be a universal motor. The means for operating the motor may operate the universal motor at a constant no load speed. The means for operating the motor may operate the universal motor at a variable no load speed based upon a user input. The means for operating the motor may optimize a range of pulse-width-modulation according to the rated voltages of the AC power supply and the DC power supply so that the motor substantially the same output speed performance when operating using the AC power supply and the DC power supply. The motor may be a brushless motor. The means for operating the motor may use at least one of cycle-by-cycle current limiting, conduction band control, and advance angle control such that the motor substantially the same output speed performance when operating using the AC power supply and the DC power supply.

In another aspect, a power tool system includes a first power tool having a first power tool rated voltage, a second power tool having a second power tool rated voltage that is different from the first power tool rated voltage, and a first battery pack coupleable to the first power tool and to the second power tool. The first battery pack is switchable between a first configuration having a first battery pack rated voltage that corresponds to the first power tool rated voltage such that the first battery pack enables operation of the first power tool, and a second configuration having a convertible battery pack rated voltage that corresponds to the second power tool rated voltage such that the battery pack enables operation of the second power tool.

Implementations of this aspect may include one or more of the following features. The system may include a second removable battery pack having the first battery pack rated voltage and configured to be coupled to the first power tool to enable operation of the first power tool, but that does not enable operation of the second power tool. The second power tool rated voltage may be greater than the first power tool rated voltage. The first power tool rated voltage may be a whole number multiple of the second power tool rated voltage. The first power tool rated voltage may be approximately 17 volts to 20 volts and the second power tool rated voltage range may be approximately 51 volts to 60 volts. The first power tool may have been on sale prior to May 18, 2014, and the second power tool may not have been on sale prior to May 18, 2014. The first power tool may be a DC-only power tool and the second power tool may be a DC-only power tool or an AC/DC power tool. The second power may be alternatively coupleable to an AC power supply having a rated voltage that corresponds to a voltage rating of an AC mains power supply to enable operation of the second power tool using either the convertible battery pack or the AC power supply.

According to another aspect of the invention, a power tool is provided comprising: a housing; an electric universal motor having a positive terminal, a negative terminal, and a commutator engaging a pair of brushes coupled to the positive and the negative terminals, the motor being configured to operate within an operating voltage range of approximately 90V to 132V; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the first and second nominal voltages fall approximately within the operating voltage range of the motor; and a motor control circuit configured to supply electric power from one of the AC power line or the DC power line via a common node to the motor such that the brushes are electrically coupled to one of the AC or DC power supplies.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series.

According to another aspect of the invention, the power tool described above is a variable-speed tool, as described herein.

In an embodiment, the power tool further comprises: a DC switch circuit arranged between the DC power line and the motor; an AC switch arranged between the AC power line and the motor; and a control unit configured to control a switching operation of the DC switch circuit or the AC switch to control a speed of the motor enabling variable speed operation of the motor at constant torque.

In an embodiment, the DC switch circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

In an embodiment, the AC switch comprises a phase controlled switch comprising at least one of a triac, a thyristor, or a SCR switch, and the control unit is configured to control a phase of the AC switch according to a desired speed of the motor.

In an embodiment, the control unit is configured to sense current on one of the AC power line or the DC power line to set a mode of operation to one of an AC mode of operation or a DC mode of operation, and control the switching operation of one or the other of the DC switch circuit or the AC switch based on the mode of operation.

In an alternative embodiment, the power tool further comprises: a power switching unit comprising a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant torque.

In an embodiment, the control unit is configured to sense current on one of the AC power line or the DC power line to set a mode of operation to one of an AC mode of operation or a DC mode of operation, and control the switching operation of the semiconductor switch according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a conduction band according to a desired speed of the motor and, within each AC line half-cycle, turn the semiconductor switch ON at approximately the beginning of the conduction band and turn the semiconductor switch OFF at approximately a zero crossing of the AC power line.

In an embodiment, the power tool further comprises a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

In an embodiment, the diode bridge is arranged to rectify the AC power line through the semiconductor switch, but not through the motor.

In an embodiment, the semiconductor switching unit is arranged between the common node of the AC and DC power lines.

According to another aspect of the invention, a power tool is provided comprising: a housing; a universal motor having a positive terminal, a negative terminal, and a commutator engaging a pair of brushes coupled to the positive and the negative terminals, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit configured to supply electric power from one of the AC power line or the DC power line via a common node to the motor such that the brushes are electrically coupled to one of the AC or DC power supplies, the motor control circuit being configured to reduce a supply of power from the AC power line to the motor to a level corresponding to the operating voltage of the operating voltage range of the motor.

In an embodiment, the motor control circuit comprises an AC switch disposed in series with the AC power line, and a control unit configured to control a phase of the AC power line via the AC switch and set a fixed conduction band of the AC switch to reduce an average voltage amount on the AC line to a level corresponding to the operating voltage range of the motor to a level corresponding to the operating voltage range of the motor.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series. In an embodiment, the operating voltage range of the motor is approximately within a range of 100V to 120V encompassing the second nominal voltage, and the first nominal voltage is in the range of 220 VAC to 240 VAC. In an embodiment, the control unit is configured to set the fixed conduction band of the AC switch to a value within the range of 100 to 140 degrees.

In an embodiment, the operating voltage range of the motor is approximately within a range of 60V to 90V encompassing the second nominal voltage, and the first nominal voltage is in the range of 100 VAC to 120 VAC. In an embodiment, the control unit is configured to set the fixed conduction band of the AC switch to a value within the range of 70 to 110 degrees.

In an embodiment, the control unit is configured to operate the tool at constant speed at the fixed conduction band.

In an embodiment, the AC switch includes a phase controlled switch comprising one of a triac, a thyristor, or a SCR switch, and the controller is configured to control a phase of the AC switch according to a desired speed of the motor.

According to another aspect of the invention, the power tool described above is a variable-speed power tool, as described herein.

According to an embodiment, the motor control circuit further comprising a DC switch circuit arranged between the DC power line and the motor, wherein the control unit is configured to control a switching operation of the DC switch circuit or the AC switch to control a speed of the motor enabling variable speed operation of the motor at constant load.

According to an embodiment, the DC switch circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

According to an embodiment, the control unit is configured to vary a conduction angle of the AC switch from zero up to the fixed conduction band according to a desired speed of the motor.

According to an embodiment, the control unit is configured to sense current on one of the AC power line or the DC power line to set a mode of operation to one of an AC mode of operation or a DC mode of operation, and control the switching operation of one or the other of the DC switch circuit or the AC switch based on the mode of operation.

According to an embodiment, the motor control circuit comprises: a power switching unit including a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant load, wherein the control unit is configured to control a phase of the AC power line via the semiconductor switch.

In an embodiment, the control unit is configured to sense current on one of the AC power line or the DC power line to set a mode of operation to one of an AC mode of operation or a DC mode of operation, and control the switching operation of the semiconductor switch in one of an AC mode or a DC mode of operation according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a maximum conduction band corresponding to the operating voltage range of the motor.

In an embodiment, the control unit is configured to set a conduction band according to a desired speed of the motor from zero up to the maximum conduction band and in proportion thereto, and within each AC line half-cycle, turn the semiconductor switch ON at approximately the beginning of the conduction band and turn the semiconductor switch OFF at approximately a zero crossing of the AC power line.

In an embodiment, the operating voltage range of the motor is approximately within a range of 100V to 120V encompassing the second nominal voltage, and the first nominal voltage is in the range of 220 VAC to 240 VAC. In an embodiment, the control unit is configured to set the maximum conduction band to a value within the range of 100 to 140 degrees.

In an embodiment, the operating voltage range of the motor is approximately within a range of 60V to 100V encompassing the second nominal voltage, and the first nominal voltage is in the range of 100 VAC to 120 VAC. In an embodiment, the control unit is configured to set the maximum conduction band of the AC switch to a value within the range of 70 to 110 degrees.

In an embodiment, the diode bridge is arranged to rectify the AC power line through the semiconductor switch, but not through the motor.

In an embodiment, the motor control circuit further comprising a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

According to another aspect of the invention, a power tool is provided comprising: a housing; an electric universal motor having a positive terminal, a negative terminal, and a commutator engaging a pair of brushes coupled to the positive and the negative terminals; a power supply interface arranged to receive at least one of AC power from an AC power supply or DC power from a DC power supply, and to output the AC power via an AC power line and the DC power via a DC power line; a power switching unit comprising a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant torque.

In an embodiment, the control unit is configured to sense current on one of the AC power line or the DC power line to set a mode of operation to one of an AC mode of operation or a DC mode of operation, and control the switching operation of the semiconductor switch according to the mode of operation.

In an embodiment, in the DC mode of operation, the control unit is configured to set a pulse-width modulation (PWM) duty cycle according to a desired speed of the motor and turn the semiconductor switch on and off periodically in accordance with the PWM duty cycle.

In an embodiment, in the AC mode of operation, the control unit is configured to set a conduction band according to a desired speed of the motor and, within each AC line half-cycle, turn the semiconductor switch ON at approximately the beginning of the conduction band and turn the semiconductor switch OFF at approximately a zero crossing of the AC power line.

In an embodiment, the power tool further comprises a second semiconductor switch and a freewheel diode disposed in series with the motor to allow a current path for a motor current during an off-cycle of the semiconductor switch in the DC mode of operation.

In an embodiment, the semiconductor switch comprises one of a field effect transistor (FET) or an insulated gate bipolar transistor (IGBT).

In an embodiment, the diode bridge is arranged to rectify the AC power line through the semiconductor switch, but not through the motor.

In an embodiment, the power switching unit is arranged between the common node of the AC and DC power lines.

According to another aspect of the invention, a power tool is provided comprising: a housing; an electric direct-current (DC) motor having a positive terminal, a negative terminal, and a commutator engaging a pair of brushes coupled to the positive and the negative terminals, the motor being configured to operate within an operating voltage range within a range of approximately 90V to 132V; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the first and second nominal voltages fall approximately within the operating voltage range of the motor; and a motor control circuit including a rectifier circuit configured to rectify an alternating signal to a rectified signal on the AC power line, the motor control circuit being configured to supply electric power from one of the AC power line or the DC power line via a common node to the motor such that the brushes are electrically coupled to one of the AC or DC power supplies.

In an embodiment, the rectifier circuit includes a full-wave diode bridge rectifier.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series.

According to another aspect of the invention, the power tool described above is a variable-speed tool, as described herein.

In an embodiment, the power tool further comprises: a switching circuit arranged between the common node of the AC and DC power lines and the motor; and a control unit configured to control a switching operation of the switching circuit to control a speed of the motor enabling variable speed operation of the motor at constant torque.

In an embodiment, the switching circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

In an embodiment, the motor is a permanent magnet DC motor.

According to another aspect of the invention, a power tool is provided comprising: a housing; an electric direct-current (DC) motor having a positive terminal, a negative terminal, and a commutator engaging a pair of brushes coupled to the positive and the negative terminals, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit including a rectifier circuit configured to rectify an alternating signal to a rectified signal on the AC power line, the motor control circuit being configured to supply electric power from one of the AC power line or the DC power line via a common node to the motor such that the brushes are electrically coupled to one of the AC or DC power supplies, the motor control circuit being configured to reduce a supply of power from the AC power line to the motor to a level corresponding to the operating voltage range of the motor.

In an embodiment, the rectifier circuit includes a half-wave diode bridge circuit arranged to reduce an average voltage amount on the AC power line by approximately half.

In an embodiment, the motor control circuit comprises a power switch arranged between the common node of the AC and DC power lines and a control unit configured to control a pulse-width modulation (PWM) of the power switch, wherein the control unit is configured to set a pulse-width modulation (PWM) duty cycle of the power switch to a fixed value less than 100% to reduce an average voltage amount on the AC line to a level corresponding to the operating voltage range of the motor. In an embodiment, the power switch comprises one of a field effect transistor (FET) or an insulated gate bipolar transistor (IGBT).

In an embodiment, the motor control circuit comprises an AC switch disposed in series with the AC power line between the power supply interface and the rectifier circuit and a control unit configured to control a phase of the AC power line via the AC switch and set a fixed conduction band of the AC switch to reduce an average voltage amount on the AC power line to a level corresponding to the operating voltage range of the motor.

In an embodiment, the AC switch includes a phase controlled switch comprising one of a triac, a thyristor, or a SCR switch, and the controller is configured to control a phase of the AC switch according to a desired speed of the motor.

In an embodiment, the motor control circuit comprises an ON/OFF switch arranged between the common node of the AC and DC power lines and the motor.

In an embodiment, the motor control circuit comprises a control unit coupled to a power switch arranged on the DC power line. In an embodiment, the control unit is configured to monitor a fault condition associated with the DC power supply and turn the power switch off to cut off a supply of power from the DC power supply to the motor.

In an embodiment, the power tool further comprises a power supply switching unit arranged to isolate the AC power line and the DC power line. In an embodiment, the power supply switching unit comprises a relay switch arranged on the DC power line and activated by a coil coupled to the AC power line. In an embodiment, the power supply switching unit comprises at least one double-pole double-throw switch arranged between the common node of the AC and DC power lines and the power supply interface. In an embodiment, the power supply switching unit comprises at least one single-pole double-throw switch having an output terminal coupled to the common node of the AC and DC power lines.

In an embodiment, the DC power supply comprises a high rated voltage battery pack.

In an embodiment, the DC power supply comprises at least two medium-rated voltage battery packs and the power supply interface is configured to connect two or more of the at least two battery packs in series. In another embodiment, the operating voltage range of the motor is approximately within a range of 100V to 120V encompassing the second nominal voltage, and the first nominal voltage is in the range of 220 VAC to 240 VAC. In an embodiment, the control unit is configured to set the fixed conduction band of the AC switch to a value within the range of 100 to 140 degrees.

In an embodiment, the operating voltage range of the motor is approximately within a range of 60V to 90V encompassing the second nominal voltage, and the first nominal voltage is in the range of 100 VAC to 120 VAC. In an embodiment, the control unit is configured to set the fixed conduction band of the AC switch to a value within the range of 70 to 110 degrees.

In an embodiment, the control unit is configured to operate the tool at constant speed at the fixed conduction band.

According to another aspect of the invention, the power tool described above is a variable-speed tool, as described herein.

In an embodiment, the power tool further comprises: a switching circuit arranged between the common node of the AC and DC power lines and the motor; and a control unit configured to control a pulse-width modulation (PWM) switching operation of the switching circuit to control a speed of the motor enabling variable speed operation of the motor at constant torque.

In an embodiment, the switching circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

According to an embodiment, the control unit is configured to sense current on one of the AC power line or the DC power line to set a mode of operation to one of an AC mode of operation or a DC mode of operation.

In an embodiment, the controller is configured to reduce a supply of power through the switching circuit to a level corresponding to the operating voltage range of the motor in the AC mode of operation.

In an embodiment, the control unit is configured to control the switching operation of the switching circuit within a first duty cycle range in the DC mode of operation, and control the switching operation of the switching circuit within a second duty cycle range in the AC mode of operation, wherein the second duty cycle range is smaller than the first duty cycle range.

In an embodiment, the control unit is configured to control the switching operation of the switching circuit at zero to 100% duty cycle in the DC mode of operation, and control the switching operation of the switching circuit from zero to a threshold value less than 100% in the AC mode of operation.

According to another aspect of the invention, a power tool is provided comprising: a housing; a brushless direct current (BLDC) motor including a rotor and a stator having at least three stator windings corresponding to at least three phases of the motor, the rotor being moveable by the stator when the stator windings are appropriately energized within the corresponding phases, each phase being characterized by a corresponding voltage waveform energizing the corresponding stator winding, the motor being configured to operate within an operating voltage range; a power supply interface arranged to receive at least one of AC power from an AC power supply having a first nominal voltage or DC power from a DC power supply having a second nominal voltage, the DC power supply comprising at least one removable battery pack coupled to the power supply interface, the power supply interface configured to output the AC power via an AC power line and the DC power via a DC power line; and a motor control circuit configured to receive the AC power line and the DC power line and supply electric power to the motor at a level corresponding to the operating voltage range of the motor, the motor control circuit having a rectifier circuit configured to rectify an alternating signal on the AC power line to a rectified voltage signal on a DC bus line, and a power switch circuit configured to regulate a supply of electric power from the DC bus line to the motor.

In an embodiment, the rectifier circuit comprises a diode bridge. In an embodiment, the rectifier circuit further comprises a link capacitor arranged in parallel to the diode bridge on the DC bus line. In an embodiment, the diode bridge comprises a full-wave bridge. In an alternative embodiment, the diode bridge comprises a half-wave bridge.

In an embodiment, the DC power line is connected directly to a node on the DC bus line bypassing the rectifier circuit. In an alternative embodiment, the DC power line and the AC power line are jointly coupled to an input node of the rectifier circuit.

In an embodiment, the power tool further comprises a power supply switching unit arranged to isolate the AC power line and the DC power line. In an embodiment, the switching unit comprises a relay switch arranged on the DC power line and activated by a coil coupled to the AC power line. In an embodiment, the power supply switching unit comprises at least one single-pole double-throw switch having input terminals coupled to the AC and DC power lines and an output terminal coupled to an input node of the rectifier circuit. In an embodiment, the power supply switching unit comprises at least one double-pole double-throw switch having input terminals coupled to the AC and DC power lines, a first output terminal coupled to the input node of the rectifier circuit, and a second output terminal coupled directly to a node on the DC bus line bypassing the rectifier circuit.

In an embodiment, the motor control circuit further comprises a controller arranged to control a switching operation of the power switch circuit. In an embodiment, the controller is a programmable device including a microcontroller, a microprocessor, a computer processor, a signal processor. Alternatively, the controller is an integrated circuit configured and customized to control a switching operation of the power switch unit. In an embodiment, the control unit is further configured to monitor a fault condition associated with the power tool or the DC power supply and deactivate the power switch circuit to cut off a supply of power to the motor. In an embodiment, the control unit is configured to sense current on one of the AC power line or the DC power line to set a mode of operation to one of an AC mode of operation or a DC mode of operation, and control the switching operation of the power switch circuit based on the mode of operation. In an alternative embodiment, the control unit is configured to control the switching operation of the power switch circuit irrespective of an AC or DC mode of operation.

In an embodiment, the power switch circuit comprises a plurality of power switches including three pairs of high-side and low-side power switches configured as a three-phase bridge circuit coupled to the phases of the motor.

In an embodiment, the motor control circuit further comprises a gate driver circuit coupled to the controller and the power switch circuit, and configured to drive gates of the plurality of power switches based on one or more drive signals from the controller.

In an embodiment, the motor control circuit further comprises a power supply regulator including at least one voltage regulator configured to output a voltage signal to power at least one of the gate driver circuit or the controller.

In an embodiment, the motor control circuit further comprises an ON/OFF switch coupled to at least one of an ON/OFF actuator or a trigger switch and arranged to cut off a supply of power from the power supply regulator and the gate driver circuit.

In an embodiment, the power tool further comprises a plurality of position sensors disposed at close proximity to the rotor to provide rotational position signals of the rotor to the control unit. In an embodiment, the controller is configured to control the switching operation of the power switch circuit based on the position signals to appropriately energize the stator windings within the corresponding phases.

According to an embodiment, within each phase of the motor, the controller is configured to activate a drive signal for a corresponding one of the plurality of power switches within a conduction band corresponding to the phase of the motor.

In an embodiment, the controller is configured to set a pulse-width modulation (PWM) duty cycle according to a desired speed of the motor and control the drive signal to turn the corresponding one of the plurality of power switches on and off periodically within the conduction band in accordance with the PWM duty cycle to enable variable speed operation of the motor at constant load.

According to an aspect of the invention, the first and second nominal voltages both fall approximately within the operating voltage range of the motor.

In an embodiment, the operating voltage range of the motor is approximately within a range of 90V to 132V encompassing the second nominal voltage, and the first nominal voltage is in the range of approximately 100 VAC to 120 VAC. In an embodiment, the DC power supply comprises a high-rated voltage battery pack. In an embodiment, the DC power supply comprises at least two medium-rated voltage battery packs and the power supply interface is configured to connect two or more of the at least two battery packs in series.

In an embodiment, the link capacitor has a capacitance value optimized to provide an average voltage of approximately less than or equal to 110V on the DC bus line when the power tool is powered by the AC power supply, where the first nominal voltage is approximately 120 VAC. In an embodiment, the link capacitor has a capacitance value of less than or equal to approximately 50 μF.

In an embodiment, the link capacitor has a capacitance value optimized to provide an average voltage of approximately 120V on the DC bus line when the power tool is powered by the AC power supply, where the first nominal voltage is approximately 120 VAC. In an embodiment, the link capacitor has a capacitance value of less than or equal to approximately 200 to 600 μF. In an embodiment, the DC power supply has a nominal voltage of approximately 120 VDC.

According to an aspect of the invention, at least one of first and second nominal voltages does not approximately correspond to the operating voltage range of the motor.

In an embodiment, the motor control circuit is configured to optimize a supply of power from at least one of the AC power line or the DC power line to the motor at a level corresponding to the operating voltage range of the motor.

In an embodiment, the controller is configured to set a mode of operation to one of an AC mode of operation or a DC mode of operation, and control the switching operation of the power switch circuit based on the mode of operation. In an embodiment, the controller is configured to sense current on one of the AC power line or the DC power line to set the mode of operation. In an embodiment, the controller is configured to receive a signal from the power supply interface indicative of the mode of operation.

In an embodiment, the operating voltage range of the motor encompasses the first nominal voltage, but not the second nominal voltage. In an embodiment, the operating voltage range of the motor is approximately within a range of 100V to 120V encompassing the first nominal voltage, and the second nominal voltage is in a range of approximately 60 VDC to 100 VDC. In an embodiment, the controller may be configured to boost an effective supply of power to the motor in the DC mode of operation to correspond to the operating voltage range of the motor.

In an embodiment, the operating voltage range of the motor encompasses the second nominal voltage, but not the first nominal voltage. In an embodiment, the operating voltage range of the motor is approximately within a range of 60V to 100V encompassing the second nominal voltage, and the first nominal voltage is in a range of approximately 100 VAC to 120 VAC. In an embodiment, the controller may be configured to reduce an effective supply of power to the motor in the AC mode of operation to correspond to the operating voltage range of the motor.

In an embodiment, the operating voltage range of the motor encompasses neither the first nominal voltage nor the first nominal voltage. In an embodiment, the motor control circuit is configured to optimize a supply of power from both the AC power line and the DC power line to the motor at a level corresponding to the operating voltage range of the motor.

In an embodiment, the operating voltage range of the motor is approximately within a range of 150V to 170V, the first nominal voltage is in a range of approximately 100 VAC to 120 VAC, and the second nominal voltage is in a range of approximately 90 VDC to 120 VDC. In an embodiment, the controller may be configured to boost an effective supply of power to the motor in both the AC mode of operation and the DC mode of operation to correspond to the operating voltage range of the motor.

In an embodiment, the operating voltage range of the motor is approximately within a range of 150V to 170V, the first nominal voltage is in a range of approximately 220 VAC to 240 VAC, and the second nominal voltage is in a range of approximately 90 VDC to 120 VDC. In an embodiment, the controller may be configured to boost an effective supply of power to the motor in the DC mode of operation, but reduce an effective supply of power to the motor in the AC mode of operation, to correspond to the operating voltage range of the motor.

In an embodiment, the controller is configured to control the switching operation of the power switch circuit via one or more drive signals at a fixed pulse-width modulation (PWM) duty cycle, the controller setting the fixed PWM duty cycle to a first value in relation to the first nominal voltage when powered by the AC power supply and to a second value different from the first value and in relation to the second nominal voltage when powered by the DC power supply.

In an embodiment, the controller is configured to control the switching operation of the power switch circuit via one or more drive signals at a fixed pulse-width modulation (PWM) duty cycle of less than 100% in the AC mode of operation to reduce an effective supply of power to the motor in the AC mode of operation to correspond to the operating voltage range of the motor.

In an embodiment, the controller is configured to control the switching operation of the power switch circuit via one or more drive signals at a pulse-width modulation (PWM) duty cycle up to a threshold value, the controller setting the threshold value to a first value in relation to the first nominal voltage when powered by the AC power supply and to a second value different from the first value and in relation to the second nominal voltage when powered by the DC power supply.

In an embodiment, the controller is configured to control the switching operation of the power switch circuit within a first duty cycle range in the DC mode of operation, and control the switching operation of the power switch circuit within a second duty cycle range in the AC mode of operation, wherein the second PWM duty cycle range is smaller than the first duty cycle range, in order to reduce an effective supply of power to the motor in the AC mode of operation to correspond to the operating voltage range of the motor.

In an embodiment, the controller is configured to control the switching operation of the power switch circuit at zero to 100% duty cycle in the DC mode of operation, and control the switching operation of the power switch circuit from zero to a threshold value less than 100% in the AC mode of operation, in order to reduce an effective supply of power to the motor in the AC mode of operation to correspond to the operating voltage range of the motor.

In an embodiment, the controller is configured to receive a measure of instantaneous current on the DC bus line and enforce a current limit on current through the power switch circuit by comparing instantaneous current measures to the current limit and, in response to an instantaneous current measure exceeding the current limit, turning off the plurality of power switches for a remainder of a present time interval to interrupt current flowing to the electric motor, where duration of each time interval is fixed as a function of the given frequency at which the electric motor is controlled by the controller.

In an embodiment, the controller turns on select power switches at end of the present time interval and thereby resumes current flow to the motor.

In an embodiment, the duration of each time interval is approximately ten times an inverse of the given frequency at which the motor is controlled by the controller. In an embodiment, the duration of each time interval is on the order to 100 microseconds.

In an embodiment, duration of the each time interval corresponds to a period of pulse-width modulation (PWM) cycle.

In an embodiment, the controller is configured to receive a measure of current on the DC bus line and enforce a current limit on current through the power switch circuit by setting or adjusting a PWM duty cycle of the one or more drive signals. In an embodiment, the controller is configured to monitor the current through the DC bus line and adjust the PWM duty cycle if the current through the DC bus line exceeds the current limit.

In an embodiment, the controller is configured to set the current limit according to a voltage rating of one of the AC or the DC power supplies.

In an embodiment, the controller is configured to set the current limit to a first threshold in the AC mode of operation and to a second threshold in the DC mode of operation, wherein the second threshold is higher than the first threshold, in order to reduce an effective supply of power to the motor in the AC mode of operation to correspond to the operating voltage range of the motor.

According to an embodiment, the controller is configured to activate a drive signal within each phase of the motor for a corresponding one of the plurality of power switches within a conduction band (CB) corresponding to the phase of the motor. According to an embodiment, the CB is set to approximately 120 degrees.

In an embodiment, the controller is configured to shift the CB by an advance angle (AA) such that the CB leads ahead of a back electro-magnetic field (EMF) current of the motor. According to an embodiment, the AA is set to approximately 30 degrees.

In an embodiment, the controller is configured to set at least one of the CB or AA according to a voltage rating of one or more of the AC or DC power supplies. In an embodiment, the controller is configured to set at least one of the CB or AA to a first value in relation to the first nominal voltage when powered by the AC power supply and to a second value different from the first value and in relation to the second nominal voltage when powered by the DC power supply.

In an embodiment, the controller is configured set to the CB to a first CB value during the AC mode of operation and to a second CB value greater than the first CB value during the DC mode of operation. In an embodiment, the second CB value is determined so as to boost an effective supply of power to the motor in the DC mode of operation to correspond to the operating voltage range of the motor. In an embodiment, first CB value is approximately 120 degrees and the second CB value is greater than approximately 130 degrees.

In an embodiment, the controller is configured set to the AA to a first AA value during the AC mode of operation and to a second AA value greater than the first AA value during the DC mode of operation. In an embodiment, the second AA value is determined so as to boost an effective supply of power to the motor in the DC mode of operation to correspond to the operating voltage range of the motor. In an embodiment, first AA value is approximately 30 degrees and the second AA value is greater than approximately 35 degrees.

In an embodiment, the controller is configure to set the CB and AA in tandem according to the voltage rating of the AC or DC power supplies.

In an embodiment, the controller is configured to set at least one of the CB or AA to a base value corresponding to a maximum speed of the motor at approximately no load, and gradually increase the at least one of CB or AA from the base value to a threshold value in relation to an increase in torque to yield a substantially linear speed-torque curve. In an embodiment, the controller is configured to maintain substantially constant speed on the speed-torque curve. In an embodiment, the base value and the threshold value corresponds to a low torque range within which the speed-torque curve is substantially linear. In an embodiment, the controller is configured to maintain the at least one of CB or AA at the torque greater than the low torque range.

According to another aspect of the invention, a power tool is provided comprising: a housing; a brushless direct current (BLDC) motor including a rotor and a stator having at least three stator windings corresponding to at least three phases of the motor, the rotor being moveable by the stator when the stator windings are appropriately energized within the corresponding phases, each phase being characterized by a corresponding voltage waveform energizing the corresponding stator winding, the motor being configured to operate within an operating voltage range; and a motor control circuit configured to receive electric power from a first power supply having a first nominal voltage or a second power supply having a second nominal voltage different from the first nominal voltage, and to provide electric power to the motor at a level corresponding to the operating voltage range of the motor. In an embodiment, the first and second power supplies each comprise an AC power supply or a DC power supply.

In an embodiment, at least one of first and second nominal voltages does not approximately correspond to, is different from, or is outside the operating voltage range of the motor. In an embodiment, the motor control circuit is configured to optimize a supply of power from at least one of the first or second power supplies to the motor at a level corresponding to the operating voltage range of the motor.

In an embodiment, the operating voltage range of the motor encompasses the first nominal voltage, but not the second nominal voltage. In an embodiment, the operating voltage range of the motor is approximately within a range of 100V to 120V encompassing the first nominal voltage, and the second nominal voltage is in a range of approximately 60V to 100V. In an embodiment, the controller may be configured to boost an effective supply of power to the motor to correspond to the operating voltage range of the motor when powered by the second power supply.

In an embodiment, the operating voltage range of the motor encompasses the second nominal voltage, but not the first nominal voltage. In an embodiment, the operating voltage range of the motor is approximately within a range of 60V to 100V encompassing the second nominal voltage, and the first nominal voltage is in a range of approximately 100 VAC to 120 VAC. In an embodiment, the controller may be configured to reduce an effective supply of power to the motor to correspond to the operating voltage range of the motor when powered by the first power supply.

In an embodiment, the operating voltage range of the motor encompasses neither the first nominal voltage nor the first nominal voltage. In an embodiment, the motor control circuit is configured to optimize a supply of power from both the first and the second power supplies to the motor at a level corresponding to the operating voltage range of the motor.

In an embodiment, at least one of the first or second power supplies comprises an AC power supply and the motor control circuit comprises a rectifier circuit including a diode bridge. In an embodiment, the rectifier circuit further comprises a link capacitor arranged in parallel to the diode bridge on the DC bus line. In an embodiment, the diode bridge comprises a full-wave bridge. In an alternative embodiment, the diode bridge comprises a half-wave bridge.

In an embodiment, both the first and the second power supplies comprise DC power supplies having different nominal voltage levels.

In an embodiment, the motor control circuit further comprises a controller arranged to control a switching operation of the power switch circuit. In an embodiment, the controller is a programmable device including a microcontroller, a microprocessor, a computer processor, a signal processor. Alternatively, the controller is an integrated circuit configured and customized to control a switching operation of the power switch unit.

In an embodiment, the power switch circuit comprises a plurality of power switches including three pairs of high-side and low-side power switches configured as a three-phase bridge circuit coupled to the phases of the motor. In an embodiment, the motor control circuit further comprises a gate driver circuit coupled to the controller and the power switch circuit, and configured to drive gates of the plurality of power switches based on one or more drive signals from the controller. In an embodiment, the motor control circuit further comprises a power supply regulator including at least one voltage regulator configured to output a voltage signal to power at least one of the gate driver circuit or the controller. In an embodiment, the motor control circuit further comprises an ON/OFF switch coupled to at least one of an ON/OFF actuator or a trigger switch and arranged to cut off a supply of power from the power supply regulator and the gate driver circuit.

In an embodiment, the power tool further comprises a plurality of position sensors disposed at close proximity to the rotor to provide rotational position signals of the rotor to the control unit. In an embodiment, the controller is configured to control the switching operation of the power switch circuit based on the position signals to appropriately energize the stator windings within the corresponding phases.

According to an embodiment, within each phase of the motor, the controller is configured to activate a drive signal for a corresponding one of the plurality of power switches within a conduction band corresponding to the phase of the motor.

In an embodiment, the controller is configured to set a pulse-width modulation (PWM) duty cycle according to a desired speed of the motor and control the drive signal to turn the corresponding one of the plurality of power switches on and off periodically within the conduction band in accordance with the PWM duty cycle to enable variable speed operation of the motor at constant load.

In an embodiment, the link capacitor has a capacitance value of less than or equal to approximately 50 µF.

In an embodiment, the controller is configured to control the switching operation of the power switch circuit via one or more drive signals at a fixed pulse-width modulation (PWM) duty cycle, the controller setting the fixed PWM duty cycle to a first value in relation to the first nominal voltage when powered by the first power supply and to a second value different from the first value and in relation to the second nominal voltage when powered by the second power supply.

In an embodiment, the controller is configured to control the switching operation of the power switch circuit via one or more drive signals at a pulse-width modulation (PWM) duty cycle up to a threshold value, the controller setting the threshold value to a first value in relation to the first nominal voltage when powered by the first power supply and to a second value different from the first value and in relation to the second nominal voltage when powered by the second power supply.

In an embodiment, the controller is configured to control the switching operation of the power switch circuit within a first duty cycle range when coupled to the first power supply, and control the switching operation of the power switch circuit within a second duty cycle range when coupled to the second power supply, wherein the second PWM duty cycle range is smaller than the first duty cycle range, in order to optimize an effective supply of power to the motor when powered by the either the first or the second power supplies to correspond to the operating voltage range of the motor.

In an embodiment, the controller is configured to receive a measure of instantaneous current on the DC bus line and enforce a current limit on current through the power switch circuit by comparing instantaneous current measures to the current limit and, in response to an instantaneous current measure exceeding the current limit, turning off the plurality of power switches for a remainder of a present time interval to interrupt current flowing to the electric motor, where duration of each time interval is fixed as a function of the given frequency at which the electric motor is controlled by the controller.

In an embodiment, the controller turns on select power switches at end of the present time interval and thereby resumes current flow to the motor.

In an embodiment, the duration of each time interval is approximately ten times an inverse of the given frequency at which the motor is controlled by the controller. In an embodiment, the duration of each time interval is on the order to 100 microseconds.

In an embodiment, duration of the each time interval corresponds to a period of pulse-width modulation (PWM) cycle.

In an embodiment, the controller is configured to receive a measure of current on the DC bus line and enforce a current limit on current through the power switch circuit by setting or adjusting a PWM duty cycle of the one or more drive signals. In an embodiment, the controller is configured to monitor the current through the DC bus line and adjust the PWM duty cycle if the current through the DC bus line exceeds the current limit.

In an embodiment, the controller is configured to set the current limit according to a voltage rating of one of the first or second power supplies.

In an embodiment, the controller is configured to set the current limit to a first threshold when the power tool is powered by the first power supply and to a second threshold when the power tool is powered by the second power supply, wherein the second threshold is higher than the first threshold, in order to optimize an effective supply of power to the motor from either the first or the second power supplies to correspond to the operating voltage range of the motor.

According to an embodiment, the controller is configured to activate a drive signal within each phase of the motor for a corresponding one of the plurality of power switches within a conduction band (CB) corresponding to the phase of the motor. According to an embodiment, the CB is set to approximately 120 degrees.

In an embodiment, the controller is configured to shift the CB by an advance angle (AA) such that the CB leads ahead of a back electro-magnetic field (EMF) current of the motor. According to an embodiment, the AA is set to approximately 30 degrees.

In an embodiment, the controller is configured to set at least one of the CB or AA according to a voltage rating of one or more of the first or the second power supplies.

In an embodiment, the controller is configured to set the CB to a first CB value when the power tool is powered by the first power supply and to a second CB value greater than the first CB value when the power tool is powered by the second power supply. In an embodiment, the second CB value is determined so as to boost or reduce an effective supply of power to the motor when powered by either the first or the second power supplies to correspond to the operating voltage range of the motor. In an embodiment, first CB value is approximately 120 degrees and the second CB value is greater than approximately 130 degrees.

In an embodiment, the controller is configured to the AA to a first AA value when the power tool is powered by the first power supply to a second AA value greater than the first AA value when the power tool is powered by the second power supply. In an embodiment, the second AA value is determined so as to boost or reduce an effective supply of power to the motor when powered by either the first or the second power supplies to correspond to the operating voltage range of the motor. In an embodiment, first AA value is approximately 30 degrees and the second AA value is greater than approximately 35 degrees.

In an embodiment, the controller is configure to set the CB and AA in tandem according to the voltage rating of the first or the second power supplies.

In an embodiment, the controller is configured to set at least one of the CB or AA to a base value corresponding to a maximum speed of the motor at approximately no load, and gradually increase the at least one of CB or AA from the base value to a threshold value in relation to an increase in torque to yield a substantially linear speed-torque curve. In an embodiment, the controller is configured to maintain substantially constant speed on the speed-torque curve. In an embodiment, the base value and the threshold value corresponds to a low torque range within which the speed-torque curve is substantially linear. In an embodiment, the controller is configured to maintain the at least one of CB or AA at the torque greater than the low torque range.

In another aspect, a battery pack is convertible back and forth between a low rated voltage/high capacity configuration and a medium rated voltage/low capacity configuration.

In another aspect, a power tool system includes a battery pack that is convertible back and forth between a low rated voltage/high capacity configuration and a medium rated voltage/low capacity configuration and a power tool that couples with the battery pack, converts the battery pack from the low rated voltage/high capacity configuration to the medium rated voltage/low capacity configuration and operates with the battery pack in its medium rated voltage/low capacity configuration.

In another aspect, a power tool system includes a battery pack that is convertible back and forth between a low rated voltage/high capacity configuration and a medium rated voltage/low capacity configuration, a first power tool that couples with the battery pack, converts the battery pack from the low rated voltage/high capacity configuration to the medium rated voltage/low capacity configuration and operates with the battery pack its medium rated voltage/low capacity configuration and a second power tool that couples with the battery pack and operates with the battery pack in its low rated voltage/high capacity configuration.

In another aspect, a power tool system includes a first battery pack that is convertible back and forth between a low rated voltage/high capacity configuration and a medium rated voltage/low capacity configuration, a second battery pack that is always in a low rated voltage/high capacity configuration and a power tool that couples with the first battery pack and operates with the first battery pack in its low rated voltage/high capacity configuration and couples with the second battery pack and operates with the second battery pack in its low rated voltage/high capacity configuration.

In another aspect, a power tool system includes a first battery pack that is convertible back and forth between a low rated voltage/high capacity configuration and a medium rated voltage/low capacity configuration, a second battery pack that is always in a low rated voltage/high capacity configuration, a first power tool power tool that couples with the first battery pack and operates with the first battery pack in its low rated voltage/high capacity configuration and couples with the second battery pack and operates with the second battery pack in its low rated voltage/high capacity configuration and a second power tool that couples with the first battery pack but not the second battery pack and operates with the first battery pack in its high rated voltage/low capacity configuration.

In another aspect, a power tool system includes a battery pack that is convertible back and forth between a low rated voltage/high capacity configuration and a medium rated voltage/low capacity configuration, a first, medium rated voltage power tool that couples with the battery pack, converts the battery pack from the low rated voltage/high capacity configuration to the medium rated voltage/low capacity configuration and operates with the battery pack in its medium rated voltage/low capacity configuration and a second, high rated voltage power tool that couples with a plurality of the battery packs, converts each battery pack from the low rated voltage/high capacity configuration to the medium rated voltage/low capacity configuration and operates with the battery packs in their medium rated voltage/low capacity configuration.

In another aspect, a power tool system includes a battery pack that is convertible back and forth between a low rated voltage/high capacity configuration and a medium rated voltage/low capacity configuration, a high rated voltage power tool that couples with a plurality of the battery packs, converts each battery pack from the low rated voltage/high capacity configuration to the medium rated voltage/low capacity configuration and/or couples with a high rated voltage alternating current power supply and operates at a high rated voltage with either the battery packs in their medium rated voltage/low capacity configuration and/or the high rated voltage alternating current power supply.

In another aspect, a first battery pack is convertible back and forth between a low rated voltage/high capacity configuration and a medium rated voltage/low capacity configuration a second battery pack that is always in a low rated voltage/high capacity configuration and a battery pack charger is electrically and mechanically connectable to the first battery pack and the second battery pack is able to charger both the first battery pack and the second battery pack.

In another aspect, a battery pack includes a housing and a battery residing in the housing. The battery may include a plurality of rechargeable cells and a switching network coupled to the plurality of rechargeable cells. The switching network may have a first configuration and a second configuration. The switching network may be switchable from the first configuration to the second configuration and from the second configuration to the first configuration. The plurality of rechargeable cells may be in a first configuration when the switching network is in the first configuration and a second configuration when the switching network is in the second configuration. The second configuration is different than the first configuration.

The switching network of the battery pack of this embodiment may have a third configuration wherein the plurality of rechargeable cells is in a third configuration when the switching network is in the third configuration. The switching network of the battery pack of this embodiment may be switched between the first configuration and the second configurations by an external input to the battery pack. The first configuration of the rechargeable cells of the battery pack of this embodiment may be a relatively low voltage and high capacity configuration and the second configuration of the rechargeable cells of the battery pack may be a relatively high voltage and low capacity configuration. The battery pack of this embodiment may include cell configurations in which the first configuration provides a first rated pack voltage and the second configuration provides a second rated pack voltage, wherein the first rated pack voltage is different than the second rated pack voltage. The third configuration of the battery pack of this embodiment may be an open circuit configuration.

The rechargeable cells of the battery pack of the first configuration may enter the third configuration upon converting between the first and second configurations. The battery pack of this embodiment may comprise a terminal block coupled to the plurality of rechargeable cells and the switching network, wherein the terminal block receives a switching element to switch the switching network from the first configuration to the second configuration.

In another aspect, a battery pack comprises a housing and a battery residing in the housing. The battery may include a set P of O rechargeable cells Q where O is a number $\geq 2$. The set P of rechargeable cells Q may include N subsets R of cells Q where N is a number $\geq 2$. Each subset R of cells Q may include M cells Q, where M is a number $\geq 1$, where M×N=0. The battery may include a switching network coupled to the rechargeable cells, wherein the switching network may have a first configuration and a second configuration and may be switchable from the first configuration to the second configuration and from the second configuration to the first configuration. All of the subsets R of rechargeable cells Q may be connected in parallel when the switching network is in the first configuration and disconnected when the switching network is in the second configuration. A first power terminal may be coupled to a positive terminal of cell Q1 and a second power terminal may be coupled to a negative terminal of QO wherein the first and second power terminals provide power out from the battery pack. A negative conversion terminal may be coupled to a negative terminal of each subset R1 through RN−1 and a positive conversion terminal may be coupled to a positive terminal of each subset R2 through RN. The negative conversion terminal and the positive conversion terminal of the battery pack of this embodiment are accessible from outside the battery housing.

In another aspect, a battery pack comprises a housing and a battery residing in the housing. The battery of this embodiment may include a battery residing in the housing. The battery of this embodiment may include a set P of O rechargeable cells Q, where O is a number $\geq 2$. The set P of rechargeable cells Q may include N subsets R of cells Q, where N is a number $\geq 2$. Each subset R of cells Q may include M cells Q where M is a number $\geq 1$, where M×N=0. The battery pack of this embodiment may include a switching network coupled to the rechargeable cells. The switching network may have a first configuration and a second configuration and may be switchable from the first configuration to the second configuration and from the second configuration to the first configuration. All of the subsets R of rechargeable cells Q may be connected in parallel when the switching network is in the first configuration and disconnected when the switching network is in the second configuration. The battery pack may include a first power terminal coupled to a positive terminal of Q1 and a second power terminal coupled to a negative terminal of QO wherein the first and second power terminals provide power out from the battery pack. The battery pack may include a negative conversion terminal coupled to a negative terminal of each subset of cells and a positive conversion terminal coupled to a positive terminal of each subset of cells.

In another aspect, a power tool comprises: a first power supply from an AC input having a rated AC voltage; a second power supply from a plurality of rechargeable battery cells having the rated DC voltage; a motor coupleable to the first power supply and the second power supply; and a control circuit configured to operate the motor with substantially the same output power when operating on the first power supply and the second power supply. The rated DC voltage of the power tool of this embodiment may be approximately equal to the rated AC voltage. The motor of the power tool of this embodiment is a brushed motor. The control circuit of the power tool of this embodiment may operate the brushed motor at a constant no load speed regardless of whether the motor is operating on the first power supply or the second power supply. The control circuit of the power tool of this embodiment may operate the brushed motor at a variable no load speed based upon a user input. The control circuit of the power tool of this embodiment may include an IGBT/MOSFET circuit configured to operate the motor at a variable no load speed using either the first power supply or the second power supply. The motor of the power tool of this embodiment may be a brushless motor. The control circuit of the power tool of this embodiment may comprise a small capacitor and a cycle by cycle current limiter. The rated DC voltage of the power tool of this embodiment may be less than the rated AC voltage. The control circuit of the power tool of this embodiment may comprise a small capacitor and a cycle by cycle current limiter. The control circuit power tool of this embodiment may comprise at least one of advance angle and conduction band controls. The control circuit of the power tool of this embodiment may detect whether the first power supply and the second power supply are activated. The control circuit of the power tool of this embodiment may select the first power supply whenever it is active. The control circuit of the power tool of this embodiment may switch to the second power supply in the event that the first power supply becomes inactive. The control circuit of the power tool of this embodiment may include a boost mode whereby the control circuit operates the power supply at a higher output power using both the first power supply and the second power supply simultaneously. The power supply of the power tool of this embodiment may be provided by a cordset. The first power supply and the second power supply of the power tool of this embodiment may provide power to the motor simultaneously and may provide substantially more power than either the first or the second power supplies could provide individually.

In another aspect, a power tool comprises an input for receiving power from an AC power supply; an input for receiving power from a rechargeable DC power supply; a charger for charging the rechargeable DC power supply with the AC power supply; and a motor configured to be powered by at least one of the AC power supply and the rechargeable DC power supply. The AC power supply of the power tool of this embodiment may be a mains line. The rechargeable DC power supply of the power tool of this embodiment may be a removable battery pack.

In another aspect, a power tool comprises a power tool comprising an input for receiving AC power from an AC power source, the AC power source having a rated AC voltage, the AC power source external to the power tool; an input for receiving DC power from a DC power source, the DC power source having a rated DC voltage, the DC power source being a plurality of rechargeable battery cells, the rated DC voltage approximately equal to the rated AC voltage; and a motor configured to be powered by at least one of the AC power source and the DC power source. The AC power source of the power tool of this embodiment may be a mains line. The rechargeable DC power supply of the power tool of this embodiment may be a battery pack. The AC power supply and the DC power supply of the power tool of this embodiment may have a rated voltage of 120 volts.

In another aspect, a power tool comprises a motor; a first power supply from an AC input line; a second power supply from a rechargeable battery, the second power supply providing power approximately equivalent to the power of the first power supply. The first power supply and the second power supply of the power tool of this embodiment may provide power to the motor simultaneously. The first power supply and the second power supply of the power tool of this embodiment may provide power to the motor alternatively.

In another aspect, a power tool comprises a motor; a first power supply from an AC input line; a second power supply from a rechargeable battery, the second power supply providing power approximately equivalent to the power of the first power supply. The first power supply and the second power supply of the power tool of this embodiment may provide power to the motor simultaneously. The first power supply and the second power supply of the power tool of this embodiment may provide power to the motor alternatively.

In another aspect, a battery pack may include: a housing; a plurality of cells; and a converter element, the converter element moveable between a first position wherein the plurality of cells are configured to provide a first rated voltage and a second position wherein the plurality of cells are configured to provide a second rated voltage different than the first rated voltage.

BRIEF DESCRIPTION OF THE DRAWINGS

FIG. 14C depicts an exemplary combined efficiency and maximum power output contour map for the same power tool based on various CB and AA values, according to an alternative embodiment.

DETAILED DESCRIPTION

I. Power Tool System

Figure 1A:
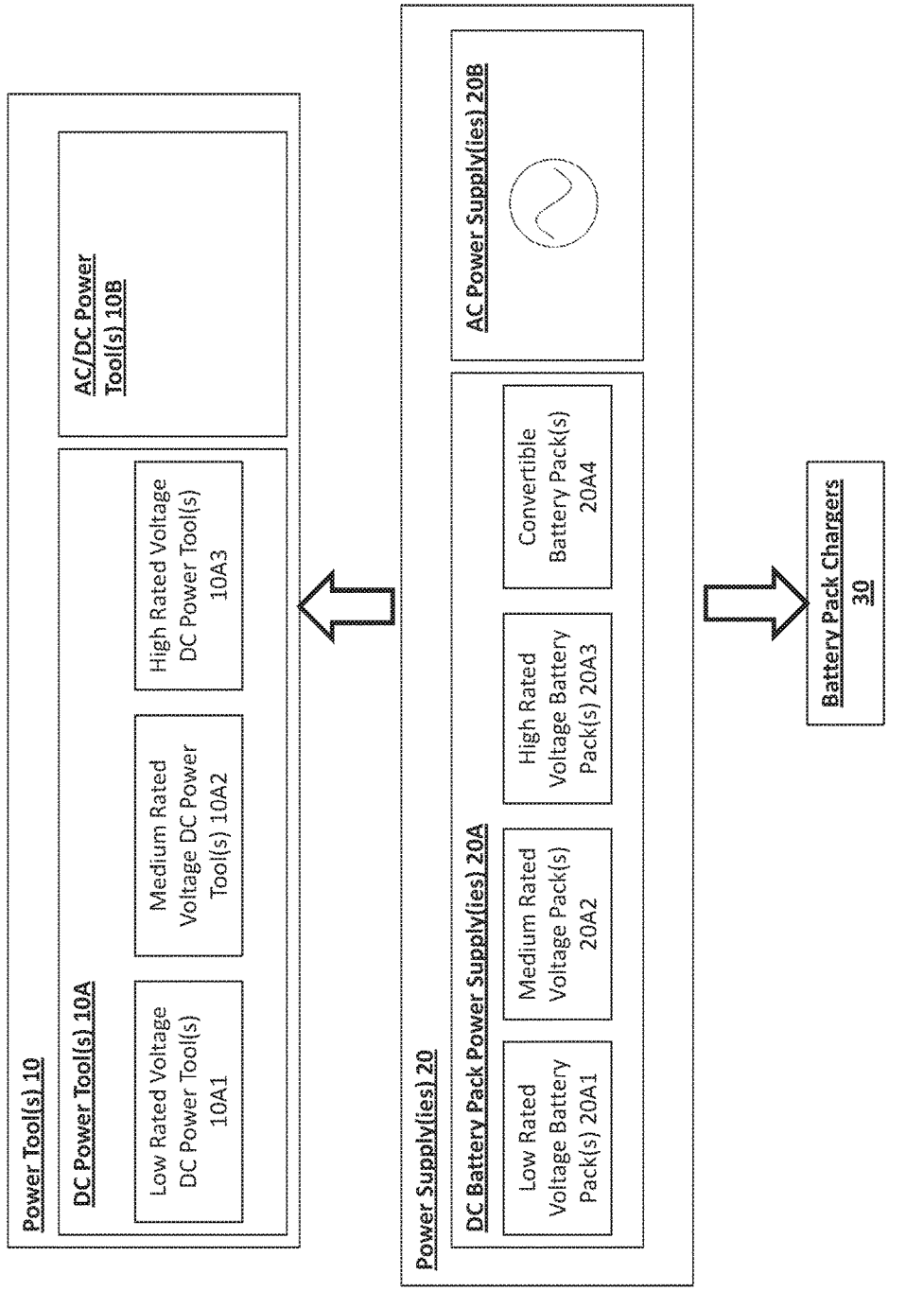
FIG. 1A is a schematic diagram of a power tool system.

Referring to FIG. 1A, in one embodiment, a power tool system 1 includes a set of power tools 10 (which include DC power tools 10A and AC/DC power tools 10B), a set of power supplies 20 (which include DC battery pack power supplies 20A and AC power supplies 20B), and a set of battery pack chargers 30. Each of the power tools, power supplies, and battery pack chargers may be said to have a rated voltage. As used in this application, rated voltage may refer to one or more of the advertised voltage, the operating voltage, the nominal voltage, or the maximum voltage, depending on the context. The rated voltage may also encompass a single voltage, several discrete voltages, or one or more ranges of voltages. As used in the application, rated voltage may refer to any of these types of voltages or a range of any of these types of voltages.

Advertised Voltage.

With respect to power tools, battery packs, and chargers, the advertised voltage generally refers to a voltage that is designated on labels, packaging, user manuals, instructions, advertising, marketing, or other supporting documents for these products by a manufacturer or seller so that a user is informed which power tools, battery packs, and chargers will operate with one another. The advertised voltage may include a numeric voltage value, or another word, phrase, alphanumeric character combination, icon, or logo that indicates to the user which power tools, battery packs, and chargers will work with one another. In some embodiments, as discussed below, a power tool, battery pack, or charger may have a single advertised voltage (e.g., 20V), a range of advertised voltages (e.g., 20V-60V), or a plurality of discrete advertised voltages (e.g., 20V/60V). As discussed further below, a power tool may also be advertised or labeled with a designation that indicates that it will operate with both a DC power supply and an AC power supply (e.g., AC/DC or AC/60V). An AC power supply may also be said to have an advertised voltage, which is the voltage that is generally known in common parlance to be the AC mains voltage in a given country (e.g., 120 VAC in the United States and 220 VAC-240 VAC in Europe).

Operating Voltage.

For a power tool, the operating voltage generally refers to a voltage or a range of voltages of AC and/or DC power supply(ies) with which the power tool, its motor, and its electronic components are designed to operate. For example, a power tool advertised as a 120V AC/DC tool may have an operating voltage range of 92V-132V. The power tool operating voltage may also refer to the aggregate of the operating voltages of a plurality of power supplies that are coupled to the power tool (e.g., a 120V power tool may be operable using two 60V battery packs connected in series). For a battery pack and a charger, the operating voltage refers to the DC voltage or range of DC voltages at which the battery pack or charger is designed to operate. For example, a battery pack or charger advertised as a 20V battery pack or charger may have an operating voltage range of 17V-19V. For an AC power supply, the operating voltage may refer either to the root-mean-square (RMS) of the voltage value of the AC waveform and/or to the average voltage within each positive half-cycle of the AC waveform. For example, a 120 VAC mains power supply may be said to have an RMS operating voltage of 120V and an average positive operating voltage of 108V.

Nominal Voltage.

For a battery pack, the nominal voltage generally refers to the average DC voltage output from the battery pack. For example, a battery pack advertised as a 20V battery pack, with an operating voltage of 17V-19V, may have a nominal voltage of 18V. For an AC power supply, the operating voltage may refer either to the root-mean-square (RMS) of the voltage value of the AC waveform and/or to the average voltage within each positive half-cycle of the AC waveform. For example, a 120 VAC mains power supply may be said to have an RMS nominal voltage of 120V and an average positive nominal voltage of 108V.

Maximum Voltage.

For a battery pack, the maximum voltage may refer to the fully charged voltage of the battery pack. For example, a battery pack advertised as a 20V battery pack may have a maximum fully charged voltage of 20V. For a charger, the maximum voltage may refer to the maximum voltage to which a battery pack can be recharged by the charger. For example, a 20V charger may have a maximum charging voltage of 20V.

It should also be noted that certain components of the power tools, battery packs, and chargers may themselves be said to have a voltage rating, each of which may refer to one or more of the advertised voltage, the operating voltage, the nominal or voltage, or the maximum voltage. The rated voltages for each of these components may encompass a single voltage, several discrete voltages, or one or more ranges of voltages. These voltage ratings may be the same as or different from the rated voltage of power tools, battery packs and chargers. For example, a power tool motor may be said to have its own an operating voltage or range of voltages at which the motor is designed to operate. The motor rated voltage may be the same as or different from the operating voltage or voltage range of the power tool. For example, a power tool having a voltage rating of 60V-120V may have a motor that has an operating voltage of 60V-120V or a motor that has an operating voltage of 90V-100V.

The power tools, power supplies, and chargers also may have ratings for features other than voltage. For example, the power tools may have ratings for motor performance, such as an output power (e.g., maximum watts out (MWO) as described in U.S. Pat. No. 7,497,275, which is incorporated by reference) or motor speed under a given load condition. In another example, the battery packs may have a rated capacity, which refers to the total energy stored in a battery pack. The battery pack rated capacity may depend on the rated capacity of the individual cells and the manner in which the cells are electrically connected.

This application also refers to the ratings for voltage (and other features) using relative terms such as low, medium, high, and very high. The terms low rated, medium rated, high rated, and very high rated are relative terms used to indicate relative relationships between the various ratings of the power tools, battery packs, AC power supplies, chargers, and components thereof, and are not intended to be limited to any particular numerical values or ranges. For example, it should be understood that a low rated voltage is generally lower than a medium rated voltage, which is generally lower than a high rated voltage, which is generally lower than a very high rated voltage. In one particular implementation, the different rated voltages may be whole number multiples or factors of each other. For example, the medium rated voltage may be a whole number multiple of the low rated voltage, and the high rated voltage may be a whole number multiple of the medium rated voltage. For example, the low rated voltage may be 20V, the medium rated voltage may be 60V (3×20V), and the high rated voltage may be 120V (2×60V and 6×20V). In this application, the designation "XY" may sometimes be used as a generic designation for the terms low, medium, high, and very high.

In some instances, a power tool, power supply, or charger may be said to have multiple rated voltages. For example, a power tool or a battery pack may have a low/medium rated voltage or a medium/high rated voltage. As discussed in more detail below, this multiple rating refers to the power tool, power supply, or charger having more than one maximum, nominal or actual voltage, more than one advertised voltage, or being configured to operate with two or more power tools, battery packs, AC power supplies, or chargers, having different rated voltages from each other. For example, a medium/high rated voltage power tool may labeled with a medium and a high voltage, and may be configured to operate with a medium rated voltage battery pack or a high rated voltage AC power supply. It should be understood that a multiply rated voltage may mean that the rated voltage comprises a range that spans two different rated voltages or that the rated voltage has two discrete different rated values.

This application also sometimes refers to a first one of a power tool, power supply, charger, or components thereof as having a first rated voltage that corresponds to, matches, or is equivalent to a second rated voltage of a second one of a power tool, power supply, charger, or components thereof. This comparison generally refers to the first rated voltage having one or more value(s) or range(s) of values that are substantially equal to, overlap with, or fall within one or more value(s) or range(s) of values of the second rated voltage, or that the first one of the power tool, power supply, charger, or components, is configured to operate with the second one of the power tool, power supply, charger, or components thereof. For example, an AC/DC power tool having a rated voltage of 120V (advertised) or 90V-132V (operating) may correspond to a pair of battery packs having a total rated voltage of 120V (advertised and maximum), 108V (nominal) or 102V-120V (operating), and to several AC power supplies having a rated voltages ranging from of 100 VAC-120 VAC.

Conversely, this application sometimes refers to a first one of a power tool, power supply, charger, or components thereof as having a first rated voltage that does not correspond to, that is different from, or that is not equivalent to a second rated voltage of a second one of a power tool, power supply, charger, or components thereof. These comparisons generally refer to the first rated voltage having one or more value(s) or range(s) of values that are not equal to, do not overlap with, or fall outside one or more value(s) or range(s) of values of the second rated voltage, or that the first one of the power tool, power supply, charger, or components thereof are not configured to operate with the second one of the power tool, power supply, chargers, or components thereof. For example, an AC/DC power tool having the rated voltage of 120V (advertised) or 90V-132V (operating) may not correspond to a battery packs having a total rated voltage of 60V (advertised and maximum), 54V (nominal) or 51V-60V (operating), or to AC power supplies having a rated voltages ranging from of 220 VAC-240 VAC.

Referring again to FIG. 1A, the power tools 10 include a set of cordless-only or DC power tools 10A and a set of corded/cordless or AC/DC power tools 10B. The set of DC power tools 10A may include a set of low rated voltage DC power tools 10A1 (e.g., under 40V, such as 4V, 8V, 12V, 18V, 20V, 24V and/or 36V), a set of medium rated voltage DC power tools 10A2 (e.g., 40V to 80V, such as 40V, 54V, 60V, 72V, and/or 80V), and a set of high rated voltage DC power tools 10A3 (e.g., 100V to 240V, such as 100V, 110V, 120V, 220V, 230V and/or 240V). It may also be said that the high rated voltage DC power tools include a subset of high rated voltage DC power tools (e.g., 100V to 120V, such as 100V, 110V, or 120V for, e.g., the United States, Canada, Mexico, and Japan) and a subset of very high rated voltage DC power tools (e.g., 220V to 240V, such as 220V, 230V, or 240V for, e.g., most countries in Europe, South America, Africa, and Asia). For convenience, the high rated and very high rated voltage DC power tools are referred to collectively as a set of high rated voltage DC power tools 10A3.

The AC/DC power tools 10B generally have a rated voltage that corresponds to the rated voltage for an AC mains supply in the countries in which the tool will operate or is sold (e.g., 100V to 120V, such as 100V, 110V, or 120V in countries such as the United States, Canada, Mexico, and Japan, and 220V to 240V, such as 220V, 230V and/or 240V in most countries in Europe, South America, Asia and Africa). In some instances, these high rated voltage AC/DC power tools 10B are alternatively referred to as AC-rated AC/DC power tools, where AC rated refers to the fact that the high voltage rating of the AC/DC power tools correspond to the voltage rating of the AC mains power supply in a country where the power tool is operable and/or sold. For convenience, the high rated and very high rated voltage AC/DC power tools are referred to collectively as a set of high rated voltage AC/DC power tools 10B.

A. Power Supplies

The set of power supplies 20 may include a set of DC battery pack power supplies 20A and a set of AC power supplies 20B. The set of DC battery pack power supplies 20A may include one or more of the following: a set of low rated voltage battery packs 20A1 (e.g., under 40V, such as 4V, 8V, 12V, 18V, 20V, 24V and/or 36V), a set of medium rated voltage battery packs 20A2 (e.g., 40V to 80V, such as 40V, 54V, 60V, 72V and/or 80V), a set of high rated voltage battery packs 20A3 (e.g., 100V to 120V and 220V to 240V, such as 100V, 110V, 120V, 220V, 230V and/or 240V), and a set of convertible voltage range battery packs 20A4 (discussed in greater detail below). The AC power supplies 20B may include power supplies that have a high voltage rating that correspond to the voltage rating of an AC power supply in the countries in which the tool is operable and/or sold (e.g., 100V to 120V, such as 100V, 110V, or 120V, in countries such as the United States, Canada, Mexico, and Japan, and 220V to 240V, such as 220V, 230V and/or 240V in most countries in Europe, South America, Asia and Africa). The AC power supplies may comprise an AC mains power supply or an alternative power supply with a similar rated voltage, such as an AC generator or another portable AC power supply.

One or more of the DC battery pack power supplies 20A are configured to power one or more of the set of low rated voltage DC power tools 10A1, the set of medium rated voltage DC power tools 10A2, and the set of high rated voltage DC power tools 10A3, as described further below. The AC/DC power tools 10B may be powered by one or more of the DC battery pack power supplies 20A or by one or more of the AC power supplies 20B. FIGS. 111-114 of U.S. Pat. No. 9,406,915, which is incorporated herein by reference, illustrate an exemplary embodiment of an AC/DC power tool interface 22B for providing AC power from the AC power supply 20B to the AC/DC power tool 10B. The AC/DC power tool interface 22B includes a housing 23 and a cord 25 including a two or three pronged plug (not shown) at a first end and a coupled to the housing 23 at a second end. The housing 23 includes a pair of DC power tool interfaces 27 that are substantially equivalent in shape and size as the DC power tool interface 22A of the DC battery pack power supply 20A. The housing 23 also includes a three pronged receptacle 29 (or alternatively a two pronged receptacle) positioned between the pair of DC power tool interfaces 27. The illustrated AC/DC power tool interface 22B of the AC power supply 20B is received in an exemplary power supply interface 16 of an AC/DC power tool illustrated and described below in FIGS. 114 and 115. As illustrated in FIG. 113 of U.S. Pat. No. 9,406,915, the AC/DC power tool interface 22B may include a circuit 31 for receiving "dirty" AC signals from certain AC power supplies, for example, gas powered generators. The set of battery pack chargers 30 includes one or more battery pack chargers 30 configured to charge one or more of the DC battery pack power supplies 20A. Below is a more detailed description of the power supplies 20, the battery pack chargers 30, and the power tools 10.

1. DC Battery Pack Power Supplies

Referring to FIG. 1, as noted above, the DC battery pack power supplies 20A include a set of low rated voltage battery packs 20A1, a set of medium rated voltage battery packs 20A2, a set of high rated voltage battery packs 20A3, and a set of convertible battery packs 20A4. Each battery pack may include a housing, a plurality of cells, and a power tool interface that is configured to couple the battery pack to a power tool or to a charger. Each cell has a rated voltage, usually expressed in volts (V), and a rated capacity (referring to the energy stored in a cell), usually expressed in amp-hours (Ah). As is well known by those of ordinary skill in the art, when cells in a battery pack are connected to each other in series the voltage of the cells is additive. When the cells are connected to each other in parallel the capacity of the cells is additive. The battery pack may include several strings of cells. Within each string, the cells may be connected to each other in series, and each string may be connected to the other cells in parallel. The arrangement, voltage and capacity of the cells and the cell strings determine the overall rated voltage and rated capacity of the battery pack. Within each set of DC battery pack power supplies 20A, there may be battery packs having the same voltage but multiple different rated capacities, for example, 1.5 Amp-Hours (Ah), 2 Ah, 3 Ah, or 4 Ah.

Figure 2C:
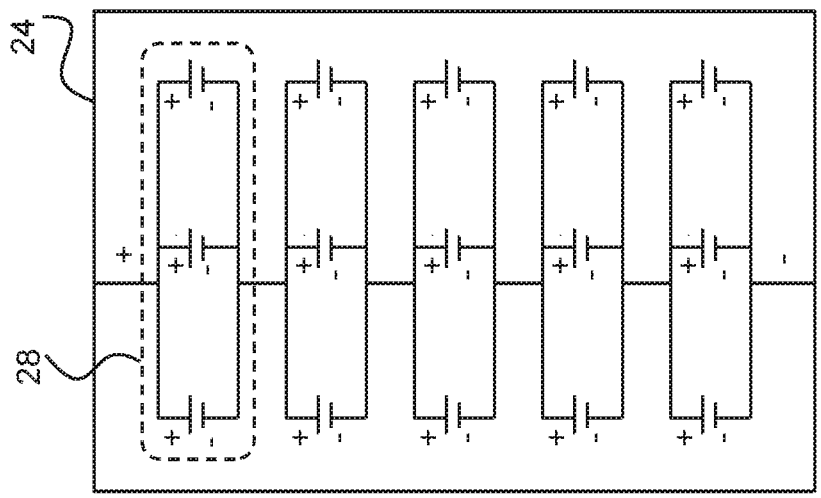
FIGS. 2A-2C are exemplary simplified circuit diagrams of battery cell configurations of a battery.
Figure 2B:
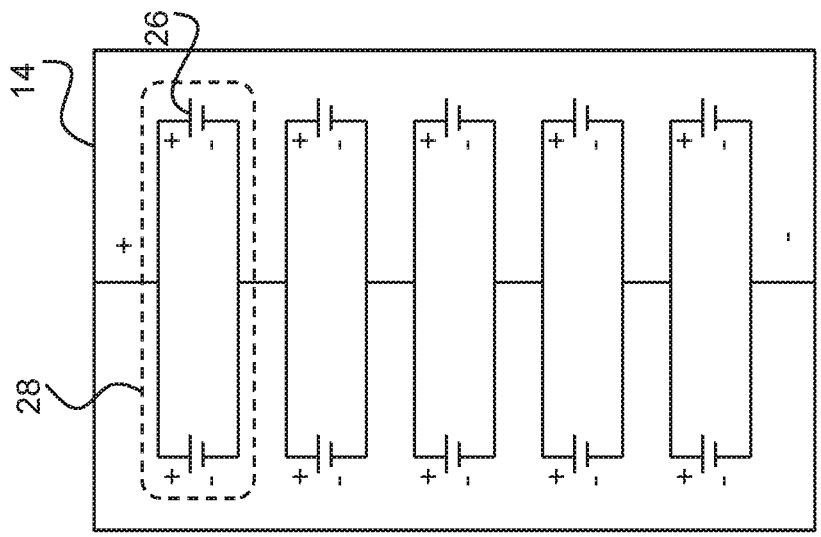
Figure 2A:
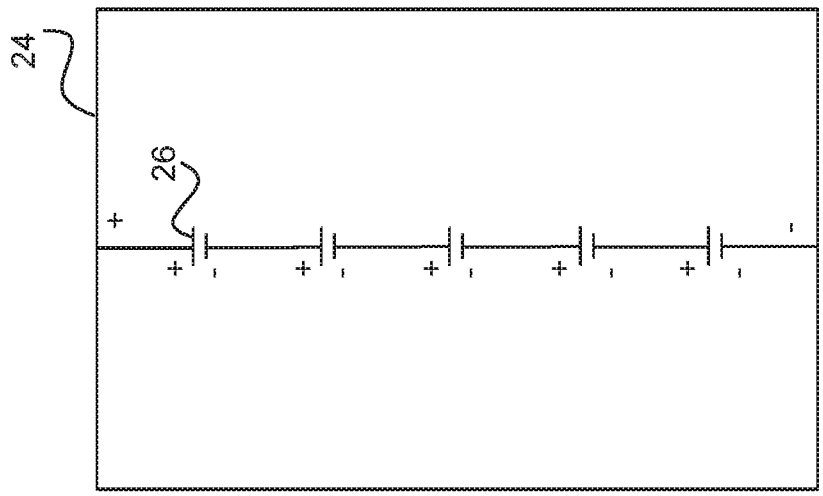

FIGS. 2A-2C illustrate exemplary battery cell configurations for a battery 24 that is part of the set of DC battery pack power supplies 20A. These examples are not intended to limit the possible cell configurations of the batteries 24 in each set of DC battery pack power supplies 20A. FIG. 2A illustrates a battery 24 having five battery cells 26 connected in series. In this example, if each of the cells 26 has a rated voltage of 4V and a rated capacity of 1.5 Ah this battery 24 would have a rated voltage of 20V and a rated capacity of 1.5 Ah. FIG. 2B illustrates a battery 24 having ten cells. The battery 24 includes five subsets 28 of cells 26 with each subset 28 including two cells 26. The cells 26 of each subset 28 are connected in parallel and the subsets 28 are connected in series. In this example, if each of the cells 26 has a rated voltage of 4V and a rated capacity of 1.5 Ah this battery 24 would have a rated voltage of 20V and a rated capacity of 3 Ah. FIG. 2C illustrates a battery 24 having fifteen cells 120. The battery 24 includes five subsets 28 of cells 26 with each subset 28 including three cells 26. The cells 26 of each subset 28 are connected in parallel and the subsets 28 are connected in series. In this example, if each of the cells 26 has a rated voltage of 4V and a rated capacity of 1.5 Ah this battery 24 would have a rated voltage of 20V and a rated capacity of 4.5 Ah.

a. Low Rated Voltage Battery Packs

Figure 3A:
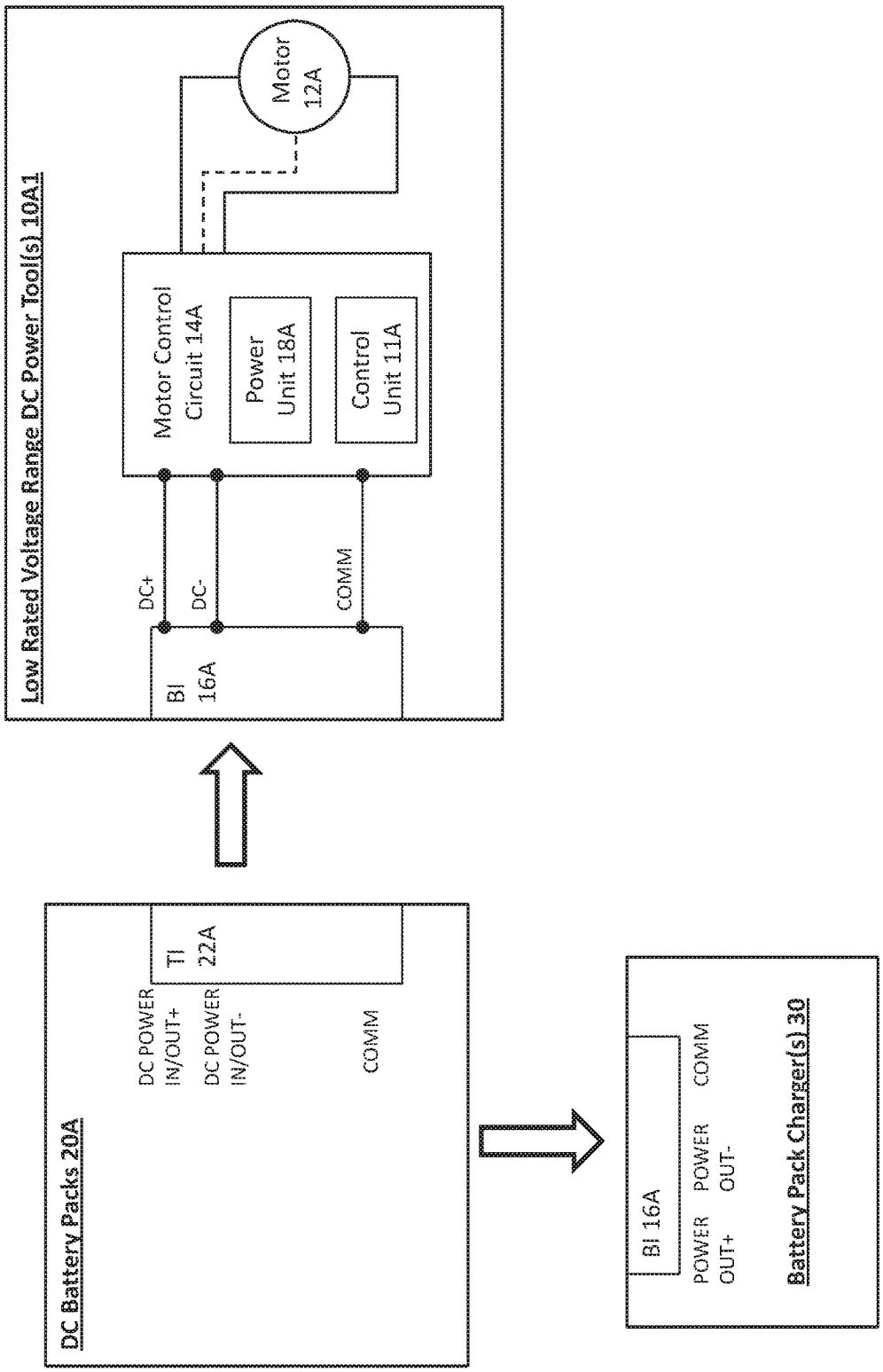
FIG. 3A is a schematic diagram of a set of low rated voltage DC power tool(s), a set of DC battery pack power supply(ies), and a set of battery pack charger(s) of the power tool system of FIG. 1A.

Referring to FIGS. 1A and 3A, each of the low rated voltage battery packs 20A1 includes a DC power tool interface 22A configured to be coupled to a battery pack interface 16A on a corresponding low rated voltage power tool 10A1 and to a battery pack interface 16A on a corresponding low rated voltage battery pack charger 30. The DC power tool interface 22A may include a DC power in/out+ terminal, a DC power in/out− terminal, and a communications (COMM) terminal. The set of low rated voltage battery packs 20A1 may include one or more battery packs having a first rated voltage and a first rated capacity. The first rated voltage is, relatively speaking, a low rated voltage, as compared to the other battery packs in the DC battery pack power supplies 20A. For example, the low rated voltage battery packs 20A1 may include battery packs having a rated voltage of 17V-20V (which may encompass an advertised voltage of 20V, an operating voltage of 17V-19V, a nominal voltage of 18V, and a maximum voltage of 20V). However, the set of low rated voltage battery packs 20A1 is not limited to a rated voltage of 20V. The set of low rated voltage battery packs 20A1 may have other relatively low rated voltages such as 4V, 8V, 12V, 18V, 24V, or 36V. Within the set of low rated voltage battery packs 20A1 there may be battery packs having the same rated voltage but with different rated capacities. For example, the set of low rated voltage battery packs 20A1 may include a 20V/1.5 Ah battery pack, a 20V/2 Ah battery pack, a 20V/3 Ah battery pack and/or a 20V/4 Ah battery pack. When referring to the low rated voltage of the set of low rated voltage battery packs 20A1, it is meant that the rated voltage of the set of low rated voltage battery packs 20A1 is lower than the rated voltage of the set of medium rated voltage battery packs 20A2 and the set of high rated voltage battery packs 20A3.

Examples of battery packs in the set of low rated voltage battery packs 120A may include the DEWALT 20V MAX set of battery packs, sold by DEWALT Industrial Tool Co. of Towson, Md. Other examples of battery packs that may be included in the first set of battery packs 110 are described in U.S. Pat. No. 8,653,787 and U.S. patent application Ser. Nos. 13/079,158; 13/475,002; and Ser. No. 13/080,887, which are incorporated by reference.

The rated voltage of the set of low rated voltage battery packs 20A1 generally corresponds to the rated voltage of the set of low rated voltage DC power tools 10A1 so that the set of low rated voltage battery packs 20A1 may supply power to and operate with the low rated voltage DC power tools 10A1. As described in further detail below, the set of low rated voltage battery packs 20A1 may also be able to supply power to one or more of the medium rated voltage DC power tools 10A2, the high rated voltage DC power tools 10A3, or the high rated voltage AC/DC power tools 10B, for example, by coupling more than one of the low rated voltage battery packs 20A1 to these tools in series so that the voltage of the low rated voltage battery packs 20A1 is additive and corresponds to the rated voltage of the power tool to which the battery packs are coupled. The low rated voltage battery packs 20A1 may additionally or alternatively be coupled in series with one or more of the medium rated voltage battery packs 20A2, the high rated voltage battery packs 20A3, or the convertible battery packs 20A4 to output the desired voltage level for any of the medium and high rated voltage DC power tools 10A2, 10A3, and/or the AC/DC power tools 10B.

b. Medium Rated Voltage Battery Packs

Figure 3B:
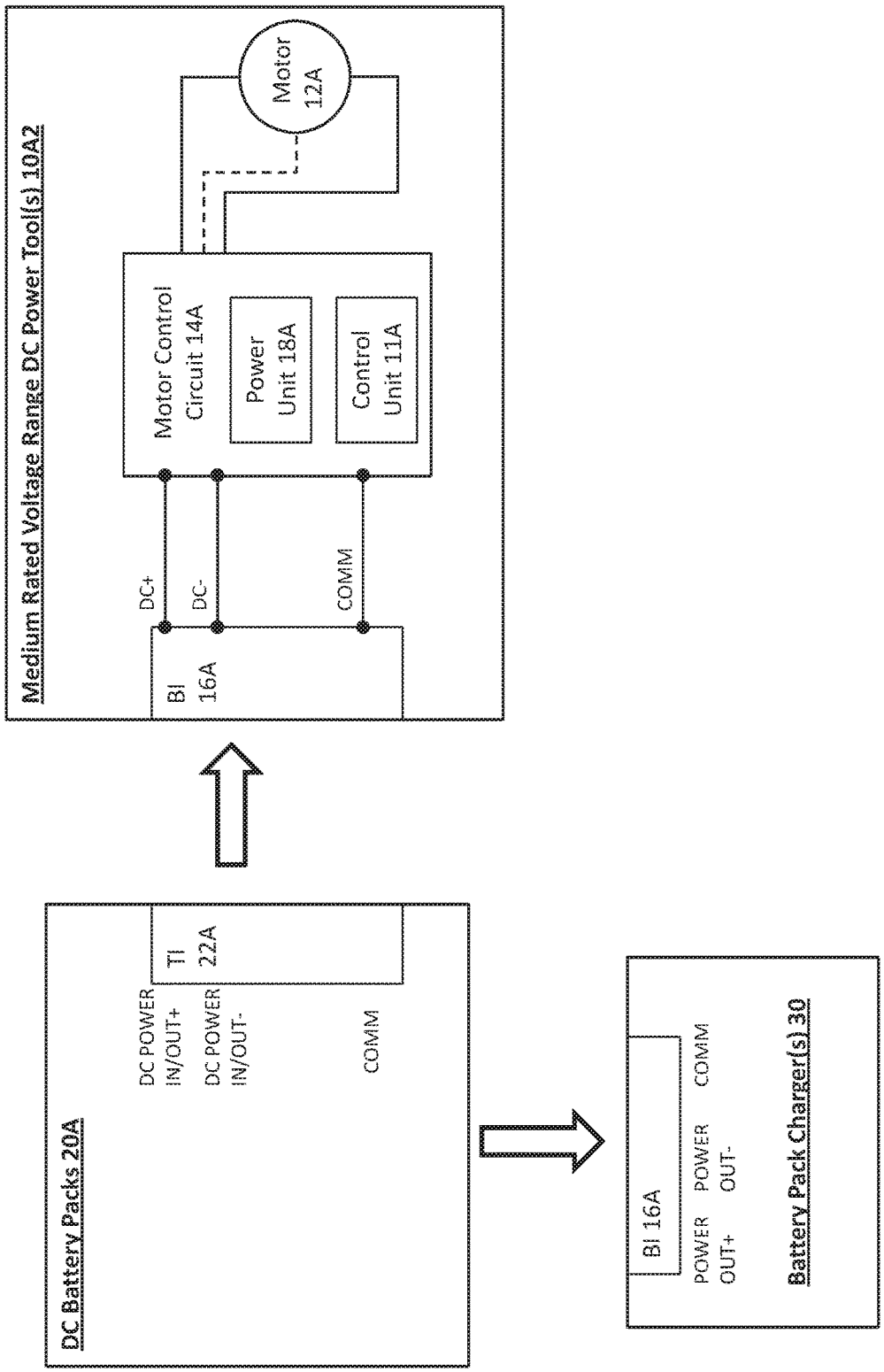
FIG. 3B is a schematic diagram of a set of medium rated voltage DC power tool(s), a set of DC battery pack power supply(ies), and a set of battery pack charger(s) of the power tool system of FIG. 1A.

Referring to FIGS. 1A and 3B, each of the medium rated voltage battery packs 20A2 includes a DC power tool interface 22A configured to be coupled to a battery pack interface 16A on a corresponding medium rated voltage DC power tool 10A2 and to a battery pack interface 16A on a corresponding medium rated voltage battery pack charger 30. The DC power tool interface 22A may include a DC power in/out+ terminal, a DC power in/out− terminal, and a communications (COMM) terminal. The set of medium rated voltage battery packs 20A2 may include one or more battery packs having a second rated voltage and a second rated capacity. The second rated voltage is, relatively speaking, a medium rated voltage, as compared to other battery packs in the set of DC battery packs power supplies 20A. For example, the set of medium rated voltage battery packs 20A2 may include battery packs having a rated voltage of 51V-60V (which may encompass an advertised voltage of 60V, an operating voltage of 51V-57V a nominal voltage of 54V, and a maximum voltage of 60V). However, the set of medium rated voltage battery packs 20A2 is not limited to a rated voltage of 60V. The set of medium rated voltage battery packs 20A2 may have other relatively medium rated voltages such as 40V, 54V, 72V or 80V. Within the set of medium rated voltage battery packs 20A2, there may be battery packs having the same rated voltage but with different rated capacities. For example, the set of medium rated voltage battery packs 20A2 may include a 60V/1.5 Ah battery pack, a 60V/2 Ah battery pack, a 60V/3 Ah battery pack, and/or 60V/4 Ah battery pack. When referring to the medium rated voltage of the set of medium rated voltage battery packs 20A2, it is meant that the rated voltage of the set of medium rated voltage battery packs 20A2 is higher than the rated voltage of the set of low rated voltage battery packs 20A1 but lower than the rated voltage of the set of high rated voltage battery packs 20A3.

The rated voltage of the set of medium rated voltage battery packs 20A2 generally corresponds to the rated voltage of the medium rated voltage DC power tools 10A2 so that the set of medium rated voltage battery packs 20A2 may supply power to and operated with the medium rated voltage DC power tools 10A2. As described in further detail below, the set of medium rated voltage battery packs 20A2 may also be able to supply power to the high rated voltage DC power tools 10A3 or the AC/DC power tools 10B, for example, by coupling more than one of the medium rated voltage battery packs 20A2 to these tools other in series so that the voltage of the medium rated voltage battery packs 20A2 is additive and corresponds to the rated voltage of the power tool to which the battery packs are coupled. The medium rated voltage battery packs 20A2 may additionally or alternatively be coupled in series with any of the low rated voltage battery packs 20A1, the high rated voltage battery packs 20A3, or the convertible battery packs 20A4 to output the desired voltage level for any of the high rated voltage DC power tools 10A or the AC/DC power tools 10B.

c. High Rated Voltage Battery Packs

Figure 3C:
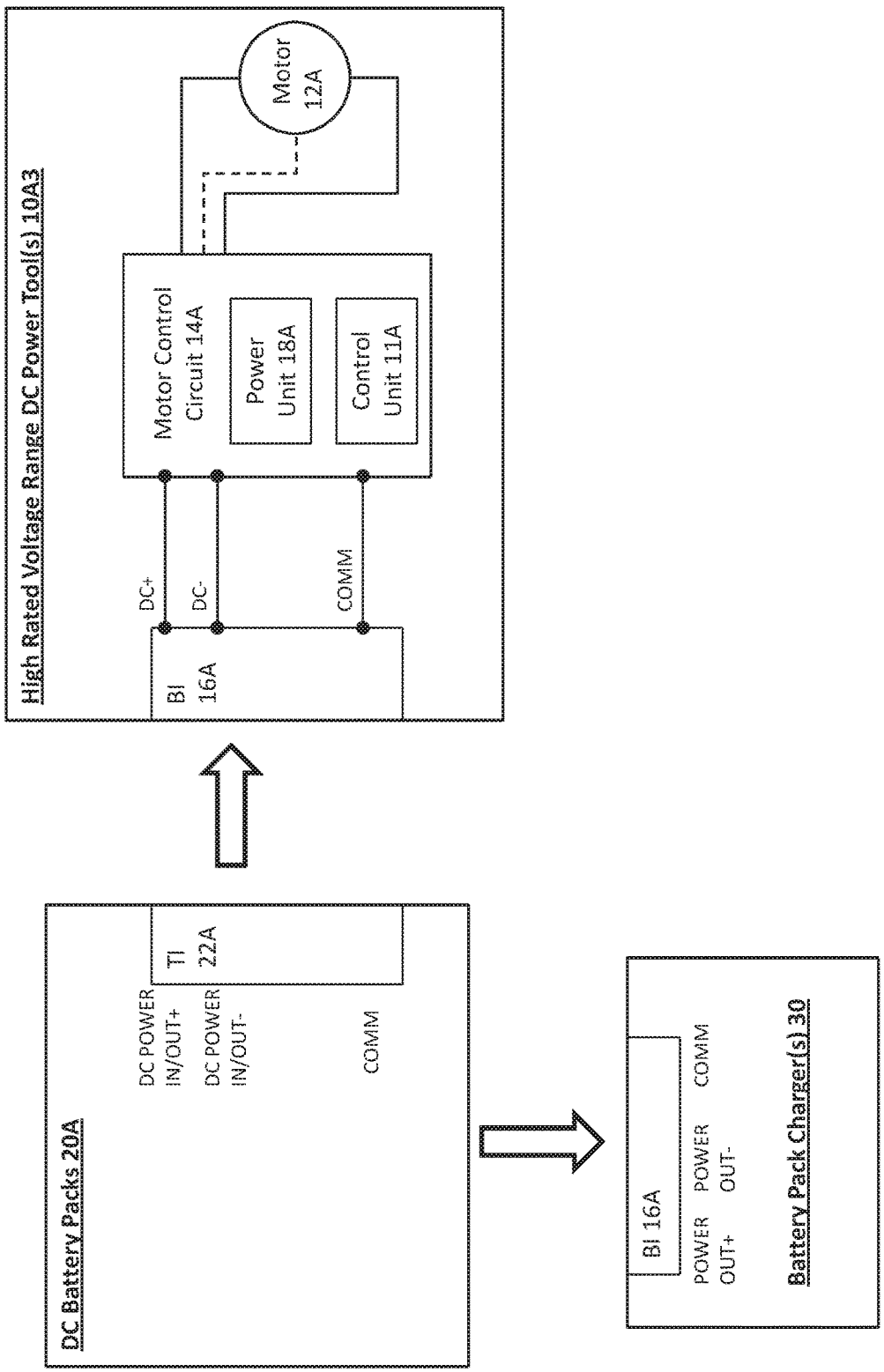
FIG. 3C is a schematic diagram of a set of high rated voltage DC power tool(s), a set of DC battery pack power supply(ies), and a set of battery pack charger(s) of the power tool system of FIG. 1A.

Referring to FIGS. 1A and 3C, each of the high rated voltage battery packs 20A3 includes a DC power tool interface 22A configured to be coupled to a battery pack interface 16A on a corresponding high rated voltage DC power tool 10A3 and to a battery pack interface 16A on a corresponding medium rated voltage battery pack charger 30. The DC power tool interface 22A may include a DC power in/out+ terminal, a DC power in/out− terminal, and a communications (COMM) terminal. The set of high rated voltage battery packs 20A3 may include one or more battery packs having a third rated voltage and a third rated capacity. The third rated voltage is, relatively speaking, a high rated voltage, as compared to other battery packs in the set of DC battery pack power supplies 220A. For example, the set of high rated voltage battery packs 20A3 may include battery packs having a rated voltage of 102V-120V (which may encompass an advertised voltage of 120V, an operating voltage of 102V-114V a nominal voltage of 108V, and maximum voltage of 120V). However, the set of high rated voltage battery packs 20A3 is not limited to a rated voltage of 120V. The set of high rated voltage battery packs 20A3 may have other relatively high rated voltages such as 90V, 100V, 110V, or 120V. The high rated voltage of the set of high rated voltage battery packs 20A3 may alternatively be referred to as an AC rated voltage since the high rated voltage may correspond to a rated voltage of an AC mains power supply in the country in which the power tool is operable and/or sold. Within the set of high rated voltage battery packs 20A3, there may be battery packs having the same rated voltage but with different rated capacities. For example, the set of high rated voltage battery packs 20A3 may include a 120V/1.5 Ah battery pack, a 120V/2 Ah battery pack, a 120V/3 Ah battery pack, and/or a 120V/4 Ah battery pack. When referring to the high rated voltage of the set of high rated voltage battery packs 20A3, it is meant that the rated voltage of the set of high rated voltage battery packs 20A3 is higher than the rated voltage of the set of low rated voltage battery packs 20A1 and the rated voltage of the set of medium rated voltage battery packs 20A2.

The rated voltage of the set of high rated voltage battery packs 20A3 generally corresponds to the rated voltage of the high rated voltage DC power tools 10A3 and the AC/DC power tools 10E3 so that the set of high rated voltage battery packs 20A3 may supply power to and operate with the high rated voltage DC power tools 10A3 and the AC/DC power tools 10B. As described in further detail below, the set of high rated voltage battery packs 20A3 may also be able to supply power to the very high rated voltage AC/DC power tools 128, for example, by coupling more than one of the high rated voltage battery packs 20A3 to the tools in series so that the voltage of the high rated voltage battery packs 20A3 is additive. The high rated voltage battery packs 20A3 may additionally or alternatively be coupled in series with any of the low rated voltage battery packs 20A1, the medium rated voltage battery packs 20A2, or the convertible battery packs 20A4 to output the desired voltage level for any of the AC/DC power tools 10B.

d. Convertible Battery Packs

Referring to FIG. 1A and as discussed in greater detail in U.S. Pat. No. 9,406,915, which is incorporated herein by reference, the set of convertible battery packs 20A4 are convertible battery packs, each of which may be converted between (1) a first rated voltage and a first rated capacity and (2) a second rated voltage and a second rated capacity that are different than the first rated voltage and the first rated capacity. For example, the configuration of the cells residing in the battery pack 20A4 may be changed between a first cell configuration that places the convertible battery pack 20A4 in a first battery pack configuration and a second cell configuration that places the convertible battery pack 20A4 in a second battery pack configuration. In one implementation, in the first battery pack configuration, the convertible battery pack 20A4 has a low rated voltage and a high rated capacity, and in the second battery pack configuration, the battery pack has a medium rated voltage and a low rated capacity. In other words, the battery packs of the set of convertible battery packs 20A4 are capable of having at least two different rated voltages, e.g., a lower rated voltage and a higher rated voltage, and at least two different capacities, e.g., a higher rated capacity and a lower rated capacity.

As noted above, low, medium and high ratings are relative terms and are not intended to limit the battery packs of the set of convertible battery packs 20A4 to specific ratings. Instead, the convertible battery packs of the set of convertible battery packs 20A4 may be able to operate with the low rated voltage power tools 10A1 and with the medium rated voltage power tools 20A2, where the medium rated voltage is greater than the low rated voltage. In one particular embodiment, the convertible battery packs 20A4 are convertible between a low rated voltage (e.g., 17V-20V, which may encompass an advertised voltage of 20V, an operating voltage of 17V-19V a nominal voltage of 18V, and a maximum voltage of 20V) that corresponds to the low rated voltage of the low rated voltage DC power tools 10A1, and a medium rated voltage (e.g., 60V, which may encompass an advertised voltage of 60V, an operating voltage of 51V-57V, a nominal voltage of 54V, and a maximum voltage of 60V) that corresponds to the medium rated voltage of the medium rated voltage DC power tools 10A2. In addition, as described further below, the convertible battery packs 20A4 may be able to supply power to the high rated voltage DC power tools 10A3 and the high voltage AC/DC power tools 10B, e.g., with the convertible battery packs 20A4 operating at their medium rated voltage and connected to each other in series so that their voltage is additive to correspond to the rated voltage of the high rated voltage DC power tools 10A3 or the AC/DC power tools 10B.

In other embodiments, the convertible battery packs may be backwards compatible with a first pre-existing set of power tools having a first rated voltage when in a first rated voltage configuration and forwards compatible with a second new set of power tools having a second rated voltage. For example, the convertible battery packs may be coupleable to a first set of power tools when in a first rated voltage configuration, where the first set of power tools is an existing power tool that was on sale prior to May 18, 2014, and to a second set of power tools when in a second rated voltage configuration, where the second set of power tools was not on sale prior to May 18, 2014. For example, in one possible implementation a low/medium rated convertible battery pack may be coupleable in a 20V rated voltage configuration to one or more of DeWALT® 20V MAX cordless power tools sold by DeWALT Industrial Tool Co. of Towson, Md., that were on sale prior to May 18, 2014, and in a 60V rated voltage configuration to one or more 60V rated power tools that were not on sale prior to May 18, 2014. Thus, the convertible battery packs facilitate compatibility in a power tool system having both pre-existing and new sets of power tools.

Referring to FIGS. 1A and 3A-3C, the convertible battery packs 20A4 each include a plurality of cells and a DC power tool interface 22A configured to be coupled to a battery pack interface 16A on a corresponding low, medium, or high rated voltage DC power tool 10A1, 10A2, or 10A3. The DC power tool interface 22A is also configured to be coupled the battery pack interface 16A on a corresponding battery pack charger 30. As discussed in greater detail below, the convertible battery pack 20A4 may be coupled to one or more rated voltage battery pack chargers 30 where the convertible battery pack 20A4 is placed in the voltage rating configuration that corresponds to that battery pack charger 30 when it is coupled to that battery pack charger 30. For example, the DC power tool interface 22A may include a DC power in/out+ terminal, a DC power in/out– terminal, and a communications (COMM) terminal. Several possible embodiments of convertible battery packs and their interfaces are described in further detail below.

B. Battery Pack Chargers

Referring to FIGS. 1A, and 3A-3C, the set of battery pack chargers 30 contains one more battery pack chargers that are able to mechanically and electrically connect to the battery packs of one or more of the low rated voltage battery packs 20A1, medium rated voltage battery packs 20A2, high rated voltage battery packs 20A3, and convertible battery packs 20A4. The set of battery pack chargers 30 are able to charge any of the battery packs 20A1, 20A2, 20A3, 20A4. The battery pack chargers 30 may have different rated voltages. For example, the battery pack chargers 30 may have one or more rated voltages, such as a low rated voltage, a medium rated voltage, and/or a high rated voltage to match the rated voltages of the sets of battery packs in the system. The battery pack chargers 30 may also have multiple or a range of rated voltages (e.g., a low-medium rated voltage) to enable the battery pack chargers 30 to charge battery packs having different rated voltages. The battery pack chargers 30 may also have a battery pack interface 16A configured to be coupled to a DC power tool interface 22A on the battery packs. The battery pack interface 16A may include a DC power in/out+ terminal, a DC power in/out– terminal, and a communications (COMM) terminal. In certain embodiments, the battery pack interface 16A may include a converter configured to cause one of the convertible battery packs to be placed in a desired rated voltage configuration for charging the battery pack, as discussed in greater detail below.

C. Power Tools

1. Low Rated Voltage DC Power Tools

Referring to FIGS. 1A and 3A, the set of low rated voltage power tools 10A1 includes one or more different types of cordless or DC-only power tools that utilize DC power supplied from one or more of the DC battery pack power supplies 20A that have a low rated voltage (such as removable and rechargeable battery packs). The rated voltage of the low rated voltage DC power tools 10A1 generally correspond to the rated voltage of the low rated voltage battery packs 20A1 or to the rated voltage of the convertible battery packs 20A4 when placed in a low rated voltage configuration. For example, the low rated voltage DC power tools 10A1 having a rated voltage of 20V may be powered using 20V battery pack(s) 20A1 or by 20V/60V convertible battery packs 20A4 in a 20V configuration. The power tool rated voltage of 20V may itself be shorthand for a broader rated voltage of 17-20V, which may encompass an operating voltage range of, e.g., 17V-20V that encompasses the rated voltage range of the low rated voltage battery packs.

The low rated voltage DC power tools 10A1 each include a motor 12A that can be powered by a DC-only power supply. The motor 12A may be any brushed or brushless DC electric motor, including, but not limited to, a permanent magnet brushless DC motor (BLDC), a permanent magnet brushed motor, a universal motor, etc. The low rated voltage DC power tools 10A1 may also include a motor control circuit 14A configured to receive DC power from a battery pack interface 16A via a DC line input DC+/− and to control power delivery from the DC power supply to the motor 12A. In an exemplary embodiment, the motor control circuit 14A may include a power unit 18A having one or more power switches (not shown) disposed between the power supply and the motor 12A. The power switch may be an electro-mechanical on/off switch, a power semiconductor device (e.g., diode, FET, BJT, IGBT, etc.), or a combination thereof. In an exemplary embodiment, the motor control circuit 14A may further include a control unit 11. The control unit 11 may be arranged to control a switching operation of the power switches in the power unit 18A. In an exemplary embodiment, the control unit 11 may include a micro-controller or similar programmable module configured to control gates of power switches. Additionally or alternatively, the control unit 11 may be configured to monitor and manage the operation of the DC battery pack power supplies 20A. Additionally or alternatively, the control unit 11 may be configured to monitor and manage various tool operations and conditions, such as temperature control, over-speed control, braking control, etc.

In an exemplary embodiment, as discussed in greater detail below, the low rated voltage DC power tool 10A1 may be a constant-speed tool (e.g., a hand-held light, saw, grinder, etc.). In such a power tool, the power unit 18A may simply include an electro-mechanical on/off switch engage-able by a tool user. Alternatively, the power unit 18A may include one or more semi-conductor devices controlled by the control unit 11 at fixed no-load speed to turn the tool motor 12A on or off.

In another embodiment, as discussed in greater detail below, a low rated voltage DC power tool 10A1 may be a variable-speed tool (e.g., a hand-held drill, impact driver, reciprocating saw, etc.). In such a power tool, the power switches of the power unit 18A may include one or more semiconductor devices arranged in various configurations (e.g., a FET and a diode, an H-bridge, etc.), and the control unit 11 may control a pulse-width modulation of the power switches to control a speed of the motor 12A.

The low rated voltage DC power tools 10A1 may include hand-held cordless tools such as drills, circular saws, screw-drivers, reciprocating saws, oscillating tools, impact drivers, and flashlights, among others. The low rated voltage power tools may include existing cordless power tools that were on sale prior to May 18, 2014. Examples of such low rated voltage DC power tools 10A1 may include one or more of the DeWALT® 20V MAX set of cordless power tools sold by DeWALT Industrial Tool Co. of Towson, Md. The low rated voltage DC power tools 10A1 may alternatively include cordless power tools that were not on sale prior to May 18, 2014. In other examples, U.S. Pat. Nos. 8,381,830, 8,317,350, 8,267,192, D646,947, and D644,494, which are incorporated by reference, disclose tools comprising or similar to the low rated voltage cordless power tools 10A1.

2. Medium Rated Voltage DC Power Tools

Referring to FIGS. 1A and 3B, the set of medium rated voltage DC power tools 10A2 may include one or more different types of cordless or DC-only power tools that utilize DC power supplied from one or more of the DC battery pack power supplies 20A that alone or together have a medium rated voltage (such as removable and recharge-able battery packs. The rated voltage of the medium rated voltage DC power tools 10A2 will generally correspond to the rated voltage of the medium rated voltage battery packs 20A2 or to the rated voltage of the convertible battery packs 20A4 when placed in a medium rated voltage configuration. For example, the medium rated voltage DC power tools 10A2 may have a rated voltage of 60V and may be powered by a 60V medium rated voltage battery pack 20A2 or by a 20V/60V convertible battery pack 20A4 in a 60V configu-ration. The power tool rated voltage of 60V may be short-hand for a broader rated voltage of 17-20V, which may encompass an operating range of, e.g., 51V-60V that encom-passes the rated voltage of the medium rated voltage battery packs. In an exemplary embodiment, the medium rated voltage DC power tool 10A2 may include multiple battery interfaces configured to receive two or more low rated voltage battery packs 20A1. In an exemplary embodiment, the medium rated voltage DC power tool 10A2 may addi-tionally include circuitry to couple the DC battery pack power supplies 20A in series to produce a desired medium rated voltage corresponding to the rated voltage of the medium rated voltage DC power tool 10A2.

Similar to low rated voltage DC power tools 10A1 discussed above, the medium rated voltage DC power tools 10A2 each include a motor 12A that can be powered by a DC battery pack power supply 20A. The motor 12A may be any brushed or brushless DC electric motor, including, but not limited to, a permanent magnet brushless DC motor (BLDC), a permanent magnet brushed motor, a universal motor, etc. The medium rated voltage DC power tools 10A2 also include a motor control circuit 14A configured to receive DC power from the battery pack interface 16A via a DC line input DC+/− and to control power delivery from the DC power supply to the motor 12A. In an exemplary embodiment, the motor control circuit 14A may include a power unit 18A having one or more power switches (not shown) disposed between the power supply and the motor 12A. The power switch may be an electro-mechanical on/off switch, a power semiconductor device (e.g., diode, FET, BJT, IGBT, etc.), or a combination thereof. In an exemplary embodiment, the motor control circuit 14A may further include a control unit 11. The control unit 11 may be arranged to control a switching operation of the power switches in the power unit 18A. Similarly to the motor control circuit 14A described above for low rated voltage DC power tools 10A1, the motor control circuit 14A may control the motor 12A in fixed or variable speed. In an exemplary embodiment, the control unit 11 may include a micro-controller or similar programmable module config-ured to control gates of power switches. Additionally or alternatively, the control unit 11 may be configured to monitor and manage the operation of the DC battery pack power supplies 20A. Additionally or alternatively, the con-trol unit 11 may be configured to monitor and manage various tool operations and conditions, such as temperature control, over-speed control, braking control, etc.

The medium rated voltage DC power tools 10A2 may include similar types of tools as the low rated voltage DC power tools 10A1 that have relatively higher power output requirements, such as drills, a circular saws, screwdrivers, reciprocating saws, oscillating tools, impact drivers and flashlights. The medium rated voltage DC power tools 10A2 may also or alternatively have other types of tools that require higher power or capacity than the low rated voltage DC power tools 10A1, such as chainsaws, string trimmers, hedge trimmers, lawn mowers, nailers and/or rotary hammers.

In yet another and/or a further embodiment, as discussed in more detail below, the motor control circuit 14A of a medium rated voltage DC power tool 10A2 enables the motor 12A to be powered using DC battery pack power supplies 20A having rated voltages that are different from each other and that are less than a medium rated voltage. In other words, medium rated voltage DC power tool 10A2 may be configured to operate at more than one rated voltage (e.g., at a low rated voltage or at a medium rated voltage). Such a medium rated voltage DC power tool 10A2 may be said to have more than one voltage rating corresponding to each of the voltage ratings of the DC power supplies that can power the tool. For example, the medium rated voltage DC power tool 10A2 of FIG. 3B may have a low/medium rated voltage (e.g., a 20V/60V rated voltage, 40V/60V rated voltage) that is capable of being alternatively powered by one of the low rated voltage battery packs 20A1 (e.g., a 20V battery pack), by one of the medium rated voltage battery packs 20A2 (e.g., a 60V battery pack), or by a convertible battery pack 20A4 in either a low rated voltage configuration or a medium rated voltage configuration. In alternative implementations, the medium rated voltage DC power tool 10A2 may operate using a pair of low rated voltage battery packs 20A1 connected in series to operate at yet another low or medium rated voltage that is different than the medium rated voltage of the motor 12A in the medium rated voltage DC power tool 10A2 (e.g., two low rated voltage 18V battery packs 20A1 connected in series to generate a combined low rated voltage of 36V).

Operating the power tool motor 12A at significantly different voltage levels will yield significant differences in power tool performance, in particular the rotational speed of the motor, which may be noticeable and in some cases unsatisfactory to the users. Thus, in an embodiment of the invention herein described, the motor control circuit 14A is configured to optimize the motor 12A performance based on the rated voltage of the power supply, i.e., based on whether the medium rated voltage DC power tool 10A2 is coupled with either a low rated voltage DC power supply (e.g., low rated voltage battery pack 20A1) or a medium rated voltage power supply (e.g., medium rated voltage battery pack 20A2 for which the motor 212A in the medium rated voltage DC power tools 10A2 is optimized or rated). In doing so, the difference in the tool's output performance is minimized, or at least reduced to a level that is satisfactory to the end user.

In this embodiment, the motor control circuit 14A is configured to either boost or reduce an effective motor performance from the power supply to a level that corresponds to the operating voltage range (or voltage rating) of the medium rated voltage DC power tool 10A2. In particular, the motor control circuit 14A may reduce the power output of the tool 10A when used with a medium rated voltage battery pack 20A2 to match (or come reasonably close to) the output level of the tool 10A when used with a low rated voltage battery pack 20A1 in a manner that is satisfactory to an end user. Alternatively or additionally, motor control circuit 14A may boost the power output of the medium rated voltage DC power tool 10A2 when used with a low rated voltage battery pack 20A1 to match (or come reasonably close to) the output level of the medium rated voltage DC power tool 10A2 when used with a medium rated voltage battery pack 20A2 in a manner that is satisfactory to an end user. In an embodiment, the low/medium rated voltage DC power tool 10A2 may be configured to identify the rated voltage of the power supply via, for example, a battery ID, and optimize motor performance accordingly. These methods for optimizing (i.e., boosting or reducing) the effective motor performance are discussed later in this disclosure in detail.

3. High Rated Voltage DC Power Tools

Referring to FIGS. 1A and 3C, the set of high rated voltage DC power tools 10A3 may include cordless (DC only) high rated (or AC rated) voltage power tools with motors configured to operate at a high rated voltage and high output power (e.g., approximately 1000 to 1500 Watts). Similar to the low and medium rated voltage DC power tools 10A1, 10A2, the high rated voltage DC power tools 10A3 may include various cordless tools (i.e., power tools, outdoor tools, etc.) for high power output applications. The high rated voltage DC power tools 10A3 may include for example, similar types of tools as the low rated voltage and medium rated voltage DC power tools, such as drills, circular saws, screwdrivers, reciprocating saws, oscillating tools, impact drivers, flashlights, string trimmers, hedge trimmers, lawn mowers, nailers and/or rotary hammers. The high rated voltage DC power tools may also or alternatively include other types of tools that require higher power or capacity such as miter saws, chain saws, hammer drills, grinders, and compressors.

Similar to the low and medium rated voltage DC power tools 10A1, 10A2, the high rated voltage DC power tools 10A3 each include a motor 12A, a motor control circuit 14A, and a battery pack interface 16A that are configured to enable operation from one or more DC battery pack power supplies 20A that together have a high rated voltage that corresponds to the rated voltage of the power tool 10A. Similarly to motors 12A described above with reference to FIG. 3A, the motor 12A may be any brushed or brushless DC electric motor, including, but not limited to, a permanent magnet brushless DC motor (BLDC), a permanent magnet DC brushed motor (PMDC), a universal motor, etc. Similarly to motor control circuits 14A may include a power unit 18A having one or more power switches (not shown) disposed between the power supply and the motor 12A. The power switch may be an electro-mechanical on/off switch, a power semiconductor device (e.g., diode, FET, BJT, IGBT, etc.), or a combination thereof. In an embodiment, the motor control circuit 14A may further include a control unit 11. The control unit 11 may be arranged to control a switching operation of the power switches in the power unit 18A. The motor control circuit 14A may control the motor 12A in fixed or variable speed. In an embodiment, the control unit 11 may include a micro-controller or similar programmable module configured to control gates of power switches. Additionally or alternatively, the control unit 11 may be configured to monitor and manage the operation of the DC battery pack power supplies 20A. Additionally or alternatively, the control unit 11 may be configured to monitor and manage various tool operations and conditions.

Referring to FIG. 3C, the high rated voltage DC power tools 10A3 may be powered by a single DC battery pack power supply 20A received in a battery pack interface (or battery receptacle) 16A. In an embodiment, the DC battery pack power supply 20A may be a high rated voltage battery pack 20A3 having a high rated voltage (e.g., 120V) that corresponds to the rated voltage of the high rated voltage DC power tool 10A3.

Referring to FIG. 3C, in an alternative embodiment, the battery pack interface 16A of the high rated voltage DC power tools 10A3 may include two or more battery receptacles 16A1, 16A2 that receive two or more DC battery pack power supplies 20A at a given time. In an embodiment, the high rated voltage DC power tools 10A3 may be powered by a pair of DC battery pack power supplies 20A received together in the battery receptacles 216A1, 216A2. In this embodiment, the battery pack interface 16A also may include a switching unit (not shown) configured to connect the two DC battery pack power supplies 20A in series. The switching unit may for example include a circuit provided within the battery pack interface 16A, or within the motor control circuit 14A. Alternatively, the DC battery pack power supplies 20A may be medium rated voltage battery packs 20A2 connected in series via the switching unit 120-10 to similarly output a high rated voltage (e.g., two 60V battery packs connected in series for a combined rated voltage of 120V). In yet another embodiment, a single high rated voltage battery pack 20A3 may be coupled to one of the battery receptacles to provide a rated voltage of 120V. For example, the high rated voltage DC power tools 10A2 may have a rated voltage of 60V and may be powered by two 60V medium rated voltage battery packs 20A2 or by two 20V/60V convertible battery packs 20A4 in their 60V configuration. The power tool rated voltage of 120V may itself be shorthand for a broader rated voltage range of 102V-120V, which may encompass an operating range of, e.g., 102V-120V that encompasses the operating range of the two medium rated voltage battery packs.

In an embodiment, the total rated voltage of the battery packs received in the cordless power tool battery receptacle(s) 16A may correspond to the rated voltage of the cordless DC power tool 10A itself. However, in other embodiments, the high rated voltage cordless DC power tool 10A3 may additionally be operable using one or more DC battery pack power supplies 20A that together have a rated voltage that is lower than the rated voltage of the motor 12A and the motor control circuit 14A in the high rated cordless DC power tool 10A3. In this latter case, the cordless DC power tool 10A may be said to have multiple rated voltages corresponding to the rated voltages of the DC battery pack power supplies 20A that the high rated voltage DC power tool 10A3 will accept. For example, the high rated voltage DC power tool 10A3 may be a medium/high rated voltage DC power tool if it is able to operate using either a high rated voltage battery pack 20A3 or a medium rated voltage battery pack 20A2 (e.g., a 60V/120V, a 60-120V power tool, a 80V/120V, or a 80-120V power tool) that is capable of being alternatively powered by a plurality of low rated voltage battery packs 20A1 (e.g., a 20V battery packs), one or more medium rated voltage battery packs 20A2 (e.g., a 60V battery pack), one high rated voltage battery pack 20A3, or one or more convertible battery packs 20A4. The user may mix and match any of the DC battery pack power supplies 20A for use with the high rated voltage DC power tool 10A3.

In order for the motor in the high rated voltage DC power tool 10A3 (which as discussed may be optimized to work at a high power and a high voltage rating) to work acceptably with DC power supplies having a total voltage rating that is less than the voltage rating of the motor), the motor control circuit 14A may be configured to optimize the motor performance based on the rated voltage of the low rated voltage DC battery packs 20A1. As discussed briefly above and in detail later in this disclosure, this may be done by optimizing (i.e., booting or reducing) an effective motor performance from the power supply to a level that corresponds to the operating voltage range (or voltage rating) of the high rated voltage DC power tool 10A3.

In an alternative or additional embodiment (not shown), an AC/DC adaptor may be provided that couples an AC power supply to the battery pack interface 16A and converts the AC power from the AC power supply to a DC signal of comparable rated voltage to supply a high rated voltage DC power supply to the high rated voltage DC power tool 10A3 via the battery pack interface 16A.

4. High (AC) Rated Voltage AC/DC Power Tools

Figure 4:
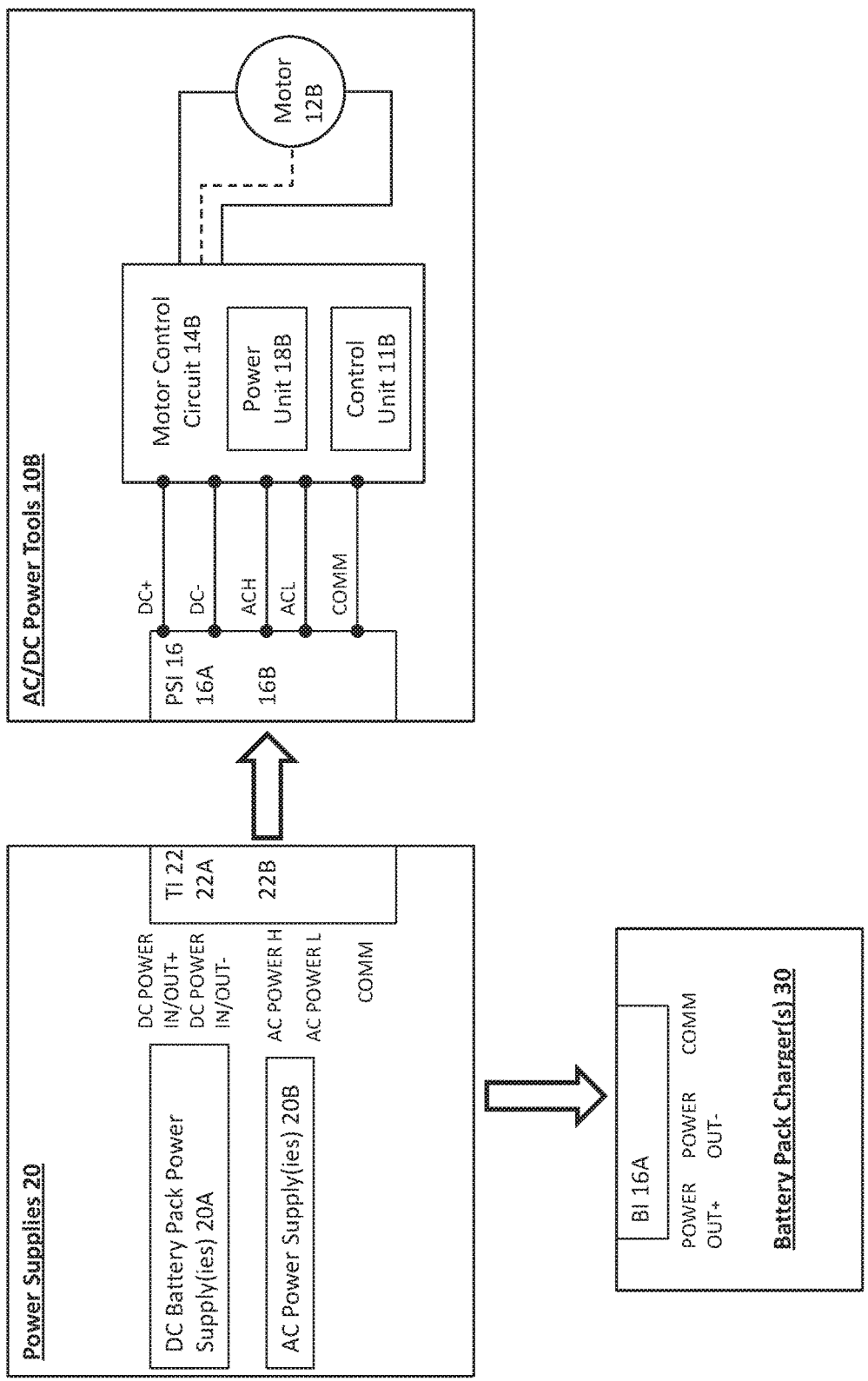
FIG. 4 is a schematic diagram of a set of high rated voltage AC/DC power tool(s), a set of DC battery pack power supply(ies), a set of AC power supply(ies), and a set of battery pack charger(s) of the power tool system of FIG. 1A.

Referring to FIGS. 1A and 4, the corded/cordless (AC/DC) power tools 10B each have an AC/DC power supply interface 16 with DC line inputs DC+/−(16A), AC line inputs ACH, ACL (16B), and a communications line (COMM) coupled to a motor control circuit 14B. The AC/DC power supply interface 16 is configured to be coupled to a tool interface of one or more of the DC battery pack power supplies 20A and the AC power supplies 20B. The DC battery pack power supplies 20A may have a DC power in/out+ terminal, a DC power in/out− terminal, and a communications (COMM) terminal that can be coupled to the DC+/− line inputs and the communications line (COMM) in the AC/DC power supply interface 16 in the AC/DC power tool 10B. The DC power in/out+ terminal, the DC power in/out− terminal, and the communications (COMM) terminals of the DC battery pack power supplies 20A may also be able to couple the DC battery pack power supplies 20A to the battery pack interfaces 16A of the battery pack chargers 30, as described above. The AC power supplies 20B may be coupled to the ACH, ACL, and/or the communications (COMM) terminals of the power supply interface 16B in the AC/DC power tool 10B by AC power H and AC power L terminals or lines and by a communications (COMM) terminal or line. In each AC/DC power tool 10B, the motor control circuit 14B and the motor 12B are designed to optimize performance of the motor for a given rated voltage of the power tool and of the power supplies.

As discussed further below, the motors 12B may be brushed motors or brushless motors, such as a permanent magnet brushless DC motor (BLDC), a permanent magnet DC brushed motor (PMDC), or a universal motor. The motor control circuit 14B may enable either constant-speed operation or variable-speed operation, and depending on the type of motor and speed control, may include different power switching and control circuitry, as described in greater detail below.

In an exemplary embodiment, the AC/DC power supply interface 16 may be configured to include a single battery pack interface (e.g. a battery pack receptacle) 16A and an AC power interface 16B (e.g. AC power cable received in the tool housing). The motor control circuit 14B in this embodiment may be configured to selectively switch between the AC power supply 20B and DC battery pack power supply 20A. In this embodiment, the DC battery pack power supply 20A may be a high rated voltage battery pack 20A3 having a high rated voltage (e.g., 120V) that corresponds to the rated voltage of the AC/DC power tool 10B and/or the rated voltage of the AC power supply 20B. The motor control unit 14B may be configured to, for example, supply AC power from the AC supply 20B by default when it senses a current from the AC supply 20B, and otherwise supply power from the DC battery pack power supply 20A.

In another exemplary embodiment, the AC/DC power supply interface 16 may be configured to include, in addition to the AC supply interface 16B, a pair of battery interfaces such as two battery receptacles. Reference is made herein once again to FIGS. 114-117 of U.S. Pat. No. 9,406,915, which is incorporated herein by reference, for an example of such an arrangement. This arrangement allows the AC/DC power tool 10B to be powered by more than one DC battery pack power supply 20A that, when connected in series, together have a high rated voltage that corresponds to the AC rated voltage of the mains power supply. In this embodiment, the AC/DC power tools 10B may be powered by a pair of the DC battery pack power supplies 20A received in the battery receptacles 16A1, 16A2. In an embodiment, a switching unit may be provided and configured to connect the two DC battery pack power supplies 20A in series. Such a switching unit may for example include a simple wire connection provided in AC/DC power supply interface 16 connecting the battery receptacles. Alternatively, such a switching unit may be provided as a part of the motor control circuit 14B.

In this embodiment, the DC battery pack power supplies 20A may be two of the medium rated voltage battery packs 20A2 connected in series via a switching unit to similarly output a high rated voltage (e.g., two 60V battery packs connected in series for a combined rated voltage of 120V). Referring to FIG. 116, in yet another exemplary embodiment, a single high rated voltage battery pack 20A3 may be coupled to one of the battery receptacles 16A2 to provide a rated voltage of 120V, and the other battery receptacle 16A1 may be left unused. In this embodiment, motor control circuit 14B may be configured to select one of the AC power supply 20B or the combined DC battery pack power supplies 20A for supplying power to the motor 12B.

In these embodiments, the total rated voltage of the DC battery pack power supplies 20A received in the AC/DC power tool battery pack receptacle(s) 16A may correspond to the rated voltage level of the AC/DC power tool 10B, which generally corresponds to the rated voltage of the AC mains power supply 20B. As previously discussed, the power supply 20 used for the high rated voltage DC power tools 10A3 or the AC/DC power tools 10B is a high rated voltage mains AC power supply 20B. For example, the AC/DC power tools 10A2 may have a rated voltage of 120V and may be able to be powered by a 120 VAC AC mains power supply or by two 20V/60V convertible battery packs 20A4 in their 60V configuration and connected in series. The power tool rated voltage of 120V may be shorthand for a broader rated voltage of, e.g., 100V-120V that encompasses the operating range of the power tool and the operating range of the two medium rated voltage battery packs. In one implementation, the power tool rated voltage of 120V may be shorthand for an even broader operating range of 90V-132V which encompasses the entire operating range of the two medium rated voltage battery packs (e.g., 102 VDC-120 VDC) and the all of the AC power supplies available in North America and Japan (e.g., 100 VAC, 110 VAC, 120 VAC) with a ±10% error factor to account for variances in the voltage of the AC mains power supplies).

In other embodiments, the AC/DC power tools 10B may additionally be operable using one or more of the DC battery pack power supplies 20A that together have a rated voltage that is lower than the AC rated voltage of the AC mains power supply, and that is less than the voltage rating of the motor 12A and motor control circuit 14A. In this embodiment, the AC/DC power tool 10B may be said to have multiple rated voltages corresponding to the rated voltages of the DC battery pack power supplies 20A and the AC power supply 20B that the AC/DC power tool 10B will accept. For example, the AC/DC power tool 10B is be a medium/high rated power tool if it is able to operate using either a medium rated voltage battery pack 20A2 or a high rated voltage AC power supply 20B (e.g., a 60V/120V or a 60-120V or 60 VDC/120 VAC). According to this embodiment, the user may be given the ability to mix and match any of the DC battery pack power supplies 20A for use with AC/DC power tool 10B. For example, AC/DC power tool 10B may be able to be used with two low rated voltage packs 20A1 (e.g., 20V, 30V, or 40V packs) connected in series via a switching unit to output a rated voltage of between 40V to 80V. In another example, the AC/DC power tool 10B may be used with a low rated voltage battery pack 20A1 and a medium rated voltage battery pack 20A2 for a total rated voltage of between 80V to 100V.

In order for the motor 12B in the AC/DC power tool 10B (which as discussed above is optimized to work at a high output power and a high voltage rating) to work acceptably with DC battery pack power supplies having a total voltage rating that is less than the high voltage rating of the tool (e.g., in the range of 40V to 100V as discussed above), the motor control circuit 14B may be configured to optimize the motor performance based on the rated voltage of the DC battery pack power supplies 20A. As discussed briefly above and in detail later in this disclosure, this may be done by optimizing (i.e., boosting or reducing) an effective motor performance from the power supply to a level that corresponds to the operating voltage range (or voltage rating) of the high rated voltage DC power tool 10A3.

II. AC/DC Power Tools and Motor Controls

Figure 5A:
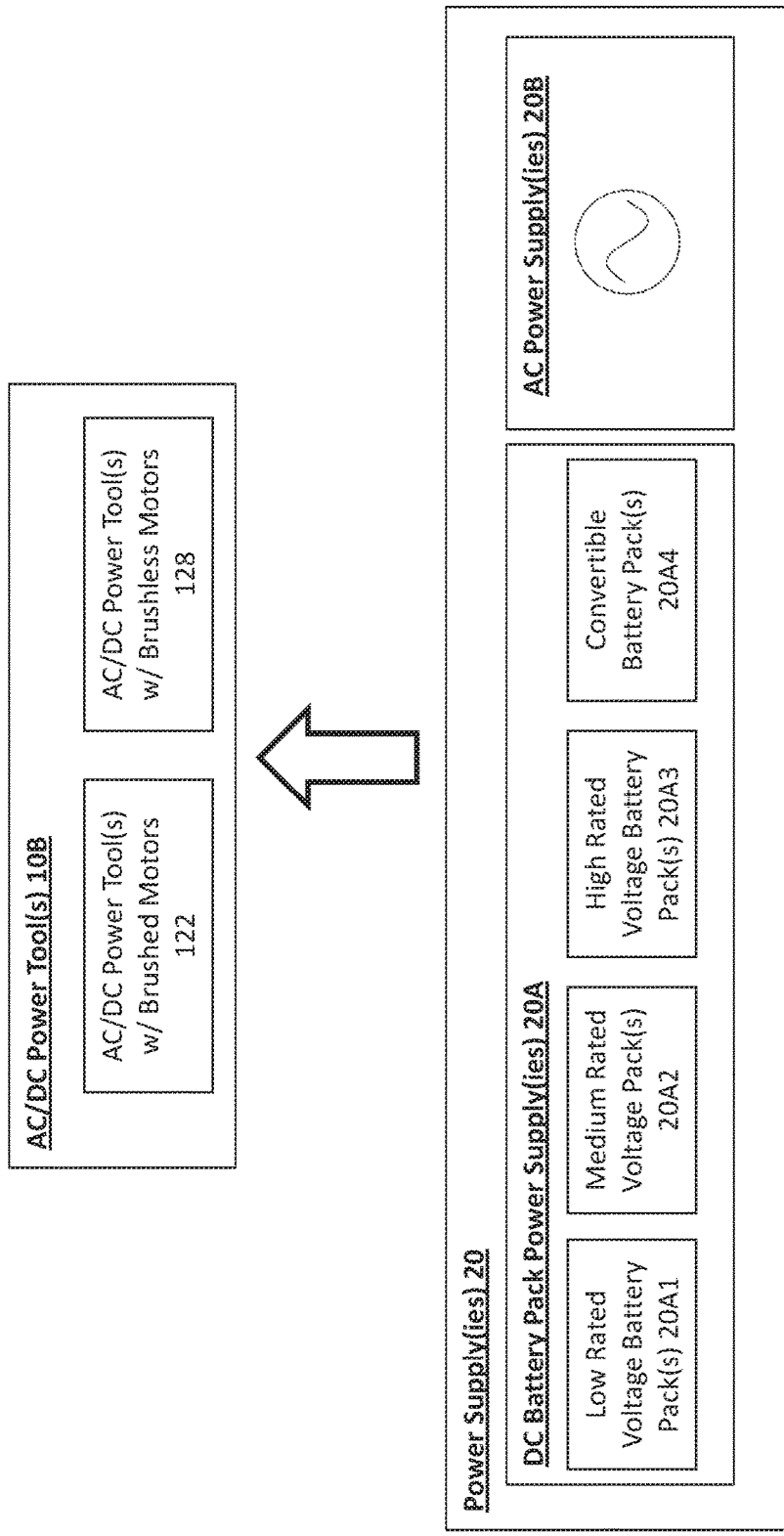
FIGS. 5A-5B are schematic diagrams of classifications of AC/DC power tools of the power tool system of FIG. 1A.
Figure 5B:
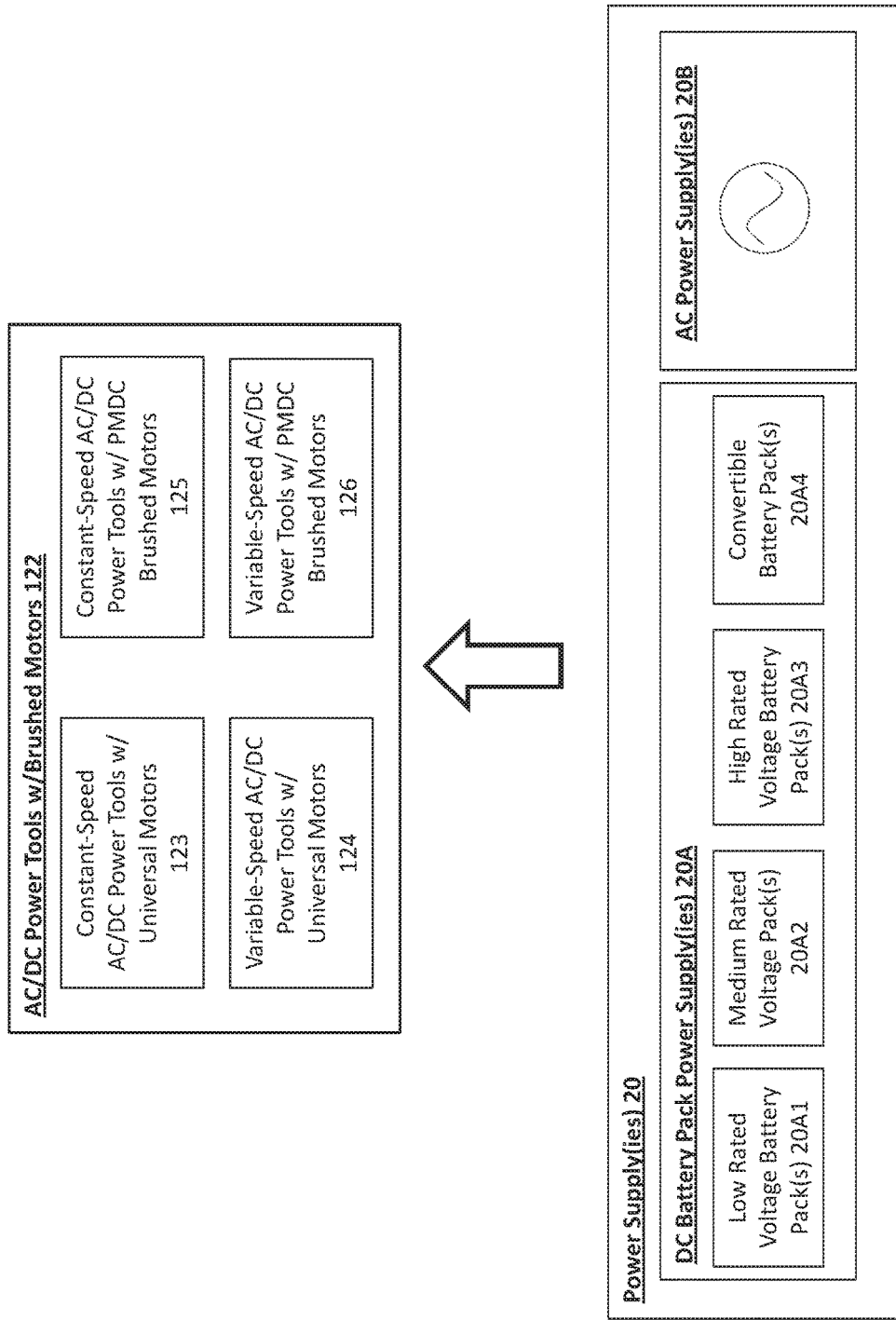

Referring to FIGS. 1A and 5A, the high rated voltage AC/DC power tools 10B may be classified based on the type of motor, i.e., high rated voltage AC/DC power tools with brushed motors 122 and high rated voltage AC/DC power tools with brushless motors 128. Referring also to FIG. 5B, the AC rated voltage AC/DC power tools with brushed motors 122 may be further classified into four subsets based on speed control and motor type: constant-speed AC/DC power tools with universal motors 123, variable-speed AC/DC power tools with universal motors 124, constant-speed AC/DC power tools with DC brushed motors 125, and variable-speed AC/DC power tools with universal motors 126. These various sets and subsets of high rated voltage AC/DC power tools are discussed in greater detail below.

In the ensuing FIGS. 5A-15E, power tools 123, 124, 125, 126 and 128 may each correspond to power tool 10B depicted in FIG. 4. Similarly, in the ensuing FIGS. 5A-15E, motors 123-2, 124-2, 125-2, 126-2, and 202 may each correspond to motor 12B in FIG. 4; motor control circuits 123-4, 124-4, 125-4, 126-4, and 204 may each correspond to motor control circuit 14B in FIG. 4; power units 123-6, 124-6, 125-6, 126-6, and 206 may each correspond to power unit 18B in FIG. 4; control unit 123-8, 124-8, 125-8, 126-8, and 208 may each correspond to control unit 11B in FIG. 4; and power supply interfaces 123-5, 124-5, 125-5, 126-5, and 128-5 may each correspond to power supply interface 16B in FIG. 4.

A. Constant-Speed AC/DC Power Tools with Universal Motors

Turning now to FIGS. 6A-6D, the first subset of AC/DC power tools with brushed motors 122 includes the constant-speed AC/DC power tools 123 with universal motors (herein referred to as constant-speed universal-motor tools 123).

These include corded/cordless (AC/DC) power tools that operate at constant speed at no load (or constant load) and include brushed universal motors 123-2 configured to operate at a high rated voltage (e.g., 100V to 120V, or more broadly 90V to 132V) and high power (e.g., 1500 to 2500 Watts). A universal motor is a series-wound motor having stator field coils and a commutator connected to the field coils in series. A universal motor in this manner can work with a DC power supply as well as an AC power supply. In an embodiment, constant-speed universal motor tools 123 may include high powered tools for high power applications such as concrete hammers, miter saws, table saws, vacuums, blowers, and lawn mowers, etc.

In an embodiment, a constant-speed universal motor tool 123 includes a motor control circuit 123-4 that operates the universal motor 123-2 at a constant speed under no load. The power tool 123 further includes power supply interface 123-5 arranged to receive power from one or more of the aforementioned DC power supplies and/or AC power supplies. The power supply interface 123-5 is electrically coupled to the motor control circuit 123-4 by DC power lines DC+ and DC− (for delivering power from a DC power supply) and by AC power lines ACH and ACL (for delivering power from an AC power supply).

In an embodiment, motor control circuit 123-4 may include a power unit 123-6. In an embodiment, power unit 123-6 includes an electro-mechanical ON/OFF switch 123-12. In an embodiment, the tool 123 includes an ON/OFF trigger or actuator (not shown) coupled to ON/OFF switch 123-12 enabling the user to turn the motor 123-2 ON or OFF. The ON/OFF switch 123-12 is provided in series with the power supply to electrically connect or disconnect supply of power from power supply interface 123-5 to the motor 123-2.

Figure 6A:
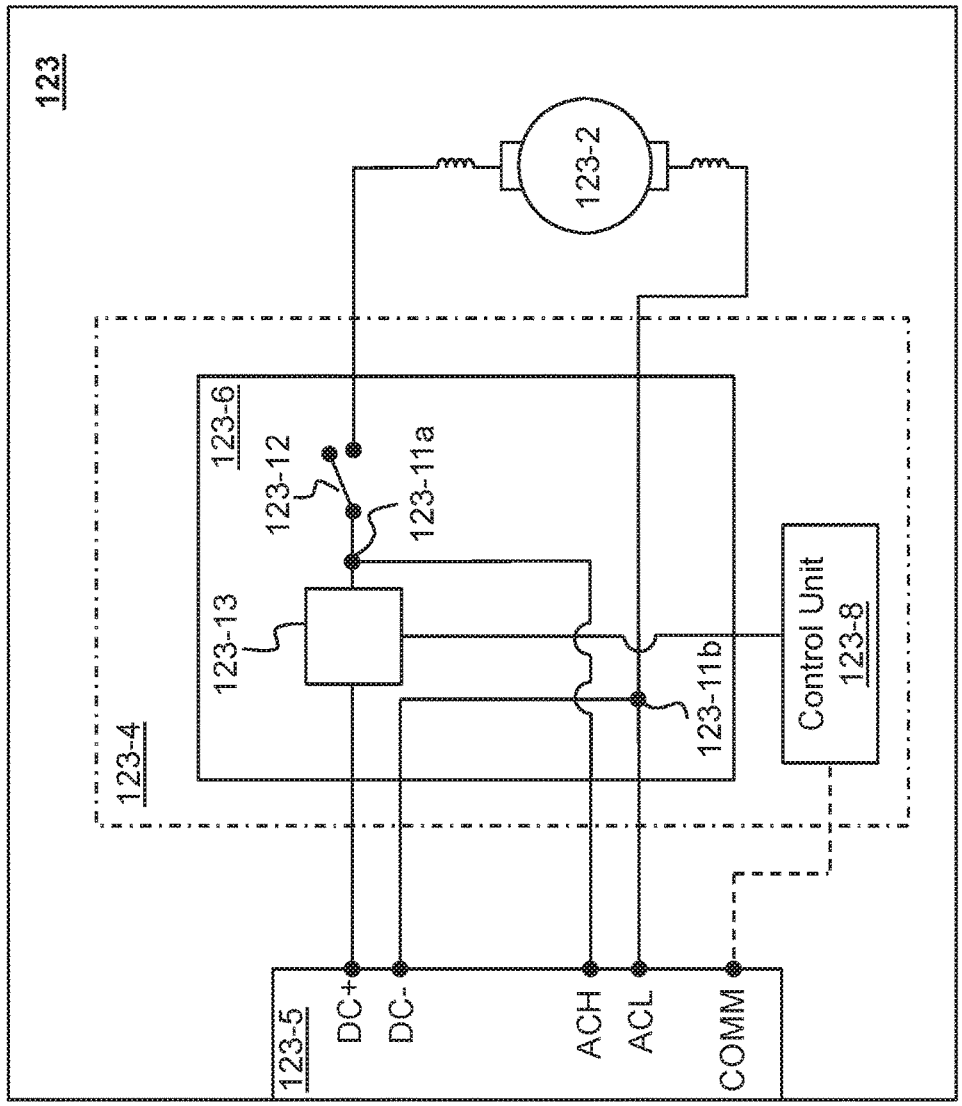
FIG. 6A depicts an exemplary system block diagram of a constant-speed AC/DC power tool with a universal motor, according to an embodiment.

Referring to FIG. 6A, constant-speed universal motor tool 123 is depicted according to one embodiment, where the ACH and DC+ power lines are coupled together at common positive node 123-11a, and the ACL and DC− power lines are coupled together at a common negative node 123-11b. In this embodiment, ON/OFF switch 123-12 is arranged between the positive common node 123-11a and the motor 123-2. To ensure that only one of the AC or DC power supplies are utilized at any given time, in an embodiment, a mechanical lockout may be utilized. In an exemplary embodiment, the mechanical lockout may physically block access to the one of the AC or DC power supplies at any given time.

In addition, as depicted in FIG. 6A, constant-speed universal motor tool 123 may be further provided with a control unit 123-8. In an embodiment, control unit 123-8 may be coupled to a power switch 123-13 that is arranged inside power unit 123-6 between the DC+ power line of power supply interface 123-5 and the ON/OFF switch 123-12. In an embodiment, control unit 123-8 may be provided to monitor the power tool 123 and/or battery conditions. In an embodiment, control unit 123-8 may be coupled to tool 123 elements such as a thermistor inside a tool. In an embodiment, control unit 123-8 may also be coupled to the battery pack(s) via a communication signal line COMM provided from power supply interface 123-5. The COMM signal line may provide a control or informational signal relating to the operation or condition of the battery pack(s) to the control unit 123-8. In an embodiment, control unit 123-8 may be configured to cut off power from the DC+ power line from power supply interface 123-5 using the power switch 123-13 if tool fault conditions (e.g., tool over-temperature, tool over-current, etc.) or battery fault conditions (e.g., battery over-temperature, battery over-current, battery over-voltage, battery under-voltage, etc.) are detected. In an embodiment, power switch 123-13 may include a FET or other controllable switch that is controlled by control unit 123-8.

Figure 6B:
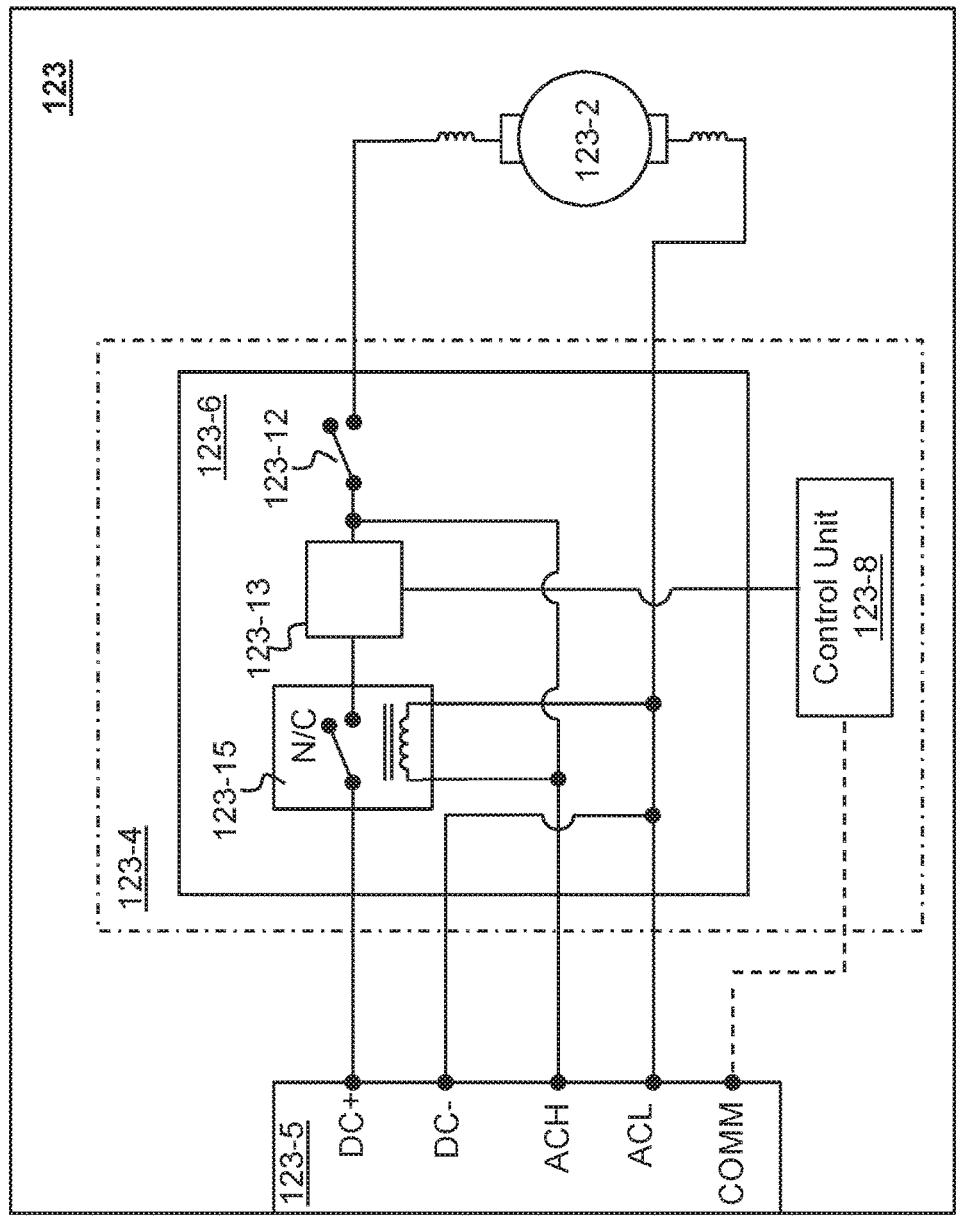
FIG. 6B depicts an exemplary system block diagram of the constant-speed AC/DC power tool of FIG. 6A additionally provided with an exemplary power supply switching unit, according to an embodiment.
Figure 6C:
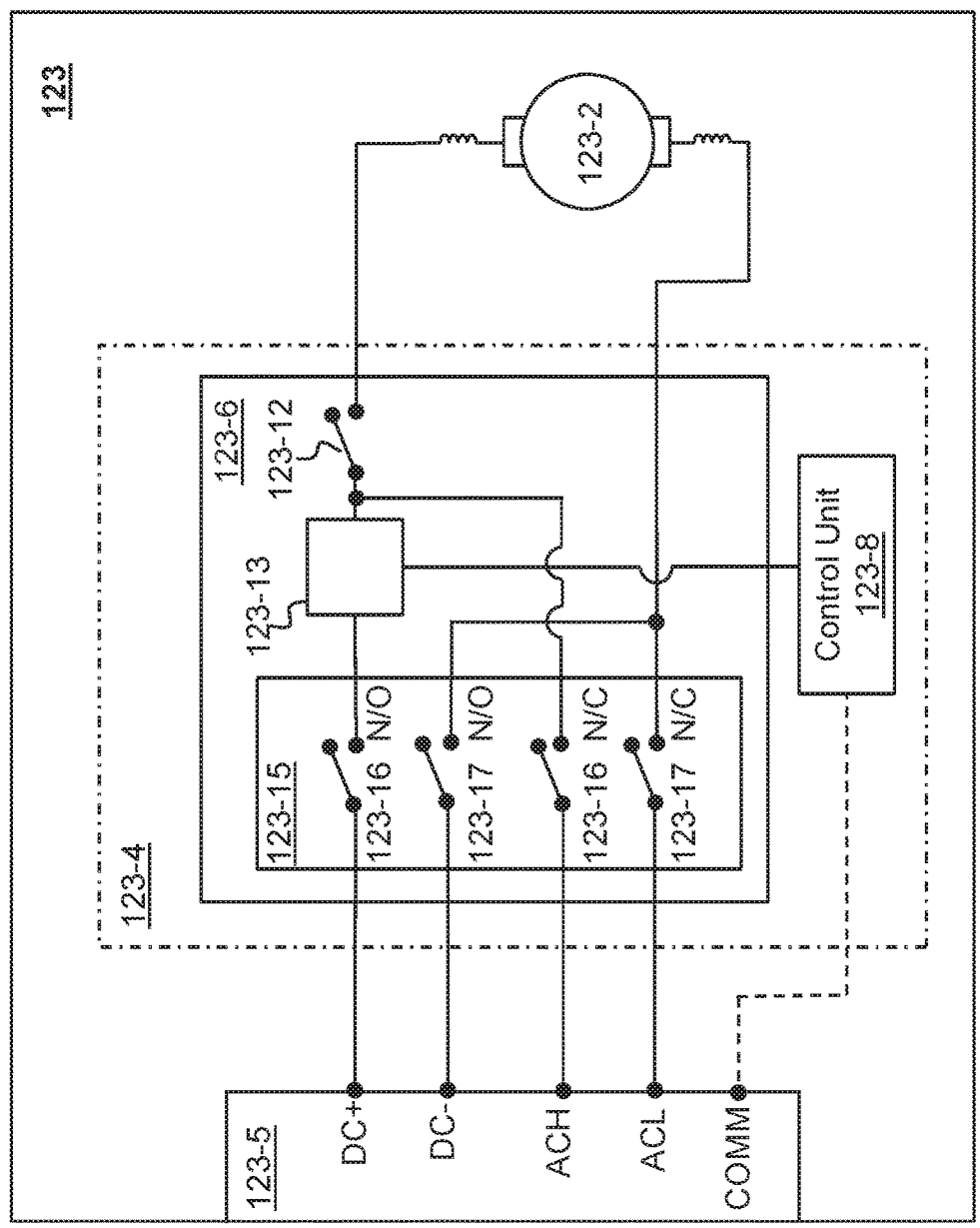
FIG. 6C depicts an exemplary system block diagram of the constant-speed AC/DC power tool of FIG. 6A additionally provided with an alternative exemplary power supply switching unit, according to an embodiment.
Figure 6D:
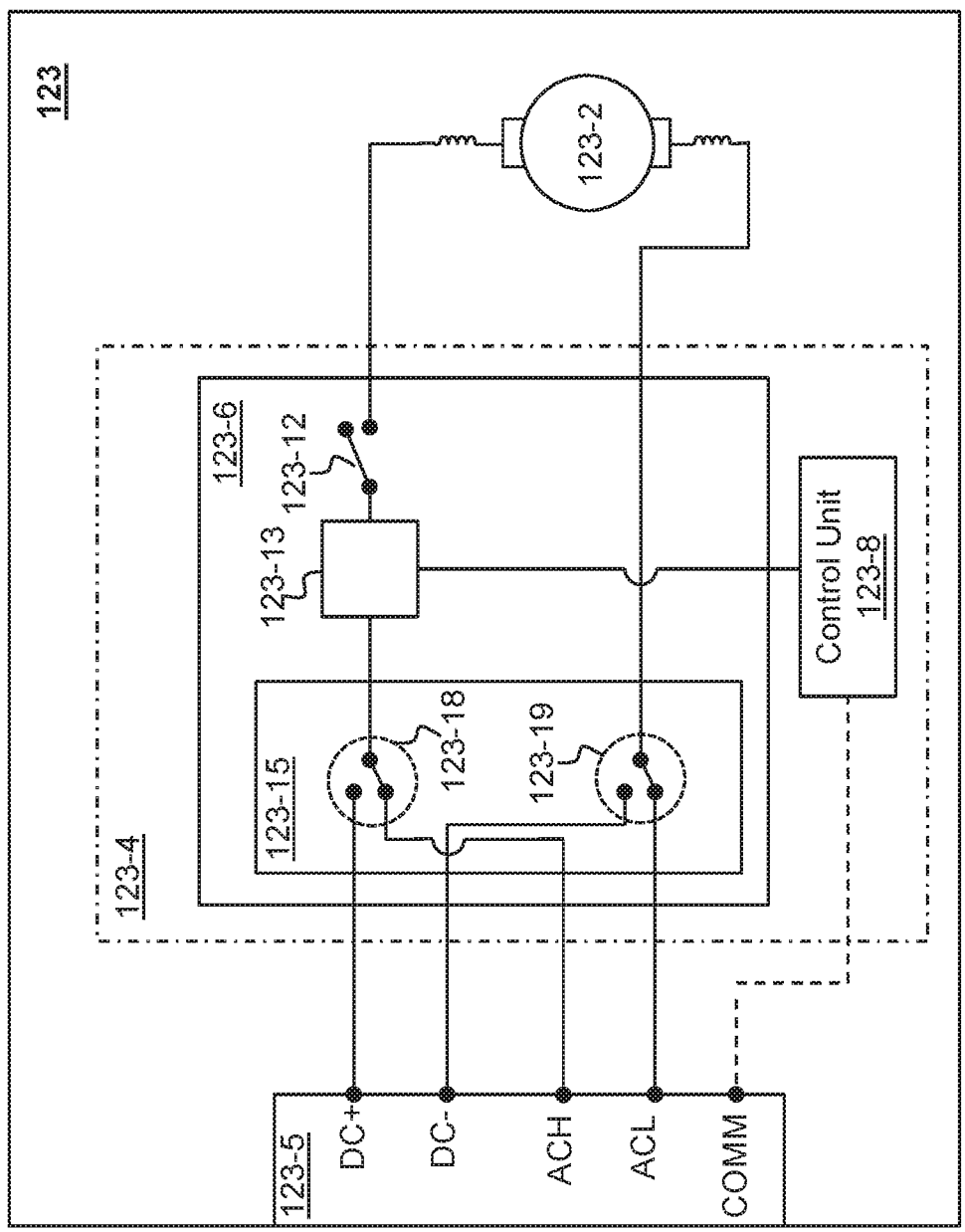
FIG. 6D depicts an exemplary system block diagram of the constant-speed AC/DC power tool of FIG. 6A additionally provided with yet another exemplary power supply switching unit, according to an embodiment.

FIG. 6B-6D depict the constant-speed universal motor tool 123 according to an alternative embodiment, where the DC power lines DC+/DC− and AC power lines ACH/ACL are isolated via a power supply switching unit 123-15 to ensure that power cannot be supplied from both the AC power supply and the DC power supply at the same time (even if the power supply interface 123-5 is coupled to both AC and DC power supplies).

In one embodiment, as shown in FIG. 6B, the power supply switching unit 123-15 may include a normally-closed single-pole, single-throw relay arranged between the DC power line DC+ and the ON/OFF switch 123-12, with a coil coupled to the AC power line ACH and ACL. The output of the power supply switching unit 123-15 and the ACH power line are jointly coupled to the power switch 123-13. When no AC power is being supplied, the relay is inactive, and DC power line DC+ is coupled to the power switch 123-13. When AC power is being supplied, the coil is energized and the relay becomes active, thus disconnecting the DC power line DC+ from the power switch 123-13.

In an alternative or additional embodiment, as shown in FIG. 6C, the power supply switching unit 123-15 may include a double-pole, double-throw switch 123-16 having input terminals coupled to the DC+ and ACH power lines of the power supply interface 123-5, and output terminals jointly coupled to the power switch 123-13. In an embodiment, a second double-pole, double-throw switch 123-17 is provided having input terminals coupled to negative DC− and ACL power lines of the power supply interface 123-5, and output terminals jointly coupled to a negative terminal of the motor 123-2. In an embodiment, switches 123-16 and 123-17 may be controlled via a relay coil similar to FIG. 6B. Alternatively, switches 123-16 and 123-17 may be controlled via a mechanical switching mechanism (e.g., a moving contact provided on the battery receptacle that closes the switches when a battery pack is inserted into the battery receptacle).

In another embodiment, as shown in FIG. 6D, the power supply switching unit 123-15 may include a single-pole, double-throw switch 123-18 having input terminals coupled to DC+ and ACH power lines of the power supply interface 123-5, and an output terminal coupled to the power switch 123-13. In an embodiment, a second single-pole, double-throw switch 123-19 is provided having input terminals coupled to negative DC− and ACL power lines of the power supply interface 123-5, and an output terminal coupled to a negative terminal of the motor 123-2. In an embodiment, switches 123-18 and 123-19 may be controlled via a relay coil similar to FIG. 6B. Alternatively, switches 123-18 and 123-19 may be controlled via a mechanical switching mechanism (e.g., a moving contact provided on the battery receptacle that closes the switches when a battery pack is inserted into the battery receptacle).

It must be understood that while tool 123 in FIGS. 6A-6D is provided with a control unit 123-8 and power switch 123-13 to cut off supply of power in an event of a tool or battery fault condition, tool 123 may be provided without a control unit 123-8 and a power switch 123-13. For example, the battery pack(s) may be provided with its own controller to monitor its fault conditions and manage its operations.

1. Constant-Speed Universal Motor Tools with Power Supplies Having Comparable Voltage Ratings In FIGS. 6A-6D described above, power tools 123 are designed to operate at a high-rated voltage range of, for example, 100V to 120V (which corresponds to the AC power voltage range of 100 VAC to 120 VAC in North America and Japan), or more broadly, 90V to 132V (which is ±10% of the AC power voltage range of 100 to 120 VAC), and at high power (e.g., 1500 to 2500 Watts). Specifically, the motor 123-2 and power unit 123-6 components of power tools 123 are designed and optimized to handle high-rated voltage of 100 to 120V, or more broadly 90V to 132V. This may be done by selecting voltage-compatible power devices, and designing the motor with the appropriate size and winding configuration to handle the high-rated voltage range. The motor 123-2 also has an operating voltage or operating voltage range that may be equivalent to, fall within, or correspond to the operating voltage or the operating voltage range of the tool 123.

In an embodiment, the power supply interface 123-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 123-5 both correspond to (e.g., match, overlap with, or fall within) the operating voltage range of the motor 123-2 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

Figure 6E:
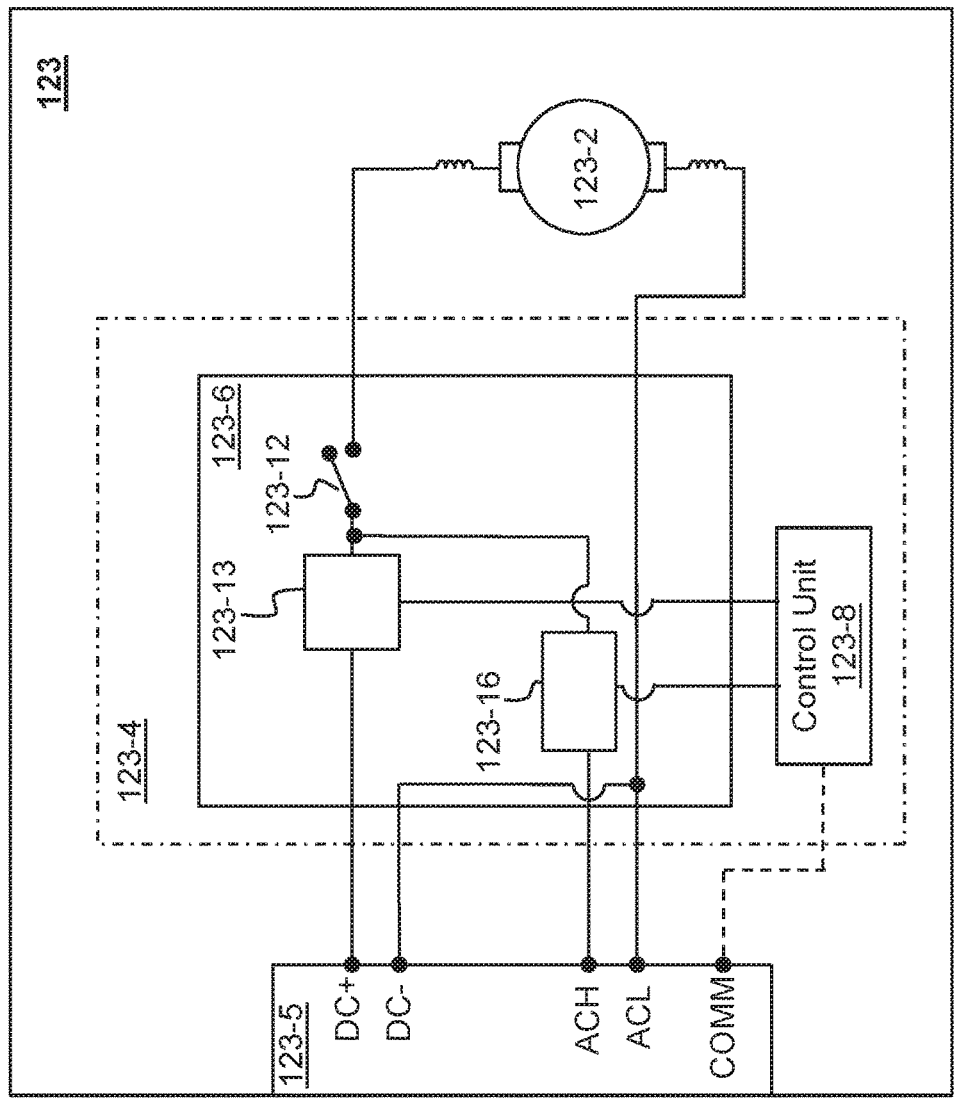
FIG. 6E depicts an exemplary system block diagram of a constant-speed AC/DC power tool with a universal motor where power supplied from an AC power supply has a nominal voltage significantly different from nominal voltage provided from a DC power supply, according to an embodiment.

2. Constant-Speed Universal Motor Tools with Power Supplies Having Disparate Voltage Ratings FIG. 6E depicts a power tool 123, according to another embodiment of the invention, where supply of power provided by the AC power supply has a nominal voltage that is significantly different from a nominal voltage provided from the DC power supply. For example, the AC power line of the power supply interface 123-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

Operating the power tool motor 123-2 at significantly different voltage levels may yield significant differences in power tool performance, in particular the rotational speed of the motor, which may be noticeable and in some cases unsatisfactory to the users. Also supplying voltage levels outside the operating voltage range of the motor 123-2 may damage the motor and the associated switching components. Thus, in an embodiment of the invention herein described, the motor control circuit 123-4 is configured to optimize a supply of power to the motor (and thus motor performance) 123-2 depending on the nominal voltage of the AC or DC power lines such that motor 123-2 yields substantially uniform speed and power performance in a manner satisfactory to the end user, regardless of the nominal voltage provided on the AC or DC power lines.

In this embodiment, motor 123-2 may be designed and configured to operate at a voltage range that encompasses the nominal voltage of the DC power line. In an exemplary embodiment, power tool 123 may be designed to operate at a voltage range of for example 60V to 90V (or more broadly ±10% at 54V to 99V) encompassing the nominal voltage of the DC power line of the power supply interface 123-5 (e.g., 72 VDC or 90 VDC), but lower than the nominal voltage of the AC power line (e.g., 220V-240V). In another exemplary embodiment, the motor 123-2 may be designed to operate at a voltage range of 100V to 120V (or more broadly ±10% at 90V to 132V), encompassing the nominal voltage of the DC power line of the power supply interface 123-5 (e.g., 108 VDC), but lower than the nominal voltage range of 220-240V of the AC power line.

In an embodiment, in order for tool 123 to operate with the higher nominal voltage of the AC power line, tool 123 is further provided with a phase-controlled AC switch 123-16. In an embodiment, AC switch 123-16 may include a triac or an SRC switch controlled by the control unit 123-8. In an embodiment, the control unit 123-8 may be configured to set a fixed conduction band (or firing angle) of the AC switch 123-16 corresponding to the operating voltage of the tool 123.

For example, for a tool 123 having a motor 123-2 with an operating voltage range of 60V to 100V but receiving AC power having a nominal voltage of 100V-120V, the conduction band of the AC switch 123-16 may be set to a value in the range of 100 to 140 degrees, e.g., approximately 120 degrees. In this example, the firing angle of the AC switch 123-16 may be set to 60 degrees. By setting the firing angle to approximately 60 degrees, the AC voltage supplied to the motor will be approximately in the range of 70-90V, which corresponds to the operating voltage of the tool 123. In this manner, the control unit 123-8 optimizing the supply of power to the motor 123-2.

In another example, for a tool 123 having a motor 123-2 with an operating voltage range of 100 to 120V but receiving AC power having a nominal voltage of 220-240V, the conduction band of the AC switch 123-16 may be set to a value in the range of 70 to 110 degrees, e.g., approximately 90 degrees. In this example, the firing angle of the AC switch 123-16 may be set to 90 degrees. By setting the firing angle to 90 degrees, the AC voltage supplied to the motor will be approximately in the range of 100-120V, which corresponds to the operating voltage of the tool 123.

In this manner, motor control circuit 123-4 optimizes a supply of power to the motor 123-2 depending on the nominal voltage of the AC or DC power lines such that motor 123-2 yields substantially uniform speed and power performance in a manner satisfactory to the end user, regardless of the nominal voltage provided on the AC or DC power lines.

B. Variable-Speed AC/DC Power Tools with Universal Motors

Turning now to FIG. 7A-7H, the second subset of AC/DC power tools with brushed motors 122 includes variable-speed AC/DC power tools 124 with universal motors (herein also referred to as variable-speed universal-motor tools 124). These include corded/cordless (AC/DC) power tools that operate at variable speed at no load and include brushed universal motors 124-2 configured to operate at a high rated voltage (e.g., 100V to 120V, more broadly 90V to 132V) and high power (e.g., 1500 to 2500 Watts). As discussed above, a universal motor is series-wound motor having stator field coils and a commutator connected to the field coils in series. A universal motor in this manner can work with a DC power supply as well as an AC power supply. In an embodiment, variable-speed universal-motor tools 124 may include high-power tools having variable speed control, such as concrete drills, hammers, grinders, saws, etc.

In an embodiment, variable-speed universal-motor tool 124 is provided with a variable-speed actuator (not shown), e.g., a trigger switch, a touch-sense switch, a capacitive switch, a gyroscope, or other variable-speed input mechanism (not shown) engageable by a user. In an embodiment, the variable-speed actuator is coupled to or includes a potentiometer or other circuitry for generating a variable-speed signal (e.g., variable voltage signal, variable current signal, etc.) indicative of the desired speed of the motor 124-2. In an embodiment, variable-speed universal-motor tool 124 may be additionally provided with an ON/OFF trigger or actuator (not shown) enabling the user to start the motor 124-2. Alternatively, the ON/OFF trigger functionally may be incorporated into the variable-speed actuator (i.e., no separate ON/OFF actuator) such that an initial actuation of the variable-speed trigger by the user acts to start the motor 124-2.

In an embodiment, a variable-speed universal motor tool 124 includes a motor control circuit 124-4 that operates the universal motor 124-2 at a variable speed under no load or constant load. The power tool 124 further includes power supply interface 124-5 arranged to receive power from one or more of the aforementioned DC power supplies and/or AC power supplies. The power supply interface 124-5 is electrically coupled to the motor control circuit 124-4 by DC power lines DC+ and DC− (for delivering power from a DC power supply) and by AC power lines ACH and ACL (for delivering power from an AC power supply).

In an embodiment, motor control circuit 124-4 may include a power unit 124-6. In an embodiment, power unit 124-6 may include a DC switch circuit 124-14 arranged between the DC power lines DC+/DC− and the motor 124-2, and an AC switch 124-16 arranged between the AC power lines ACH/ACL and the motor 124-2. In an embodiment, DC switch circuit 124-14 may include a combination of one or more power semiconductor devices (e.g., diode, FET, BJT, IGBT, etc.) arranged to switchably provide power from the DC power lines DC+/DC− to the motor 124-2. In an embodiment, AC switch 124-16 may include a phase-controlled AC switch (e.g., triac, SCR, thyristor, etc.) arranged to switchably provide power from the AC power lines ACH/ACL to the motor 124-2.

In an embodiment, motor control circuit 124-4 may further include a control unit 124-8. Control unit 124-8 may be arranged to control a switching operation of the DC switch circuit 124-14 and AC switch 124-16. In an embodiment, control unit 124-8 may include a micro-controller or similar programmable module configured to control gates of power switches. In an embodiment, the control unit 124-8 is configured to control a PWM duty cycle of one or more semiconductor switches in the DC switch circuit 124-14 in order to control the speed of the motor 124-2 based on the speed signal from the variable-speed actuator when power is being supplied from one or more battery packs through the DC power lines DC+/DC−. Similarly, the control unit 124-8 is configured to control a firing angle (or conduction angle) of AC switch 124-16 in order to control the speed of the motor 124-2 based on the speed signal from the variable-speed actuator when power is being supplied from the AC power supply through the AC power lines ACH/ACL.

In an embodiment, control unit 124-8 may also be coupled to the battery pack(s) via a communication signal line COMM provided from power supply interface 124-5. The COMM signal line may provide a control or informational signal relating to the operation or condition of the battery pack(s) to the control unit 124-8. In an embodiment, control unit 124-8 may be configured to cut off power from the DC output line of power supply interface 124-5 using DC switch circuit 124-14 if battery fault conditions (e.g., battery over-temperature, battery over-current, battery over-voltage, battery under-voltage, etc.) are detected. Control unit 124-8 may further be configured to cut off power from either the AC or DC output lines of power supply interface 124-5 using DC switch circuit 124-14 and/or AC switch 124-16 if tool fault conditions (e.g., tool over-temperature, tool over-current, etc.) are detected.

In an embodiment, power unit 124-6 may be further provided with an electro-mechanical ON/OFF switch 124-12 coupled to the ON/OFF trigger or actuator discussed above. The ON/OFF switch simply connects or disconnects supply of power from the power supply interface 124-5 to the motor 124-2. Alternatively, the control unit 124-8 may be configured to deactivate DC switch circuit 124-14 and AC switch 124-16 until it detects a user actuation of the ON/OFF trigger or actuator (or initial actuator of the variable-speed actuator if ON/OFF trigger functionally is be incorporated into the variable-speed actuator). The control unit 124-8 may then begin operating the motor 124-2 via either the DC switch circuit 124-14 or AC switch 124-16. In this manner, power unit 124-6 may be operable without an electro-mechanical ON/OFF switch 124-12.

Figure 7A:
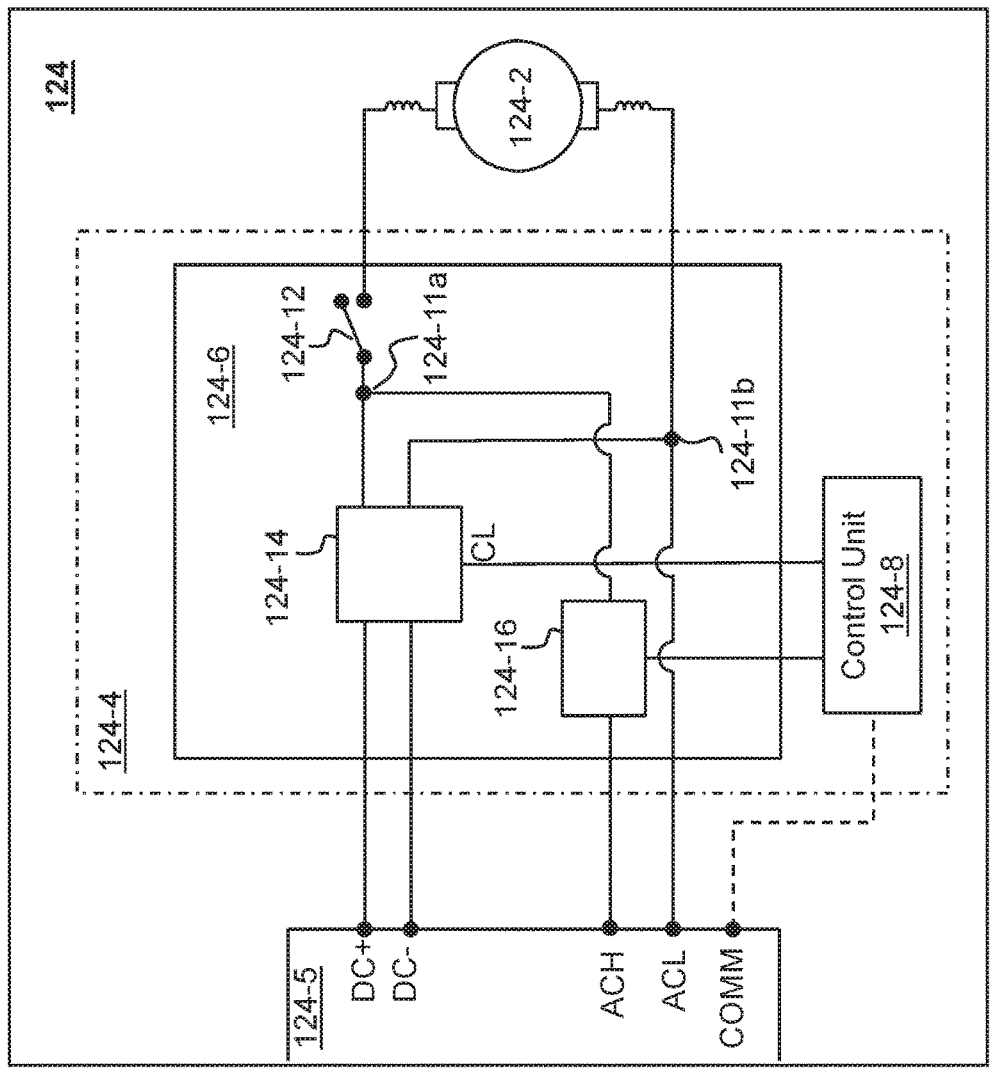
FIG. 7A depicts an exemplary system block diagram of a variable-speed AC/DC power tool with a universal motor, according to an embodiment.

Referring to FIG. 7A, the variable-speed universal motor tool 124 is depicted according to one embodiment, where the ACH and DC+ power lines are coupled together at common positive node 124-11a, and the ACL and DC− power lines are coupled together at a common negative node 124-11b. In this embodiment, ON/OFF switch 124-12 is arranged between the positive common node 124-11a and the motor 124-2. To ensure that only one of the AC or DC power supplies are utilized at any given time, in an embodiment, the control unit 124-8 may be configured to activate only one of the DC switch circuit 124-14 and AC switch 124-16 at any given time.

In a further embodiment, as a redundancy measure and to minimize electrical leakage, a mechanical lockout may be utilized. In an exemplary embodiment, the mechanical lockout may physically block access to the AC or DC power supplies at any given time.

Figure 7B:
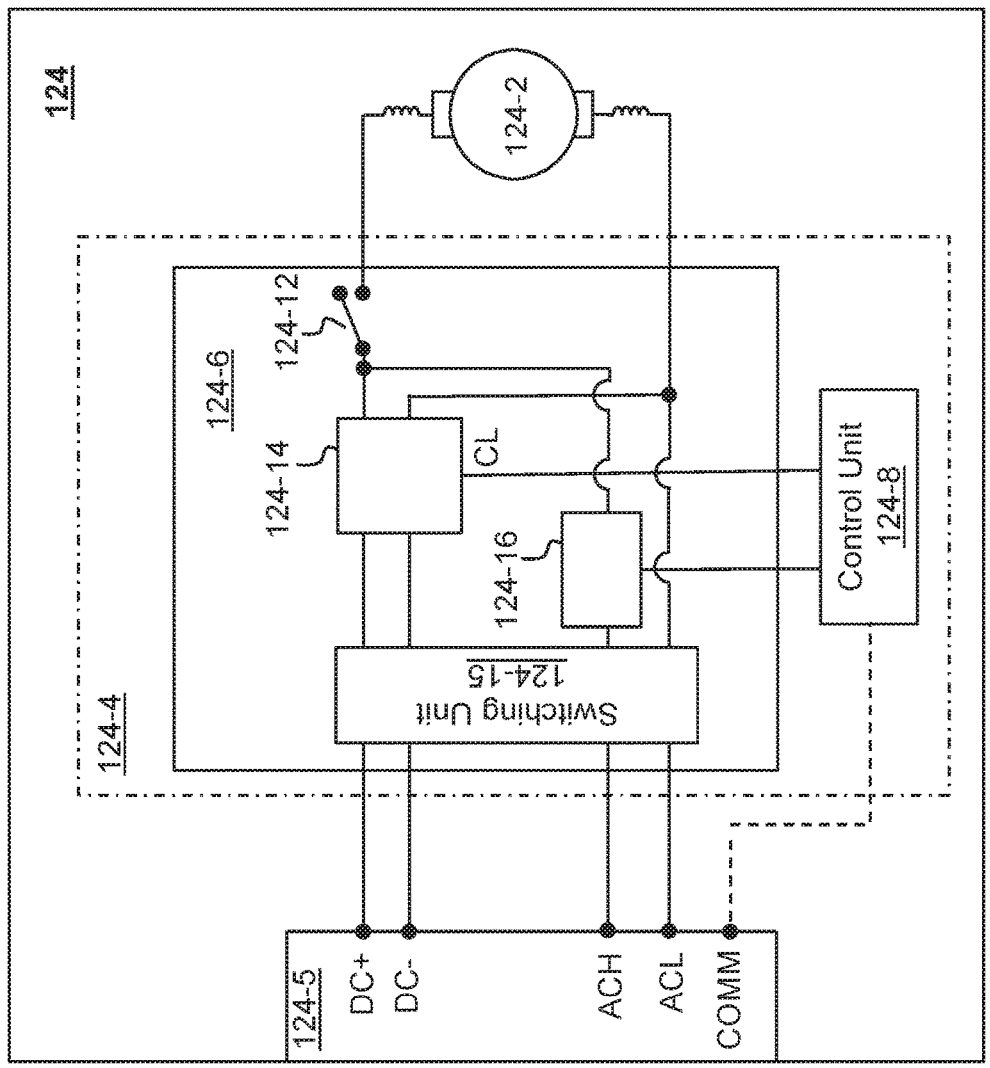
FIG. 7B depicts an exemplary system block diagram of the constant-speed AC/DC power tool of FIG. 7A additionally provided with a power supply switching unit, according to an embodiment.

FIG. 7B depicts the variable-speed universal motor tool 124 is depicted according to an alternative embodiment, where DC power lines DC+/DC− and AC power lines ACH/ACL are isolated via a power supply switching unit 124-15 to ensure that power cannot be supplied from both the AC power supply and the DC power supply at the same time (even if the power supply interface 124-5 is coupled to both AC and DC power supplies). Switching unit 124-15 may be configured to include relays, single-pole double-throw switches, double-pole double-throw switches, or a combination thereof, as shown and described with reference to FIGS. 6B to 6D. It should be understood that while the power supply switching unit 124-15 in FIG. 7B is depicted between the power supply interface 124-5 on one side, and the DC switch circuit 124-14 and AC switch 124-16 on the other side, the power supply switching unit 124-15 may alternatively be provided between the DC switch circuit 124-14 and AC switch 124-16 on one side, and the motor 124-2 on the other side, depending on the switching arrangement utilized in the power supply switching unit 124-15.

Figure 7D:
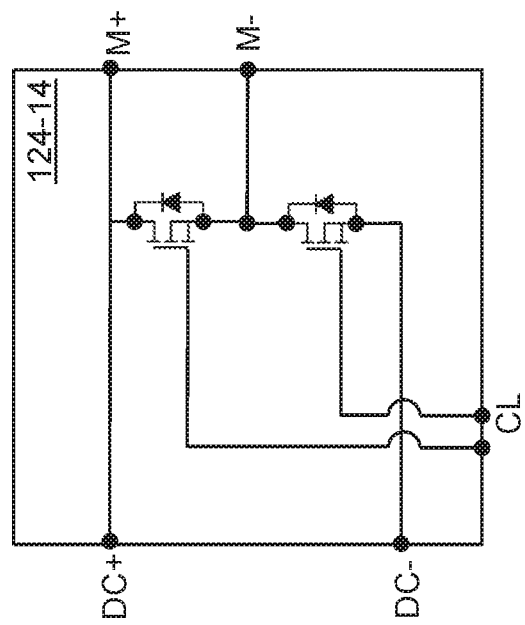
FIGS. 7C-7E depict exemplary circuit diagrams of various embodiments of a DC switch circuit.
Figure 7C:
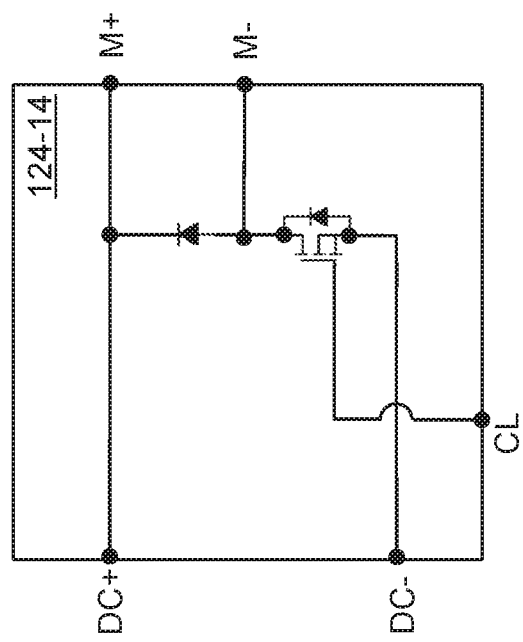
Figure 7E:
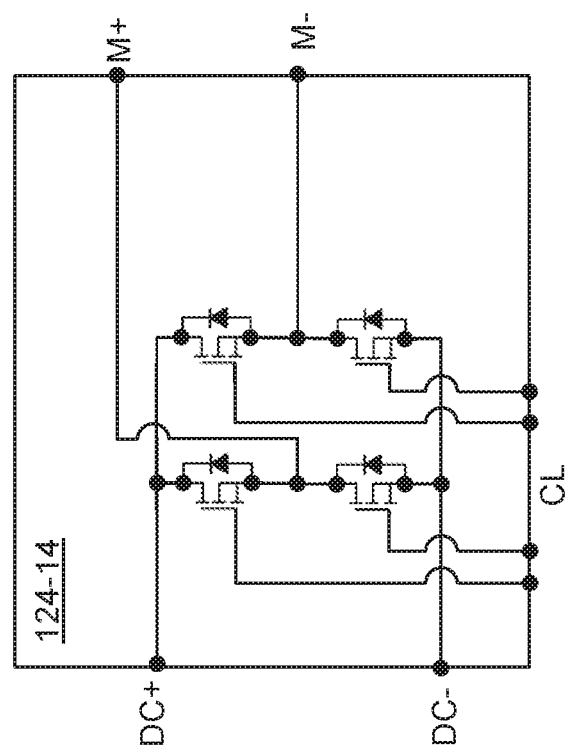

As discussed above, DC switch circuit 124-14 may include a combination of one or more semiconductor devices. FIGS. 7C to 7E depict various arrangements and embodiments of the DC switch circuit 124-14. In one embodiment shown in FIG. 7C, a combination of a FET and a diode is used in what is known as a chopper circuit, and the control unit 124-8 drives the gate of the FET (via a gate driver that is not shown) to control a PWM duty cycle of the motor 124-2. In another embodiment, as shown in FIG. 7D, a combination of two FETs is used in series (i.e., a half-bridge). The control unit 124-8 may in this case drive the gates or one or both FETs (i.e., single-switch PWM control or PWM control with synchronous rectification). In yet another embodiment, as shown in FIG. 7E, a combination of four FETs is used as an H-bridge (full-bridge). The control unit 124-8 may in this case drive the gates or two or four FETs (i.e., without or with synchronous rectification) from 0% to 100% PWM duty cycle correlating to the desired speed of the motor from zero to full speed. It is noted that any type of controllable semiconductor device such as a BJT, IGBT, etc. may be used in place of the FETs shown in these figures. For a detailed description of these circuits and the associated PWM control mechanisms, reference is made to U.S. Pat. No. 8,446,120 titled: "Electronic Switch Module for a Power Tool," which is incorporated herein by reference in its entirety.

Referring again to FIGS. 7A and 7B, AC switch 124-16 may include a phase-controlled AC power switch such as a triac, a SCR, a thyristor, etc. arranged in series on AC power line ACH and/or AC power line ACL. In an embodiment, the control unit 124-8 controls the speed of the motor by switching the motor current on and off at periodic intervals in relation to the zero crossing of the AC current or voltage waveform. The control unit 124-8 may fire the AC switch 124-16 at a conduction angle of between 0 to 180 degrees within each AC half cycle correlating to the desired speed of the motor from zero to full speed. For example, if the desired motor speed is 50% of the full speed, control unit 124-8 may fire the AC switch 124-16 at 90 degrees, which is the medium point of the half cycle. Preferably such periodic intervals are caused to occur in synchronism with the original AC waveform. The conduction angle determines the point within the AC waveform at which the AC switch 124-16 is fired, i.e. turned on, thereby delivering electrical energy to the motor 124-2. The AC switch 124-16 turns off at the conclusion of the selected period, i.e., at the zero-crossing of the AC waveform. Thus, the conduction angle is measured from the point of firing of AC switch 124-16 to the zero-crossing. For a detailed description of phase control of a triac or other phase controlled AC switch in a power tool, reference is made to U.S. Pat. No. 8,657,031, titled "Universal Control Module," U.S. Pat. No. 7,834,566, titled: "Generic Motor Control," and U.S. Pat. No. 5,986,417, titled: "Sensorless Universal Motor Speed Controller," each of which are incorporated herein by reference in its entirety.

As discussed, control unit 124-8 controls the switching operation of both DC switch circuit 124-14 and AC switch 124-16. When tool 124 is coupled to an AC power supply, the control unit 124-8 may sense current through the AC power lines ACH/ACL and set its mode of operation to control the AC switch 124-16. In an embodiment, when tool 124 is coupled to a DC power supply, the control unit 124-8 may sense lack of zero crossing on the AC power lines ACH/ACL and change its mode of operation to control the DC switch circuit 124-14. It is noted that control unit 124-8 may set its mode of operation in a variety of ways, e.g., by sensing a signal from the COMM signal line, by sensing voltage on the DC power lines DC+/DC−, etc.

1. Integrated Power Switch/Diode Bridge

Figure 7F:
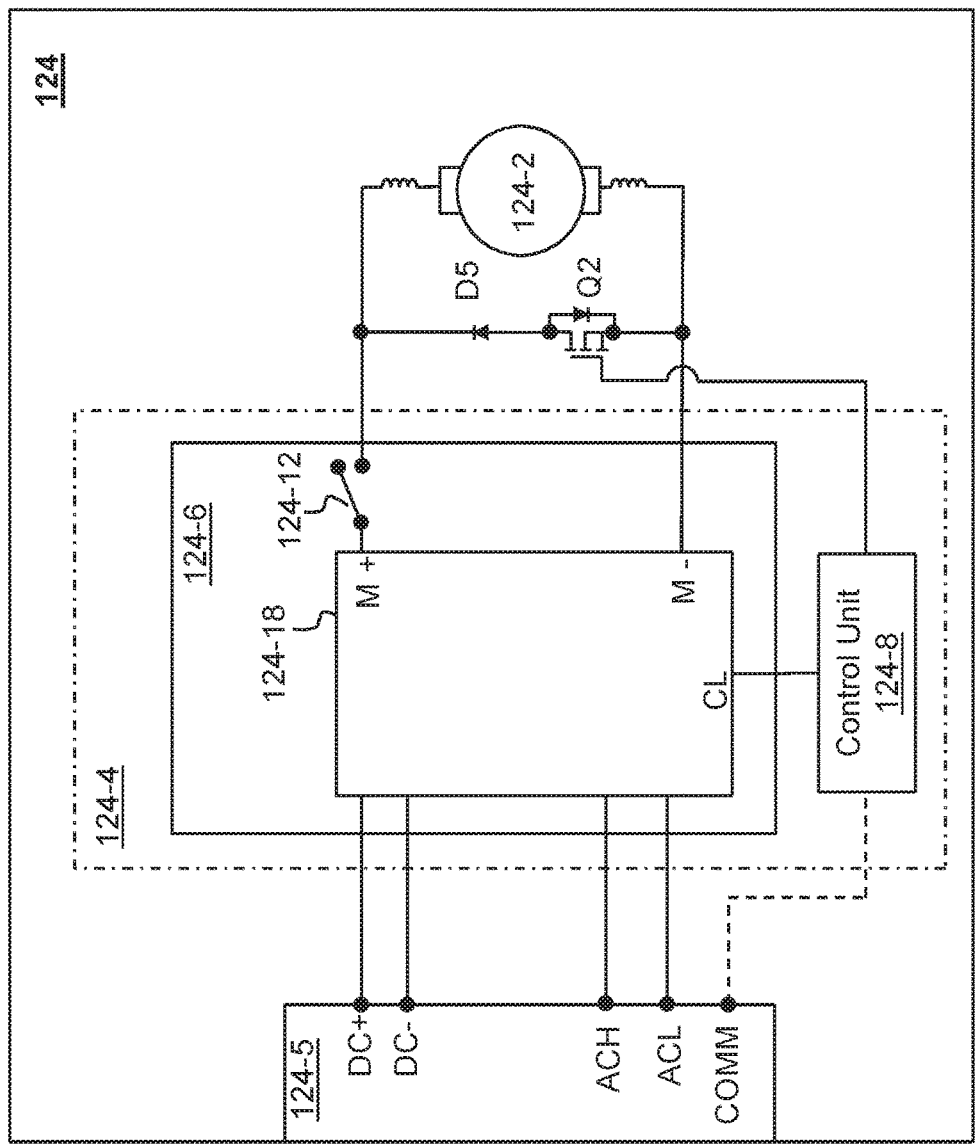
FIG. 7F depicts an exemplary system block diagram of a variable-speed AC/DC power tool with a universal motor having an integrated AC/DC power switching circuit, according to an alternative embodiment.
Figure 7G:
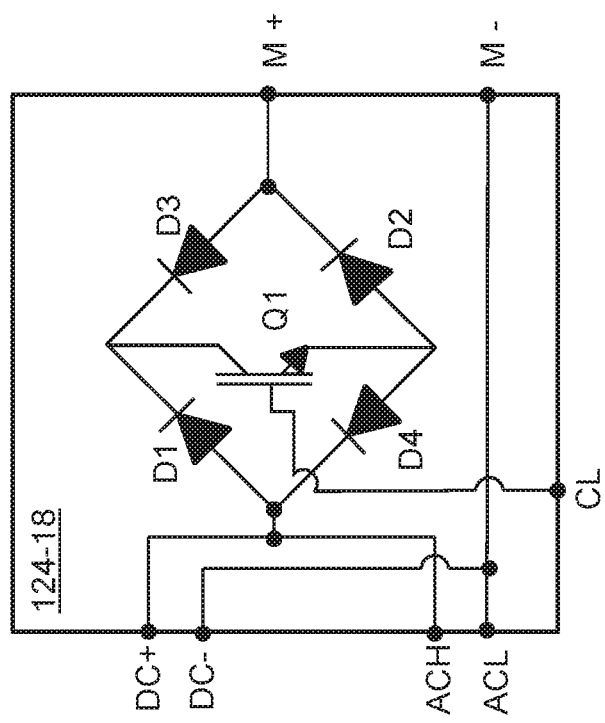
FIGS. 7G and 7H depict exemplary circuit diagrams of various embodiments of the integrated AC/DC power switching circuit.
Figure 7H:
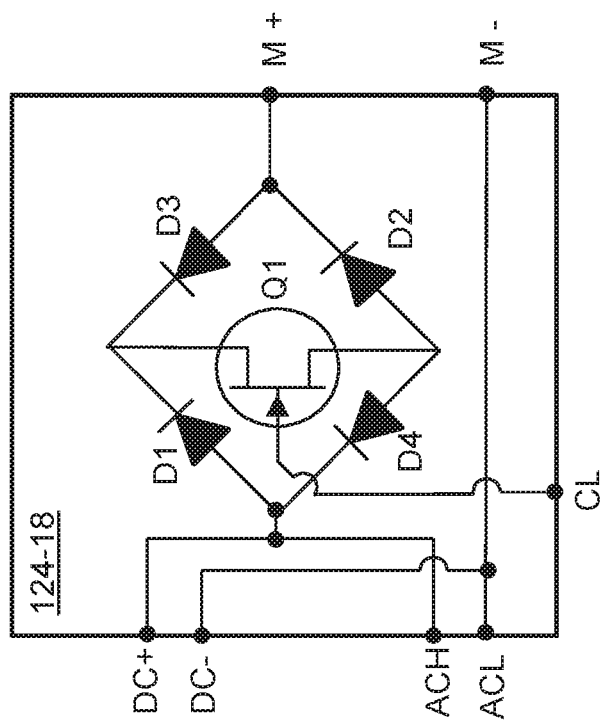

Referring now to FIGS. 7F-7H, variable-speed universal-motor tool 124 is depicted according to an alternative embodiment, where the AC and DC power lines of the power supply interface 124-5 are coupled to an integrated AC/DC power switching circuit 124-18.

As shown in FIGS. 7G and 7H, integrated AC/DC power switching circuit 124-18 includes a semiconductor switch Q1 nested within a diode bridge configured out of diodes D1-D4. Semiconductor switch Q1 may be a field effect transistor (FET) as shown in FIG. 7H, or an insulated gate bipolar transistor (IGBT) as shown in FIG. 7G. The semiconductor switch Q1 is arranged between D1 and D3 on one end and between D2 and D4 on the other end. Line inputs DC+ and ACH are jointly coupled to a node of the diode bridge between D1 and D4. The positive motor terminal M+ is coupled to a node of the diode bridge between D2 and D3.

When tool 124 is coupled to a DC power supply, in an embodiment, the control unit 124-8 sets its mode of operation to DC mode, as discussed above. In this mode, control unit 124-8 controls the semiconductor switch Q1 via a PWM technique to control motor speed, i.e., by turning switch Q1 ON and OFF to provide a pulse voltage. The PWM duty cycle, or ratio of the ON and OFF periods in the PWM signal, is selected according to the desired speed of the motor.

When tool 124 is coupled to an AC power supply, in an embodiment, the control unit 124-8 sets its mode of operation to AC, as discussed above. In this mode, control unit 124-8 controls the semiconductor switch Q1 in a manner to resemble a switching operation of a phase controlled switch such as a triac. Specifically, the switch Q1 is turned ON by the control unit 124-8 correspondingly to a point of the AC half cycle where a triac would normally be fired. The control unit 124-8 continued to keep the switch Q1 ON until a zero-crossing has been reached, which indicates the end of the AC half cycle. At that point, control unit 124-8 turns switch Q1 OFF correspondingly to the point of current zero crossing. In this manner the control unit 124-8 controls the speed of the motor by turning switch Q1 ON within each half cycle to control the conduction angle of each AC half cycle according to the desired speed of the motor.

When power is supplied via DC power lines DC+/DC−, current flows through D1-Q1-D2 into the motor 124-2. As mentioned above, control unit 124-8 controls the speed of the motor by controlling a PWM duty cycle of switch Q1. When power is supplied via AC power lines ACH/ACL, current flows through D1-Q1-D2 during every positive half-cycle, and through D3-Q1-D4 through every negative half-cycle. Thus, the diode bridge D1-D4 acts to rectify the AC power passing through the switch Q1, but it does not rectify the AC power passing through the motor terminals M+/M−. As mentioned above, control unit 124-8 controls the speed of the motor by controlling a conduction band of each half cycle via switch Q1.

It is noted that in an embodiment, control unit 124-8 may perform PWM control on switch Q1 in both the AC and DC modes of operation. Specifically, instead of controlling a conduction band of the AC line within each half-cycle, control unit 124-8 may select a PWM duty cycle and using the PWM technique discussed above to control the speed of the motor.

Depending on the motor 124-2 size and property, motor 124-2 may have an inductive current that is slightly delayed with respect to the AC line current. In the AC mode of operation, this current is allowed to decay down to zero at the end of each AC half cycle, i.e., after every voltage zero crossing. However, in the DC mode of operation, it is desirable to provide a current path for the inductive current of the motor 124-2. Thus, according to an embodiment, a freewheeling switch Q2 and a freewheeling diode D5 are further provided parallel to the motor 124-2 to provide a path for the inductive current flowing through the motor 124-2 when Q1 has been turned OFF. In an embodiment, in the AC mode of operation, control unit 124-8 is configured to keep Q2 OFF at all times. However, in the DC mode of operation, control unit 124-8 is configured to keep freewheeling switch Q2 ON.

In a further embodiment, control unit 124-8 is configured to turn Q2 ON when switch Q1 is turned OFF, and vice versa. In other words, when Q1 is being pulse-width modulated, the ON and OFF periods of switch Q1 will synchronously coincide with the OFF and ON periods of switch Q2. This ensures that the freewheeling current path of Q2/D5 does not short the motor 124-8 during any Q1 ON cycle.

With such arrangement, the speed of motor 124-2 can be controlled regardless of whether power tool 124 is connected to an AC or a DC power supply.

2. Variable-Speed Universal Motor Tools with Power Supplies Having Comparable Voltage Ratings In FIGS. 7A, 7B, and 7F described above, power tools 124 are designed to operate at a high-rated voltage range of, for example, 100V to 120V (which corresponds to the AC power voltage range of 100V to 120 VAC), or more broadly, 90V to 132V (which corresponds to ±10% of the AC power voltage range of 100 to 120 VAC), and at high power (e.g., 1500 to 2500 Watts). The motor 124-2 also has an operating voltage or operating voltage range that may be equivalent to, fall within, or correspond to the operating voltage or the operating voltage range of the tool 124.

In an embodiment, the power supply interface 124-5 is arranged to provide an AC voltage having a nominal voltage that is significantly different from a nominal voltage provided from the DC power supply. For example, the AC power line of the power supply interface 124-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

3. Variable-Speed Universal Motor Tools with Power Supplies Having Disparate Voltage Ratings According to an alternative embodiment of the invention, voltage provided by the AC power supply has a nominal voltage that is significantly different from a nominal voltage provided from the DC power supply. For example, the AC power line of the power supply interface 124-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V (e.g., 230V in many European countries or 220V in many African countries), and the DC power line may provide a nominal voltage in the range of 100-120V (e.g., 108 VDC).

Operating the power tool motor 124-2 at significantly different voltage levels may yield significant differences in power tool performance, in particular the rotational speed of the motor, which may be noticeable and in some cases unsatisfactory to the users. Also supplying voltage levels outside the operating voltage range of the motor 124-2 may damage the motor and the associated switching components. Thus, in an embodiment of the invention herein described, the motor control circuit 124-4 is configured to optimize a supply of power to the motor (and thus motor performance) 124-2 depending on the nominal voltage of the AC or DC power lines such that motor 124-2 yields substantially uniform speed and power performance in a manner satisfactory to the end user, regardless of the nominal voltage provided on the AC or DC power lines.

In this embodiment, motor 124-2 may be designed and configured to operate at a voltage range that encompasses the nominal voltage of the DC power line. In an exemplary embodiment, motor 124-2 may be designed to operate at a voltage range of for example 60V to 90V (or more broadly ±10% at 54V to 99V) encompassing the nominal voltage of the DC power line of the power supply interface 124-5 (e.g., 72 VDC or 90 VDC), but lower than the nominal voltage of the AC power line (e.g., 220V-240V). In another exemplary embodiment, motor 124-2 may be designed to operate at a voltage range of 100V to 120V (or more broadly ±10% at 90V to 132V), encompassing the nominal voltage of the DC power line of the power supply interface 124-5 (e.g., 108 VDC), but lower than the nominal voltage range of 220-240V of the AC power line.

In an embodiment, in order for motor 124-2 to operate to operate with the higher nominal voltage of the AC power line, control unit 124-8 may be configured to set a fixed maximum conduction band for the phase-controlled AC switch 124-16 corresponding to the operating voltage of the tool 124. Specifically, the control unit 124-8 may be configured to set a fixed firing angle corresponding to the maximum speed of the tool (e.g., at 100% trigger displacement) resulting in a conduction band of less than 180 degrees within each AC half-cycle at maximum no-load speed. This allows the control unit 124-8 to optimize the supply of power to the motor by effectively reducing the total voltage provided to the motor 124-2 from the AC power supply.

For example, for a motor 124-2 having an operating voltage range of 60 to 100V but receiving AC power having a nominal voltage of 100-120V, the conduction band of the AC switch 124-16 may be set to a maximum of approximately 120 degrees. In other words, the firing angle of the AC switch 124-16 may be varied from 60 degrees (corresponding to 120 degrees conduction angle) at full desired speed to 180 degrees (corresponding to 0 degree conduction angle) at no-speed. By setting the maximum firing angle to approximately 60 degrees, the AC voltage supplied to the motor at full desired speed will be approximately in the range of 70-90V, which corresponds to the operating voltage of the tool 124.

In this manner, motor control circuit 124-4 optimizes a supply of power to the motor 124-2 depending on the nominal voltage of the AC or DC power lines such that motor 124-2 yields substantially uniform speed and power performance in a manner satisfactory to the end user, regardless of the nominal voltage provided on the AC or DC power lines.

C. Constant-Speed AC/DC Power Tools with Brushed PMDC Motors

Figure 8A:
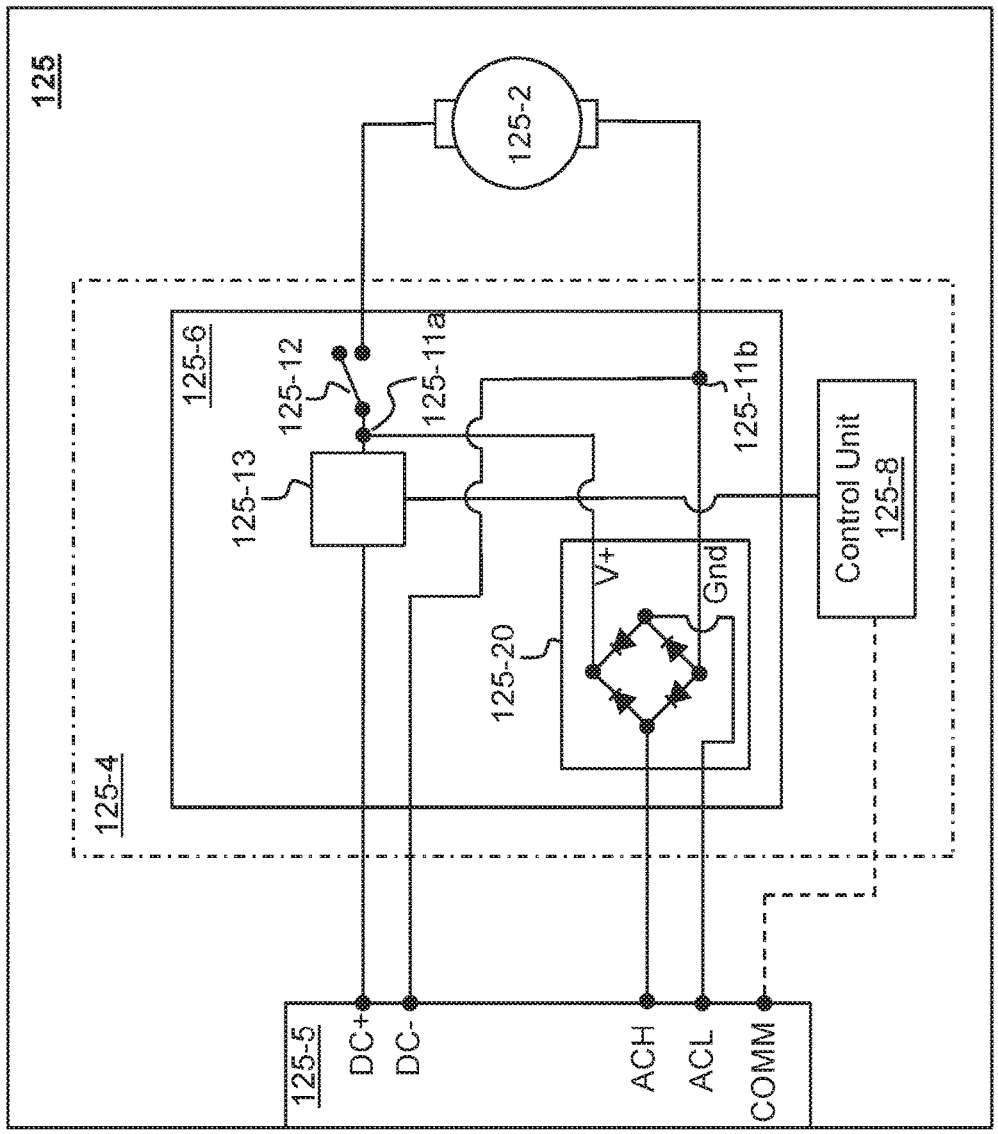
FIG. 8A depicts an exemplary system block diagram of a constant-speed AC/DC power tool with a brushed direct-current (DC) motor, according to an embodiment.
Figure 8B:
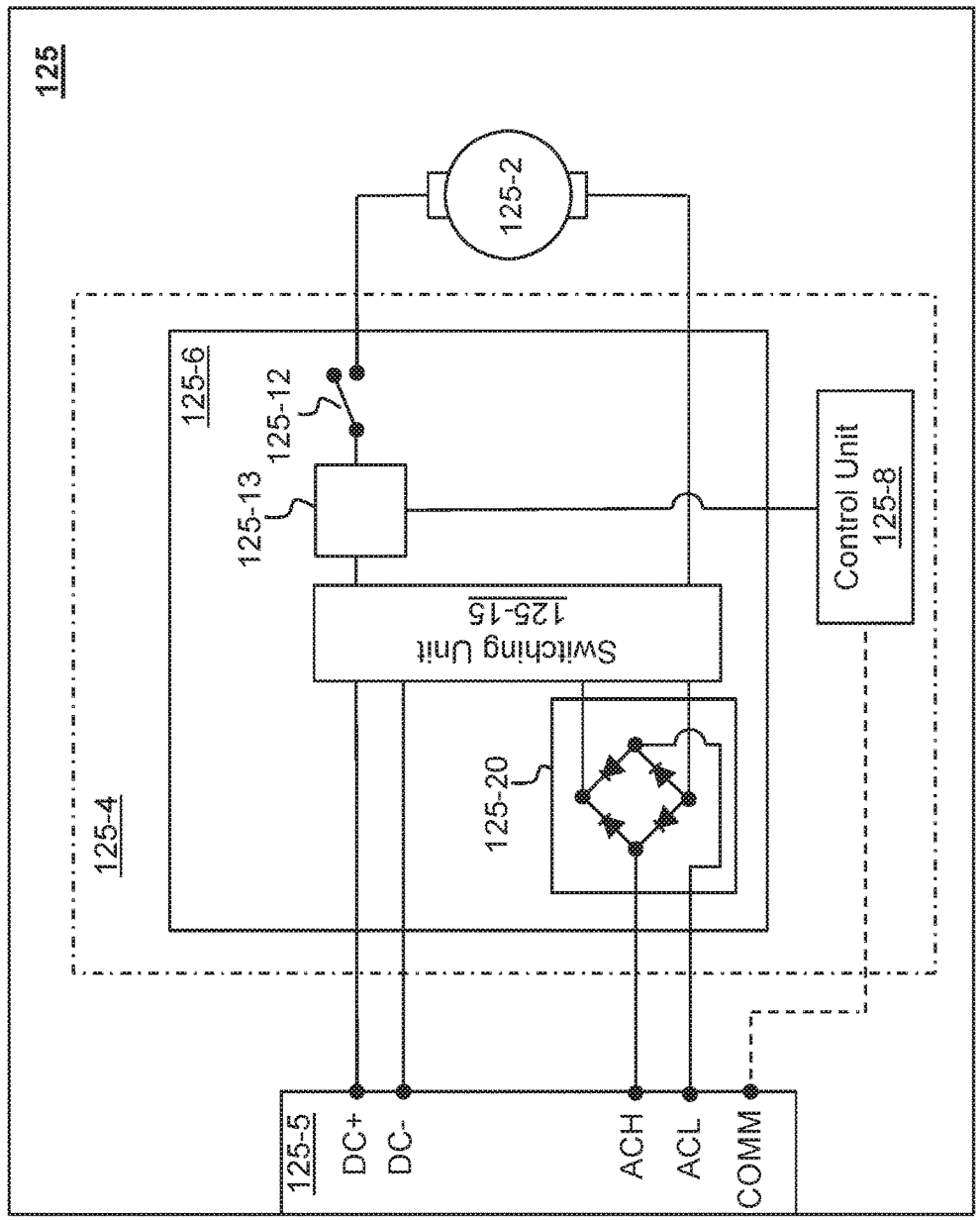
FIG. 8B depicts an exemplary system block diagram of the constant-speed AC/DC power tool of FIG. 8A additionally provided with an exemplary power supply switching unit, according to an embodiment.

Turning now to FIGS. 8A and 8B, the third subset of AC/DC power tools with brushed motors 122 includes constant-speed AC/DC power tools 125 with permanent magnet DC (PMDC) brushed motors (herein referred to as constant-speed PMDC tools 125), which tend to be more efficient than universal motors. These include corded/cordless (AC/DC) power tools that operate at constant speed at no load (or constant load) and include PMDC brushed motors 125-2 configured to operate at a high rated voltage (e.g., 100V to 120V) and high power (e.g., 1500 to 2500

Watts). A PMDC brushed motor generally includes a wound rotor coupled to a commutator, and a stator having permanent magnets affixed therein. A PMDC motor, as the name implies, works with DC power only. This is because the permanent magnets on the stator do not change polarity, and as the AC power changes from a positive half-cycle to a negative half-cycle, the polarity change in the brushes brings the motor to a stand-still. For this reason, in an embodiment, as shown in FIGS. 8A and 8B, power from the AC power supply is passed through a rectifier circuit 125-20 to convert or remove the negative half-cycles of the AC power. In an embodiment, rectifier circuit 125-20 may be a full-wave rectifier arranged to rectify the AC voltage waveform by converting the negative half-cycles of the AC power to positive half-cycles. Alternatively, in an embodiment, rectifier circuit 125-20 may be a half-wave rectifier circuit to eliminate the half-cycles of the AC power. In an embodiment, the rectifier circuit 125-20 may be additionally provided with a link capacitor or a smoothing capacitor (not shown). In an embodiment, constant-speed PMDC motor tools 125 may include high powered tools for high power applications such as concrete hammers, miter saws, table saws, vacuums, blowers, and lawn mowers, etc.

Many aspects of the constant-speed PMDC motor tool 125 are similar to those of the constant-speed universal motor tool 123 previously discussed with reference to FIGS. 6A-6E. In an embodiment, a constant-speed PMDC motor tool 125 includes a motor control circuit 125-4 that operates the PMDC motor 125-2 at a constant speed under no load. The power tool 125 further includes power supply interface 125-5 arranged to receive power from one or more of the aforementioned DC power supplies and/or AC power supplies. The power supply interface 125-5 is electrically coupled to the motor control circuit 125-4 by DC power lines DC+ and DC− (for delivering power from a DC power supply) and by AC power lines ACH and ACL (for delivering power from an AC power supply).

In an embodiment, motor control circuit 125-4 includes a power unit 125-6. Power unit 125-6 may include an electromechanical ON/OFF switch 125-12 provided in series with the motor 125-2 and coupled to an ON/OFF trigger or actuator (not shown). Additionally and/or alternatively, power unit 125 may include a power switch 125-13 coupled to the DC power lines DC+/DC− and to a control unit 125-8. In an embodiment, control unit 125-8 may be provided to monitor the power tool 125 and/or battery conditions. In an embodiment, control unit 125-8 may be coupled to tool 125 elements such as a thermistor inside a tool. In an embodiment, control unit 125-8 may also be coupled to the battery pack(s) via a communication signal line COMM provided from power supply interface 125-5. The COMM signal line may provide a control or informational signal relating to the operation or condition of the battery pack(s) to the control unit 125-8. In an embodiment, control unit 125-8 may be configured to cut off power from the DC+ output line of power supply interface 125-5 using the power switch 125-13 if tool fault conditions (e.g., tool over-temperature, tool over-current, etc.) or battery fault conditions (e.g., battery over-temperature, battery over-current, battery over-voltage, battery under-voltage, etc.) are detected. In an embodiment, power switch 125-13 may include a FET or other controllable switch that is controlled by control unit 125-8. It is noted that power switch 125-13 in an alternative embodiment may be provided between both AC power lines ACH/ACL and DC power lines DC+/DC− on one side and the motor 125-2 on the other side to allow the control unit 125-8 to cut off power from either the AC power supply or the DC power supply in the event of a tool fault condition. Also in another embodiment, constant-speed PMDC motor tool 125 may be provided without an ON/OFF switch 125-12, and the control unit 125-8 may be configured to begin activating the power switch 125-13 when the ON/OFF trigger or actuator is actuated by a user. In other words, power switch 125-13 may be used for ON/OFF and fault condition control. It is noted that power switch 125-13 is not used to control a variable-speed control (e.g., PWM control) of the motor 125-2 in this embodiment.

Referring to FIG. 8A, constant-speed PMDC motor tool 125 is depicted according to one embodiment, where the DC+ power line and V+ output of the rectifier circuit 125-20 (which carries the rectified ACH power line) are coupled together at common positive node 125-11a, and the DC− power line and Gnd output (corresponding to ACL power line) from the rectifier circuit 125-20 are coupled together at a common negative node 125-11b. In this embodiment, ON/OFF switch 125-12 is arranged between the positive common node 125-11a and the motor 125-2. To ensure that only one of the AC or DC power supplies are utilized at any given time, in an embodiment, a mechanical lockout may be utilized. In an exemplary embodiment, the mechanical lockout may physically block access to the one of the AC or DC power supplies at any given time.

In FIG. 8B, constant-speed PMDC motor tool 125 is depicted according to an alternative embodiment, where the DC power lines DC+/DC− and the AC power lines ACH/ACL are isolated via a power supply switching unit 125-15 to ensure that power cannot be supplied from both the AC power supply and the DC power supply at the same time (even if the power supply interface 125-5 is coupled to both AC and DC power supplies). The power supply switching unit 125-15 may be configured similarly to any of the configurations of power supply switching unit 123-15 in FIGS. 6B-6D. It is noted that power supply switching unit 125-15 may be arranged between the AC power lines ACH/ACL and the rectifier circuit 125-20 in an alternative embodiment. In yet another embodiment, power supply switching unit 125-15 may be arranged between the power switch 125-13 and the ON/OFF switch 125-12.

It should be understood that while tool 125 in FIGS. 8A and 8B is provided with a control unit 125-8 and power switch 125-13 to cut off supply of power in an event of a tool or battery fault condition, tool 125 may be provided without a control unit 125-8 and a power switch 125-13. For example, the battery pack(s) may be provided with its own controller to monitor its fault conditions and manage its operations.

1. Constant Speed PMDC Tools with Power Supplies Having Comparable Voltage Ratings In FIGS. 8A and 8B described above, power tools 125 are designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). The motor 125-2 also has an operating voltage or operating voltage range that may be equivalent to, fall within, or correspond to the operating voltage or the operating voltage range of the tool 125.

In an embodiment, the power supply interface 125-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 125-5 both correspond to (e.g., match, overlap with, or fall within) the operating voltage range of the power tool 125 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

2. Constant Speed PMDC Tools with Power Supplies Having Disparate Voltage Ratings According to another embodiment of the invention, voltage provided by the AC power supply has a nominal voltage that is significantly different from a nominal voltage provided from the DC power supply. For example, the AC power line of the power supply interface 125-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the power tool motor 125-2 at significantly different voltage levels may yield significant differences in power tool performance, in particular the rotational speed of the motor, which may be noticeable and in some cases unsatisfactory to the users. Also supplying voltage levels outside the operating voltage range of the motor 125-2 may damage the motor and the associated switching components. Thus, in an embodiment of the invention herein described, the motor control circuit 125-4 is configured to optimize a supply of power to the motor (and thus motor performance) 125-2 depending on the nominal voltage of the AC or DC power lines such that motor 125-2 yields substantially uniform speed and power performance in a manner satisfactory to the end user, regardless of the nominal voltage provided on the AC or DC power lines.

In this embodiment, power tool motor 125-2 may be designed and configured to operate at a voltage range that encompasses the nominal voltage of the DC power line. In an exemplary embodiment, motor 125-2 may be designed to operate at a voltage range of for example 60V to 90V (or more broadly ±10% at 54V to 99V) encompassing the nominal voltage of the DC power line of the power supply interface 125-5 (e.g., 72 VDC or 90 VDC), but lower than the nominal voltage of the AC power line (e.g., 220V-240V). In another exemplary embodiment, motor 125-2 may be designed to operate at a voltage range of 100V to 120V (or more broadly ±10% at 90V to 132V), encompassing the nominal voltage of the DC power line of the power supply interface 125-5 (e.g., 108 VDC), but lower than the nominal voltage range of 220-240V of the AC power line.

In an embodiment, in order for motor 125-2 to operate with the higher nominal voltage of the AC power line, motor control circuit 125-4 may be designed to optimize supply of power to the motor 125-2 according to various implementations discussed herein.

In one implementation, rectifier circuit 125-20 may be provided as a half-wave diode bridge rectifier. As persons skilled in the art shall recognize, a half-wave rectified waveform will have about approximately half the average nominal voltage of the input AC waveform. Thus, in a scenario where the nominal voltage of the AC power line is in the range of 220-240V and the motor 125-2 is designed to operate at a voltage range of 100V to 120V, the rectifier circuit 125-20 may be configured as a half-wave rectifier to provide an average nominal AC voltage of 110V to 120V to the motor 125-2, which is within the operating voltage range of the power tool 125.

Figure 8C:
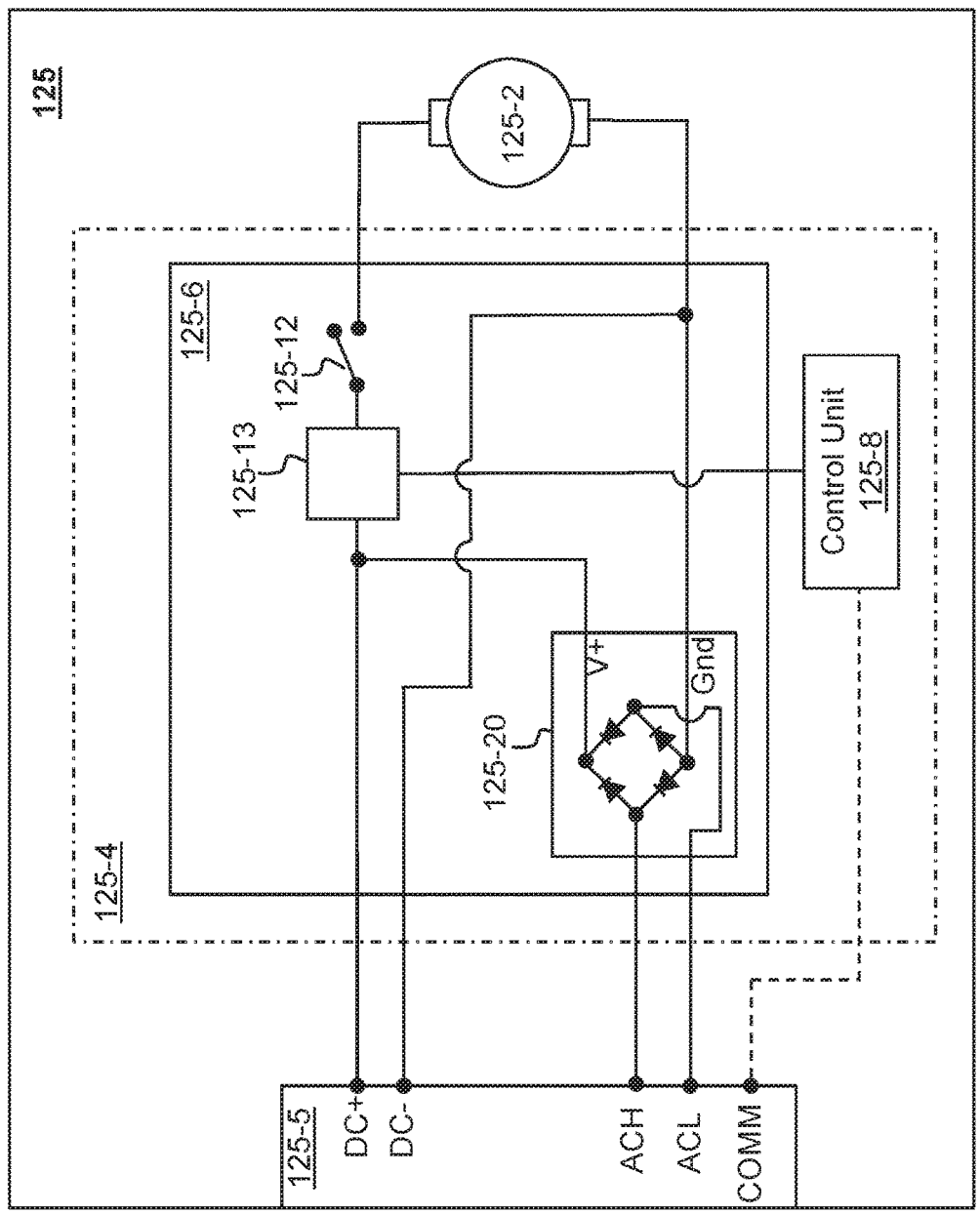
FIG. 8C depicts an exemplary system block diagram of a constant-speed AC/DC power tool with a brushed DC motor where power supplied from an AC power supply has a nominal voltage significantly different from nominal voltage provided from a DC power supply, according to an embodiment.

In another implementation, as shown in FIG. 8C, the V+ output of the rectifier circuit 125-20 may be provided as an input to power switch 125-13, and control unit 125-8 may be configured to pulse width modulate (PWM) the V+ signal at a fixed duty cycle corresponding to the operating voltage of the tool 125. For example, for a tool 125 having an operating voltage range of 60 to 100V but receiving AC power having a nominal voltage of 100-120V, when control unit 125-8 senses AC current on the AC power line of power supply interface 125-5, it controls a PWM switching operation of power switch 125-13 at fixed duty cycle in the range of 60% to 80% (e.g., 70%). This results in a voltage level of approximately 70-90V being supplied to the motor 125-2 when operating from an AC power supply, which corresponds to the operating voltage of the tool 125.

Figure 8D:
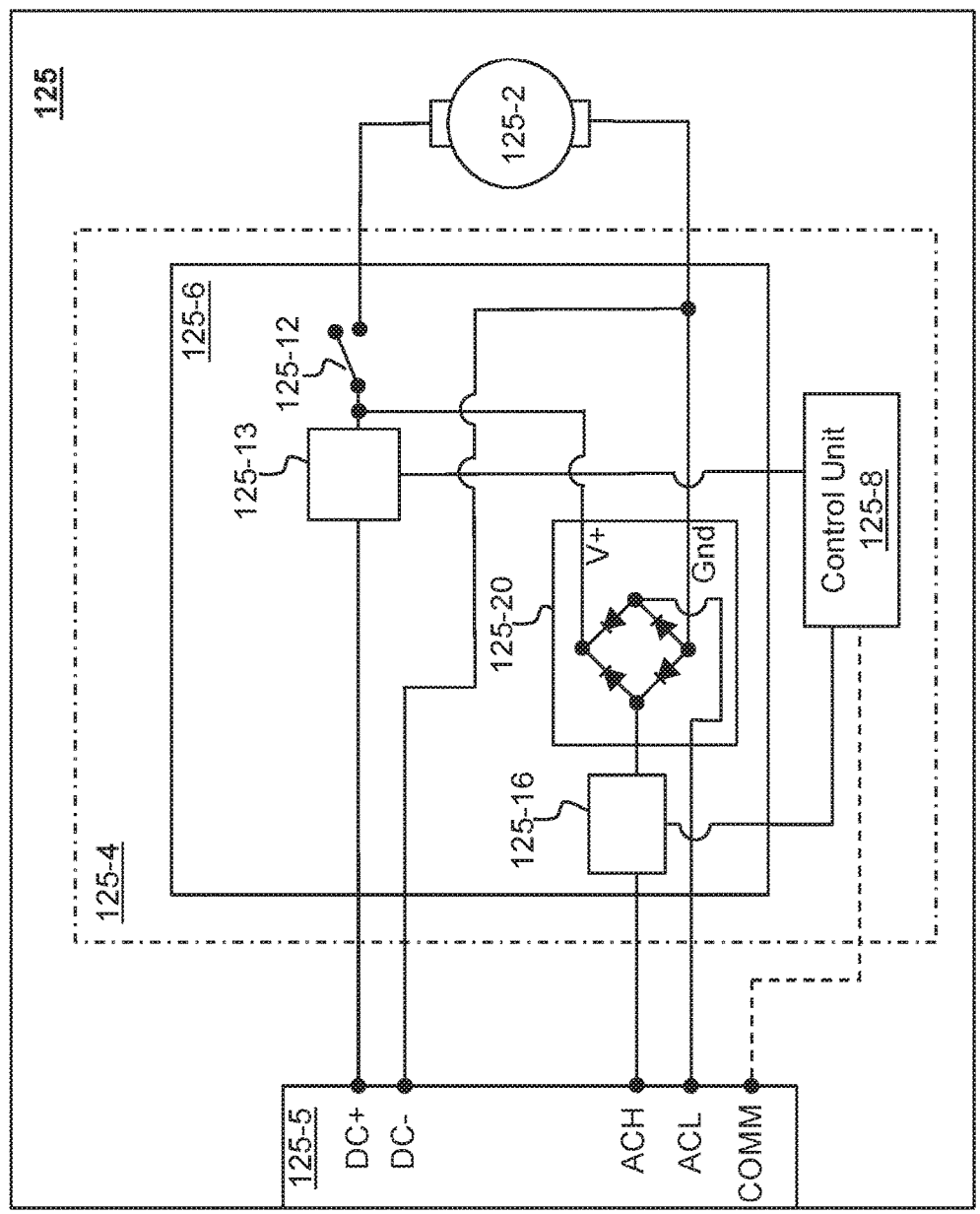
FIG. 8D depicts another exemplary system block diagram of a constant-speed AC/DC power tool with a brushed DC motor where power supplied from an AC power supply has a nominal voltage significantly different from nominal voltage provided from a DC power supply, according to an alternative embodiment.

In yet another implementation, as shown in FIG. 8D, tool 125 may be further provided with a phase-controlled AC switch 125-16. In an embodiment, AC switch 125-16 is arranged in series with the V+ output of the rectifier circuit 125-20. In an embodiment, AC switch 125-16 may include a triac or an SRC switch controlled by the control unit 125-8. In an embodiment, the control unit 125-8 may be configured to set a fixed conduction band (or firing angle) of the AC switch 125-16 corresponding to the operating voltage of the tool 125. For example, for a motor 125-2 having an operating voltage range of 60 to 100V but receiving AC power having a nominal voltage of 100-120V, the conduction band of the AC switch 125-16 may be fixedly set to approximately 120 degrees. In other words, the firing angle of the AC switch 125-16 may be set to 60 degrees. By setting the firing angle to approximately 60 degrees, the AC voltage supplied to the motor 125-2 will be approximately in the range of 70-90V, which corresponds to the operating voltage of the motor 125-2. In another example, for a motor 125-2 having an operating voltage range of 100 to 120V but receiving AC power having a nominal voltage of 220-240V, the conduction band of the AC switch 125-16 may be fixedly set to approximately 90 degrees. In other words, the firing angle of the AC switch 125-16 may be set to 90 degrees. By setting the firing angle to 90 degrees, the AC voltage supplied to the motor 125-2 will be approximately in the range of 100-120V, which corresponds to the operating voltage of the motor 125-2. In this manner, control unit 125-8 optimizes the supply of power to the motor 125-2.

In this manner, motor control circuit 125-4 optimizes a supply of power to the motor 125-2 depending on the nominal voltage of the AC or DC power lines such that motor 125-2 yields substantially uniform speed and power performance in a manner satisfactory to the end user, regardless of the nominal voltage provided on the AC or DC power lines.

D. Variable-Speed AC/DC Power Tools with Brushed DC Motors

Figure 9A:
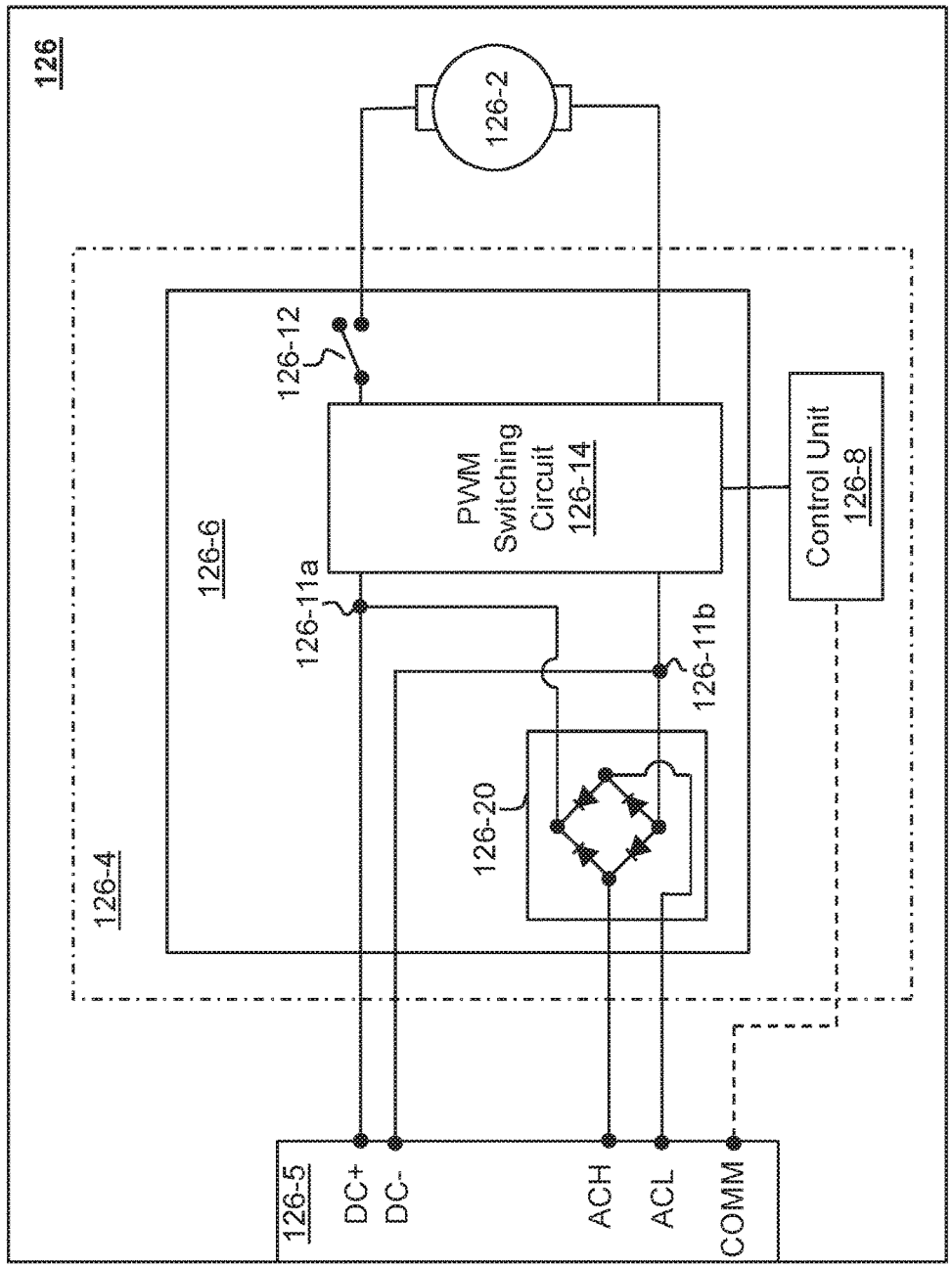
FIG. 9A depicts an exemplary system block diagram of a variable-speed AC/DC power tool with a brushed DC motor, according to an embodiment.
Figure 9B:
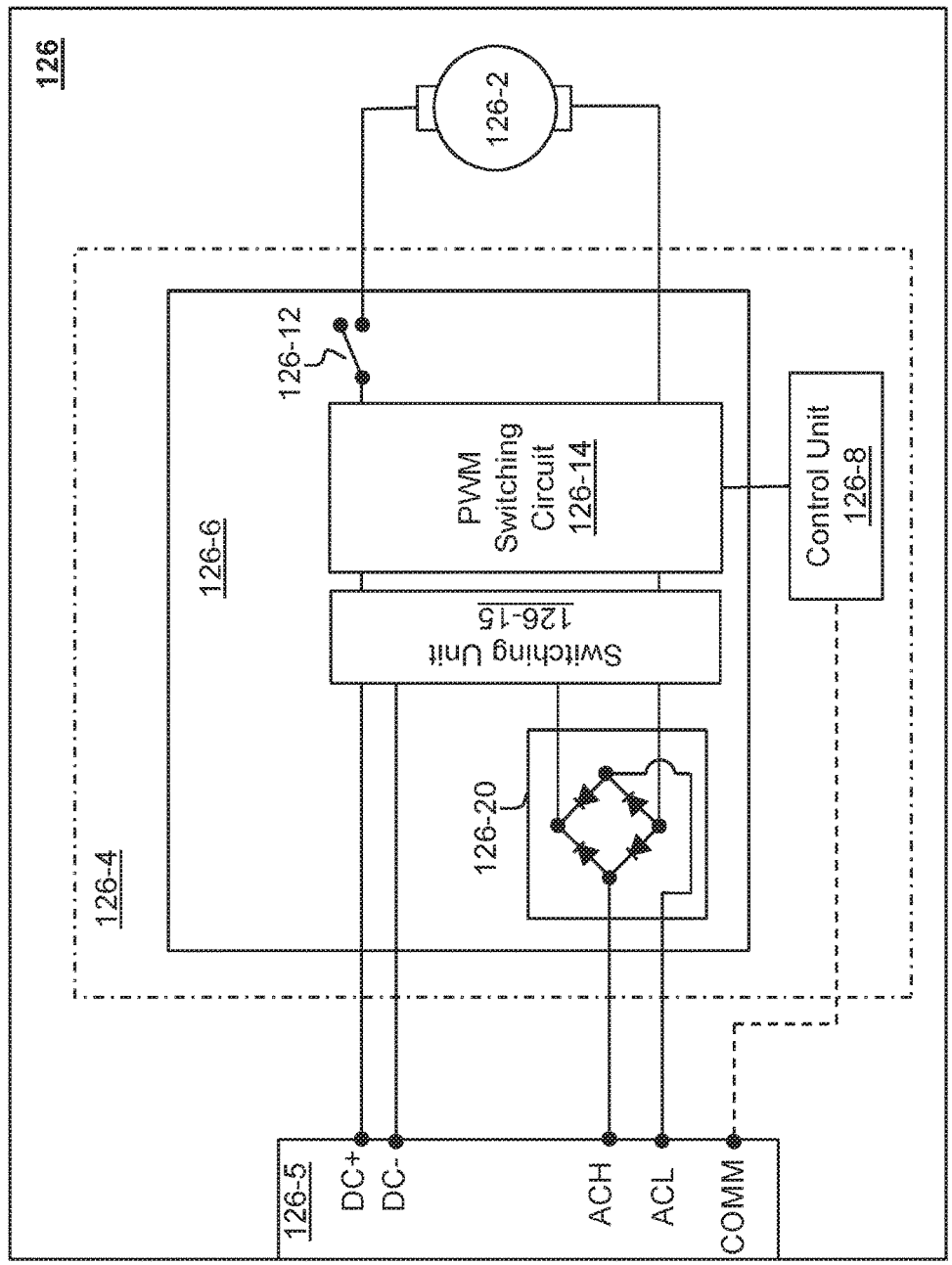
FIG. 9B depicts an exemplary system block diagram of the constant-speed AC/DC power tool of FIG. 9A additionally provided with a power supply switching unit, according to an embodiment.

Turning now to FIG. 9A-9B, the fourth subset of AC/DC power tools with brushed motors 122 includes variable-speed AC/DC power tools 126 with PMDC motors (herein also referred to as variable-speed PMDC motor tools 126). These include corded/cordless (AC/DC) power tools that operate at variable speed at no load and include brushed permanent magnet DC (PMDC) motors 126-2 configured to operate at a high rated voltage (e.g., 100 to 120V) and high power (e.g., 1500 to 2500 Watts). As discussed above, a PMDC brushed motor generally includes a wound rotor coupled to a commutator, and a stator having permanent magnets affixed therein. A PMDC motor, as the name implies, works with DC power only. This is because the permanent magnets on the stator do not change polarity, and as the AC power changes from a positive half-cycle to a negative half-cycle, the polarity change in the brushes brings the motor to a stand-still. For this reason, in an embodiment, as shown in FIGS. 9A and 9B, power from the AC power supply is passed through a rectifier circuit 126-20 to convert or remove the negative half-cycles of the AC power. In an embodiment, rectifier circuit 126-20 may be a full-wave rectifier to convert the negative half-cycles of the AC power to positive half-cycles. Alternatively, in an embodiment, rectifier circuit 126-20 may be a half-wave rectifier circuit to eliminate the half-cycles of the AC power. In an embodiment, variable-speed PMDC motor tools 126 may include high-power tools having variable speed control, such as concrete drills, hammers, grinders, saws, etc.

Many aspects of the variable-speed PMDC motor tool 126 are similar to those of variable-speed universal motor tool 124 previously discussed with reference to FIGS. 7A-7E. In an embodiment, variable-speed PMDC motor tool 126 is provided with a variable-speed actuator (not shown, e.g., a trigger switch, a touch-sense switch, a capacitive switch, a gyroscope, or other variable-speed input mechanism) engageable by a user. In an embodiment, the variable-speed actuator is coupled to or includes a potentiometer or other circuitry for generating a variable-speed signal (e.g., variable voltage signal, variable current signal, etc.) indicative of the desired speed of the motor 126-2. In an embodiment, variable-speed PMDC motor tool 126 may be additionally provided with an ON/OFF trigger or actuator (not shown) enabling the user to start the motor 126-2. Alternatively, the ON/OFF trigger functionally may be incorporated into the variable-speed actuator (i.e., no separate ON/OFF actuator) such that an initial actuation of the variable-speed trigger by the user acts to start the motor 126-2.

In an embodiment, a variable-speed PMDC motor tool 126 includes a motor control circuit 126-4 that operates the PMDC motor 126-2 at variable speed under no load or constant load. The power tool 126 further includes power supply interface 126-5 arranged to receive power from one or more of the aforementioned DC power supplies and/or AC power supplies. The power supply interface 126-5 is electrically coupled to the motor control circuit 126-4 by DC power lines DC+ and DC− (for delivering power from a DC power supply) and by AC power lines ACH and ACL (for delivering power from an AC power supply). The AC power lines ACH and ACL are inputted into the rectifier circuit 126-20.

Since the AC line is passed through the rectifier circuit 126-20, it no longer includes a negative component and thus, in an embodiment, does not work with a phase controlled switch for variable-speed control. Thus, in an embodiment, instead of separate DC and AC switch circuits as shown in FIGS. 7A and 7B, motor control circuit 126-4 is provided with a PWM switching circuit 126-14. PWM switching circuit may include a combination of one or more power semiconductor devices (e.g., diode, FET, BJT, IGBT, etc.) arranged as a chopper circuit, a half-bridge, or an H-bridge, e.g., as shown in FIGS. 7C-7E.

In an embodiment, motor control circuit 126-4 further includes a control unit 126-8. Control unit 126-8 may be arranged to control a switching operation of the PWM switching circuit 126-14. In an embodiment, control unit 126-8 may include a micro-controller or similar programmable module configured to control gates of power switches. In an embodiment, the control unit 126-8 is configured to control a PWM duty cycle of one or more semiconductor switches in the PWM switching circuit 126-14 in order to control the speed of the motor 126-2. In addition, control unit 126-8 may be configured to monitor and manage the operation of the power tool or battery packs coupled to the power supply interface 126-5 and interrupt power to the motor 126-2 in the event of a tool or battery fault condition (such as, battery over-temperature, tool over-temperature, battery over-current, tool over-current, battery over-voltage, battery under-voltage, etc.). In an embodiment, control unit 126-8 may be coupled to the battery pack(s) via a communication signal line COMM provided from power supply interface 126-5. The COMM signal line may provide a control or informational signal relating to the operation or condition of the battery pack(s) to the control unit 126-6. In an embodiment, control unit 126-6 may be configured to cut off power from the DC output line of power supply interface 126-5 if the COMM line indicates a battery failure or fault condition.

Similar to variable-speed universal motor tool 124 previously discussed with reference to FIGS. 7A-7E, variable-speed PMDC motor tool 126 may be further provided with an electro-mechanical ON/OFF switch 126-12 coupled to the ON/OFF trigger or actuator discussed above. The ON/OFF switch 126-12 simply connects or disconnects supply of power from the power supply to the motor 126-2. Alternatively, tool 126 may be provided without an ON/OFF switch 126-12. In that case, control unit 126-8 may be configured to deactivate PWM switching circuit 126-14 until it detects a user actuation of the ON/OFF trigger or actuator (or initial actuator of the variable-speed actuator if ON/OFF trigger functionally is be incorporated into the variable-speed actuator). The control unit 126-8 may then begin operating the motor 126-2 by activating one or more of the switches in PWM switching circuit 126-14.

Referring to FIG. 9A, the tool 126 is depicted according to one embodiment, where the ACH and DC+ power lines are coupled together at common positive node 126-11*a*, and the ACL and DC− power lines are coupled together at a common negative node 126-11*b*. In this embodiment, ON/OFF switch 126-12 and PWM switching circuit 126-14 are arranged between the positive common node 126-11*a* and the motor 126-2. To ensure that only one of the AC or DC power supplies are utilized at any given time and to minimize leakage, in an embodiment, a mechanical lockout (embodiments of which are discussed in more detail below) may be utilized. In an exemplary embodiment, the mechanical lockout may physically block access to the AC or DC power supplies at any given time.

In FIG. 9B, variable-speed PMDC motor tool 126 is depicted according to an alternative embodiment, where the DC power lines DC+/DC- and the AC power lines ACH/ACL are isolated from each other via a power supply switching unit 126-15 to ensure that power cannot be supplied from both the AC power supply and battery pack(s) at the same time (even if the power supply interface is coupled to both AC and DC power supplies). The power supply switching unit 126-15 may be configured similarly to any of the configurations of power supply switching unit 123-15 in FIGS. 6B-6D, i.e., relays, single-pole double-throw switches, double-pole double-throw switches, or a combination thereof. It must be understood that while the power supply switching unit 126-15 in FIG. 9B is depicted between the rectifier circuit 126-20 and the PWM switching circuit 126-14, the power supply switching unit 126-15 may alternatively be provided directly on the AC and DC line outputs of the power supply interface 126-5.

1. Variable-Speed Brushed DC Tools with Power Supplies Having Comparable Voltage Ratings In FIGS. 9A and 9B described above, power tools 126 are designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). Specifically, the motor 126-2 and power unit 126-6 components of power tools 126 are designed and optimized to handle high-rated voltage of 100 to 120V, preferably 90V to 132V. The motor 126-2 also has an operating voltage or operating voltage range that may be equivalent to, fall within, or correspond to the operating voltage or the operating voltage range of the tool 126.

In an embodiment, the power supply interface 126-5 is arranged to provide AC power line having a nominal voltage in the range of 100 to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 126-5 both correspond to (e.g., match, overlap with, or fall within) the operating voltage range of the power tool 125 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power.

2. Variable-Speed Brushed DC Tools with Power Supplies Having Disparate Voltage Ratings According to another embodiment of the invention, voltage provided by the AC power supply has a nominal voltage that is significantly different from a nominal voltage provided from the DC power supply. For example, the AC power line of the power supply interface 126-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the power tool motor 126-2 at significantly different voltage levels may yield significant differences in power tool performance, in particular the rotational speed of the motor, which may be noticeable and in some cases unsatisfactory to the users. Also supplying voltage levels outside the operating voltage range of the motor 126-2 may damage the motor and the associated switching components. Thus, in an embodiment of the invention herein described, the motor control circuit 126-4 is configured to optimize a supply of power to the motor (and thus motor performance) 126-2 depending on the nominal voltage of the AC or DC power lines such that motor 126-2 yields substantially uniform speed and power performance in a manner satisfactory to the end user, regardless of the nominal voltage provided on the AC or DC power lines.

In this embodiment, motor 126-2 may be designed and configured to operate at a voltage range that encompasses the nominal voltage of the DC power line. In an exemplary embodiment, motor 126-2 may be designed to operate at a voltage range of for example 60V to 90V (or more broadly ±10% at 54V to 99V) encompassing the nominal voltage of the DC power line of the power supply interface 126-5 (e.g., 72 VDC or 90 VDC), but lower than the nominal voltage of the AC power line (e.g., 220V-240V). In another exemplary embodiment, motor 126-2 may be designed to operate at a voltage range of 100V to 120V (or more broadly ±10% at 90V to 132V), encompassing the nominal voltage of the DC power line of the power supply interface 126-5 (e.g., 108 VDC), but lower than the nominal voltage range of 220-240V of the AC power line.

In order for motor 126-2 to operate with the higher nominal voltage of the AC power line, the motor control circuit 126-4 may be design to optimize supply of power to the motor 126-2 according to various implementations discussed herein.

In one implementation, rectifier circuit 126-20 may be provided as a half-wave diode bridge rectifier. As persons skilled in the art shall recognize, a half-wave rectified waveform will have about approximately half the average nominal voltage of the input AC waveform. Thus, in a scenario where the nominal voltage of the AC power line is in the range of 220-240V and the motor 126-2 is designed to operate at a voltage range of 100V to 120V, the rectifier circuit 126-20 configured as a half-wave rectifier will provide an average nominal AC voltage of 110-120V to the motor 126-2, which is within the operating voltage range of the motor 126-2.

In another implementation, control unit 126-8 may be configured to control the PWM switching circuit 126-14 differently based on the input voltage being provided. Specifically, control unit 126-8 may be configured to perform PWM on the PWM switching circuit 126-14 switches at a normal duty cycle range of 0 to 100% in DC mode (i.e., when power is being supplied via DC+/DC− lines), and perform PWM on the switches at a duty cycle range from 0 to a maximum threshold value corresponding to the operating voltage of the motor 126-2 in AC mode (i.e., when power is being supplied via ACH/ACL lines).

For example, for a motor 126-2 having an operating voltage range of 60 to 100V but receiving AC power having a nominal voltage of 100-120V, when control unit 126-8 senses AC current on the AC power line of power supply interface 126-5, it controls a PWM switching operation of PWM switching circuit 126-14 at duty cycle in the range of from 0 up to a maximum threshold value, e.g., 70%. In this embodiment, running at variable speed, the duty cycle will be adjusted according to the maximum threshold duty cycle. Thus, for example, when running at half-speed, the PWM switching circuit 126-14 may be run at 35% duty cycle. This results in a voltage level of approximately 70-90V being supplied to the motor 126-2 when operating from an AC power supply, which corresponds to the operating voltage of the motor 126-2.

In this manner, motor control circuit 126-4 optimizes a supply of power to the motor 126-2 depending on the nominal voltage of the AC or DC power lines such that motor 126-2 yields substantially uniform speed and power performance in a manner satisfactory to the end user, regardless of the nominal voltage provided on the AC or DC power lines.

E. AC/DC Power Tools with Brushless Motors

Figure 10A:
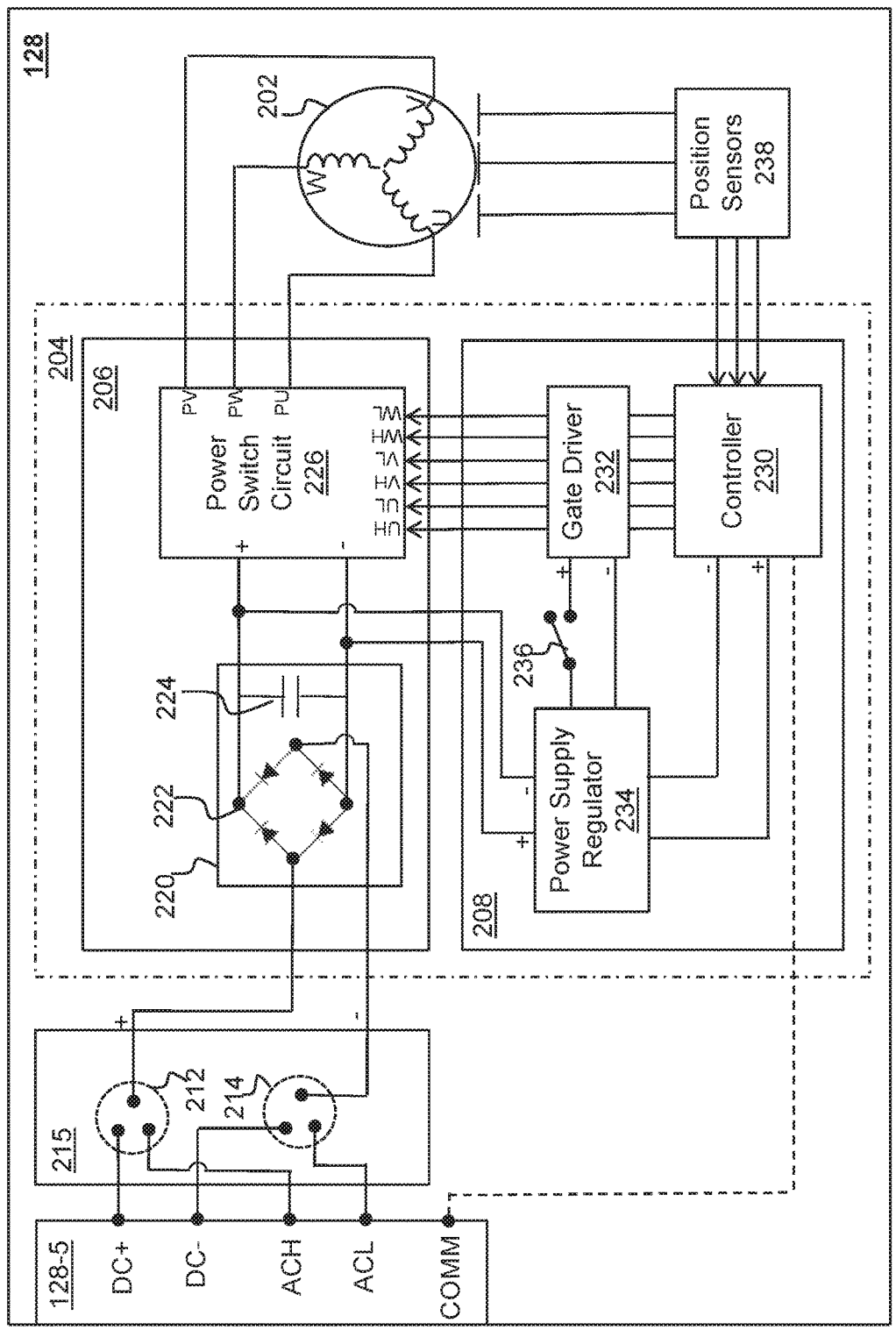
FIG. 10A depicts an exemplary system block diagram of an AC/DC power tool with a three-phase brushless DC motor having a power supply switching unit and a motor control circuit, according to an embodiment.
Figure 10B:
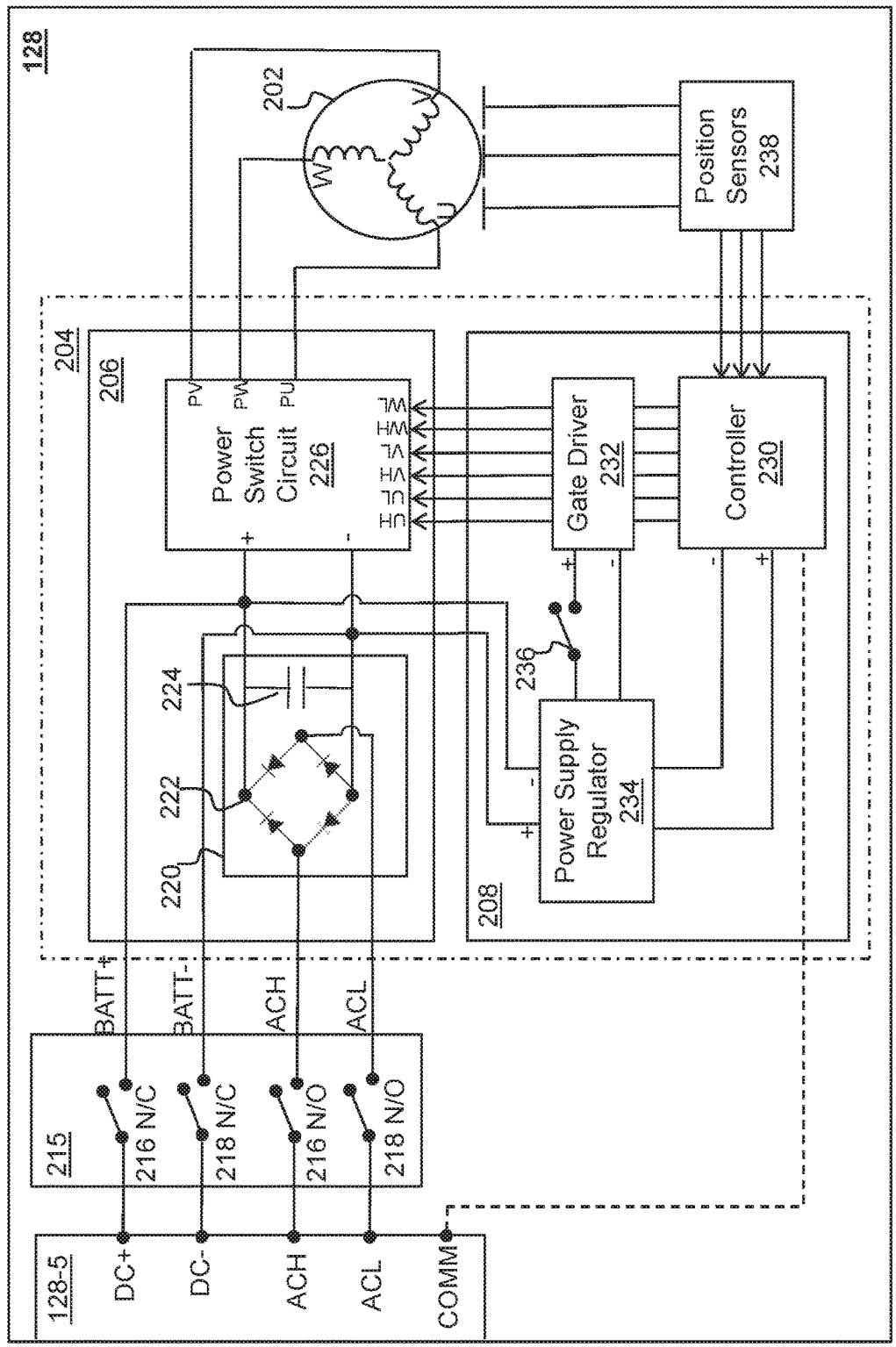
FIG. 10B depicts an exemplary system block diagram of the AC/DC power tool of FIG. 10A having an alternative power supply switching unit, according to an embodiment.
Figure 10C:
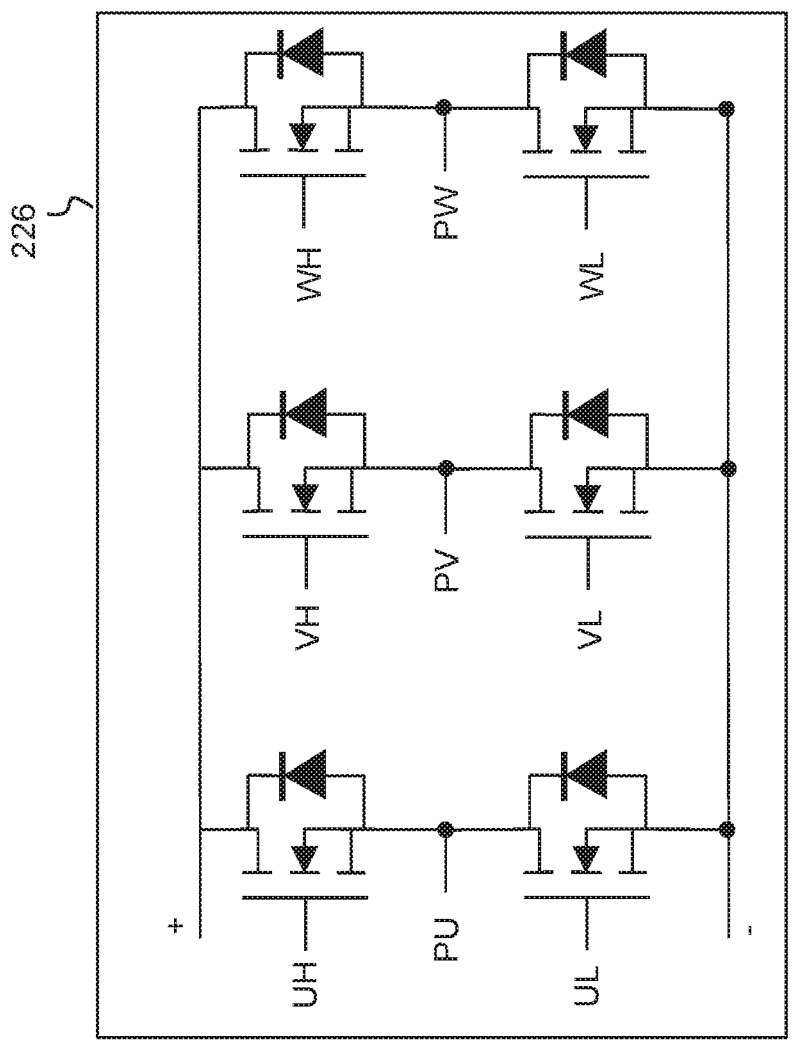
FIG. 10C depicts an exemplary power switch circuit having a three-phase inverter bridge, according to an embodiment.

Referring now to FIGS. 10A-10C, the set of AC/DC power tools 128 with brushless motors (herein referred to as brushless tools 128) is described herein. In an embodiment, these include constant speed or variable speed AC/DC power tools with brushless DC (BLDC) motors 202 that are electronically commutated (i.e., are not commutated via brushes) and are configured to operate at a high rated voltage (e.g., 100-120V, preferably 90V to 132V) and high power (e.g., 1500 to 2500 Watts). A brushless motor described herein may be a three-phase permanent magnet synchronous motor including a rotor having permanent magnets and a wound stator that is commutated electronically as described below. The stator windings are designated herein as U, V, and W windings corresponding to the three phases of the motor 202. The rotor is rotationally moveable with respect to the stator when the phases of the motor 202 (i.e., the stator windings) are appropriately energized. It should be understood, however, that other types of brushless motors, such as switched reluctance motors and induction motors, are within the scope of this disclosure. It should also be understood that the BLDC motor 202 may include fewer than or more than three phases. For details of a BLDC motor construction and control, reference is made to U.S. Pat. Nos. 6,538,403, 6,975,050, U.S. Patent Publication No. 2013/0270934, all of which are assigned to Black & Decker Inc. and each of which is incorporated herein by reference in its entirety.

In an embodiment, brushless tools 128 may include high powered tools for variable speed applications such as concrete drills, hammers, grinders, and reciprocating saws, etc. Brushless tools 128 may also include high powered tools for constant speed applications such as concrete hammers, miter saws, table saws, vacuums, blowers, and lawn mowers, etc.

In an embodiment, a brushless tool 128 can be operated at constant speed at no load (or constant load), or at variable speed at no load (or constant load) based on an input from a variable-speed actuator (not shown, e.g., a trigger switch, a touch-sense switch, a capacitive switch, a gyroscope, or other variable-speed input mechanism engageable by a user) arranged to provide a variable analog signal (e.g., variable voltage signal, variable current signal, etc.) indicative of the desired speed of the BLDC motor 202. In an embodiment, brushless tool 128 may be additionally provided with an ON/OFF trigger or actuator (not shown) enabling the user to start the motor 202. Alternatively, the ON/OFF trigger functionally may be incorporated into the variable-speed actuator (i.e., no separate ON/OFF actuator) such that an initial actuation of the variable-speed trigger by the user acts to start the motor 202.

In an embodiment, brushless tool 128 includes a power supply interface 128-5 able to receive power from one or more of the aforementioned DC power supplies and/or AC power supplies. The power supply interface 128-5 is electrically coupled to the motor control circuit 204 by DC power lines DC+ and DC− (for delivering power from a DC power supply) and by AC power lines ACH and ACL (for delivering power from an AC power supply).

In an embodiment, brushless tool 128 further includes a motor control circuit 204 disposed to control supply of power from the power supply interface 128-5 to BLDC motor 202. In an embodiment, motor control circuit 204 includes a power unit 206 and a control unit 208, discussed below.

As the name implies, BLDC motors are designed to work with DC power. Thus, in an embodiment, as shown in FIGS. 10A and 10B, in an embodiment, power unit 206 is provided with a rectifier circuit 220. In an embodiment, power from the AC power lines ACH and ACL is passed through the rectifier circuit 220 to convert or remove the negative half-cycles of the AC power. In an embodiment, rectifier circuit 220 may include a full-wave bridge diode rectifier 222 to convert the negative half-cycles of the AC power to positive half-cycles. Alternatively, in an embodiment, rectifier circuit 220 may include a half-wave rectifier to eliminate the half-cycles of the AC power. In an embodiment, rectifier circuit 220 may further include a link capacitor 224. As discussed later in this disclosure, in an embodiment, link capacitor 224 has a relatively small value and does not smooth the full-wave rectified AC voltage, as discussed below. In an embodiment, capacitor 224 is a bypass capacitor that removes the high frequency noise from the bus voltage.

Power unit 206, in an embodiment, may further include a power switch circuit 226 coupled between the power supply interface 128-5 and motor windings to drive BLDC motor 202. In an embodiment, power switch circuit 226 may be a three-phase bridge driver circuit including six controllable semiconductor power devices (e.g. FETs, BJTs, IGBTs, etc.).

FIG. 10C depicts an exemplary power switch circuit 226 having a three-phase inverter bridge circuit, according to an embodiment. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL, as discussed below. In an embodiment, the drains of the high-side FETs are coupled to the sources of the low-side FETs to output power signals PU, PV, and PW for driving the BLDC motor 202.

Referring back to FIGS. 10A and 10B, control unit 208 includes a controller 230, a gate driver 232, a power supply regulator 234, and a power switch 236. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 202 rotor. In an embodiment, position sensors 238 may be Hall sensors. It should be noted, however, that other types of positional sensors may be alternatively utilized. It should also be noted that controller 230 may be configured to calculate or detect rotational positional information relating to the motor 202 rotor without any positional sensors (in what is known in the art as sensorless brushless motor control). Controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply from power supply interface 128-5 to a voltage level compatible for operating the controller 230 and/or the gate driver 232. In an embodiment, power supply regulator 234 may include a buck converter and/or a linear regulator to reduce the power voltage of power supply interface 128-5 down to, for example, 15V for powering the gate driver 232, and down to, for example, 3.2V for powering the controller 230.

In an embodiment, power switch 236 may be provided between the power supply regulator 234 and the gate driver 232. Power switch 236 may be an ON/OFF switch coupled to the ON/OFF trigger or the variable-speed actuator to allow the user to begin operating the motor 202, as discussed above. Power switch 236 in this embodiment disables supply of power to the motor 202 by cutting power to the gate drivers 232. It is noted, however, that power switch 236 may be provided at a different location, for example, within the power unit 206 between the rectifier circuit 220 and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

In an embodiment of the invention, in order to minimize leakage and to isolate the DC power lines DC+/DC− from the AC power lines ACH/ACL, a power supply switching unit 215 may be provided between the power supply interface 128-5 and the motor control circuit 204. The power supply switching unit 215 may be utilized to selectively couple the motor 202 to only one of AC or DC power supplies. Switching unit 215 may be configured to include relays, single-pole double-throw switches, double-pole double-throw switches, or a combination thereof.

In the embodiment of FIG. 10A, power supply switching unit 215 includes two double-pole single-throw switches 212, 214 coupled to the DC power lines DC+/DC− and the AC power lines ACH/ACL. Switch 212 includes two input terminals coupled to DC+ and ACH terminals of the DC and AC lines, respectively. Similarly, switch 214 includes two input terminals coupled to DC− and ACL terminals of the DC and AC lines, respectively. Each switch 212, 214 includes a single output terminal, which is coupled to the rectifier 222.

In an alternative embodiment shown in FIG. 10B, power supply switching unit 215 two double-pole double-throw switches 216, 218 coupled to the DC power lines DC+/DC− and the AC power lines ACH/ACL. Switches switch 216, 218 include two output terminals instead of one, which allow the DC power line DC+/DC− to bypass rectifier 222 and be coupled directly to the +/− terminals of the power switch circuit 226.

1. Brushless Tools with Power Supplies Having Comparable Voltage Ratings

In an embodiment, power tools 128 described above may be designed to operate at a high-rated voltage range of, for example, 100V to 120V (which corresponds to the AC power voltage range of 100V to 120 VAC), more broadly 90V to 132V (which corresponds to ±10% of the AC power voltage range of 100 to 120 VAC), and at high power (e.g., 1500 to 2500 Watts). Specifically, the BLDC motor 202, as well as power unit 206 and control unit 208 components, are designed and optimized to handle high-rated voltage of 100 to 120V, preferably 90V to 132V. The motor 202 also has an operating voltage or operating voltage range that may be equivalent to, fall within, or correspond to the operating voltage or the operating voltage range of the tool 128.

In an embodiment, the power supply interface 128-5 is arranged to provide AC power line having a nominal voltage in the range of 100V to 120V (e.g., 120 VAC at 50-60 Hz in the US, or 100 VAC in Japan) from an AC power supply, or a DC power line having a nominal voltage in the range of 100 to 120V (e.g., 108 VDC) from a DC power supply. In other words, the DC nominal voltage and the AC nominal voltage provided through the power supply interface 128-5 both correspond to (e.g., match, overlap with, or fall within) each other and the operating voltage range of the power tool 128 (i.e., high-rated voltage 100V to 120V, or more broadly approximately 90V to 132V). It is noted that a nominal voltage of 120 VAC corresponds to an average voltage of approximately 108V when measured over the positive half cycles of the AC sinusoidal waveform, which provides an equivalent speed performance as 108 VDC power. In an embodiment, as discussed in detail below, the link capacitor 224 is selected to have an optimal value that provides less than approximately 110V on the DC bus line from the 1210 VAC power supply. In an embodiment, the link capacitor 224 may be less than or equal to 50 μF in one embodiment, less than or equal to 20 μF in one embodiment, or less than or equal to 10 μF in one embodiment.

2. Brushless Tools with Power Supplies Having Disparate Voltage Ratings

According to an alternative embodiment of the invention, voltage provided by the AC power supply has a nominal voltage that is significantly different from a nominal voltage provided from the DC power supply. For example, the AC power line of the power supply interface 128-5 may provide a nominal voltage in the range of 100 to 120V, and the DC power line may provide a nominal voltage in the range of 60V-100V (e.g., 72 VDC or 90 VDC). In another example, the AC power line may provide a nominal voltage in the range of 220 to 240V, and the DC power line may provide a nominal voltage in the range of 100-120V (e.g., 108 VDC).

Operating the BLDC motor 202 at significantly different voltage levels may yield significant differences in power tool performance, in particular the rotational speed of the motor, which may be noticeable and in some cases unsatisfactory to the users. Also supplying voltage levels outside the operating voltage range of the motor 202 may damage the motor and the associated switching components. Thus, in an embodiment of the invention herein described, the motor control circuit 204 is configured to optimize a supply of power to the motor (and thus motor performance) 202 depending on the nominal voltage of the AC or DC power lines such that motor 202 yields substantially uniform speed and power performance in a manner satisfactory to the end user, regardless of the nominal voltage provided on the AC or DC power lines.

Accordingly, in an embodiment, while the motor 202 may be designed and configured to operate at one or more operating voltage ranges that correspond to both the nominal or rated voltages of the AC power supply line and the DC power supply line, the motor 202 may be designed and configured to operate at a more limited operating voltage range that may correspond to (e.g., match, overlap and/or encompass) one or neither of the AC and DC power supply rated (or nominal) voltages.

For example, in one implementation, motor 202 may be designed and configured to operate at a voltage range that corresponds to the nominal voltage of the DC power line. In an exemplary embodiment, motor 202 may be designed to operate at a voltage range of, for example, 60V to 100V, that corresponds to the nominal voltage of the DC power supply (e.g., 72 VDC or 90 VDC), but that is lower than the nominal voltage of the AC power supply (100V-120V). In another exemplary embodiment, motor 202 may be designed to operate at a voltage range of, for example, 100V to 120V, or more broadly 90 to 132V, that corresponds to the nominal voltage of the DC power supply (e.g., 108 VDC), but lower than the nominal voltage range of 220-240V of the AC power supply. In this implementation, control unit 208 may be configured to reduce the effective motor performance associated with the AC power line of the power supply interface 128-5 to correspond to the operating voltage range of the motor 202, as described below in detail.

In another implementation, motor 202 may be designed and configured to operate at a voltage range that corresponds to the nominal voltage of the AC power supply. For example, motor 202 may be designed to operate at a voltage range of, for example 120V to 120V that corresponds to the nominal voltage of the AC power supply (e.g., 100 VAC to 120 VAC), but higher than the nominal voltage of the DC power supply (e.g., 72 VDC or 90 VDC). In this implementation, control unit 208 may be configured to boost the effective motor performance associated with the DC power line to a level that corresponds to the operating voltage range of the motor 202, as described below in detail.

In yet another implementation, motor 202 may be designed to operate at a voltage range of that does not correspond to either the AC or the DC nominal voltages. For example, motor 202 may be designed to operate at a voltage range of 150V to 170V, or more broadly 135V to 187V (which is ±10% of the voltage range of 150 to 170 VAC), which may be higher than the nominal voltage of the DC power line of the power supply interface 128-5 (e.g., 108 VDC), but lower than the nominal voltage range (e.g., 220-240V) of the AC power line. In this implementation, control unit 208 may be configured to reduce the effective motor performance associated with the AC power line and boost the effective motor performance associated with the DC power line, as described below in detail.

In yet another implementation, motor 202 may be designed to operate at a voltage range that may or may not correspond to the DC nominal voltages depending on the type and rating of the battery pack(s) being used. For example, motor 202 may be designed to operate at a voltage range of, for example 90V to 132V. This voltage range may correspond to the combined nominal voltage of some combination of battery packs previously discussed (e.g. two medium-rated voltage packs for a combined nominal voltage of 108 VDC), but higher than the nominal voltage of other battery pack(s) (e.g., a medium-rated voltage pack and a low-rated voltage pack used together for a combined nominal voltage of 72 VDC). In this implementation, control unit 208 may be configured to sense the voltage received from the one or more battery pack(s) and optimize the supply of power to the motor 202 accordingly. Alternatively, control unit 208 may receive a signal from the coupled battery pack(s) or the battery supply interface 128-5, indicating the type or rated voltage of battery pack(s) being used. In this implementation, control unit 208 may be configured to reduce or boost the effective motor performance associated with the DC power line, as described below in detail, depending on the nominal voltage or the voltage rating of the battery pack(s) being used. Specifically, in an embodiment, control unit 208 may be configured to reduce the effective motor performance associated with the DC power line when the DC power supply has a higher nominal voltage than the operating voltage range of the motor 202, and boost the effective motor performance associated with the DC power line when the DC power supply has a lower nominal voltage than the operating voltage range of the motor 202, as described below in detail.

Hereinafter, in the detailed discussion of techniques used to optimize (i.e., boost or lower) the effective performance of the motor 202 relative to the nominal voltage levels of the AC and/or DC power supplies and corresponding to the operating voltage range of the motor 202, references are made to "lower rated voltage power supply" and "higher rated voltage power supply," in an embodiment.

It is initially noted that while the embodiments below are described with reference to an AC/DC power tool operable to receive power supplies having disparate nominal (or rated) voltage levels, the principles discloses here may apply to a cordless-only power tool and/or an corded-only power tool as well. For example, in order for high rated voltage DC power tool 10A3 previously discussed (which may be optimized to work at a high power and a high voltage rating) to work acceptably with DC power supplies having a total voltage rating that is less than the voltage rating of the motor), the motor control circuit 14A may be configured to optimize the motor performance (i.e., speed and/or power output performance of the motor) based on the rated voltage of the low rated voltage DC battery packs 20A1. As discussed briefly above and in detail later in this disclosure, this may be done by optimizing (i.e., booting or reducing) an effective motor performance from the power supply to a level that corresponds to the operating voltage range (or voltage rating) of the high rated voltage DC power tool 10A3.

3. Optimization of Physical Motor Characteristics Based on Power Supply

In the above-described embodiments, reference was made to a motor 202 being designed to operate at a given operating voltage range in accordance to a desired operating voltage range of the tool. According to an embodiment, the physical design of the motor 202 may be optimized for the desired operating voltage range. In an embodiment, optimizing the motor typically involves increasing or decreasing the stack length, the thickness of the stator windings (i.e., field windings), and length of the stator windings. More speed may be provided as the number of turns of the stator windings is proportionally decreased, though motor torque suffers as a result. To make up for the torque, motor stack length may be proportionally increased. Also, as the number of turns of the stator windings is decreased more space is left in stator slots to proportionally provide thicker stator wires. In other words, thickness of stator windings may be increased as the number of turns of the field winding is decreased, and vice versa. As the thickness of the stator windings is increased, motor resistance also decreases. Motor power (i.e., maximum cold power output) is a function of the resistance and the motor voltage (i.e., back EMF of the motor). Thus, as thickness of the stack length and winding thickness is increased and the number of turns is decreased, motor power is increased for a given input voltage.

In an embodiment, these changes in motor characteristics may be utilized to improve the performance of the power tool 128 with a lower rated power supply to match a desired tool performance. In other words, the voltage ranging range of the motor 202 is increased in this manner to correspond to an operating voltage range of the power tool 128. In an exemplary embodiment, where the DC power supply has a lower nominal voltage than the AC power supply, modifying these design characteristics of the motor may be used to double the maximum cold power output of the power tool operating with a 60V DC power supply, for example, from 850 W to approximately 1700 W. In an embodiment, motor control unit 208 may then be configured to reduce the optimal performance of the power tool 128 with AC power to match the desired tool performance. This may be done via any of the techniques described in the next section below.

4. PWM Control Technique for Optimizing Motor Performance Based on Power Supply

Figure 11A:
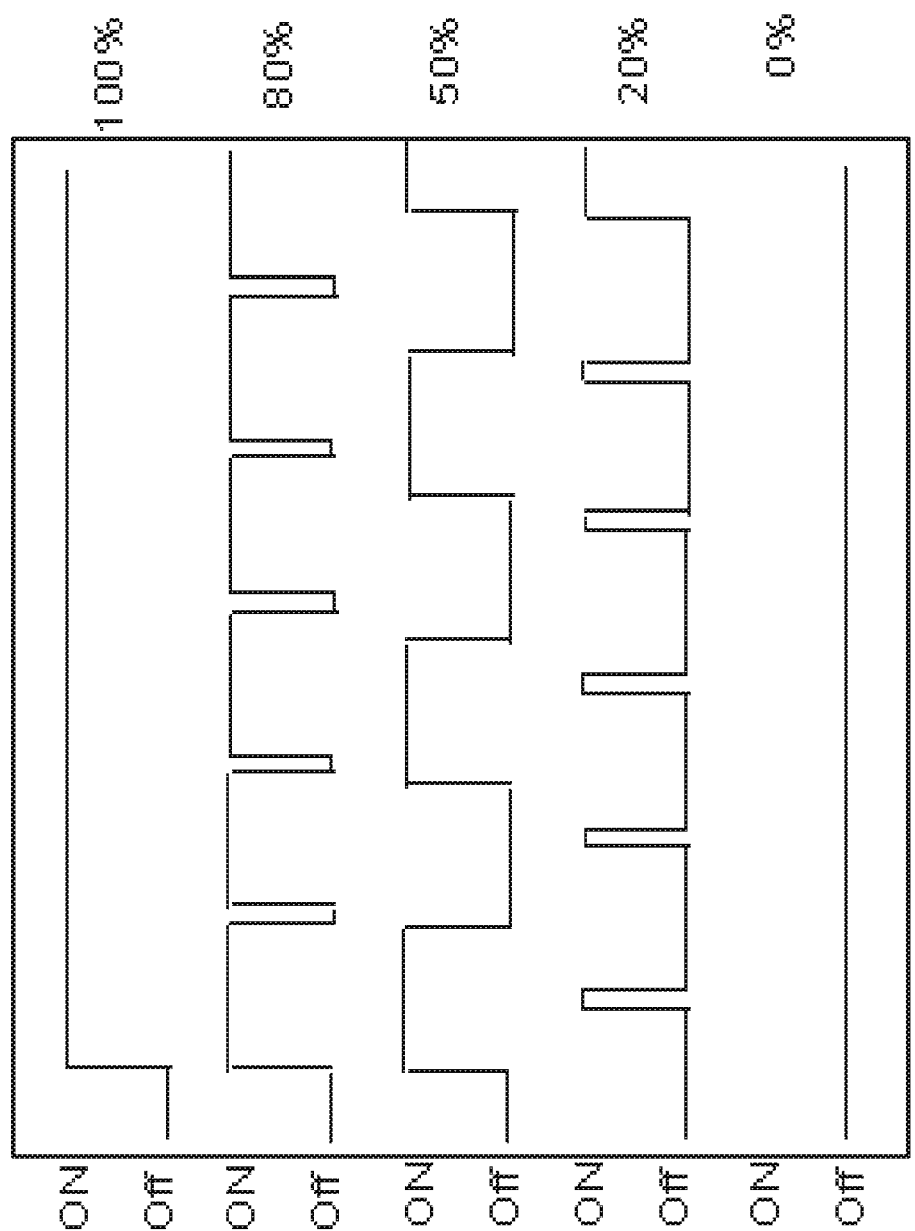
FIG. 11A depicts an exemplary waveform diagram of a drive signal for the power switch circuit within a single conduction band of a phase of the motor at various pulse-width modulation (PWM) duty cycle levels for variable-speed operation of the brushless motor, according to an embodiment.

FIG. 11A depicts an exemplary waveform diagram for a drive signal (i.e., any of UH, VH, or WH drive signals associated with the high-side switches) outputted by the controller 230 within a single conduction band of a corresponding phase (i.e., U, V, or H) of the motor. In the illustrated example, the drive signal is being modulated at 100% duty cycle, 80% duty cycle, 50% duty cycle, 20% duty cycle, and 0% duty cycle, for illustration. In this manner, controller 230 controls a speed of the motor 202 based on the variable-speed signal it receives from the variable-speed actuator (as previously discussed) to enable variable-speed operation of the motor 202 at constant load.

In order to optimize (i.e., lower) the effective performance of the motor 202 when powered by a higher rated voltage power supply, in an embodiment of the invention, the effective nominal voltage (and thus supply of power to the motor) of the higher rated voltage power supply may be reduced via a PWM control technique. In an embodiment, the control unit 208 may be configured to control a switching operation of power switch circuit 226 at a lower PWM duty cycle when receiving power from a high rated voltage power supply, as previously discussed with reference to FIGS. 7A, 7B, 9A and 9B.

For example, in an embodiment where motor 202 is designed to operate at a voltage range of 60V to 90V but receives AC power from a power supply having a nominal voltage in the range of 100-120V, the control unit 208 may be configured to set a maximum PWM duty cycle of the PWM switch circuit 226 components at a value in the range of 60% to 80% (e.g., 70%) when operating from motor 202 from the AC power line. In another example where motor 202 is designed to operate at a voltage range of 100V to 120V, or more broadly 90V to 130V, but receive AC power from a power supply having a nominal voltage in the range of 220V to 240V, the control unit 208 may be configured to set a maximum PWM duty cycle of the PWM switch circuit 226 components at a value in the range of 40% to 60% (e.g., 50%) when operating the motor 202 from the AC power line. The control unit 208 accordingly performs PWM control on the modulated AC supply (hereinafter referred to as the DC bus voltage, which is the voltage measured across the capacitor 224) proportionally from 0% up to the maximum PWM duty cycle.

In an exemplary embodiment, if the maximum duty cycle is set to 50%, the control unit 208 turns the drive signal UH, VH, or WH on the DC bus line ON at 0% duty cycle at no speed, to 25% duty cycle at half speed, and up to 50% duty cycle at full speed.

It is noted that any of the other method previously discussed with reference to power tools 123-126 (e.g., use of a half-wave diode rectifier bridge) may be additionally or alternatively utilized to lower the effective nominal voltage provided by the AC power supply to the power switch circuit 226.

It is further noted that the PWM control technique for motor performance optimization discussed above may be used in combination with the other techniques discussed later in this disclosure in order to obtain somewhat comparable speed and power performance from the motor 202 irrespective of the power supply voltage rating.

It is further noted that in some power tool applications, the PWM control scheme discussed herein may be applicable to both power supplies. Specifically, for power tool applications such as small angle grinders with a maximum power output of 1500 W, it may be desirable to optimize (i.e., lower) the effective performance of the motor 202 when power by either a 120V AC power supply (wherein the maximum PWM duty cycle may be set to, e.g., 50%), or a 72V DC power supply (wherein the maximum PWM duty cycle may be set to, e.g., 75%).

5. Current Limit for Optimization of Motor Performance Based on Power Supply

According to an embodiment of the invention, in order to optimize (i.e., lower) the effective performance of the motor 202 when powered by a higher voltage power supply, the motor control unit 208 may be configured to use a current limiting technique discussed herein.

Figure 11B:
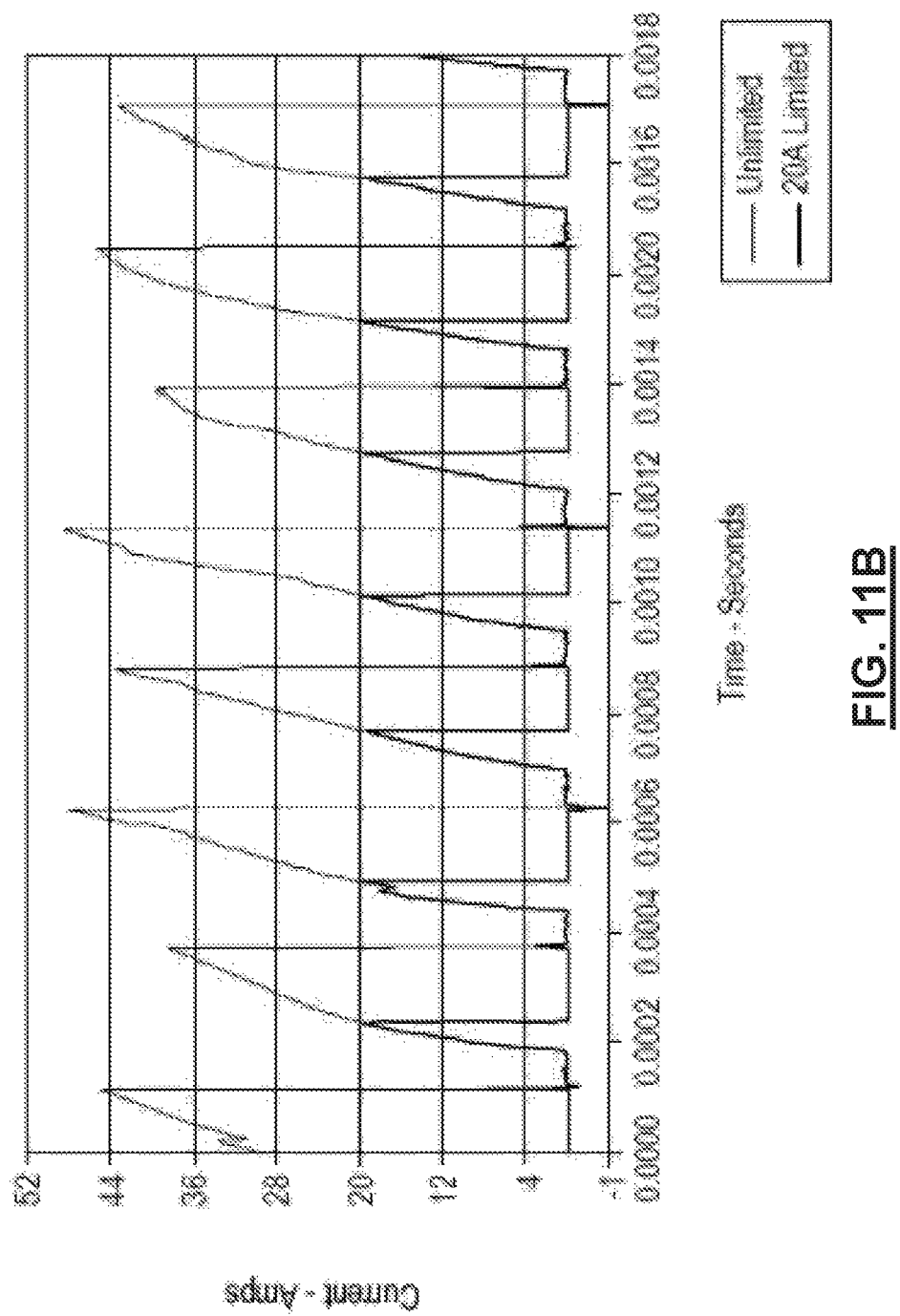
FIG. 11B depicts an exemplary current-time waveform implementing an exemplary 20 amp cycle-by-cycle current limit, according to an embodiment.

In an embodiment, control unit 208 may impose a cycle-by-cycle current limit to limit the maximum watts out of the motor 202 when operating a higher rated voltage power supply to match or fall within the performance of associated with the operating voltage range of the motor 202. When the instantaneous bus current in a given cycle exceeds a prescribed current limit, the drive signals to the switches in the PWM switch circuit 226 are turned off from the remainder of the cycle. At the beginning of the next cycle, the drive signals are restored. For each cycle, the instantaneous current continues to be evaluated in a similar manner. This principle is illustrated in FIG. 11B, where the solid line indicates the instantaneous current without a limit and the dash line indicates the instantaneous current with a 20 amp limit. Cycle-by-cycle current limit enables the power tool to achieve similar performance across different types of power supplies and under varying operating conditions as will be further described below.

Cycle-by-cycle current limiting can be implemented via a current sensor (not shown) disposed on the DC bus line and coupled to the controller 230. Specifically, a current sensor is configured to sense the current through the DC bus and provide a signal indicative of the sensed current to the controller 230. In an exemplary embodiment, the current sensor is implemented using a shunt resistor disposed in series between the rectifier 222 and the PWM switch circuit 226. Although not limited thereto, the shunt resistor may be positioned on the low voltage side of the DC bus. In this way, the controller 230 is able to detect the instantaneous current passing through the DC bus.

Figure 11C:
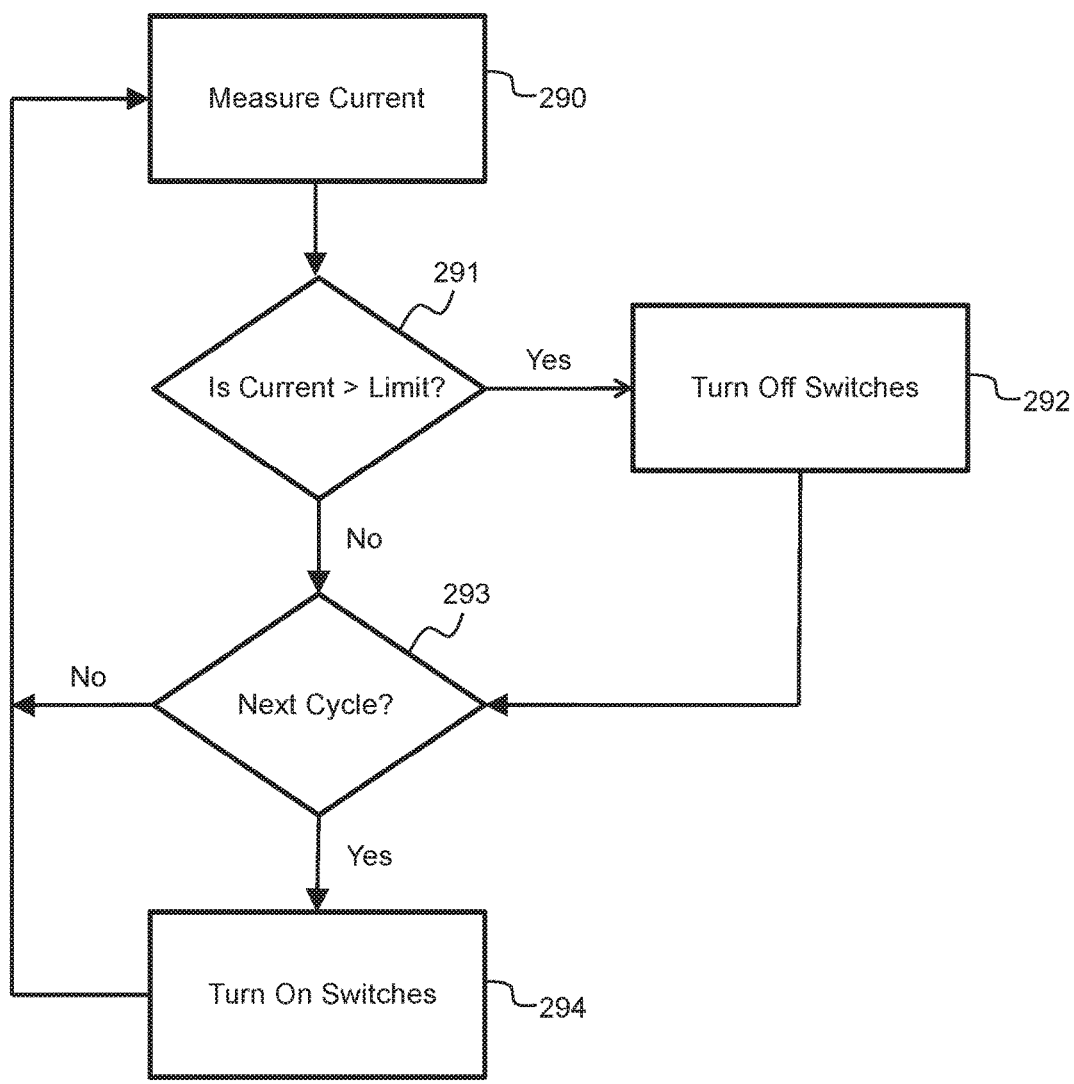
FIG. 11C depicts an exemplary flowchart for implementing cycle-by-cycle current limits.

The controller 230 is configured to receive a measure of instantaneous current passing from the rectifier to the switching arrangement operates over periodic time intervals (i.e., cycle-by-cycle) to enforce a current limit. With reference to FIG. 11C, the controller 230 enforces the current limit by measuring current periodically (e.g., every 5 microseconds) at 290 and comparing instantaneous current measures to the current limit at 291. If the instantaneous current measure exceeds the current limit, the controller 230 deactivates power switch circuit 226 switches at 292 for remainder of present time interval and thereby interrupts current flowing to the electric motor. If the instantaneous current measure is less than or equal to the current limit, the controller 230 continues to compare the instantaneous current measures to the current limit periodically for the remainder of the present time interval as indicated at 293. In an embodiment, such comparisons occur numerous times during each time interval (i.e. cycle). When the end of the present time interval is reached, the controller 230 reactivates power switch circuit 226 switches at 294 and thereby resumes current flow to the motor for the next cycle. In one embodiment, the duration of each time interval is fixed as a function of the given frequency at which the electric motor is controlled by the controller 230. For example, the duration of each time interval is set at approximately ten times an inverse of the frequency at which the electric motor is controlled by the controller. In the case the motor is controlled at a frequency of 10 kilohertz, the time interval is set at 100 microseconds. In other embodiments, the duration of each time interval may have a fixed value and no correlation with the frequency at which the electric motor is controlled by the controller.

In the example embodiment, the each time interval equals period of the PWM signals. In a constant speed tool under a no load (or constant load) condition, the duty cycle of the PWM drive signals is set, for example at 60%. In an embodiment, under load, the controller 230 operates to maintain a constant speed by increasing the duty cycle. If the current through the DC bus line increases above the current limit, the controller 230 interrupts current flow as described above which in effect reduces the duty cycle of the PWM signals. For a variable speed tool under a no load condition, the duty cycle of the PWM drive signals ranges for example from 15% to 60%, in accordance with user controlled input, such as a speed dial or a trigger switch. The controller 230 can increase or decrease the duty cycle of the PWM signals during a load condition or an over current limit condition in the same manner as described above. In one embodiment, speed control and current limiting may be implemented independently from each other by using three upper high-side power switches for speed control and the three low-side power switches for current limiting. It is envisioned that the two functions may be swapped between the upper and lower switches or combined together into one set of switches.

In the examples set forth above, the time interval remained fixed. When this period (time interval) remains fixed, then the electronic noise generated by this switching will have a well-defined fundamental frequency as well as harmonics thereof. For certain frequencies, the peak value of noise may be undesirable. By modulating the period over time, the noise is distributed more evenly across the frequency spectrum, thereby diminishing the noise amplitude at any one frequency. In some embodiment, it is envisioned that the direction of the time interval may be modulated (i.e., varied) over time to help distribute any noise over a broader frequency range.

In another embodiment, controller 230 enforces the cycle-by-cycle current limit by setting or adjusting the duty cycle of the PWM drive signals output from the gate driver circuit 232 to the power switch circuit 226. In an embodiment, the duty cycle of the PWM drive signals may be adjusted in this manner following the instant current cycle (i.e., at the beginning of the next cycle). In a fixed speed tool, the controller 230 will initially set the duty cycle of the drive signals to a fixed value (e.g., duty cycle of 75%). The duty cycle of the drive signals will remain fixed so long as the current through the DC bus remains below the cycle-by-cycle current limit. The controller 230 will independently monitor the current through the DC bus and adjust the duty cycle of the motor drive signals if the current through the DC bus exceeds the cycle-by-cycle current limit. For example, the controller 230 may lower the duty cycle to 27% to enforce the 20 amp current limit. In one embodiment, the duty cycle value may be correlated to a particular current limit by way of a look-up table although other methods for deriving the duty cycle value are contemplated by this disclosure. For variable speed tool, the controller 230 controls the duty cycle of the motor drive signals in a conventional manner in accordance with the variable-speed signal from the variable-speed actuator. The cycle-by-cycle current limit is enforced independently by the controller 230. That is, the controller will independently monitor the current through the DC bus and adjust the duty cycle of the drive signals only if the current through the DC bus exceeds the cycle-by-cycle current limit as described above.

In one embodiment, the cycle-by-cycle current limit is dependent upon the type and/or nominal voltage of the power supply. In an embodiment, depending on the nominal voltage of the AC or DC power supply, the controller 230 selects a current limit to enforce during operation of the power tool. In one embodiment, the current limit is retrieved by the controller 230 from a look-up table. An example look-up table is as follows:

| Source type | Nominal voltage | Current limit |
|---|---|---|
| AC | 120 V | 40 A |
| AC | 230 V | 20 A |
| DC | 120 V | 35 A |
| DC | 108 V | 40 A |
| DC | 60 V | 70 A |
| DC | 54 V | 80 A |

That is, in this exemplary embodiment, in a motor 202 having an operating voltage range of 100V to 120V, the controller 230 will enforce a 40 amp current limit when the tool is coupled to a 120V AC power supply but will enforce a 20 amp current limit when the tool is coupled to a 230V AC power supply. As a result, the effective output power of the tool is substantially the same. In an alternative embodiment where the power tool has an operating voltage range of 150V to 170V, controller 230 may enforce a 30 A current limit in order to reduce the effective performance of the motor 202 when powered by the 230V AC power supply.

Further, controller 230 is configured to enforce a 40 am current limit when the tool is coupled to a 108V DC power supply, but will enforce a slightly lower current limit (e.g., 35 amps) when the tool is coupled to a 120V DC power supply (e.g., when the tool is being supplied DC power from a generator or a welder). Similarly, controller 230 is configured to enforce a 80 am current limit when the tool is coupled to a 54V DC power supply, but will enforce a slightly lower current limit (e.g., 70 amps) when the tool is coupled to a 60V DC power supply. These current limits result in output power levels from the AC or DC power supplies to all be compatible with a motor 202 having an operating voltage range of 100V to 120V.

Further details for cycle-by-cycle current limiting and its applications are discussed in U.S. Provisional Application No. 62/000,307, filed May 19, 2014, titled "Cycle-By-Cycle Current Limit For Power Tools Having A Brushless Motor," and related U.S. Utility patent application having the same title filed concurrently herewith, each of which is incorporated herein by reference in its entirety.

It is noted that the cycle-by-cycle current limiting technique for optimization of motor performance discussed above may be used in combination any other motor performance optimization technique discussed in this disclosure in order to obtain somewhat comparable speed and power performance from the motor 202 irrespective of the power supply voltage rating.

6. Conduction Band and/or Advance Angle Control for Adjusting Motor Performance Based on Power Supply According to an embodiment of the invention, in order to optimize (i.e., boost or enhance) the effective performance of the motor 202 when powered by a higher rated voltage power supply, the control unit 208 may be configured to use a technique involving the conduction band and/or the advance angle (herein referred to as "CB/AA technique") described herein.

Figure 12A:
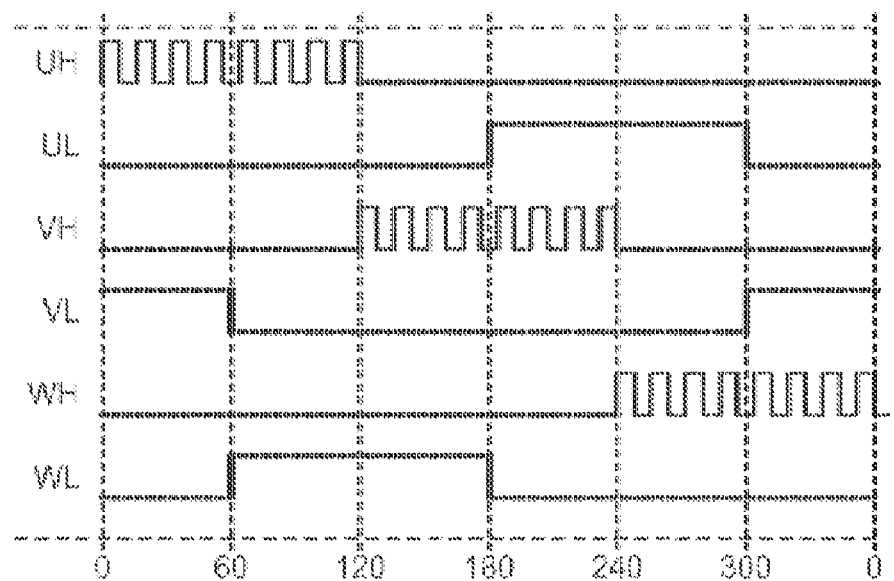
FIG. 12A depicts an exemplary waveform diagram of a pulse-width modulation (PWM) drive sequence of the three-phase inventor bridge circuit FIG. 10C within a full 360 degree conduction cycle, where each phase is being driven at a 120 degree conduction band (CB), according to an embodiment.

FIG. 12A depicts an exemplary waveform diagram of a pulse-width modulation (PWM) drive sequence of the three-phase inventor bridge circuit FIG. 10C within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor 202 rotational speed. For each phase, UH is pulse-width modulated by the control unit 208 within a 120° CB. During the CB of the high-side switch, the corresponding UL is kept low. The UL signal is then activated for a full 120° CB within a half cycle (180°) after the CB associated with the UL signal. The control unit 208 controls the amount of voltage provided to the motor, and thus the speed of the motor, via PWM control of the high-side switches.

It is noted that while the waveform diagram of FIG. 12A depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

Figure 12B:
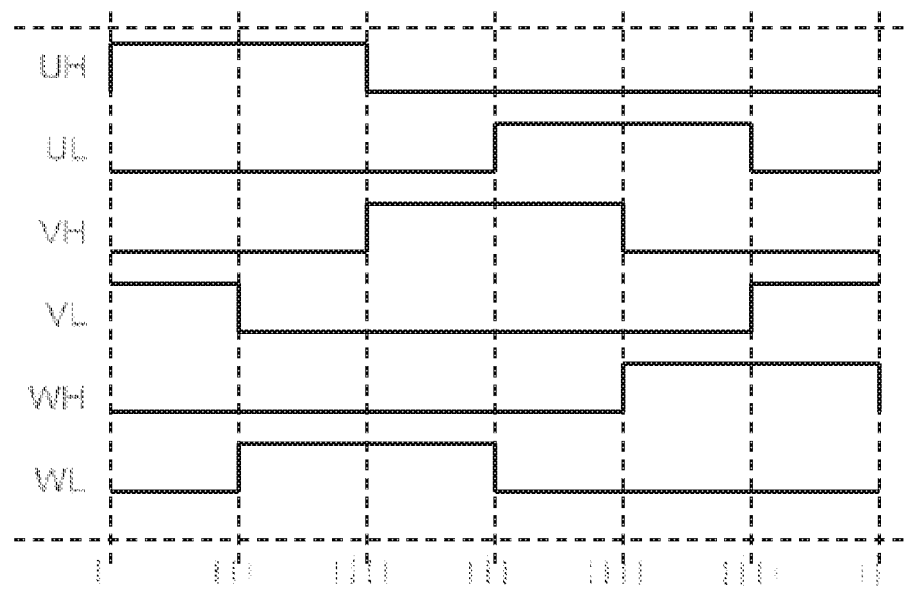
FIG. 12B depicts an exemplary waveform diagram of the drive sequence of FIG. 12A operating at full-speed, according to an embodiment.

FIG. 12B depicts an exemplary waveform diagram of the drive sequence of the three-phase inventor bridge discussed above operating at full-speed (i.e., maximum speed under constant-load condition). In this figure, the three high-side switches conduct at 100% PWM duty cycle during their respective 120° CBs, providing maximum power to the motor to operate at full-speed.

In a BLDC motor, due to imperfections in the commutation of the power switches and the inductance of the motor itself, current will slightly lag behind the back-EMF of the motor. This causes inefficiencies in the motor torque output. Therefore, in practice, the phase of the motor is shifted by an advance angle ("AA") of several degrees so the current supplied to the motor no longer lags the back-EMF of the motor. AA refers to a shifted angle Y of the applied phase voltage leading ahead a rotational EMF of the corresponding phase.

In addition, in an embodiment, the motor 202 may be an interior-permanent magnet (IPM) motor or other salient magnet motor. Salient magnet motors can be more efficient than surface-mount permanent magnet motors. Specifically, in addition to the magnet torque, a salient magnet motor includes a reluctance torque that varies as a function of the motor current (specifically, as a function of the square of the motor current), and therefore lags behind the magnet torque. In order to take advantage of this reluctance torque, in an embodiment, the AA shifted angle $\gamma$ is increased to encompass the lag of the reluctance torque. The added reluctance torque enables the salient magnet motor to produce 15 percent or more torque per amp than it would without the further shift in angle $\gamma$.

In an embodiment, AA may be implemented in hardware, where positional sensors are physically shifted at an angle with respect to the phase of the motor. Alternatively or additional, AA may be implanted in software, where the controller 230 is configured to advance the conduction band of each phase of the motor by the angle Y, as discussed herein.

Figure 12C:
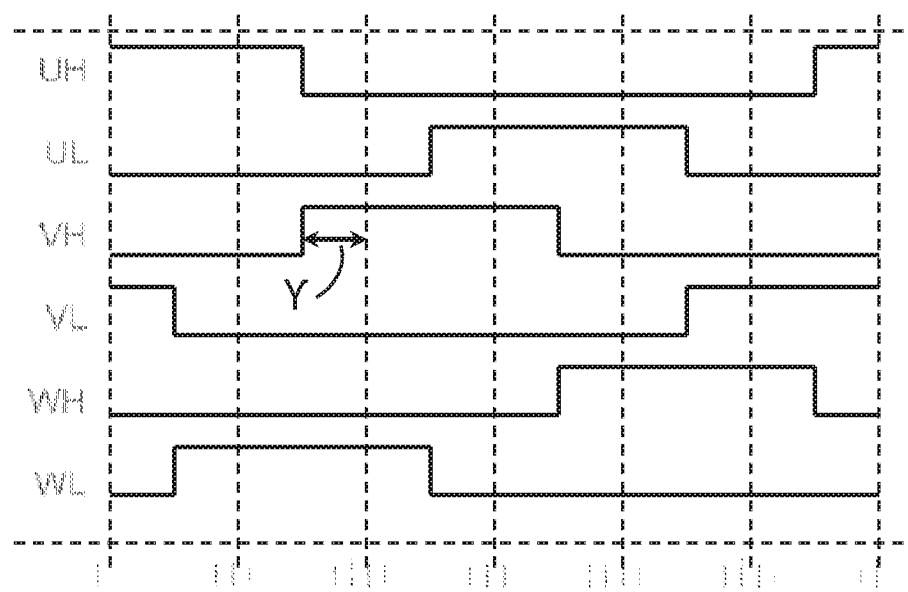
FIG. 12C depicts an exemplary waveform diagram corresponding to the drive sequence of FIG. 12B with an advance angle (AA) of γ=30°, according to an embodiment.

FIG. 12C depicts the waveform diagram of the drive sequence of FIG. 12B, shown with an AA of $\gamma=30°$, according to an embodiment. In an embodiment, AA of 30 degrees is sufficient (and is commonly used by those skilled in the art) in BLDC applications to account for the current lag with respect to the back-EMP of the motor and take advantage of the reluctance torque of salient magnet motors.

Figure 12D:
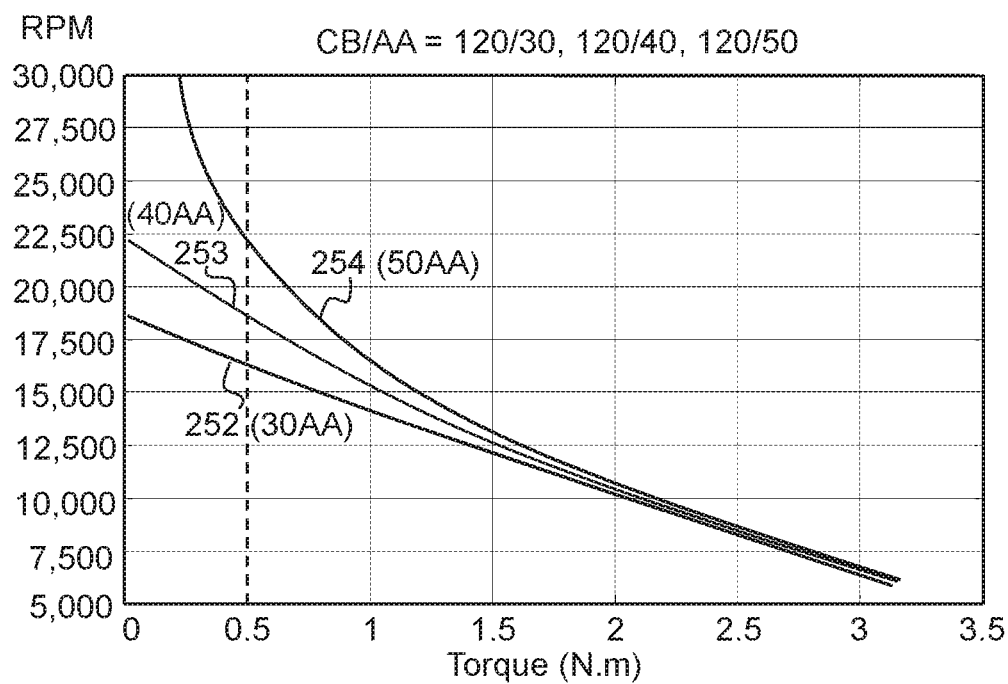
FIG. 12D depicts an exemplary speed-torque waveform diagram of an exemplary high powered tool showing the effect of increasing AA at a fixed CB of 120° on the speed/torque profile, according to an embodiment.

According to an embodiment, increasing the AA to a value greater than $\gamma=30°$ can result in increased motor speed performance. FIG. 12D depicts a speed/torque waveform diagram of an exemplary power tool 128, where increasing the AA at a fixed CB of 120° results in an upward shift in the speed/torque profile, i.e., from 252 ($\gamma=30°$), to 253 ($\gamma=40°$), to 254 ($\gamma=50°$). This shift is particularly significant at a low torque range (e.g., 0 to 1 N.m.), where motor speed can increase by approximately 20% from 252 to 253, and even more from 253 to 254 (particularly at very low torque range of, e.g., 0.2 N.m. where the speed can more than double). At a medium torque range (e.g., 1 to 2 N.m.), the increase in motor speed is noticeable, but not significant. At a high torque range (e.g., 2 N.m. and above), the increase in motor speed is minimal.

Figure 12E:
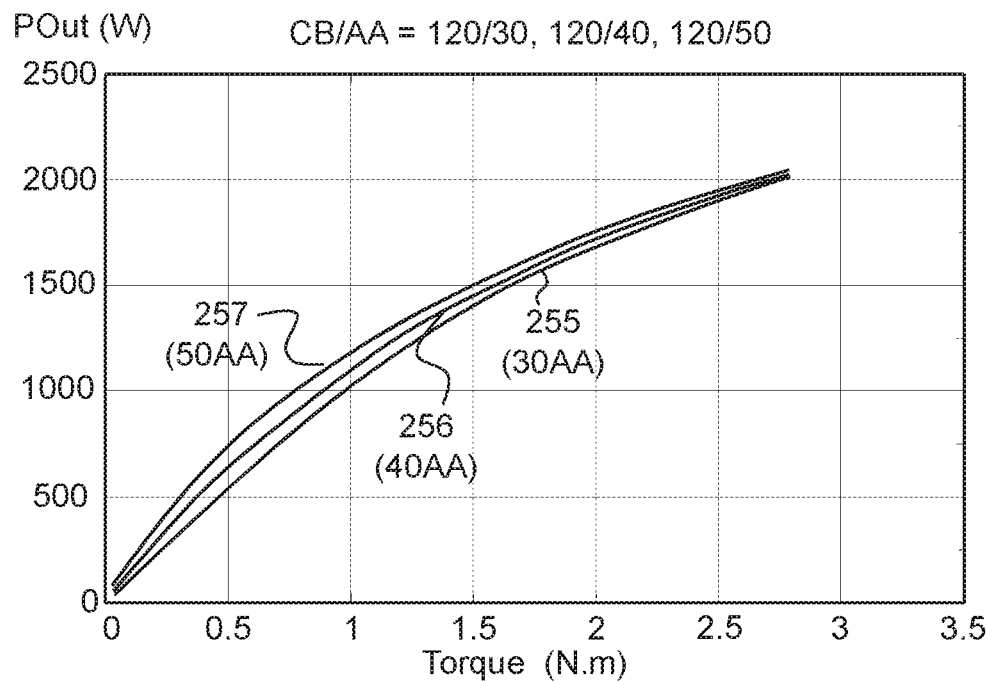
FIG. 12E depicts an exemplary power-torque waveform diagram of the same high powered tool showing the effect of increasing AA at a fixed CB of 120° on the power/torque profile, according to an embodiment.

Similarly, increasing the AA to a value greater than $\gamma=30°$ can result in increased power output. FIG. 12E depicts a power-out/torque waveform diagram of exemplary tool 128, where increasing the AA at fixed CB of 120° results in an upward shift in the power-out/torque profile, i.e., from 255 (AA=30°), to 256 (AA=40°), to 257 (AA=50°). This shift is somewhat significant at the low and medium torque range of, for example, up to 20% at approximately 1 N.m., but does not have a considerable effect on power output at the high torque range.

While not depicted in these figures, it should be understood that within the scope of this disclosure and consistent with the figures discussed above, power output and speed performance may similarly be reduced if AA is set to a value lower than $\gamma=30°$ (e.g., $\gamma=10°$ or) 20°.

According to an embodiment of the invention, in order to optimize the effective performance of the motor 202 when tool 128 is powered by a power supply that has a nominal (or rated) voltage that is higher or lower than the operating voltage of the motor 202, the AA for the phases of the motor 202 may be set according to the voltage rating or nominal voltage of the power supply. Specifically, AA may be set to a higher value in order to boost the performance of the motor 202 when powered by a lower rated voltage power supply, and set to a lower value in order to reduce the performance of the motor 202 when powered by a higher rated voltage power supply, so that somewhat equivalent or comparable speed and power performance is obtained from the motor 202 irrespective of the power supply voltage rating. For example, in an embodiment, control unit 208 may be configured to set AA of $\gamma=30°$ when power supply has a nominal voltage that falls within or matches the operating voltage range of the motor 202 (e.g., 70-90V), but set AA to a higher value (e.g., $\gamma=50°$) when power tool 128 is coupled to a lower rated voltage power supply (e.g., 54 VDC), and/or set AA to a lower value (e.g., $\gamma=20°$) when power tool 128 is coupled to a higher rated voltage power supply (e.g., 120 VAC). In an embodiment, control unit 208 may be provided with a look-up table or an equation defining a functional relationship between AA and the power supply voltage rating.

Figure 12F:
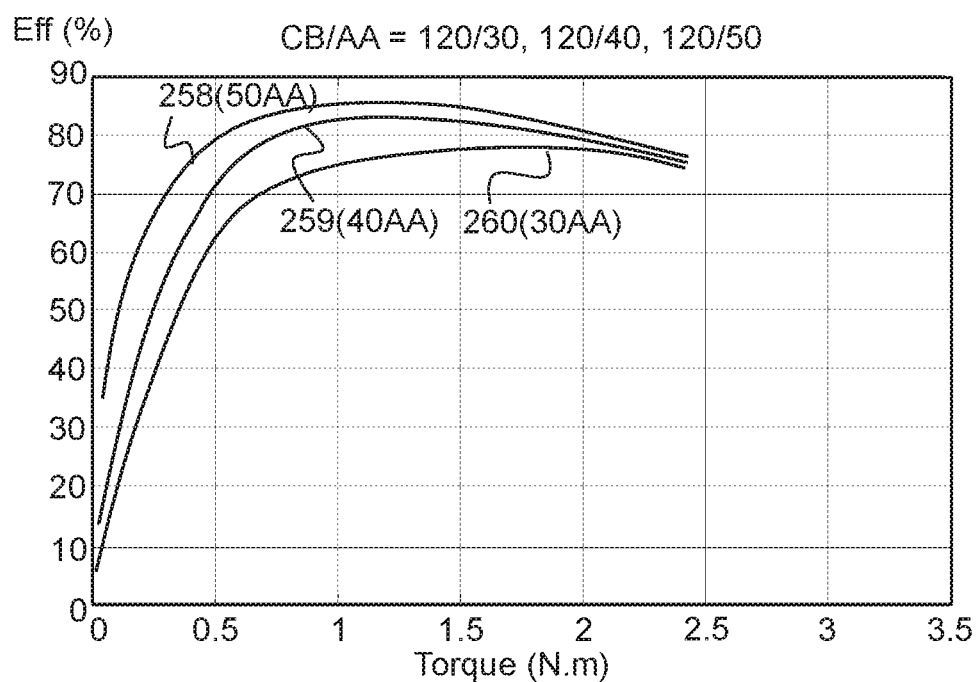
FIG. 12F depicts an exemplary efficiency-torque waveform diagram of the same high powered tool showing the effect of increasing AA at a fixed CB of 120° on the efficiency/torque profile, according to an embodiment.

While increasing AA to a value greater than $\gamma=30°$ may be used to boost motor speed and power performance, increasing the AA alone at a fixed CB can result in diminished efficiency. As will be understood by those skilled in the art, efficiency is measured as a function of (power-out/power-in). FIG. 12F depicts an exemplary efficiency/torque waveform diagram of tool 128, where increasing the AA at fixed CB of 120° results in a downward shift in the efficiency/torque profile, i.e., from 258 ($\gamma=30°$), to 259 ($\gamma=40°$), to 265 ($\gamma=50°$). This shift is particularly significant at low torque range, where efficiency can decrease by, for example, approximately 20% at around 0.5 N.m., and even more at lower torque. In other words, while increasing the AA alone (at fixed CB) to a value greater than $\gamma=30°$ can increase speed and power output at low and medium torque ranges, it does so by significantly sacrificing tool efficiency.

It was found by the inventors of this application that increasing the CB for each phase of a BLDC motor increases total power output and speed of the motor 208, particularly when performed in tandem with AA, as discussed herein.

Figure 13A:
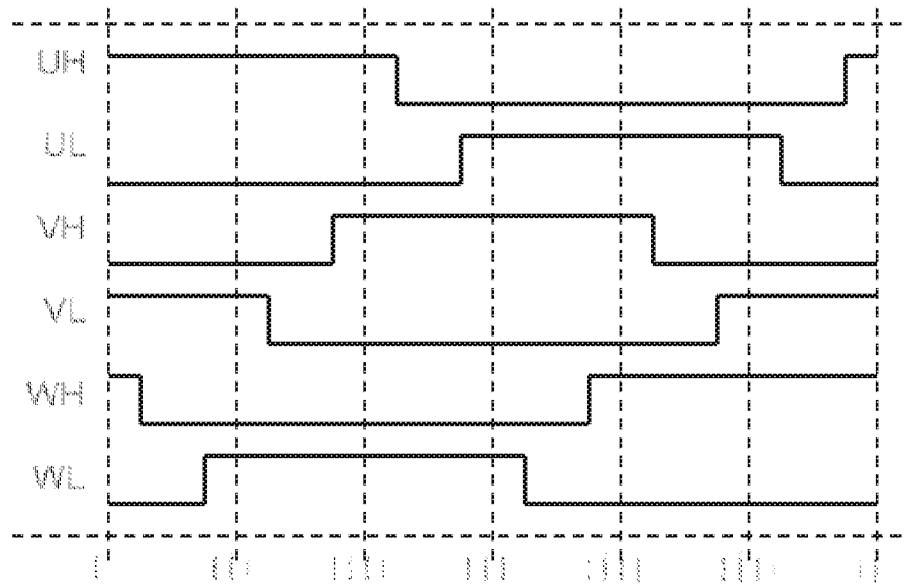
FIG. 13A depicts an exemplary waveform diagram of the drive sequence of the three-phase inventor bridge circuit, where each phase is being driven at CB of 150°, according to an embodiment.

Turning to FIG. 13A, a waveform diagram of the drive sequence of the three-phase inventor bridge of the power switch circuit 226 previously discussed is depicted, with a CB value greater than 120°, according to an embodiment of the invention. In an embodiment, the CB of each phase of the brushless motor may be increased from 120°, which is the CB value conventionally used by those skilled in the art, to, for example, 150° as shown in this illustrative example. As compared to a CB of 120° shown in FIG. 12A, the CB may be expanded by 15° on each end to obtain a CB of 150°. Increasing the CB to a value greater than 120° allows three of the switches in the three-phase inventor bridge to be ON simultaneously (e.g., between 45° to 75° and 105° to 135° in the illustrative example) and for voltage to be supplied to each phase of the motor during a larger conduction period. This, in effect, increases the total voltage amount being supplied to the motor 202 from the DC bus line, which consequently increases the motor speed and power output performance, as discussed below.

Figure 13B:
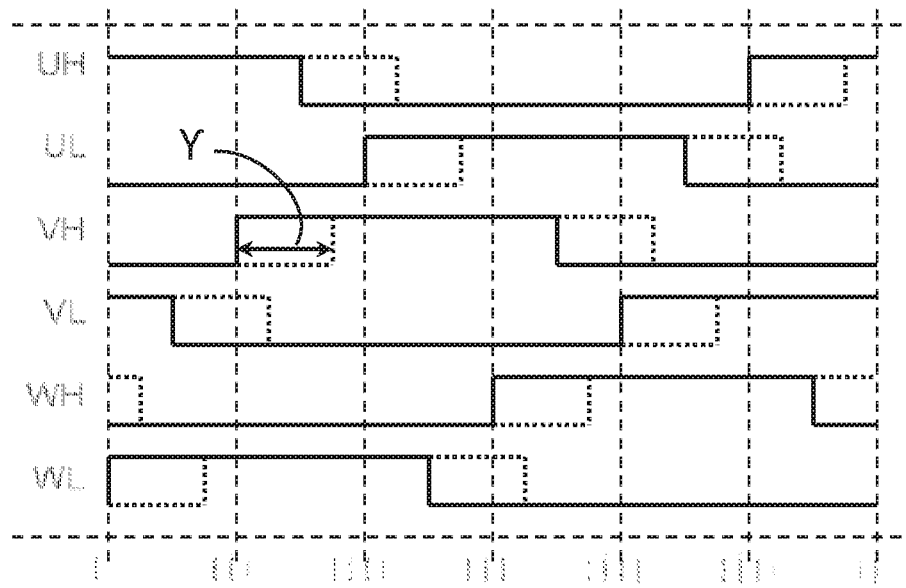
FIG. 13B depicts an exemplary waveform diagram of the drive sequence of the three-phase inventor bridge circuit, where each phase is being driven at CB of 150° with an AA of γ=30°, according to an embodiment.

FIG. 13B depicts an embodiment of the invention where the AA of each phase of the brushless motor is also varied in tandem with and corresponding to the CB. In the illustrative example, where the CB is at 150°, the AA is set to an angle of γ=45°. In an embodiment, various CB and AA correlations may be implemented in controller 230 as a look-up table or an equation defining a functional relationship between CB and the associated AA.

An exemplary table showing various CB and associated AA values is as follows:

| CB | AA (Y) |
|---|---|
| 120° | 30° |
| 130° | 35° |
| 140° | 40° |
| 150° | 45° |
| 160° | 50° |
| 170° | 55° |

It is noted that while these exemplary embodiments are made with reference to CB/AA levels of 120°/30°, 140°/40°, 160°/50°, these values are merely exemplary and any CB/AA value (e.g., 162°/50.6°, etc.) may be alternatively used. Also, the correlation between AA and CB provides in this table and throughout this disclosure is merely exemplary and not in any way limiting. Specifically, while the relationship between CB and AA in the table above is linear, the relationship may alternatively be non-linear. Also, the AA values given here for each CB are by no means fixed and can be selected from a range. For example, in an embodiment, CB of 150° may be combined with any AA in the range of 35° to 55°, preferably in the range of 40° to 50°, preferably in the range of 43° to 47°, and CB of 160° may be combined with any AA in the range of 40° to 60°, preferably in the range of 45° to 55°, preferably in the range of 48° to 52°, etc. Moreover, optimal combinations of CB and AA may vary widely from the exemplary values provided in the table above in some power tool applications.

Figure 13C:
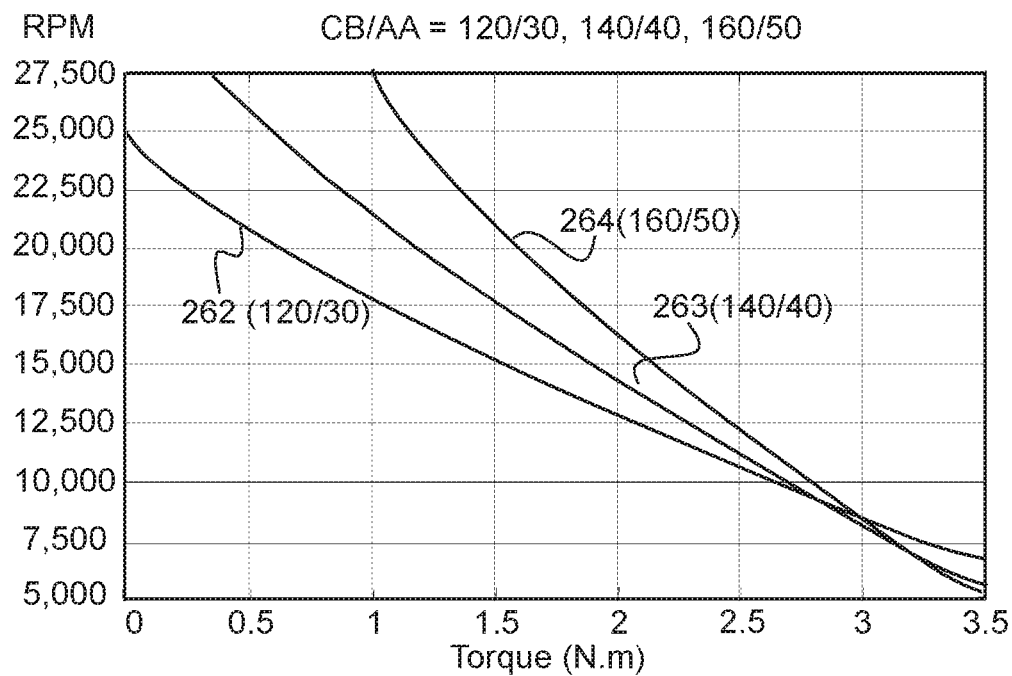
FIG. 13C depicts an exemplary speed-torque waveform diagram of an exemplary high powered tool showing the effect of increasing CB and AA in tandem on the speed/torque profile, according to an embodiment.
Figure 13D:
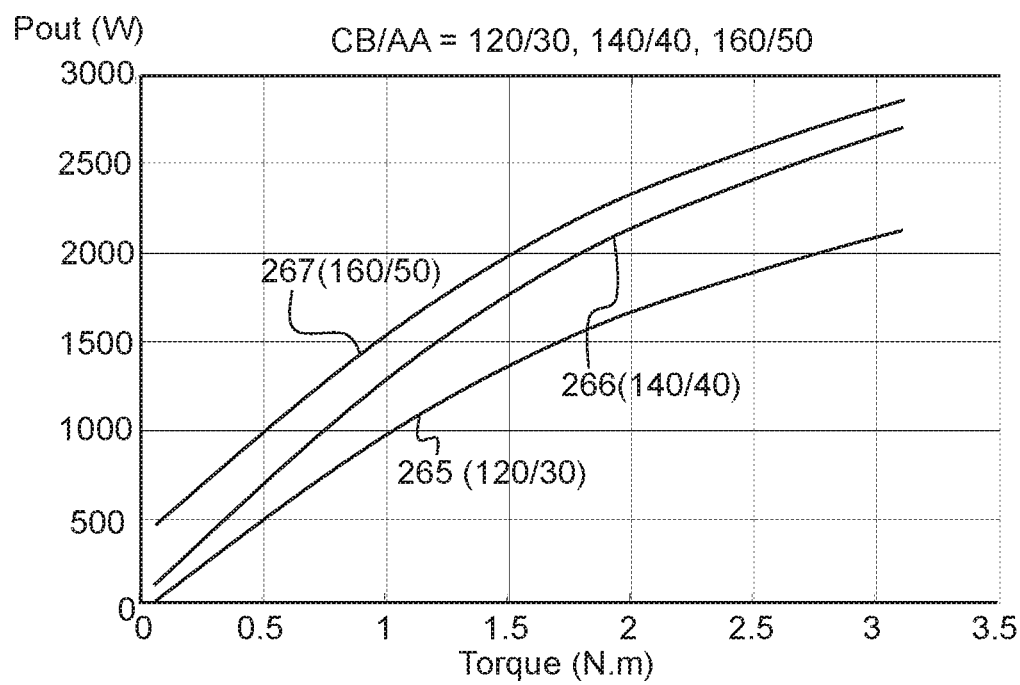
FIG. 13D depicts an exemplary power-torque waveform diagram of the same high powered tool showing the effect of increasing CB and AA in tandem on the power/torque profile, according to an embodiment.

Referring now to FIGS. 13C and 13D, increasing the CB and AA in tandem (hereinafter referred to as "CB/AA") as described above to a level greater than the CB/AA of 120°/30° can result in better speed and power output performance over a wider torque range as compared to the waveform diagrams of FIGS. 12D and 12E, according to an embodiment.

As shown in the exemplary speed/torque waveform diagram of FIG. 13C for tool 128, increasing CB/AA results in a significant upward shift in the speed/torque profile, i.e., from 262 (CB/AA=120°/30°), to 263 (CB/AA=140°/40°), to 264 (CB/AA=160°/50°), according to an embodiment. This increase is the greatest at the low torque range (where speed performance can improve by at least approximately 60%), but still significant at the medium torque range (where speed performance can improve by approximately 20% to 60%). It is noted that in an embodiment, the speed/torque profiles 262, 263, 264 begin to converge at a very low speed/very high torque range (e.g., between 7,000 rpm to 10,000 rpm), after which point increasing CB/AA no longer results in better speed performance.

Similarly, as shown in the exemplary power-out/torque waveform diagram of FIG. 13D for tool 128, increasing CB/AA results in a significant upward shift in the power-out/torque profile, i.e., from 265 (CB/AA=120°/30°), to 266 (CB/AA=140°/40°), to 267 (CB/AA=160°/50°), according to an embodiment. In an embodiment, this increase is the greatest from 266 (CB/AA=140°/40°) to 267 (CB/AA=160°/50°) at the low torque range and from 265 (CB/AA=120°/30°) to 266 (CB/AA=140°/40°) at medium and high torque ranges. It is noted that in this figure the increase in CB/AA from 120°/30°) to 160°/50° may yield an increase of up to 50% for some torque conditions, though the motor maximum power output (measured at very high load at max speed) may be increased by 10-30%.

While not depicted in these figures, it should be understood that within the scope of this disclosure and consistent with the figures discussed above, power output and speed performance may similarly be reduced if CB/AA is set to a lower level (e.g., 80°/10° or 100°/20°) than 120°/30°.

According to an embodiment of the invention, in order to optimize the effective performance of the motor 202 when tool 128 is powered by a power supply that has a nominal (or rate) voltage that is higher or lower than the operating voltage of the power tool 128, the CB/AA for the phases of the motor 202 may be set according to the voltage rating or nominal voltage of the power supply. Specifically, CB/AA may be set to a higher value in order to boost the performance of the motor 202 when powered by a lower rated voltage power supply, and set to a lower value in order to reduce the performance of the motor 202 when powered by a higher rated voltage power supply, so that somewhat comparable speed and power performance is obtained from the motor 202 irrespective of the power supply voltage rating.

In an embodiment, control unit 208 may be configured to set CB/AA to 120730° when power supply has a nominal voltage that corresponds to the operating voltage range of the motor 202, but set CB/AA to a higher level when coupled to a lower rated voltage power supply. Similarly, control unit 208 sets CB/AA to a lower level when coupled to a higher rated voltage power supply. For example, for a motor 202 having an operating voltage range of 70V-90V, control unit 208 may be configured to set CB/AA to 120°/30° for a 72 VDC or 90 VDC power supply, but to, e.g., 140°/40° for a 54 VDC power supply and to 100°/20° for a 120 VAC power supply. In another example, for a motor 202 having an operating voltage range of 90V to 132V, control unit 208 may be configured to set CB/AA to 120°/30° for a 120 VAC power supply, but to proportionally higher values, e.g., 160°/50° and 140°/40° respectively for a 54 VDC power supply and a 72 VDC power supply. In yet another example, for a motor 202 having an operating voltage range of 135V to 187V, control unit 208 may be configured to set CB/AA to, e.g., 140°/40° for a 108 VDC power supply or a 120 VAC power supply, and to 100°/20° for a 220 VAC power supply. In an embodiment, control unit 208 may be provided with a look-up table or an equation defining a functional relationship between CB/AA and the power supply voltage rating.

In an embodiment, the CB/AA control technique described herein may be used in combination with any of the other motor optimization techniques disclosed in this disclosure. For example, the CB/AA control technique may be used to boost the performance of the motor 202 when powered by a lower rated voltage power supply, and the PWM control technique discussed above, or the cycle-by-cycle current limiting technique discussed above, or a combination of both, may be used to lower the performance of the motor 202 when powered by a higher rated voltage power supply, so that somewhat comparable speed and power performance is obtained from the motor 202 irrespective of the power supply voltage rating. However, in an embodiment, it may be advantageous to utilize the CB/AA technique described above over the PWM control technique to lower performance of the motor for a higher rated voltage power supply, particularly for constant-speed power tool applications. This is because PWM switching of the power switches generates heat and increases the voltage harmonic factor. Use of the CB/AA technique described mitigates those effects on heat and voltage harmonics.

It is noted that while the description above is directed to adjusting CB in tandem with AA based on power supply rated voltage, adjusting CB alone (i.e., at a fixed AA level) according to the power supply rated voltage is also within the scope of this disclosure. Specifically, just as varying the AA level at constant CB has an effect on power and speed performance at certain torque ranges (as described above with reference to FIGS. 12D-12F), varying the CB level above and below 120 degrees at constant AA can also increase or decrease total voltage supplied to the motor, and therefore enhance or decrease motor speed and power output, tool efficiency may be sacrificed in certain torque ranges. Accordingly, in an embodiment of the invention, where tool 128 is powered by a power supply that has a nominal (or rated) voltage that is higher or lower than the operating voltage of the motor 202, the effective motor performance may be optimized by adjusting the CB (at constant AA) for the phases of the motor 202 according to the voltage rating or nominal voltage of the power supply. Specifically, CB may be set to a higher value than 120 degrees in order to boost the performance of the motor 202 when powered by a lower rated voltage power supply, and set to a lower value in order to reduce the performance of the motor 202 when powered by a higher rated voltage power supply, so that somewhat equivalent speed and power performance is obtained.

It is also once again reiterated that CB/AA levels of 120°/30°, 140°/40°, 160°/50° mentioned in any of these embodiments (as well as the embodiments discussed below) are merely by way of example and any other CB/AA level or combination that result in increased power and/or speed performance in accordance with the teachings of this disclosure are within the scope of this disclosure.

It is also noted that all the speed, torque, and power parameters and ranges shown in any of these figures and discussed above (as we as the figures and embodiments discussed below) are exemplary by nature and are not limiting on the scope of this disclosure. While some power tools may exhibit similar performance characteristics shown in these figures, other tools may have substantially different operational ranges.

7. Improved Torque-Speed Profile

Figure 13E:
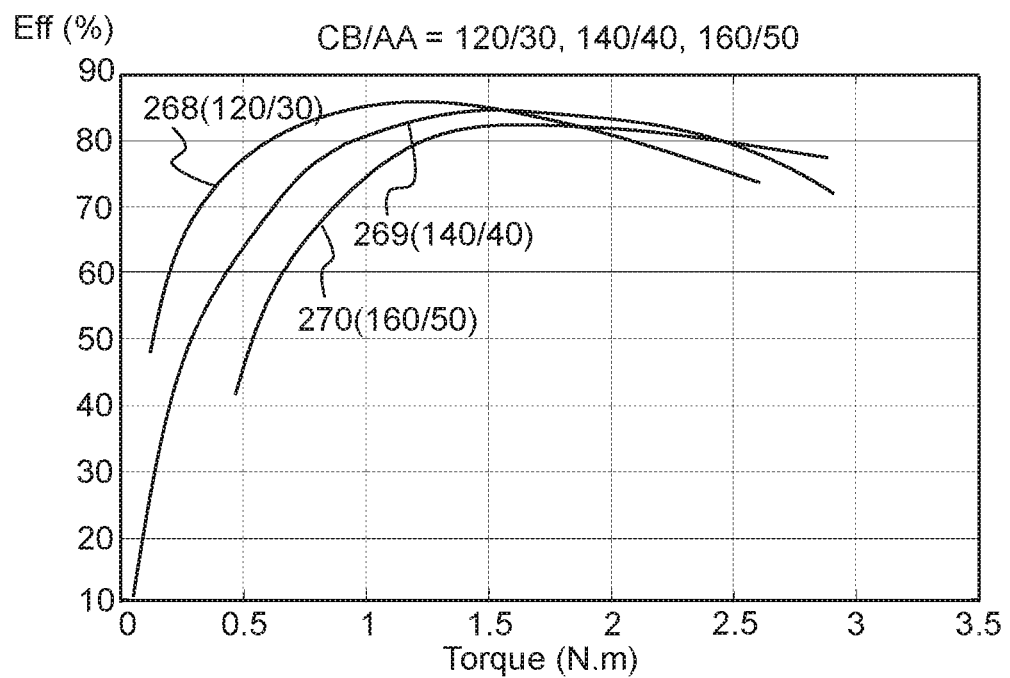
FIG. 13E depicts an exemplary efficiency-torque waveform diagram of the same high powered tool showing the effect of increasing CB and AA in tandem on the efficiency/torque profile, according to an embodiment.

Referring now to FIG. 13E, an exemplary efficiency/torque diagram of tool 128 is depicted with various CB/AA values at 268 (CB/AA=120°/30°), 269 (CB/AA=140°/40°) and 270 (CB/AA=160°/50°), according to an embodiment. As can be seen in this figure, CB/AA of 120°/30° yields the best efficiency at approximately a low to medium range (e.g., 0 to approximately 1.5 N.m. in the illustrative example), CB/AA of 140°/40° yields the best efficiency at approximately a medium to high torque range (approximately 1.5 N.m. to approximately 2.5 N.m. in the illustrative example), and CB/AA of 160°/50° yields the best efficiency at approximately a high torque range (approximately above 2.5 N.m. in the illustrative example). Accordingly, while increasing CB/AA beyond 120°/30° level greatly improves speed and power performance at all torque ranges, it may do so to the detriment of efficiency in some operating conditions, particularly at relative low torque ranges.

In addition, power tools applications generally have a top rated speed, which refers to the maximum speed of the power tool motor at no load. In variable-speed tools, the maximum speed typically corresponds to a desired speed that the motor is designed to produce at full trigger pull. Also, the rated voltage or operating voltage (or voltage range) of the motor previously discussed corresponds to the power tool's desired top rated speed. The motor's physical characteristics previously discussed (e.g., size, number of windings, windings configuration, etc.) are also generally designed to be compatible with the power tool's torque and maximum speed requirements. In fact, it is often necessary to protect the motor and the power tool transmission from exceeding the top rated speed. In a tool where the motor has the capability to output more speed than the tool's top rated speed, the speed of the motor is typically capped at its top rated speed. Thus, while increasing speed performance via the above-described CB/AA technique is certainly desirable within some torque/speed ranges, it is impractical in certain operating conditions if the increased CB/AA causes the motor speed to exceed the top rated speed of the tool. This is particularly true in the low torque range, where, as previously shown in FIG. 13C, increasing CB/AA creates a very large shift in the speed profile.

In an exemplary embodiment, where tool 128 of FIG. 13C has a top rated speed of 25,000 rpm, operating the motor 202 at CB/AA of 120°/30° allows the tool to operate within its top rated speed, but operating the tool at a higher CB/AA exceeds the top rated speed at the low torque range (e.g., speed exceeds 25,000 rpm with CB/AA of 160750° at under 1 N.m. torque, or with CB/AA of 140°/40° at under 0.6 N.m torque).

Figure 13F:
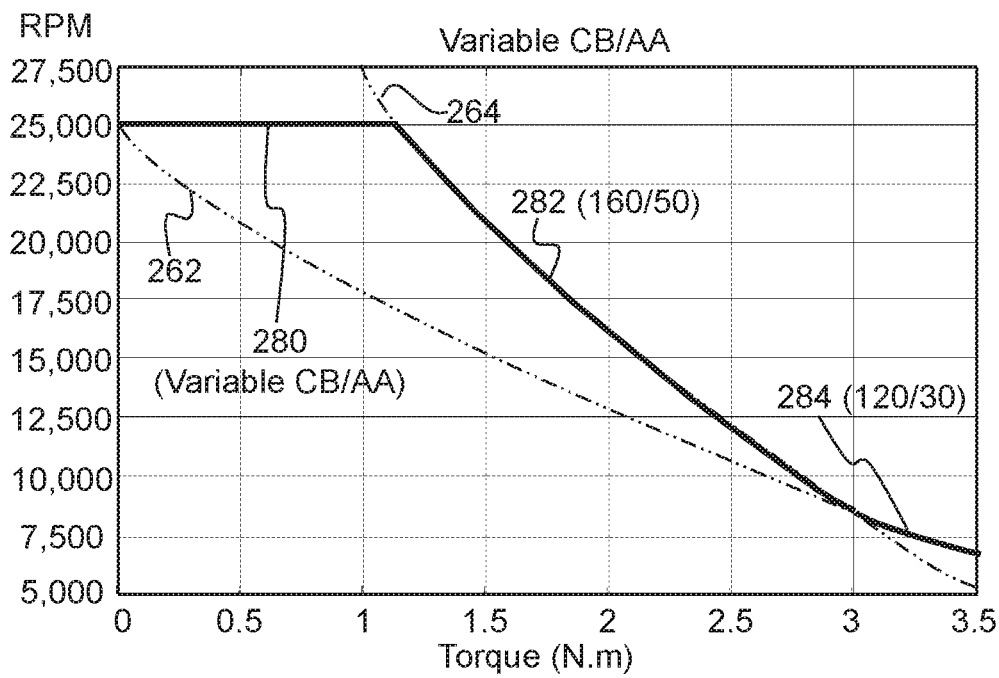
FIG. 13F depicts an exemplary improved speed-torque waveform diagram of an exemplary high powered tool using variable CB/AA, according to an embodiment.

Accordingly, in an embodiment of the invention, as shown in FIG. 13F, an improved speed-torque profile is provided, wherein at the top rated speed of the tool, the motor speed is held at a constant rate (i.e., includes a substantially flat profile 280) within a first torque range, e.g., 0 to approximately 1.2 N.m., and at a variable rate within a second torque range, e.g., above 1.2 N.m. In an embodiment, during the first torque range, CB/AA is gradually increased as a function of the torque from its base value (e.g., 120/30°) to a threshold value (e.g., 160/50°). Once that CB/AA threshold is reached, the speed-torque profile follows a curved profile 282 of the normal speed-torque profile operating at a CB/AA corresponding to the threshold value (e.g., profile 264 operating at 160/50°). In other words, the speed-torque curve at CB/AA of 160/50° is "clipped" below the tool's maximum speed, which in this example is 25,000 RPM.

The tool's performance according to this improved speed-torque profile is improved in several regards. First, it avoids operating the motor at high CB/AA levels of, for example, 160/50° at the low torque range, in particular at very low torque of under 0.5 N.m. in the exemplary embodiment where efficiency suffers the most from operating at a high CB/AA (see FIG. 13E above). This dramatically increases motor efficiency at the low torque range. Also, it gives the users the ability to operate the tool at maximum speed for a wide range of the operating torque (0 to 1.2 N.m. in the exemplary embodiment), which is beneficial to the users. Moreover, the tool operates according to a speed-torque curve at medium and high torque ranges, which the users generally expect, but at a higher power output and higher efficiency as described with reference to FIGS. 13D and 13E above. This arrangement thus increases overall tool efficiency and power output.

In order to maintain constant speed at flat portion 280 of the speed/torque profile, control unit 208 may be configured to operate the motor at variable CB/AA calculated or determined as a function of the torque from a base CB/AA value (e.g., 120/30°, which corresponds to a torque of slightly above to zero) to a threshold CB/AA value (e.g., 160/50°), as described above. In an embodiment, control unit 208 may utilize a look-up table or an algorithm to calculate and gradually increase the CB/AA as required to achieve the desired constant speed as a function of torque, according to an embodiment. Thereafter, control unit 208 is configured to operate the motor at constant CB/AA corresponding to the CB/AA threshold value (e.g., 160/50°), according to an embodiment.

According to an alternative embodiment, the control unit 208 may be configured to operate the motor at variable CB/AA calculated as a function of the torque from a low torque threshold (e.g., zero or slightly above zero, which corresponds to, e.g., CB/AA of 120/30°) to a high torque threshold (e.g., 1.2 N.m., which corresponds to, e.g., CB/AA of 160/50°). Again, the control unit 208 may utilize a look-up table or an algorithm to calculate and gradually increase the CB/AA that is required to achieve the desired constant speed as a function of the torque, according to an embodiment. Thereafter, control unit 208 is configured to operate the motor at constant CB/AA corresponding to the high torque threshold (e.g., 160/50° corresponding to 1.2 N.m.), according to an embodiment.

As discussed with reference to FIG. 13C above, the speed/torque profiles 262, 263, 264 begin to converge at a very low speed/very high torque range (e.g., between 7,000 rpm to 10,000 rpm and around 3 N.m.), after which point increasing CB/AA no longer results in better speed performance. After that point, speed/torque profiles 262 (120/30° yields higher speed performance than higher CB/AA levels. Thus, according to an embodiment, above a high threshold torque value (e.g., 3 N.m. in this example) or below a low threshold speed (e.g., approximately 8,500 rpm in this example), the speed/torque profile may revert back from profile 282 corresponding to a CB/AA of 160/50° to another profile 284 corresponding to a CB/AA of 120/30°, in order to obtain higher performance at high torque and low speed levels. The control unit 208 in this embodiment may be configured to reduce the CB/AA from the high threshold of 160/50° back down to 120/30° once the high threshold torque (or low threshold speed) is reached. This reversion may be done instantaneously or gradually to obtain a smooth transition.

Figure 13G:
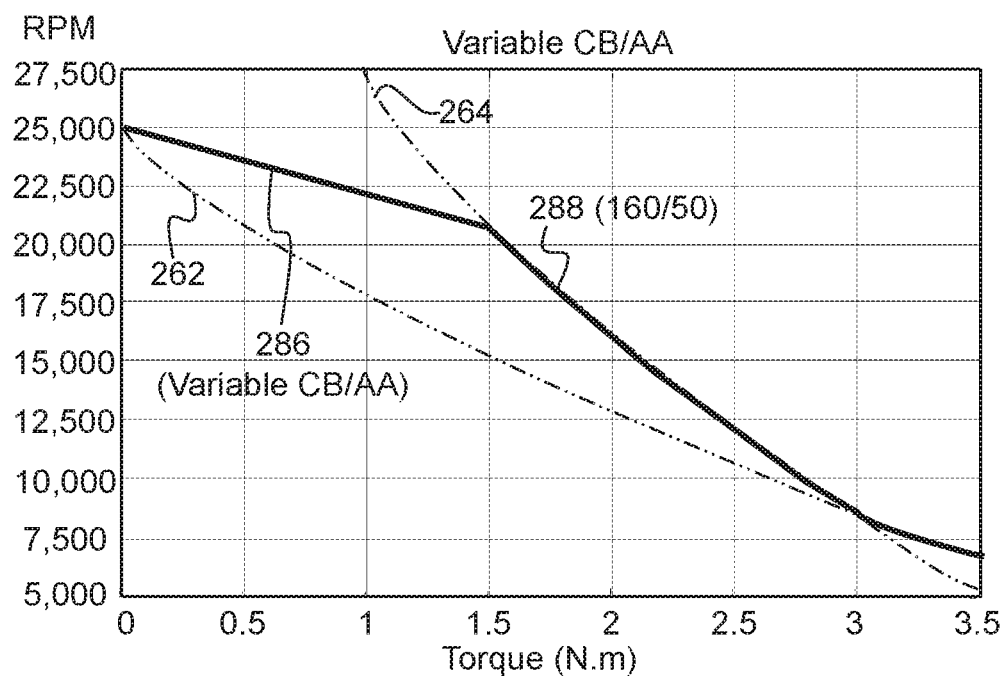
FIG. 13G depicts another improved speed-torque waveform diagram of the same high powered tool using variable CB/AA, according to an alternative embodiment.

FIG. 13G depicts a further improvement to the speed-torque profile of FIG. 13F, where instead of holding motor speed constant at low torque, motor speed is controlled at a variable rate according to a first profile 286 within a first torque range, in this case e.g., 0 to approximately 1.5 N.m., and according to a second profile 288 within a second torque range, e.g., above 1.5 N.m. In an embodiment, similar to the embodiment of FIG. 13F, CB/AA is gradually increased as a function of the torque from its base value (e.g., 120/30°) to a threshold value (e.g., 160/50°) during the first torque range. Once that CB/AA threshold is reached, the speed-torque profile follows a curved profile 288 of the normal speed-torque profile operating at a CB/AA corresponding to the threshold value (e.g., profile 264 operating at 160/50°). In contrast to the embodiment of FIG. 13F, however, the increase in CB/AA is designed to gradually reduce speed from the top rated speed down to a second speed value, e.g., 12,000 rpm, within the first torque range. This configuration allows the transition to higher CB/AA levels to occur at a slower rate, which results in further increases in efficiency within the first torque range.

It is noted that while the first profile 286 in this embodiment is linear, any other non-linear profile, or any combination of flat, linear, and non-linear profile, may be alternatively employed within the first torque range in order to increase efficiency. For example, in an embodiment, first profile 286 may include a steep portion along profile 262 (wherein CB/AA is maintained at or around the 120/30° level) for an entire duration of a very small torque range (e.g., 0 to 0.5 N.m.), followed by a flat or semi-flat portion that connects the steep portion to the second profile 282.

According to an embodiment of the invention, the improved speed-torque profile described herein may be utilized to optimize the effective performance of the motor 202 with high efficiency when tool 128 is powered by a power supply that has a nominal (or rate) voltage that is higher or lower than the operating voltage of the motor 202. Specifically, in an embodiment, instead of operating the motor at a constant CB/AA level set according to the voltage rating or nominal voltage of the power supply, CB/AA may be varied at described above to maximize the motor efficiency. Specifically, in an embodiment, in order to boost the performance of the motor 202 when powered by a lower rated voltage power supply, instead of fixedly setting CB/AA to a higher level (e.g., 160°/50°) to obtain a torque-speed profile as shown in FIG. 13C, variable CB/AA may be partially adapted (e.g., for a low torque range) to obtain a torque-speed profile according to FIG. 13C or FIG. 13D.

In an embodiment, control unit 208 may be configured to set CB/AA to 120730° when power supply has a nominal voltage that corresponds to the operating voltage range of the motor 202, but set variable CB/AA as described above for a low torque when coupled to a lower rated voltage power supply. For example, in a power tool 128 with a motor 202 having an operating voltage range of 70V-90V, control unit 208 may be configured to set CB/AA to 120°/30° for a 72 VDC or 90 VDC power supply, but to variable CB/AA, e.g., 120°/30° up to 140°/40° for a 54 VDC power supply. In another example, in a power tool 128 having a motor 202 with an operating voltage range of 90V to 132V, control unit 208 may be configured to set CB/AA to 120°/30° for a 120 VAC power supply, but to variable CB/AA, e.g. from 120°/30° up to 160°/50° (or 140°/40° up to 160°/50°) for a 54 VDC power supply.

8. Optimization of Conduction Band and Advance Angle for Increased Efficiency

Figure 14A:
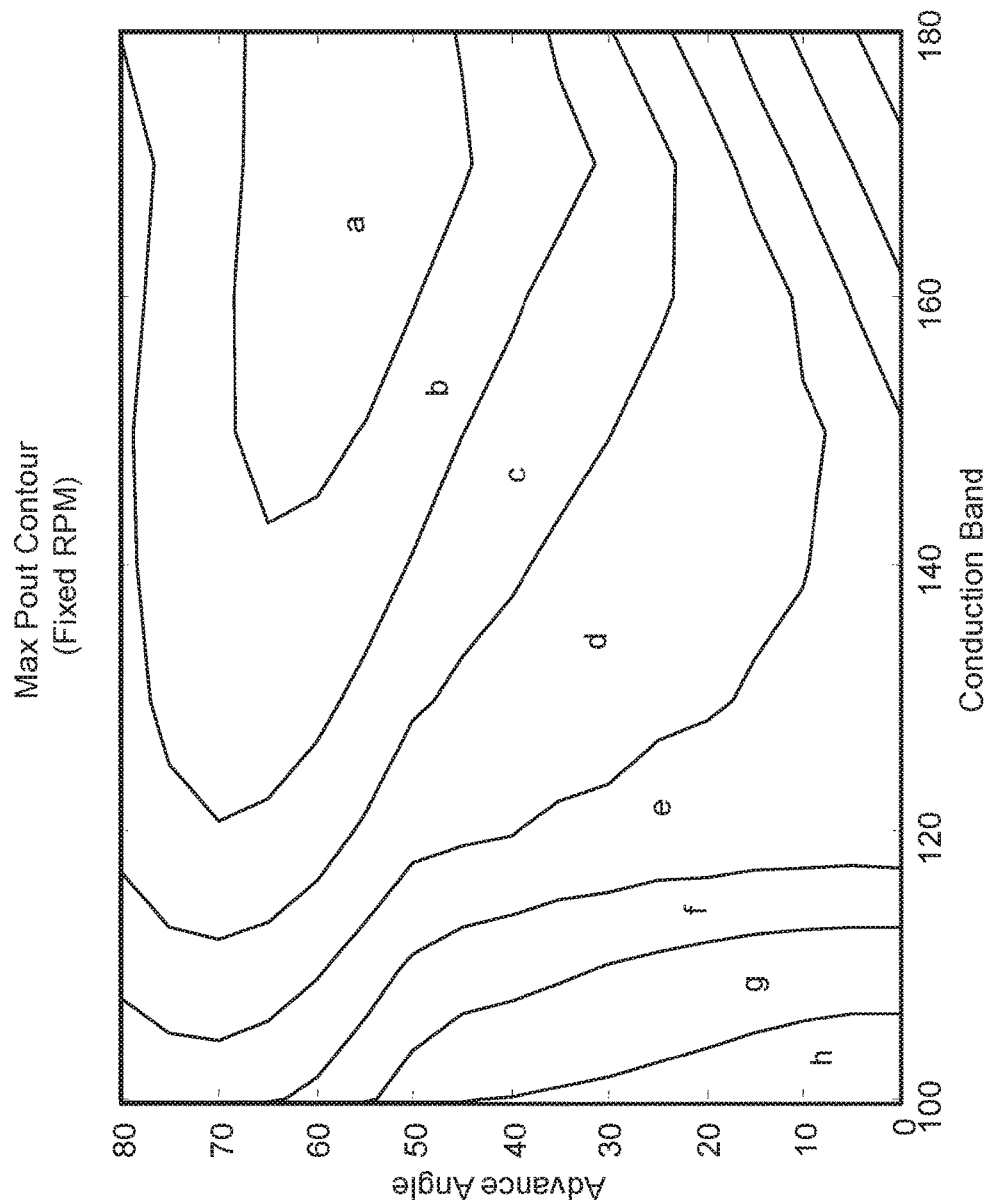
FIG. 14A depicts an exemplary maximum power output contour map for an exemplary power tool based on various CB and AA values, according to an alternative embodiment.

FIG. 14A depicts an exemplary maximum power output contour map for power tool 128 based on various CB and AA values measured at a constant medium speed of, e.g., approximately 15,000 rpm, according to an embodiment. It is noted that this medium speed value corresponds to a medium to high torque values depending on the CB/AA level (e.g., approximately 1.5 N.m. at CB/AA=120°/30°, approximately 1.85 N.m. at CB/AA=140°/40°, and approximately 2.2 N.m. at CB/AA=160°/50° per FIG. 13C). In this figure, maximum power output gradually decreases from zone 'a' (representing max power output of approximately 3,500 W or more) to zone 'h' (representing maximum power output of approximately of 200 W or less). It can be seen based on this exemplary figure that the highest max power output amount for power tool 128 at medium tool speed (and medium torque) can be obtained at a CB in the optimal range of approximately 150°-180° and AA in the optimal range of approximately 50°-70°.

Figure 14B:
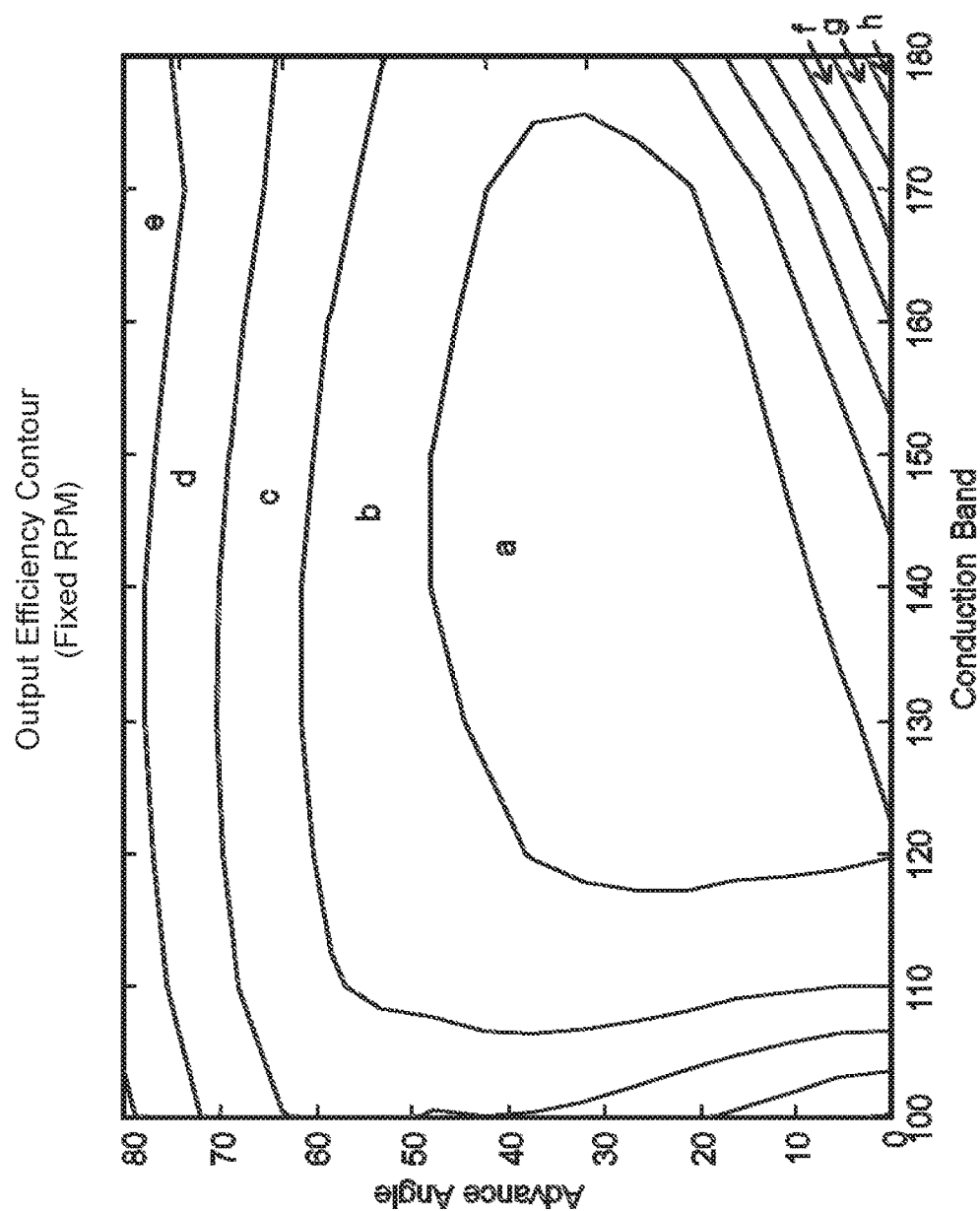
FIG. 14B depicts an exemplary efficiency contour map for the same power tool based on various CB and AA values, according to an alternative embodiment.

FIG. 14B depicts an exemplary output efficiency contour map for power tool 128 based on various CB and AA values measured at the same speed, according to an embodiment. In this figure, calculated efficiency gradually decreases from zone 'a' (representing 90% efficiency) to zone 'h' (representing 10% efficiency). It can be seen based on this exemplary figure that the highest efficiency for power tool 128 at medium tool speed (and medium torque) can be obtained at a CB in the optimal range of approximately 120°-170° and AA in the optimal range of approximately 10°-50°.

FIG. 14C an exemplary combined efficiency and max power output contour map for power tool 128 based on various CB and AA values measured at the same speed, according to an embodiment. This contour is obtained based on an exemplary function of ((Efficiency^3)*Power, where the goal is maximize power output while keeping efficiency at a high level. The calculated combined contour in this figure gradually decreases from zone 'a' to zone 'I'. It can be seen based on this exemplary contour map that the highest combination of efficiency and power output for power tool 128 at medium tool speed (and medium torque) can be obtained at a CB in the range of approximately 158°-172° combined with AA in the range of approximately 40°-58° within zone 'a'.

This figure illustrates that while increasing the CB and AA in tandem as previously described provides a simple way to increase speed and power performance levels, such increase need not be in tandem. For example, the CB/AA level of 160750° provides substantially equivalent combined efficiency and max power output performance as other CB/AA combinations that fall within zone 'a' contour, e.g., 170°/40°.

As mentioned above, the optimal CB/AA contour (zone 'a') obtained in this figure correspond to a constant medium speed, e.g., approximately 15,000 rpm, and a constant toque, e.g., approximately 2.2 N.m. per FIG. 13C. This constant medium speed is proportional to the rated or nominal voltage of the input power supply. In this particular example, the combined efficiency and maximum power output contour map was constructed at an input voltage of 120V. Modifying the input voltage to above and below 120V results in different optimal CB and AA contours.

Figure 14D:
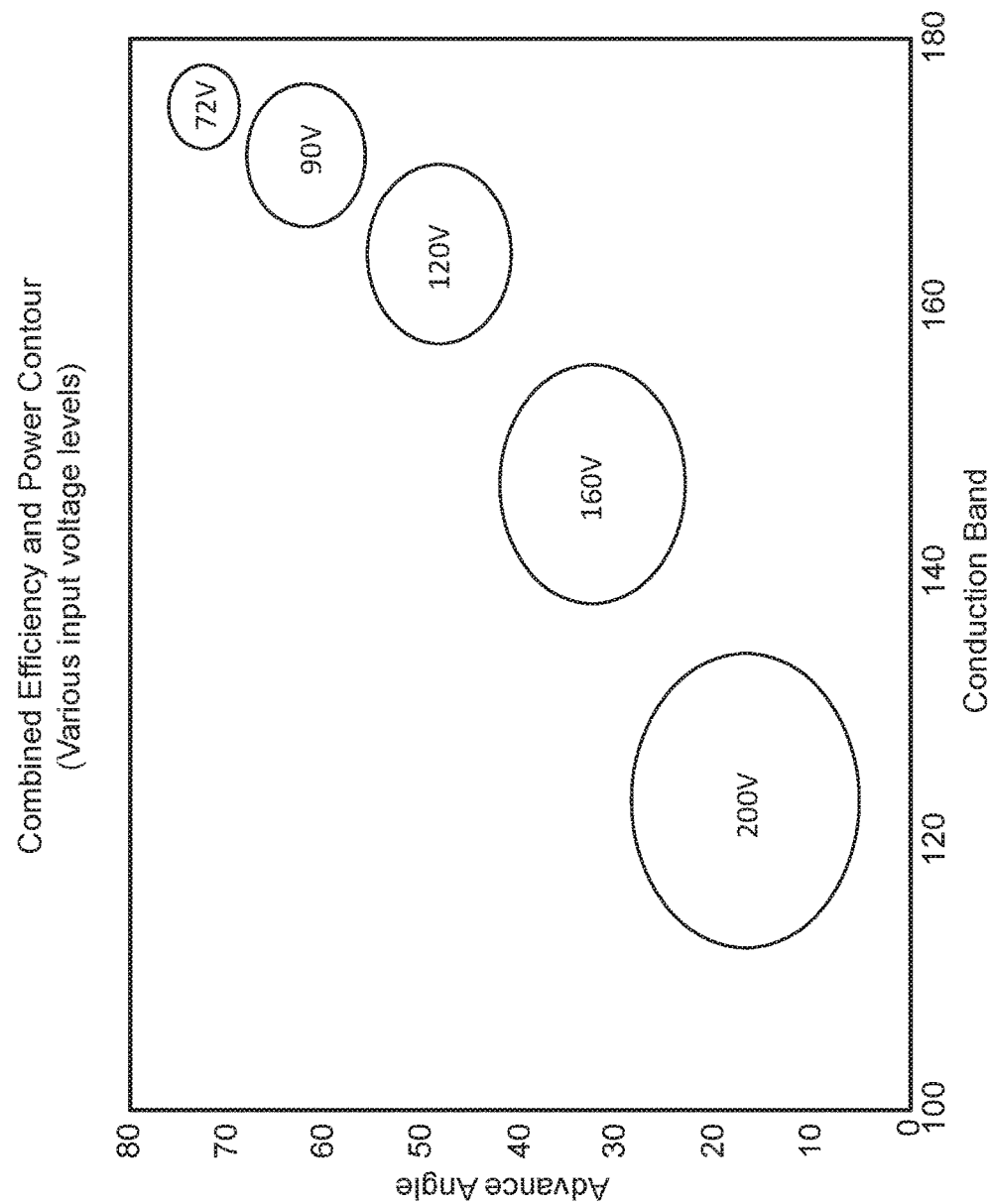
FIG. 14D depicts an exemplary contour map showing optimal combined efficiency and maximum power output contours at various input voltage levels, according to an alternative embodiment.

FIG. 14D depicts an exemplary diagram showing the optimal CB/AA contours based on the various input voltage levels. As shown in this figure, an optimal CB and AA is approximately in the range of 115° to 135° and 5° to 30° respectively at an input voltage level of approximately 200V; approximately in the range of 140° to 155° and 25° to 40° respectively at an input voltage level of approximately 160V; approximately in the range of 165° to 175° and 60° to 70° respectively at an input voltage level of approximately 90V; and approximately in the range of 170° to 178° and 70° to 76° respectively at an input voltage level of approximately 72V. In other words, the optimal CB/AA contours get smaller (thus providing a narrower combination range) as the input voltage decreases from 200V down to 72V. Also, the optimal CB ranges and AA ranges both increase as the input voltages decreases. It is noted that the contours herein are optimized to output substantially equivalent levels of maximum power output at optimal efficiency.

Accordingly, in an embodiment of the invention, the combined efficiency and power contours described herein may be utilized to optimize the effective performance of the motor 202 with high maximum power output at optimal efficiency based on the nominal (or rated) voltage level of the power supply. Specifically, in an embodiment, the CB/AA values may be selected from a first range (e.g., CB in the range of 158°-172° and AA in the range of 40°-58°) when powered by a 120V power supply, but from a second range (e.g., CB in the range of 170°-178° and AA in the range of 70°-76°) when powered by a 90V power supply to yield optimal efficiency and power performance at each voltage input level in a manner satisfactory to the end user, regardless of the nominal voltage provided on the AC or DC power lines.

In an embodiment, control unit 208 may be configured to set CB/AA to 120°/30° when power supply has a nominal voltage that corresponds to the operating voltage range of the motor 202, but set variable CB/AA as described above for a low torque when coupled to a lower rated voltage power supply. For example, in a power tool 128 with a motor 202 having an operating voltage range of 70V-90V, control unit 208 may be configured to set CB/AA to 120°/30° for a 72 VDC or 90 VDC power supply, but to variable CB/AA, e.g., 120°/30° up to 140°/40° for a 54 VDC power supply. In another example, in a power tool 128 having a motor 202 with an operating voltage range of 90V to 132V, control unit 208 may be configured to set CB/AA to 120°/30° for a 120 VAC power supply, but to variable CB/AA, e.g. from 120°/30° up to 160°/50° (or 140°/40° up to 160°/50°) for a 54 VDC power supply.

9. Optimization of Motor Performance Using the Link Capacitor

Figure 15A:
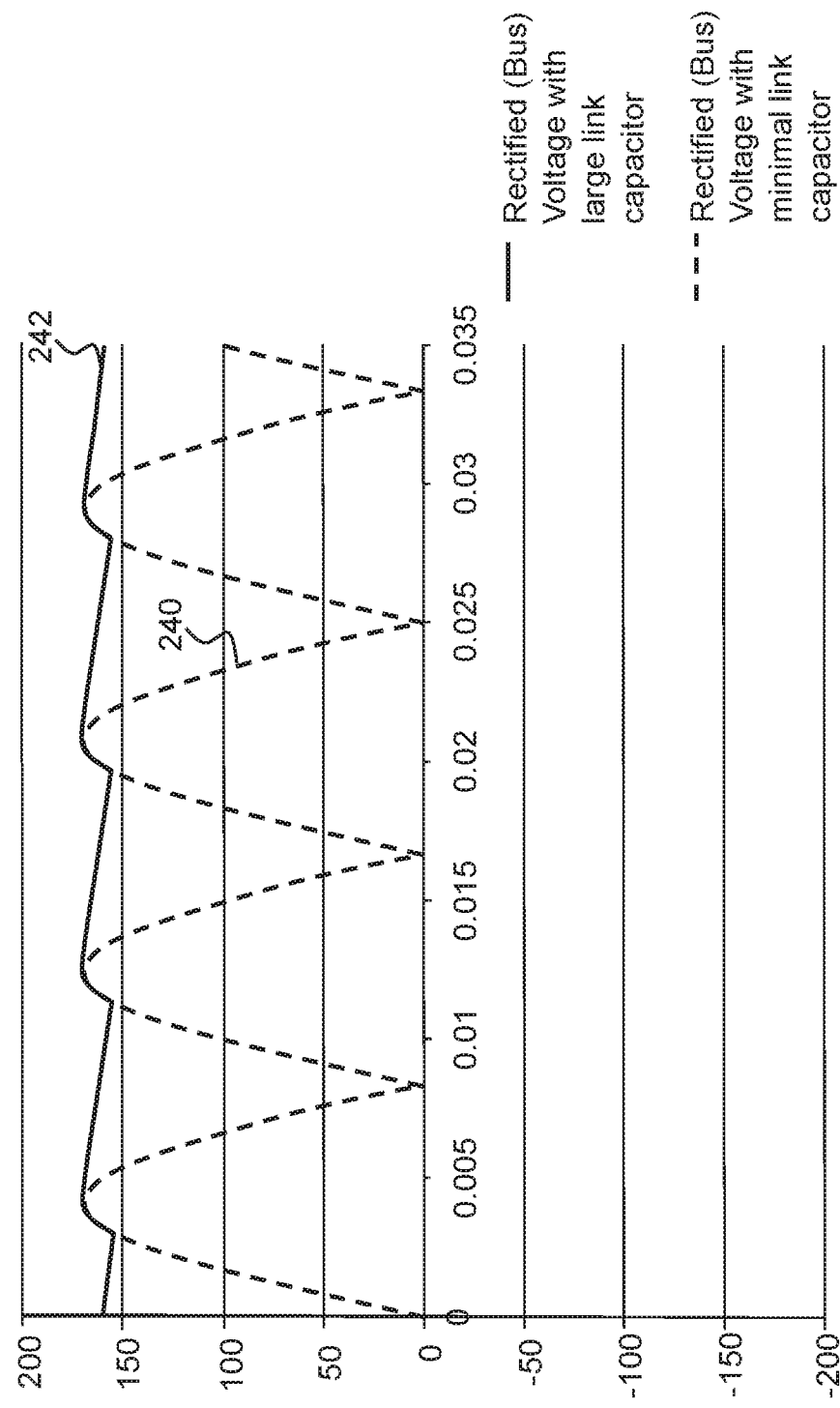
FIG. 15A depicts an exemplary waveform diagram of the rectified AC waveform supplied to the motor control circuit under a loaded condition, according to an embodiment.

FIG. 15A depicts an exemplary waveform diagram of the rectified AC waveform supplied to the motor control circuit 206 under a loaded condition, according to an embodiment. References 240 and 242 designate the full-wave rectified AC waveform as measured across the capacitor 224 (hereinafter referred to as the "DC bus voltage"). It is noted that in this diagram, it is assumed that the tool is operating under a maximum heavy load that the tool is rated to handle.

Reference 240 designates the DC bus voltage waveform under a loaded condition where capacitor 224 has a small value of, for example 0 to 50 microF. In this embodiment, the effect of the capacitor 224 on the DC bus is negligible. In this embodiment, the average voltage supplied from the DC bus line to the motor control circuit 206 under a loaded condition is:

$$V(avg) = \frac{120 * 2 * \sqrt{2}}{\pi} = 108 \ VDC$$

Reference 204 designates DC bus voltage waveform under a loaded condition where capacitor 224 has a relatively large value of, for example, 1000 microF or higher. In this embodiment, the average voltage supplied from the DC bus line to the motor control circuit 206 is approaching a straight line, which is:

$$V(avg) = 120 * \sqrt{2} = 170 \text{ VD}$$

It can be seen that by selecting the size of the capacitor 224 appropriately, an average DC bus voltage can be optimized to a desired level. Thus, for a brushless AC/DC power tool system designed to receive a nominal DC voltage of approximately 108 VDC, a small capacitor 224 for the rectifier circuit 220 to produce an average voltage of 108V under a loaded condition from an AC power supply having a nominal voltage of 120 VAC.

Figure 15B:
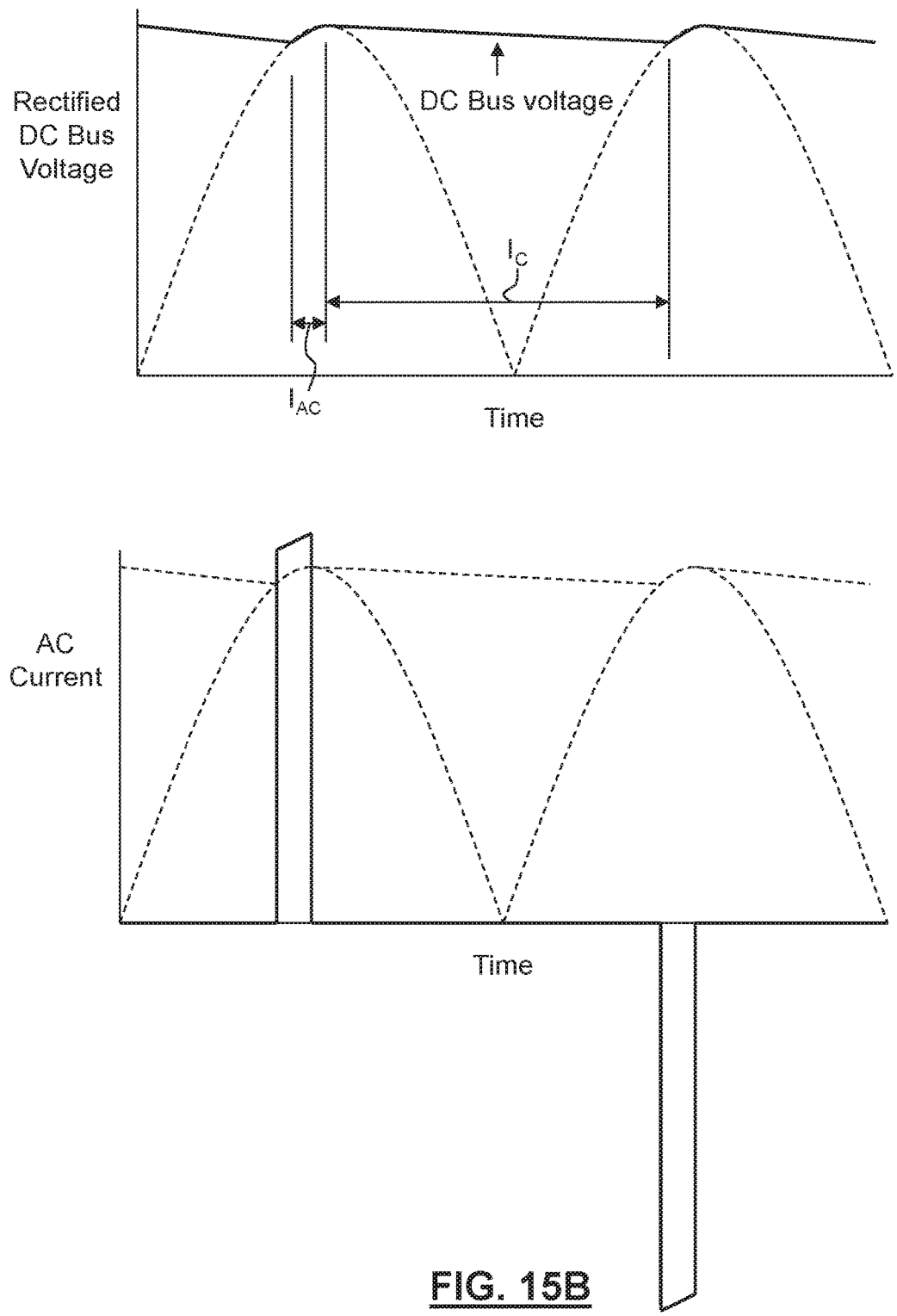
FIG. 15B depicts an exemplary rectified voltage waveform diagram and a corresponding current waveform diagram using a relatively large capacitor on a rectified AC power line (herein referred to as DC bus line), according to an embodiment.
Figure 15C:
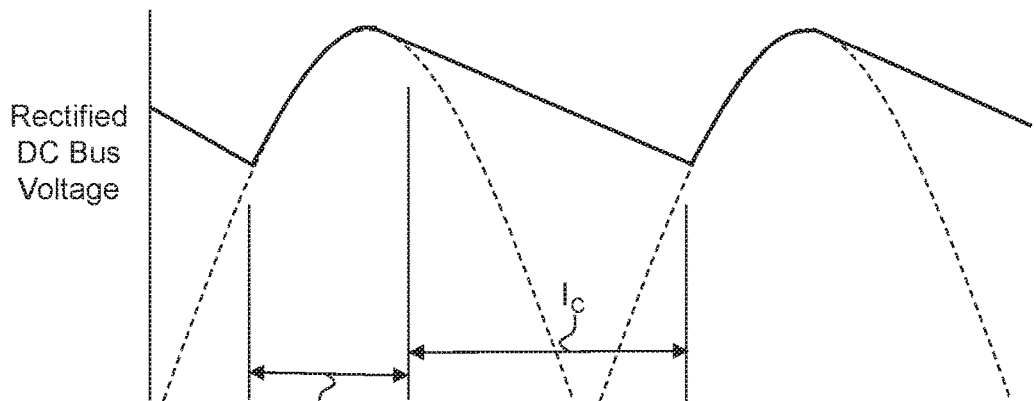
FIG. 15C depicts an exemplary rectified voltage waveform diagram and a corresponding current waveform diagram using a relatively medium-sized capacitor on the DC bus line, according to an embodiment.
Figure 15C:
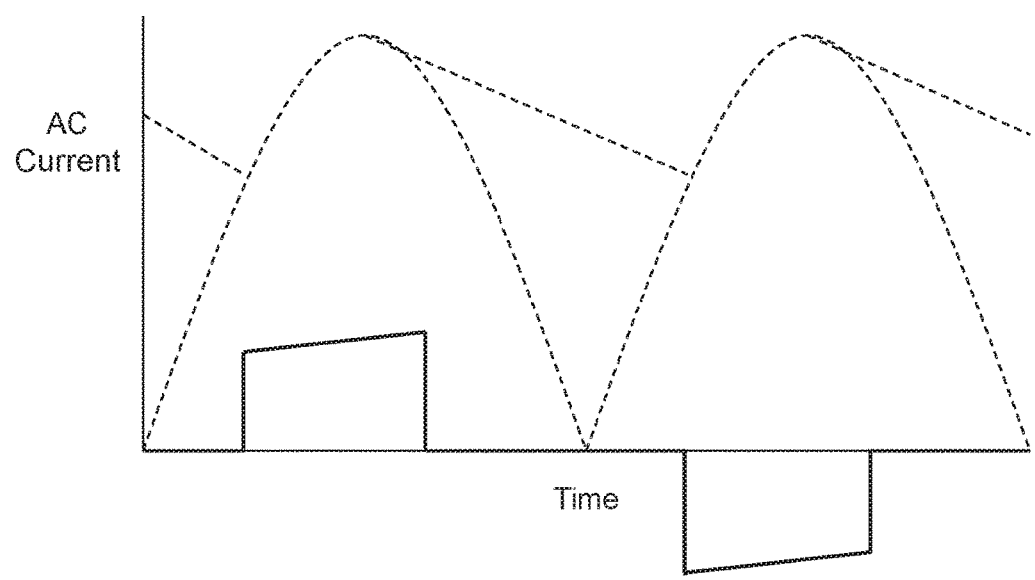
Figure 15D:
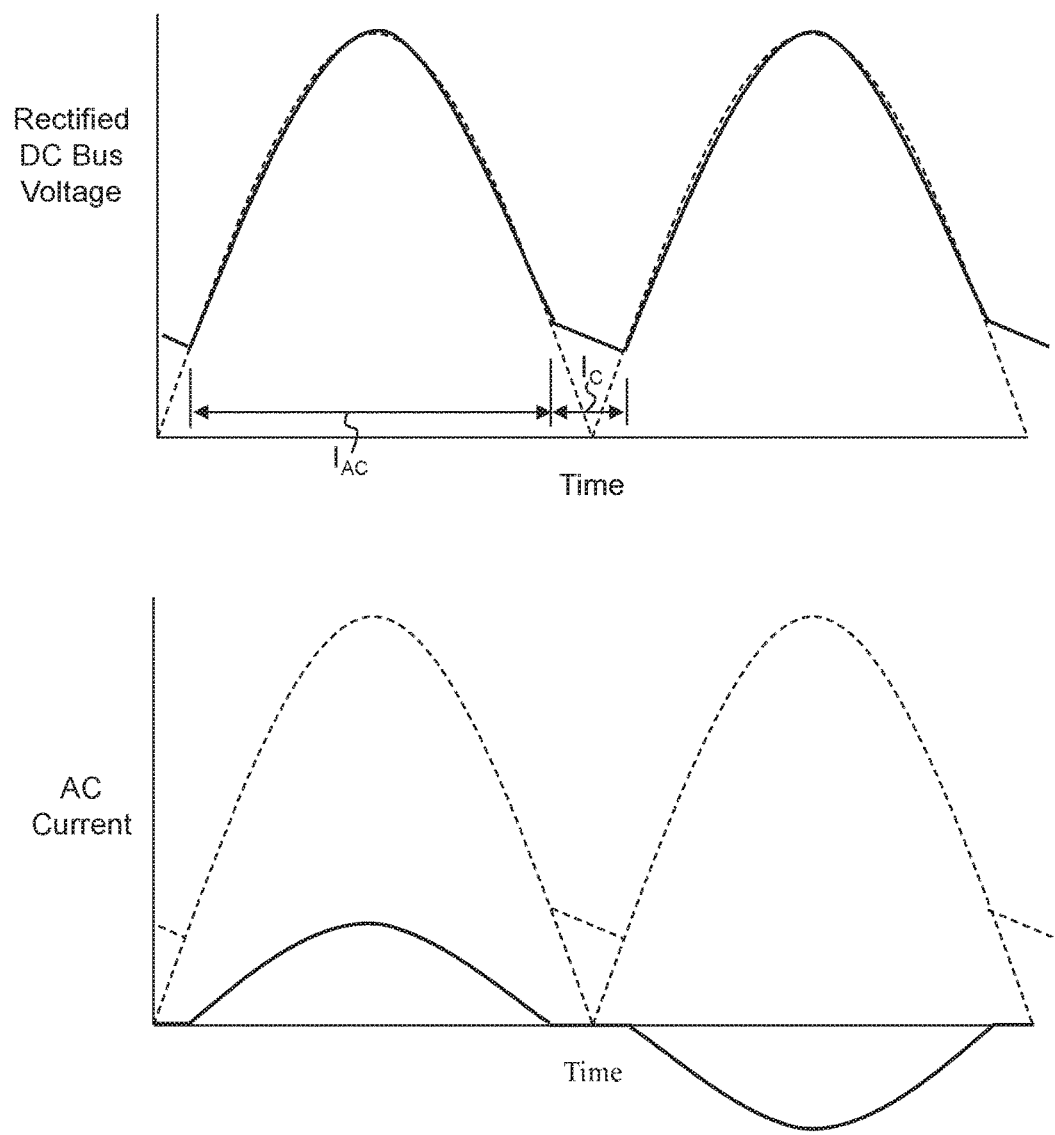
FIG. 15D depicts an exemplary rectified voltage waveform diagram and a corresponding current waveform diagram using a relatively small capacitor on the DC bus line, according to an embodiment.

FIGS. 15B-15D highlight yet another advantage of using a small capacitor. FIG. 15B, in an embodiment, depicts the voltage waveform using a large capacitor (e.g., approximately 4,000 microF) and the associated current waveform under heavy load. FIG. 15C depicts the voltage waveform using a medium sized capacitor (e.g., approximately 1000 microF) and the associated current waveform under heavy load. FIG. 15D depicts the voltage waveform using a small capacitor (e.g., approximately 200 microF) and the associated current waveform under heavy load.

When using a large capacitor as shown in the exemplary waveform diagram of FIG. 15B, the current supplied to the motor is drawn from the capacitor for a large portion of each cycle. This in effect shrinks the portion of each cycle during which current is drawn from the AC power supply, which results in large current spikes to occur within each cycle. For example, to obtain a constant RMS current of 10 A from the AC power supply, the current level within the small time window increases substantially. This increase often results in large current spikes. Such current spikes are undesirable for two reasons. First, the power factor of the tool becomes low, and the harmonic content of the AC current becomes high. Second, for a given amount of energy transferred from the AC source to the tool, the RMS value of the current will be high. The practical result of this arrangement is that an unnecessarily large AC circuit breaker is required to handle the current spikes for a given amount of work.

By comparison, when using a medium-sized capacitor as shown in FIG. 15C, the current is drawn from AC power supply within each cycle within a broader time window, which provides a lower harmonic content and higher power factor. Similarly, when using a small capacitor as shown in FIG. 15D, current drawn from the capacitor is very small (almost negligible) within each cycle, providing a larger window for current to be drawn from the AC power supply. This provides an even lower harmonic content and a much higher power factor in comparison to FIGS. 15C and 15D. As will be discussed later (see FIG. 12 below), through the small capacitors provide a lower average voltage to the motor control circuit 204, it is indeed possible to obtain a higher power output from a small capacitor 224 due to the lower harmonic context and higher power factor.

Another advantage of using a small capacitor is size. Capacitors available in the market have a typical size to capacitance ratio of 1 cm$^3$ to 1 uF. Thus, while it is practical to fit a small capacitor (e.g., 10-200 uF) into a power tool housing depending on the power tool size and application, using a larger capacitor may create challenges from an ergonomics standpoint. For example, a 1000 uF capacitor is approximately 1000 cm$^3$ in size. Conventional power tool applications that require large capacitors typically use external adaptors to house the capacitor. In embodiments of the invention, capacitor 224 is small enough to be disposed within the tool housing, e.g., inside the tool handle.

According to an embodiment of the invention, the power tool 128 of the invention may be powered by a DC power supply, e.g., a DC generator such as a welder having a DC output power line, having a DC output voltage of 120V. Using a small capacitor 224 value of approximately 0-50 microF, power tool 128 may provide a higher max power out from a DC power supply having an average voltage of 120V, than it would from a 120V AC mains power supply, which has an average voltage of 108V. As discussed above, using a small capacitor of 0-50 microF, the DC bus voltage resulting from a 120V AC mains power supply remains at an average of approximately 108V. An exemplary power tool may provide a maximum cold power output of approximately 1600 W from the 108V DC bus. By comparison, the same power tool provides a maximum cold power output of more than 2200 W from the DC bus when power is being supplied by the 120V DC power supply. This improvement represents a ratio of 2200/1600=1.37 (which corresponds to the voltage ratio ^3, i.e., (120/108)^3).

Figure 15E:
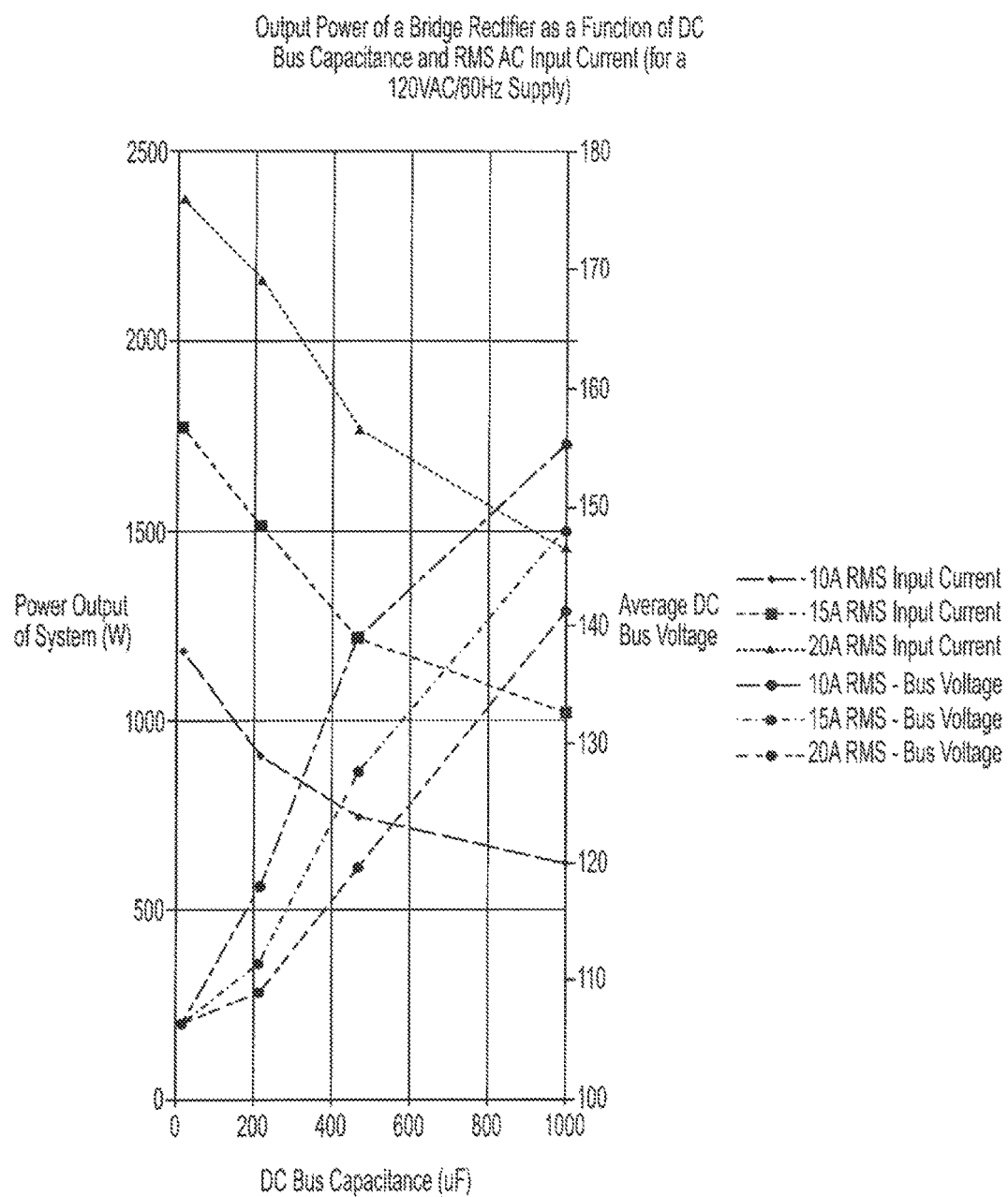
FIG. 15E depicts an exemplary combined diagram showing power output/capacitance, and average DC bus voltage/capacitance waveforms at various RMS current ratings, according to an embodiment.

According to an embodiment of the invention, it is possible to provide comparable power outputs from the AC and DC power supplies by adjusting the value of the capacitor 224. FIG. 15E depicts an exemplary combined diagram showing power output/capacitance, and average DC bus voltage/capacitance waveforms. The x axis in this diagram depicts varying capacitor value from 0 to 1000 uF. The Y axes respectively represent the maximum power watts-out (W) of the power tool ranging from 0-2500 W, and the average DC bus voltage (V) ranging from 100-180V represented by dotted lines. The three RMS current values represent the rated RMS current of the AC power supply. For example, in the US, the wall socket may be protected by a 15 A RMS current circuit breaker. In this example, it is assumed that the power tool is operating under heavy load close to its maximum current rating.

As shown in this diagram, for a power tool configured to be powered by a 10 A RMS current power supply (i.e., the tool having a current rating of approximately 10 A RMS current, or a power supply having a current rating of 10 A RMS current), the average DC bus voltage under heavy load is in the range of approximately 108-118V for the capacitor range of 0-200 uF; approximately 118-133V for capacitor range of 200 to 400 uF; approximately 133-144V for capacitor range of 400-600 uF, etc.

Similarly, for a power tool configured to be powered by a 15 A RMS current power supply (i.e., the tool having a current rating of approximately 15 A RMS current, or a power supply having a current rating of 15 A RMS current), the average DC bus voltage under heavy load is in the range of approximately 108-112V for the capacitor range of 0-200 uF; approximately 112-123V for capacitor range of 200 to 400 uF; approximately 123-133V for capacitor range of 400-600 uF, etc.

Similarly, for a power tool configured to be powered by a 20 A RMS current power supply (i.e., the tool having a current rating of approximately 20 A RMS current, or a power supply having a current rating of 20 A RMS current), the average DC bus voltage under heavy load is in the range of approximately 108-110V for the capacitor range of 0-200 uF; approximately 110-117V for capacitor range of 200 to 400 uF; approximately 117-124V for capacitor range of 400-600 uF, etc.

In an embodiment, in order to provide an average DC bus voltage from the AC mains power supply (e.g., a 108V nominal RSM voltage) that is comparable to the nominal voltage received from the DC power supply (120 VDC), the capacitor value may be adjusted based on the current rating of the power tool and the target DC bus voltage. For example, a capacitor value of approximately 230 uF may be used for a tool powered by a 10 A RMS current power supply (i.e., the tool having a current rating of approximately 10 A RMS current, or configured to be powered by a power supply having a current rating of 10 A RMS current) to provide an average DC bus voltage of approximately 120V from the AC mains. This allows for the power tool to provide a substantially similar output levels for 120V AC power supply as it would from a 120V DC power supply.

Similarly, a capacitor value of approximately 350 uF may be used for a tool powered by a 15 A RMS current power supply (i.e., the tool having a current rating of approximately 15 A RMS current, or configured to be powered by a power supply having a current rating of 15 A RMS current) to provide an average DC bus voltage of approximately 120V from the AC mains. More generally, capacitor may have a value in the range of 290-410 uF for a tool powered by a 15 A RMS current power supply to provide an average voltage substantially close to 120V on the DC bus from the AC mains. This allows for the power tool to provide a substantially similar output levels for 120V AC power supply as it would from a 120V DC power supply.

Finally, a capacitor value of approximately 500 uF may be used for a tool powered by a 20 A RMS current power supply (i.e., the tool having a current rating of approximately 20 A RMS current, or configured to be powered by a power supply having a current rating of 20 A RMS current) to provide an average DC bus voltage of approximately 120V from the AC mains. More generally, the capacitor may have a value in the range of 430-570 uF for a tool powered by a 20 A RMS current power supply to provide an average voltage substantially close to 120V on the DC bus from the AC mains. This allows for the power tool to provide a substantially similar output levels for 120V AC power supply as it would from a 120V DC power supply.

III. Example Power Tool System

Figure 1B:
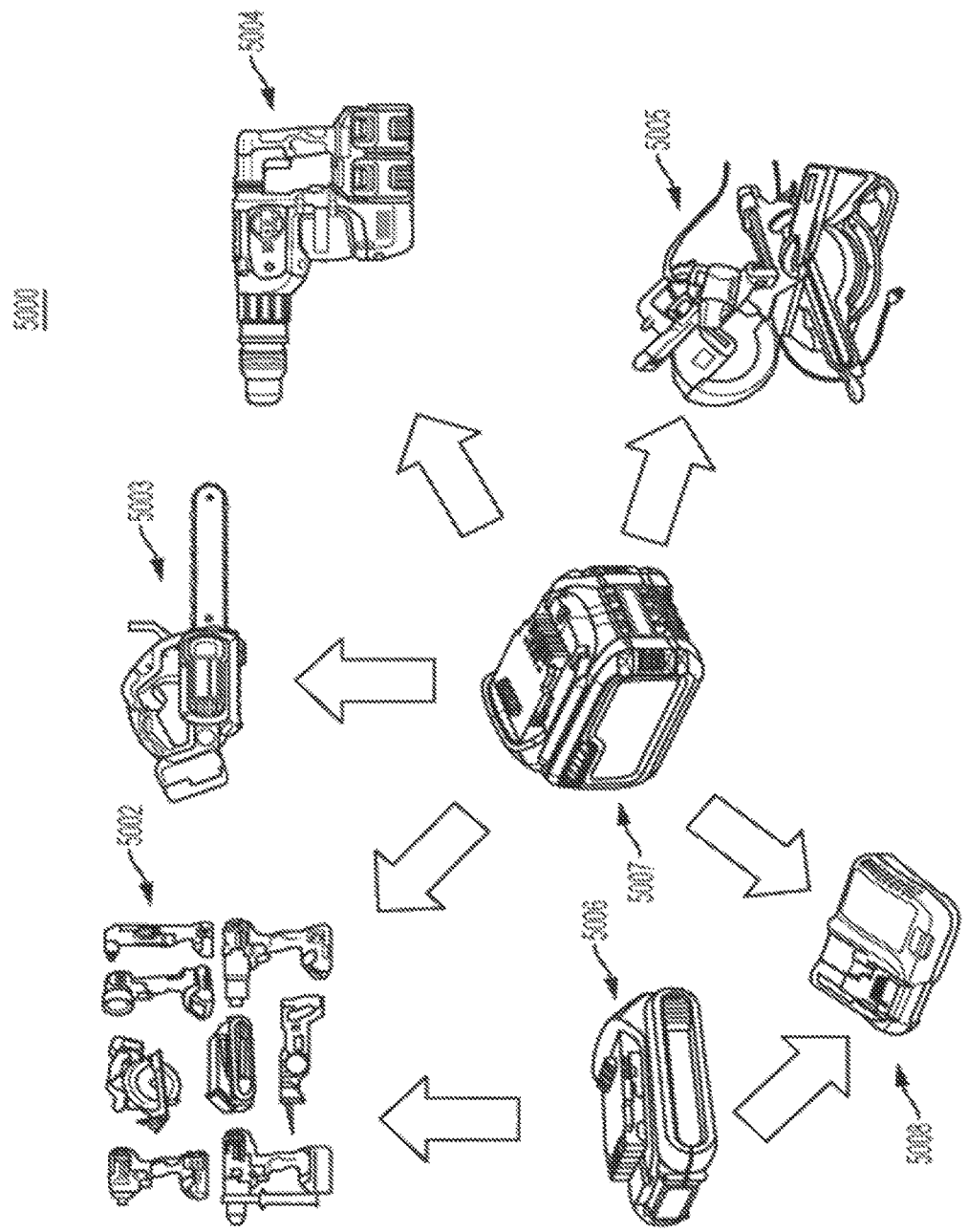
FIG. 1B is a schematic diagram of one particular implementation of a power tool system.

FIG. 1B illustrates one particular implementation of the power tool system 5001, in accordance with the above disclosure, that includes a set of low rated voltage DC power tools 5002, a set of medium rated voltage DC power tools 5003, a set of high rated voltage DC power tools 5004, a set of high or AC rated voltage AC/DC power tools 5005, a set of low rated voltage battery packs 5006, a set of low/medium rated convertible battery packs 5007, a high rated voltage AC power supply 5008, and a low rated voltage battery pack charger 5009.

The low rated voltage battery packs 5006 have a rated voltage range of 17V-20V, with an advertised voltage of 20V, an operating voltage range of 17V-19V, a nominal voltage of 18V, and a maximum voltage of 20V. Each of the low rated voltage battery packs includes a power tool interface or terminal block that enables the battery pack 5006 to be coupled to the low rated voltage power tools 5002 and to the low rated voltage battery chargers 5009. In one implementation, at least some of the low rated voltage battery packs 5006 were on sale prior to May 18, 2014. For example, the low rated voltage battery packs 5006 may include certain ones of DEWALT 20V MAX battery packs, sold by DEWALT Industrial Tool Co. of Towson, Md.

The low/medium rated voltage convertible battery packs 5007 are convertible between a first configuration having a low rated voltage and a higher capacity and a second configuration having a medium rated voltage and a lower capacity. In the first configuration, the low rated voltage is approximately 17V-20V, with an advertised voltage of 20V, an operating voltage range of 17V-19V, a nominal voltage of 18V, and a maximum voltage of 20V. The low rated voltage of the convertible battery packs 5007 corresponds to the low rated voltage of the low rated voltage battery packs 5006. In the second configuration, the medium rated voltage may be approximately 51V-60V, with an advertised voltage of 60V, an operating voltage range of 51V-57V, a nominal voltage of 54V, and a maximum voltage of 60V. For example, the convertible battery packs 5007 may be labeled as 20V/60V MAX battery packs to indicate the multiple voltage ratings of these convertible battery packs 5007.

The convertible battery packs 5007 would not have been available to the public or on sale prior to May 18, 2014. Each of the low/medium rated voltage battery packs 5007 includes a power tool interface or terminal block that enables the battery pack 5007 to be coupled to the low rated voltage power tools 5002 and to the low rated voltage battery chargers 5009 when in the low rated voltage configuration, and to the medium rated voltage DC power tools 5003, the high rated voltage DC power tools 5004, and the AC/DC power tools 5005 when in the medium rated voltage configuration.

The AC power supply 5008 has a high rated voltage that corresponds to the AC mains rated voltage in North America and Japan (e.g., 100V-120V) or to the AC mains rated voltage in Europe, South America, Asia, and Africa (e.g., 220V-240V).

The low rated voltage DC power tools 5002 are cordless only tools. The low rated voltage DC tools 5002 have a rated voltage range of approximately 17V-20V, with an advertised voltage of 20V and an operating voltage range of 17V-20V. The low rated voltage DC power tools include tools that have permanent magnet DC brushed motors, universal motors, and permanent magnet brushless DC motors, and may include constant speed and variable speed tools. The low rated voltage DC power tools may include cordless power tools having relatively low power output requirements, such as drills, circular saws, screwdrivers, reciprocating saws, oscillating tools, impact drivers, and flashlights, among others. The low rated voltage DC rated voltage power tools 5002 may include power tools that were on sale prior to May 18, 2014. Examples of the low rated voltage power tools 5002 may include one or more of the DeWALT® 20V MAX set of cordless power tools sold by DeWALT Industrial Tool Co. of Towson, Md.

Each of the low rated voltage power tools 5002 includes a single battery pack interface or receptacle with a terminal block for coupling to the power tool interface of one of the low rated voltage battery packs 5006, or to the power tool interface of one of the convertible low/medium rated voltage battery packs 5007. The battery pack interface or receptacle is configured to place or retain the convertible battery pack 5007 into its low rated voltage configuration. Thus, the low rated voltage power tools 5002 may operate using either the low rated voltage battery packs 5006 or the convertible low/medium rated voltage battery packs 5007 in their low rated voltage configuration. This is because the 17V-20V rated voltage of the battery packs 5006, 5007 corresponds to the 17V-20V rated voltage of low rated voltage the power tools 5002.

The medium rated voltage DC power tools 5003 are cordless only tools. The medium rated voltage DC power tools 5003 have a rated voltage range of approximately 51V-60V, with an advertised voltage of 60V and an operating voltage range of 51V-60V. The medium rated voltage DC power tools include tools that have permanent magnet DC brushed motors, universal motors, and permanent magnet brushless DC motors, and may include constant speed and variable speed tools. The medium rated voltage DC power tools may include similar types of tools as the low rated voltage DC tools 5002 that have relatively higher power requirements, such as drills, circular saws, screwdrivers, reciprocating saws, oscillating tools, impact drivers and flashlights. The medium rated voltage tools 5003 may also or alternatively have other types of tools that require higher power or capacity than the low rated voltage DC tools 5002, such as chainsaws (as shown in the figure), string trimmers, hedge trimmers, lawn mowers, nailers and/or rotary hammers. The medium rated voltage DC rated voltage power tools 3 do not include power tools that were on sale prior to May 18, 2014.

Each of the medium rated voltage DC power tools 5003 includes a single battery pack interface or receptacle with a terminal block for coupling to the power tool interface of the convertible low/medium rated voltage battery packs 5007. The battery pack interface or receptacle is configured to place or retain the convertible battery pack 5007 in a medium rated voltage configuration. Thus, the medium rated voltage power tools 5003 may operate using the convertible low/medium rated voltage battery packs 5007 in the medium rated voltage configuration. This is because the 51V-60V rated voltage of the battery packs 5007 corresponds to the 51V-60V rated voltage of medium rated voltage power tools 5003.

The high rated voltage DC power tools 4 are cordless only tools. The high rated voltage DC tools 5004 have a rated voltage range of approximately 100V-120V, with an advertised voltage of 120V and an operating voltage range of 100V-120V. The high rated voltage DC power tools include tools that have permanent magnet DC brushed motors, universal motors, and permanent magnet brushless DC motors, and may include constant speed and variable speed tools. The medium rated voltage DC power tools may include tools such as drills, circular saws, screwdrivers, reciprocating saws, oscillating tools, impact drivers, flashlights, string trimmers, hedge trimmers, lawn mowers, nailers and/or rotary hammers. The high rated DC power tools may also or alternatively include other types of tools that require higher power or capacity such as rotary hammers (as shown in the figure), miter saws, chain saws, hammer drills, grinders, and compressors. The high rated voltage DC rated voltage power tools 4 do not include power tools that were on sale prior to May 18, 2014.

Each of the high rated voltage DC power tools 5004 includes a battery pack interface having a pair of receptacles each with a terminal block for coupling to the power tool interface of convertible low/medium rated voltage battery packs 5007. The battery pack receptacles are configured to place or retain the convertible battery packs 5007 into their medium rated voltage configurations. The power tools 5004 also include a switching circuit (not shown) to connect the two battery packs 5007 to one another and to the tool in series, so that the voltages of the battery packs 5007 are additive. The high rated voltage power tools 5004 may be powered by and operate with the convertible low/medium rated voltage battery packs 5007 in their medium rated voltage configuration. This is because the two battery packs 5007, being connected in series, together have a rated voltage of 102V-120V (double that of a single battery pack 7), which corresponds to the 100V-120V rated voltage of high rated voltage power tools 5004.

The high rated voltage AC/DC power tools 5005 are corded/cordless tools, meaning that they can be powered by either the AC power supply 5008 or the convertible low/medium rated voltage battery packs 5007. The high rated voltage AC/DC tools 5005 have a rated voltage range of approximately 100V-120V (and perhaps as large as 90V-132V), with an advertised voltage of 120V and an operating voltage range of 100V-120V (and perhaps as large as 90V-132V). The high rated voltage AC/DC power tools 5005 include tools that have universal motors or brushless motors (e.g., permanent magnet brushless DC motors), and may include constant speed and variable speed tools. The high rated voltage AC/DC power tools 5005 may include tools such as drills, circular saws, screwdrivers, reciprocating saws, oscillating tools, impact drivers, flashlights, string trimmers, hedge trimmers, lawn mowers, nailers and/or rotary hammers. The high rated DC power tools may also or alternatively include other types of tools that require higher power or capacity such as miter saws (as shown in the figure), chain saws, hammer drills, grinders, and compressors. The high rated voltage AC/DC rated voltage power tools 5004 do not include power tools that were on sale prior to May 18, 2014.

Each of the high rated voltage AC/DC power tools 5005 includes a power supply interface having a pair of battery pack receptacles and an AC cord or receptacle. The battery pack receptacles each have a terminal block for coupling to the power tool interface of one of the convertible low/medium rated voltage battery packs. The battery pack receptacles are configured to place or retain the convertible battery packs 5007 in their medium rated voltage configurations. The AC cord or receptacle is configured to receive power from the AC power supply 5008. The power tools 5005 include a switching circuit (not shown) configured to select between being powered by the AC power supply 5008 or the convertible battery packs 5007, and to connect the two convertible battery packs 5007 to one another and to the tool in series, so that the voltages of the battery packs 5007 are additive. The high rated voltage AC/DC power tools 5005 may be powered by and operate with two convertible low/medium rated voltage battery packs 5007 in their medium rated voltage configuration, or with the AC power supply 5008. This is because the two battery packs 5007, being connected in series, together have a rated voltage of 102V-120V (double that of a single battery pack 5007) and the AC power supply may have a rated voltage of 100V-120V (depending on the country), which corresponds to the 100V-120V rated voltage of high rated voltage AC/DC power tools 5005. In countries having AC power supplies with a rating of 220V-240V, the AC/DC power tools may be configured to reduce the voltage from the AC mains power supply voltage to correspond to the rated voltage of the AC/DC power tools (e.g., by using a transformer to convert 220 VAC-240 VAC to 100 VAC-120 VA).

In certain embodiments, the motor control circuits of the power tools 5002, 5003, 5004, and 5005 may be configured to optimize the motor performance based on the rated voltage of the lower rated voltage power supply using the motor control techniques (e.g., conduction band, advance angle, cycle-by-cycle current limiting, etc.) described above.

The battery pack chargers 5009 have a rated voltage range of 17V-20V, with an advertised voltage of 20V, an operating voltage range of 17V-20V, a nominal voltage of 18V, and a maximum voltage of 20V. Each of the low rated voltage battery pack chargers includes a battery pack interface or receptacle that enables the battery pack charger 5009 to be coupled to the power tool interface of one of the low rated voltage battery packs 5006, or to the power tool interface of one of the convertible low/medium rated voltage battery packs 5007. The battery pack interface or receptacle is configured to place or retain the convertible battery pack 5007 into a low rated voltage configuration. Thus, the battery pack charge 5009 may charge both the low rated voltage battery packs 5006 and the low/medium rated voltage battery packs 5007 (in their low rated voltage configuration). This is because the 17V-20V rated voltages of the battery packs 5006, 5007 correspond to the 17V-20V rated voltage of low rated voltage chargers 5009. In one implementation, at least some of the low rated voltage battery pack chargers 5009 were on sale prior to May 18, 2014. For example, the low rated voltage battery pack chargers 5009 may include certain ones of DEWALT 20V MAX battery pack chargers, sold by DEWALT Industrial Tool Co. of Towson, Md.

It is notable that the low/medium rated voltage (e.g., 17V-20V/51V-60V) convertible battery packs 5007 are backwards compatible with preexisting low rated voltage (e.g., 17V-20V) DC power tools 5002 and low rated voltage (e.g., 17V-20V) battery pack chargers 5009, and can also be used to power the medium rated voltage (e.g., 51V-60V) DC power tools 5003, the high rated voltage (e.g., 100V-120V) DC power tools 5004, and the high rated voltage (e.g., 100V-120V) AC/DC power tools 5005. It is also notable that a pair of the low/medium rated voltage (e.g., 17V-20V/51V-60V) convertible battery packs 5007 may be connected in series to produce a high rated voltage (e.g., 100V-120V) that generally corresponds to an AC rated voltage (e.g., 100V-120V) in North America and Japan. Thus, the convertible battery packs 5007 are able to power a wide range of rated voltage power tools ranging from preexisting low rated voltage power tools to the high rated AC/DC voltage power tools.

IV. Miscellaneous

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

In this disclosure, a "control unit" refers to a processing circuit. The processing circuit may be a programmable controller, such as a microcontroller, a microprocessor, a computer processor, a signal processor, etc., or an integrated circuit configured and customized for a particular use, such as an Application Specific Integrated Circuit (ASIC), a field-programmable gate array (FPGA), etc., packaged into a chip and operable to manipulate and process data as described above. A "control unit" may further include a computer readable medium as described above for storing processor-executable instructions and data executed, used, and stored by the processing circuit.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. Numerous modifications may be made to the exemplary implementations that have been described above. These and other implementations are within the scope of the following claims.

What is claimed is:

1. A power tool comprising:
a housing;
a universal motor having a positive terminal, a negative terminal, and a commutator engaging a pair of brushes coupled to the positive and the negative terminals, the motor being configured to operate within an operating voltage range;
a power supply interface arranged to receive at least one of Alternating Current (AC) power from an AC power supply having a first nominal voltage or Direct Current (DC) power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit configured to supply AC power from the AC power line or DC power from the DC power line via a common node to the motor such that the brushes are electrically coupled to one of the AC or DC power supplies, the motor control circuit being configured to reduce a supply of power from the AC power line to the motor to a level corresponding to the operating voltage of the operating voltage range of the motor, wherein the motor control circuit comprises:

a phase-controlled AC switch disposed in series with the AC power line, and a control unit configured to control a phase of the AC switch, the control unit setting a fixed conduction band for the AC switch corresponding to the difference between the first nominal voltage and the operating voltage range of the motor, the fixed conduction band being less than 180 degrees to reduce an average voltage amount on the AC line to a level that falls within the operating voltage range of the motor.

2. The power tool of claim 1, wherein the motor control circuit comprises a control unit coupled to a power switch arranged on the DC power line, the control unit being configured to monitor a fault condition associated with the DC power supply and turn the power switch off to cut off a supply of power from the DC power supply to the motor.

3. The power tool of claim 1, further comprising a power supply switching unit arranged to isolate the AC power line and the DC power line, wherein the power supply switching unit comprises at least one of a relay switch arranged on the DC power line and activated by a coil coupled to the AC power line, at least one double-pole double-throw switch arranged between the common node of the AC and DC power lines and the power supply interface, and/or at least one single-pole double-throw switch having an output terminal coupled to the common node of the AC and DC power lines.

4. The power tool of claim 1, wherein the DC power supply comprises a high rated voltage battery pack with the second nominal voltage being in the range of approximately 100V to 120V.

5. The power tool of claim 1, wherein the DC power supply comprises at least two medium-rated voltage battery packs and the power supply interface is configured to connect two or more of the at least two battery packs in series to obtain the second nominal voltage being in the range of approximately 100V to 120V.

6. The power tool of claim 1, wherein the operating voltage range of the motor is approximately within a range of 100V to 120V encompassing the second nominal voltage, the first nominal voltage is in the range of 220 VAC to 240 VAC, and the control unit is configured to set the fixed conduction band of the AC switch to a value within the range of 100 to 140 degrees.

7. The power tool of claim 1, wherein the operating voltage range of the motor is approximately within a range of 60V to 90V encompassing the second nominal voltage, the first nominal voltage is in the range of 100 VAC to 120 VAC, and the control unit is configured to set the fixed conduction band of the AC switch to a value within the range of 70 to 110 degrees.

8. The power tool of claim 1, wherein the control unit is configured to operate the tool at constant speed at the fixed conduction band.

9. The power tool of claim 1, wherein the AC switch includes a phase controlled switch comprising one of a triac, a thyristor, or a SCR switch, and the controller is configured to control a phase of the AC switch according to a desired speed of the motor.

10. The power tool of claim 1, wherein the motor control circuit further comprising a DC switch circuit arranged between the DC power line and the motor, wherein the control unit is configured to control a switching operation of the DC switch circuit or the AC switch to control a speed of the motor enabling variable speed operation of the motor at constant load.

11. The power tool of claim 10, wherein the DC switch circuit comprises one or more controllable semiconductor switches configured in at least one of a chopper circuit, a half-bridge circuit, or a full-bridge circuit, and the control unit is configured to control a pulse-width modulation (PWM) duty cycle of the one or more semiconductor switches according to a desired speed of the motor.

12. The power tool of claim 10, wherein the control unit is configured to vary a conduction angle of the AC switch from zero up to the fixed conduction band according to a desired speed of the motor.

13. The power tool of claim 10, wherein the control unit is configured to sense current on one of the AC power line or the DC power line to set a mode of operation to one of an AC mode of operation or a DC mode of operation, and control the switching operation of one or the other of the DC switch circuit or the AC switch based on the mode of operation.

14. A power tool comprising:

a housing;

a universal motor having a positive terminal, a negative terminal, and a commutator engaging a pair of brushes coupled to the positive and the negative terminals, the motor being configured to operate within an operating voltage range;

a power supply interface arranged to receive at least one of Alternating Current (AC) power from an AC power supply having a first nominal voltage or Direct Current (DC) power from a DC power supply having a second nominal voltage, the DC power supply comprising at least one removable battery pack coupled to the power supply interface, the power supply interface configured to output the AC power via an AC power line and the DC power via a DC power line, wherein the second nominal voltage falls approximately within the operating voltage range of the motor, but the first nominal voltage is substantially higher than the operating voltage range of the motor; and a motor control circuit configured to supply electric power from one of the AC power line or the DC power line via a common node to the motor such that the brushes are electrically coupled to one of the AC or DC power supplies, the motor control circuit being configured to reduce a supply of power from the AC power line to the motor to a level corresponding to the operating voltage of the operating voltage range of the motor, wherein the motor control circuit comprises: a power switching unit including a diode bridge and a controllable semiconductor switch nested within the diode bridge, wherein the AC and DC power lines of the power supply interface are jointly coupled to a first node of the diode bridge and the motor is coupled to a second node of the diode bridge; and a control unit configured to control a switching operation of the semiconductor switch to control a speed of the motor enabling variable speed operation of the motor at constant load, wherein the control unit is configured to control a phase of the AC power line via the semiconductor switch.

15. A power tool comprising:
a housing;
an electric universal motor having a positive terminal, a negative terminal, and a commutator engaging a pair of brushes coupled to the positive and the negative terminals;
a power supply interface arranged to receive at least one of Alternating Current (AC) power from an AC power supply or Direct Current (DC) power from a DC power supply, and to output the AC power via an AC power line and the DC power via a DC power line;
a power switching unit comprising a diode bridge and a controllable semiconductor switch nested within the diode bridge, wherein the AC and DC power lines of the power supply interface are jointly coupled to a first node of the diode bridge and the motor is coupled to a second node of the diode bridge; and
a control unit configured to control a switching operation of the semiconductor switch to control a speed of the motor enabling variable speed operation of the motor at constant torque.

16. The power tool of claim 15, wherein the control unit is configured to sense current on one of the AC power line or the DC power line to set a mode of operation to one of an AC mode of operation or a DC mode of operation, and control the switching operation of the semiconductor switch according to the mode of operation.

17. The power tool of claim 16, wherein, in the DC mode of operation, the control unit is configured to set a pulse-width modulation (PWM) duty cycle according to a desired speed of the motor and turn the semiconductor switch on and off periodically in accordance with the PWM duty cycle, and, in the AC mode of operation, the control unit is configured to set a conduction band according to a desired speed of the motor and, within each AC line half-cycle, turn the semiconductor switch ON at approximately the beginning of the conduction band and turn the semiconductor switch OFF at approximately a zero crossing of the AC power line.

18. The power tool of claim 15, wherein the power tool further comprises a second semiconductor switch and a freewheel diode disposed in series with the motor to allow a current path for a motor current during an off-cycle of the semiconductor switch in the DC mode of operation.

19. The power tool of claim 15, wherein the semiconductor switch comprises one of a field effect transistor (FET) or an insulated gate bipolar transistor (IGBT).

20. The power tool of claim 15, wherein the diode bridge is arranged to rectify the AC power line through the semiconductor switch, but not through the motor.

21. The power tool of claim 15, wherein the power switching unit is arranged between the common node of the AC and DC power lines.

* * * * *